US008938068B2

(12) United States Patent
Kobayashi et al.

(10) Patent No.: US 8,938,068 B2
(45) Date of Patent: Jan. 20, 2015

(54) FUNCTIONAL ENCRYPTION APPLIED SYSTEM, INFORMATION OUTPUT APPARATUS, INFORMATION PROCESSING APPARATUS, ENCRYPTION PROTOCOL EXECUTION METHOD, INFORMATION OUTPUT METHOD, INFORMATION PROCESSING METHOD, PROGRAM AND RECORDING MEDIUM

(75) Inventors: Tetsutaro Kobayashi, Tokyo (JP); Koutarou Suzuki, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 33 days.

(21) Appl. No.: 13/387,764

(22) PCT Filed: Jul. 30, 2010

(86) PCT No.: PCT/JP2010/062948
§ 371 (c)(1),
(2), (4) Date: Mar. 15, 2012

(87) PCT Pub. No.: WO2011/016401
PCT Pub. Date: Feb. 10, 2011

(65) Prior Publication Data
US 2012/0163588 A1 Jun. 28, 2012

(30) Foreign Application Priority Data

Aug. 3, 2009 (JP) ................................. 2009-180493

(51) Int. Cl.
*H04L 9/28* (2006.01)
*H04L 9/30* (2006.01)
*H04L 9/08* (2006.01)

(52) U.S. Cl.
CPC ............ *H04L 9/3073* (2013.01); *H04L 9/0847* (2013.01)
USPC .......................................................... 380/28

(58) Field of Classification Search
USPC ........ 380/28, 30, 44, 255; 713/170, 180, 182, 713/189; 726/1
See application file for complete search history.

(56) References Cited

U.S. PATENT DOCUMENTS 5,751,811 A * 5/1998 Magnotti et al. ................. 380/28
5,864,667 A * 1/1999 Barkan ............................ 726/10
(Continued)

FOREIGN PATENT DOCUMENTS

WO WO 2008/066671 A2 6/2008

OTHER PUBLICATIONS

Jonathan Katz, et al., "Predicate Encryption Supporting Disjunctions, Polynomial Equations, and Inner Products", Cryptology ePrint Archive, Report 2007/404, Jul. 7, 2008, pp. 1-29.
(Continued)

*Primary Examiner* — Michael R Vaughan
*Assistant Examiner* — Richard McCoy
(74) *Attorney, Agent, or Firm* — Oblon, Spivak, McClelland, Maier & Neustadt, L.L.P.

(57) ABSTRACT

An information output apparatus identifies, according to a rule established for each of functional encryption protocols or a rule established for each combination of the protocols, one or more identifiers corresponding to a particular functional encryption protocol or a combination of the particular protocols, sets a particular piece of first correspondence information corresponding to the identifier or identifiers, and outputs first information which is a ciphertext or key information of the functional encryption scheme that corresponds to the particular piece of first correspondence information. An information processing apparatus inputs the first information and second information which is key information or a ciphertext of the functional encryption scheme that corresponds to a particular piece of second correspondence information into a decryption function of the functional encryption scheme and, when the truth value of a logical formula corresponding to the combination of the particular piece of first correspondence information corresponding to the first information and the particular piece of second correspondence information corresponding to the second information is true, generates a decryption result.

34 Claims, 62 Drawing Sheets

(56) References Cited

U.S. PATENT DOCUMENTS

| | | | | |
|---|---|---|---|---|
| 6,259,789 | B1* | 7/2001 | Paone | 380/28 |
| 6,937,728 | B1* | 8/2005 | Abe et al. | 380/237 |
| 7,139,918 | B2* | 11/2006 | Chang et al. | 713/193 |
| 7,184,549 | B2* | 2/2007 | Sorimachi et al. | 380/37 |
| 7,200,226 | B2* | 4/2007 | Bace | 380/37 |
| 7,443,980 | B2* | 10/2008 | Gentry et al. | 380/28 |
| 7,549,147 | B2* | 6/2009 | Futoransky et al. | 717/155 |
| 7,599,890 | B2* | 10/2009 | Hori et al. | 705/51 |
| 7,634,085 | B1* | 12/2009 | Sahai et al. | 380/28 |
| 7,660,417 | B2* | 2/2010 | Blom et al. | 380/249 |
| 7,882,363 | B2* | 2/2011 | Duffy et al. | 713/186 |
| 8,086,536 | B2* | 12/2011 | Dublish et al. | 705/57 |
| 8,166,300 | B2* | 4/2012 | Bjorkengren et al. | 713/170 |
| 8,290,146 | B2* | 10/2012 | Takashima | 380/28 |
| 8,291,231 | B2* | 10/2012 | Ueno et al. | 713/176 |
| 2003/0053625 | A1* | 3/2003 | Bially et al. | 380/42 |
| 2004/0030896 | A1* | 2/2004 | Sakamura et al. | 713/169 |
| 2004/0073790 | A1 | 4/2004 | Ateniese et al. | |
| 2004/0205247 | A1* | 10/2004 | Ahn | 709/245 |
| 2006/0075220 | A1* | 4/2006 | Baugher | 713/156 |
| 2006/0126841 | A1* | 6/2006 | Pal et al. | 380/255 |
| 2006/0230266 | A1* | 10/2006 | Maes | 713/168 |
| 2006/0280297 | A1* | 12/2006 | Fukaya | 380/28 |
| 2006/0294575 | A1* | 12/2006 | Rogers | 726/1 |
| 2007/0116275 | A1* | 5/2007 | Fadili et al. | 380/46 |
| 2007/0223703 | A1 | 9/2007 | Verma et al. | |
| 2008/0170693 | A1* | 7/2008 | Spies et al. | 380/277 |
| 2008/0263357 | A1 | 10/2008 | Boyen | |
| 2008/0304664 | A1* | 12/2008 | Suthaharan | 380/46 |
| 2009/0034716 | A1* | 2/2009 | Teranishi | 380/28 |
| 2009/0132423 | A1* | 5/2009 | Liu | 705/70 |
| 2012/0027201 | A1* | 2/2012 | Fujisaki et al. | 380/28 |
| 2012/0027210 | A1* | 2/2012 | Takeuchi et al. | 380/255 |
| 2013/0070925 | A1* | 3/2013 | Yamada et al. | 380/255 |

OTHER PUBLICATIONS

Dan Boneh, et al., "Identity-Based Encryption from the Weil Pairing", Crypto 2001, Lecture Notes in Computer Science, vol. 2139, 2001, pp. 213-229.

Ran Canetti, et al., "A Forward-Secure Public-Key Encryption", Eurocrypt, 2003, pp. 255-271.

Yevgeniy Dodis, et al., "Intrusion-Resilient Public-Key Encryption", CT RSA 2003, Lecture Notes in Computer Science, 2612, 2003, pp. 19-32.

Dan Boneh, et al., "Public Key Encryption with keyword Search", Eurocrypt 2004, pp. 1-15.

International Standard, "ISO/IEC 18033-2: Information technology—Security—techniques—Encryption algorithms—Part 2: Asymmetric Ciphers", First Edition, 2006, pp. 10-11.

X. Boyen, et al., "Identity-Based Cryptography Standard (IBCS) #1: Supersingular Curve Implementations of the BF and BB1 Cryptosystems", RFC 5091, Voltage Security, 2007, pp. 1-63.

Ian Blake, et al., "Elliptic Curves in Cryptography", London Mathematical Society, Lecture Note Series 265, ISBN4-89471-431-0, 1999, pp. 30-35.

Alfred Menezes, "Elliptic Curve Public Key Cryptosystems", Kluwer Academic Publishers, ISBN 0-7923-9368-6, 1997, pp. 61-81.

Victor S. Miller, "Short Programs for functions on Curves", URL http://crypto.stanford.edu/miller/miller.pdf, 1986, pp. 1-7.

Atsuko Miyaji, et al., "New Explicit Conditions of Elliptic Curve Traces for FR-Reduction", IEICE Trans. Fundamentals, vol. E84, No. 5, May 2001, pp. 1234-1243.

Paulo S.L.M. Barreto, et al., "Constructing Elliptic Curves with Prescribed Embedding Degrees", Proc. SCN 2002, LNCS 2576, 2003, pp. 257-267.

R. Dupont, et al., "Building Curves with Arbitrary Small MOV Degree over Finite Prime Fields", Journal of Cryptology, vol. 18, 2005, pp. 79-89.

Jonathan Katz, et al., "Predicate Encryption Supporting Disjunctions, Polynomial Equations, and Inner Products", Eurocrypt 2008, LNCS 4965, 2008, pp. 146-162.

Craig Gentry, et al., "Hierarchical ID-Based Cryptography", Proceedings of ASIACRYPT 2002, Lecture Notes in Computer Science, 2002, pp. 548-566.

K. Kurosawa, et al., "Basic Mathematics of Modern Encryption (Electronics, information and communication lectures series)", Corona Publishing Co., Mar. 2004, pp. 116-119 (With Partial English Translation).

Adi Shamir, "How to Share a Secret", Communications of the ACM, vol. 22, No. 11, Nov. 1979, pp. 612-613.

Extended European Search Report Issued Apr. 24, 2013 in Patent Application No. 10806400.7.

Extended European Search Report issued on Jan. 22, 2014 for corresponding European Patent Application N. 10 806 400.7.

1st Office Action issued on Dec. 26, 2013, for corresponding Chinese Patent Application No. 201080033976.9 with English translation.

* cited by examiner

FIG. 5A

| IDENTIFICATION INFORMATION PI | PROTOCOL |
|---|---|
| 0 | TIMED-RELEASE ENCRYPTION |
| 1 | FORWARD SECURE ENCRYPTION |
| 2 | KEY INSULATED ENCRYPTION |
| 3 | CCA2 SECURE ENCRYPTION |

FIG. 5B

| IDENTIFICATION INFORMATION PI | PROTOCOL |
|---|---|
| 0 | TIMED-RELEASE ENCRYPTION |
| 1 | FORWARD SECURE ENCRYPTION |
| 2 | KEY INSULATED ENCRYPTION |
| 3 | CCA2 SECURE ENCRYPTION |
| 4 | TIMED-RELEASE + CCA2 SECURE ENCRYPTION |
| 5 | FORWARD SECURE + CCA2 SECURE ENCRYPTION |
| 6 | KEY INSULATED + CCA2 SECURE ENCRYPTION |
| ... | ... |

FIG. 6A

| IDENTIFIER | PROTOCOL | IDENTIFIER VALUE |
|---|---|---|
| ID(0) | TIMED-RELEASE ENCRYPTION | CHOSEN: INFORMATION IDENTIFYING FUTURE TIME POINT |
| | | NOT CHOSEN: const. |
| ID(1) | FORWARD SECURE ENCRYPTION | CHOSEN: UNIQUE IDENTIFIER + TIME PERIOD INCLUDING CURRENT TIME POINT |
| | | NOT CHOSEN: const. |
| ID(2) | KEY INSULATED ENCRYPTION | CHOSEN: UNIQUE IDENTIFIER + TIME PERIOD INCLUDING CURRENT TIME POINT |
| | | NOT CHOSEN: const. |
| ID(3) | CCA2 SECURE ENCRYPTION | CHOSEN: ONE-TIME INFORMATION |
| | | NOT CHOSEN: const. |

FIG. 6B

| IDENTIFIER | PROTOCOL | IDENTIFIER VALUE |
|---|---|---|
| ID(0) | TIMED-RELEASE ENCRYPTION | INFORMATION IDENTIFYING FUTURE TIME POINT |
| ID(1) | FORWARD SECURE ENCRYPTION | UNIQUE IDENTIFIER + TIME PERIOD INCLUDING CURRENT TIME POINT |
| ID(2) | KEY INSULATED ENCRYPTION | UNIQUE IDENTIFIER + TIME PERIOD INCLUDING CURRENT TIME POINT |
| ID(3) | CCA2 SECURE ENCRYPTION | ONE-TIME INFORMATION |

FIG. 7

| IDENTIFIER | PROTOCOL | IDENTIFIER VALUE |
|---|---|---|
| ID(0) | TIMED-RELEASE ENCRYPTION | CHOSEN: INFORMATION IDENTIFYING FUTURE TIME POINT |
| | | NOT CHOSEN: const. |
| ID(1) | FORWARD SECURE ENCRYPTION | CHOSEN: UNIQUE IDENTIFIER + TIME PERIOD INCLUDING CURRENT TIME POINT |
| | | NOT CHOSEN: const. |
| ID(2) | KEY INSULATED ENCRYPTION | CHOSEN: UNIQUE IDENTIFIER + TIME PERIOD INCLUDING CURRENT TIME POINT |
| | | NOT CHOSEN: const. |
| ID(3) | CCA2 SECURE ENCRYPTION | CHOSEN: ONE-TIME INFORMATION |
| | | NOT CHOSEN: const. |
| ID(4) | TIMED-RELEASE AND CCA2 SECURE ENCRYPTION | CHOSEN: INFORMATION IDENTIFYING FUTURE TIME POINT + ONE-TIME INFORMATION |
| | | NOT CHOSEN: const. |
| ID(5) | FORWARD SECURE AND CCA2 SECURE ENCRYPTION | CHOSEN: UNIQUE IDENTIFIER + TIME PERIOD INCLUDING CURRENT TIME POINT + ONE-TIME INFORMATION |
| | | NOT CHOSEN: const. |
| ID(6) | KEY INSULATED AND CCA2 SECURE ENCRYPTION | CHOSEN: UNIQUE IDENTIFIER + TIME PERIOD INCLUDING CURRENT TIME POINT + ONE-TIME INFORMATION |
| | | NOT CHOSEN: const. |
| ... | ... | ... |

FIG. 8A

| ELEMENT NUMBER | INDETERMINATE COMPONENT | ELEMENT VALUE |
|---|---|---|
| 0 | $x_0 \cdot x_1 \cdot x_2 \cdot x_3$ | $ID(0) \cdot ID(1) \cdot ID(2) \cdot ID(3)$ |
| 1 | $x_0 \cdot x_1 \cdot x_2$ | $ID(0) \cdot ID(1) \cdot ID(2)$ |
| 2 | $x_0 \cdot x_1 \cdot x_3$ | $ID(0) \cdot ID(1) \cdot ID(3)$ |
| 3 | $x_0 \cdot x_2 \cdot x_3$ | $ID(0) \cdot ID(2) \cdot ID(3)$ |
| 4 | $x_1 \cdot x_2 \cdot x_3$ | $ID(1) \cdot ID(2) \cdot ID(3)$ |
| 5 | $x_0 \cdot x_1$ | $ID(0) \cdot ID(1)$ |
| 6 | $x_0 \cdot x_2$ | $ID(0) \cdot ID(2)$ |
| 7 | $x_0 \cdot x_3$ | $ID(0) \cdot ID(3)$ |
| 8 | $x_1 \cdot x_2$ | $ID(1) \cdot ID(2)$ |
| 9 | $x_1 \cdot x_3$ | $ID(1) \cdot ID(3)$ |
| 10 | $x_2 \cdot x_3$ | $ID(2) \cdot ID(3)$ |
| 11 | $x_0$ | $ID(0)$ |
| 12 | $x_1$ | $ID(1)$ |
| 13 | $x_2$ | $ID(2)$ |
| 14 | $x_3$ | $ID(3)$ |
| 15 | $(x_0)^0 \cdot (x_1)^0 \cdot (x_2)^0 \cdot (x_3)^0$ | 1 |

FIG. 8B

| ATT= | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|

FIG. 9A

| ELEMENT NUMBER | INDETERMINATE COMPONENT | ELEMENT VALUE |
|---|---|---|
| 0 | $x_0 \cdot x_1 \cdot x_2 \cdot x_3$ | $ID(0) \cdot ID(1) \cdot ID(2) \cdot ID(3)$ |
| 1 | $x_0 \cdot x_1 \cdot x_2$ | $ID(0) \cdot ID(1) \cdot ID(2)$ |
| ... | ... | ... |
| 9 | $x_1 \cdot x_3$ | $ID(1) \cdot ID(3)$ |
| 10 | $x_2 \cdot x_3$ | $ID(2) \cdot ID(3)$ |
| 11 | $x_0$ | $ID(0)$ |
| 12 | $x_1$ | $ID(1)$ |
| 13 | $x_2$ | $ID(2)$ |
| 14 | $x_3$ | $ID(3)$ |
| 15 | $(x_0)^0 \cdot (x_1)^0 \cdot (x_2)^0 \cdot (x_3)^0$ | 1 |
| 16 | $(x_0)^2 \cdot (x_1)^2 \cdot (x_2)^2 \cdot (x_3)^2$ | $\{ID(0)\}^2 \cdot \{ID(1)\}^2 \cdot \{ID(2)\}^2 \cdot \{ID(3)\}^2$ |
| 17 | $(x_0)^2 \cdot (x_1)^2 \cdot (x_2)^2 \cdot x_3$ | $\{ID(0)\}^2 \cdot \{ID(1)\}^2 \cdot \{ID(2)\}^2 \cdot ID(3)$ |
| 18 | $(x_0)^2 \cdot (x_1)^2 \cdot x_2 \cdot (x_3)^2$ | $\{ID(0)\}^2 \cdot \{ID(1)\}^2 \cdot ID(2) \cdot \{ID(3)\}^2$ |
| 19 | $(x_0)^2 \cdot x_1 \cdot (x_2)^2 \cdot (x_3)^2$ | $\{ID(0)\}^2 \cdot ID(1) \cdot \{ID(2)\}^2 \cdot \{ID(3)\}^2$ |
| ... | ... | ... |
| en | $(x_3)^2$ | $\{ID(3)\}^2$ |
| ... | ... | ... |

FIG. 9B

| ATT= | 0 | 1 | 2 | 3 | 4 | 5 | 6 | 7 | 8 | 9 | 10 | 11 | 12 | 13 | ... |
|---|---|---|---|---|---|---|---|---|---|---|---|---|---|---|---|

FIG. 10A

| ELEMENT NUMBER | INDETERMINATE COMPONENT | ELEMENT VALUE |
|---|---|---|
| 0 | $x_0 \cdot x_1 \cdot x_2 \cdot x_3$ | 0 |
| 1 | $x_0 \cdot x_1 \cdot x_2$ | 0 |
| 2 | $x_0 \cdot x_1 \cdot x_3$ | 0 |
| 3 | $x_0 \cdot x_2 \cdot x_3$ | 0 |
| 4 | $x_1 \cdot x_2 \cdot x_3$ | 0 |
| 5 | $x_0 \cdot x_1$ | 0 |
| 6 | $x_0 \cdot x_2$ | 0 |
| 7 | $x_0 \cdot x_3$ | 0 |
| 8 | $x_1 \cdot x_2$ | $\iota_0$ |
| 9 | $x_1 \cdot x_3$ | 0 |
| 10 | $x_2 \cdot x_3$ | 0 |
| 11 | $x_0$ | 0 |
| 12 | $x_1$ | $-\iota_0 \cdot ID'(2)$ |
| 13 | $x_2$ | $-\iota_0 \cdot ID'(1)$ |
| 14 | $x_3$ | $\iota_1$ |
| 15 | $(x_0)^0 \cdot (x_1)^0 \cdot (x_2)^0 \cdot (x_3)^0$ | $\iota_0 \cdot ID'(1) \cdot ID'(2) - \iota_1 \cdot ID'(3)$ |

FIG. 10B

| PRE= | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|

FIG. 11A

| ELEMENT NUMBER | INDETERMINATE COMPONENT | ELEMENT VALUE |
|---|---|---|
| 0 | $x_0 \cdot x_1 \cdot x_2 \cdot x_3$ | 0 |
| 1 | $x_0 \cdot x_1 \cdot x_2$ | 0 |
| ... | ... | ... |
| 9 | $x_1 \cdot x_3$ | $\iota_0$ |
| 10 | $x_2 \cdot x_3$ | 0 |
| 11 | $x_0$ | 0 |
| 12 | $x_1$ | $-\iota_0 \cdot ID'(3)$ |
| 13 | $x_2$ | 0 |
| 14 | $x_3$ | $-\iota_0 \cdot ID'(1) - 2 \cdot \iota_1 \cdot ID'(3)$ |
| 15 | $(x_0)^0 \cdot (x_1)^0 \cdot (x_2)^0 \cdot (x_3)^0$ | $\iota_0 \cdot ID'(1) \cdot ID'(3) + \iota_1 \cdot \{ID'(3)\}^2$ |
| 16 | $(x_0)^2 \cdot (x_1)^2 \cdot (x_2)^2 \cdot (x_3)^2$ | 0 |
| 17 | $(x_0)^2 \cdot (x_1)^2 \cdot (x_2)^2 \cdot x_3$ | 0 |
| 18 | $(x_0)^2 \cdot (x_1)^2 \cdot x_2 \cdot (x_3)^2$ | 0 |
| 19 | $(x_0)^2 \cdot x_1 \cdot (x_2)^2 \cdot (x_3)^2$ | 0 |
| ... | ... | ... |
| en | $(x_3)^2$ | $\iota_1$ |
| ... | ... | ... |

FIG. 11B

| PRE= | 0 | 1 | 2 | 3 | 4 | 5 | 6 | 7 | 8 | 9 | 10 | 11 | 12 | 13 | ... |
|---|---|---|---|---|---|---|---|---|---|---|---|---|---|---|---|

FIG. 14A

| ELEMENT NUMBER | INDETERMINATE COMPONENT | ELEMENT VALUE |
|---|---|---|
| 0 | SPARE FIELD | const.(0) |
| 1 | SPARE FIELD | const.(1) |
| 2 | SPARE FIELD | const.(2) |
| 3 | SPARE FIELD | const.(3) |
| 4 | SPARE FIELD | const.(4) |
| 5 | $x_0 \cdot x_1$ | $ID(0) \cdot ID(1)$ |
| 6 | $x_0 \cdot x_2$ | $ID(0) \cdot ID(2)$ |
| 7 | $x_0 \cdot x_3$ | $ID(0) \cdot ID(3)$ |
| 8 | $x_1 \cdot x_2$ | $ID(1) \cdot ID(2)$ |
| 9 | $x_1 \cdot x_3$ | $ID(1) \cdot ID(3)$ |
| 10 | $x_2 \cdot x_3$ | $ID(2) \cdot ID(3)$ |
| 11 | $x_0$ | $ID(0)$ |
| 12 | $x_1$ | $ID(1)$ |
| 13 | $x_2$ | $ID(2)$ |
| 14 | $x_3$ | $ID(3)$ |
| 15 | $(x_0)^0 \cdot (x_1)^0 \cdot (x_2)^0 \cdot (x_3)^0$ | 1 |

FIG. 14B

| ATT= | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|

FIG. 15A

| ELEMENT NUMBER | INDETERMINATE COMPONENT | ELEMENT VALUE |
|---|---|---|
| 0 | SPARE FIELD | const.'(0) |
| 1 | SPARE FIELD | const.'(1) |
| 2 | SPARE FIELD | const.'(2) |
| 3 | SPARE FIELD | const.'(3) |
| 4 | SPARE FIELD | const.'(4) |
| 5 | $x_0 \cdot x_1$ | 0 |
| 6 | $x_0 \cdot x_2$ | 0 |
| 7 | $x_0 \cdot x_3$ | 0 |
| 8 | $x_1 \cdot x_2$ | $\iota_0$ |
| 9 | $x_1 \cdot x_3$ | 0 |
| 10 | $x_2 \cdot x_3$ | 0 |
| 11 | $x_0$ | 0 |
| 12 | $x_1$ | $-\iota_0 \cdot ID'(2)$ |
| 13 | $x_2$ | $-\iota_0 \cdot ID'(1)$ |
| 14 | $x_3$ | $\iota_1$ |
| 15 | $(x_0)^0 \cdot (x_1)^0 \cdot (x_2)^0 \cdot (x_3)^0$ | $\iota_0 \cdot ID'(1) \cdot ID'(2) - \iota_1 \cdot const.$ |

FIG. 15B

| PRE= | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|

FIG. 16

| IDENTIFIER | PROTOCOL | IDENTIFIER VALUE |
|---|---|---|
| ID(0) | TIMED-RELEASE ENCRYPTION | CHOSEN: INFORMATION IDENTIFYING FUTURE TIME POINT |
| | | NOT CHOSEN: const. |
| ID(1) | FORWARD SECURE ENCRYPTION | CHOSEN: UNIQUE IDENTIFIER + TIME PERIOD INCLUDING CURRENT TIME POINT |
| | | NOT CHOSEN: const. |
| ID(2) | KEY INSULATED ENCRYPTION | CHOSEN: UNIQUE IDENTIFIER + TIME PERIOD INCLUDING CURRENT TIME POINT |
| | | NOT CHOSEN: const. |
| ID(3) | SPARE FIELD | const. |

FIG. 17A

| ELEMENT NUMBER | INDETERMINATE COMPONENT | ELEMENT VALUE |
|---|---|---|
| 0 | $x_0 \cdot x_1 \cdot x_2 \cdot x_3$ | $ID(0) \cdot ID(1) \cdot ID(2) \cdot const.$ |
| 1 | $x_0 \cdot x_1 \cdot x_2$ | $ID(0) \cdot ID(1) \cdot ID(2)$ |
| 2 | $x_0 \cdot x_1 \cdot x_3$ | $ID(0) \cdot ID(1) \cdot const.$ |
| 3 | $x_0 \cdot x_2 \cdot x_3$ | $ID(0) \cdot ID(2) \cdot const.$ |
| 4 | $x_1 \cdot x_2 \cdot x_3$ | $ID(1) \cdot ID(2) \cdot const.$ |
| 5 | $x_0 \cdot x_1$ | $ID(0) \cdot ID(1)$ |
| 6 | $x_0 \cdot x_2$ | $ID(0) \cdot ID(2)$ |
| 7 | $x_0 \cdot x_3$ | $ID(0) \cdot const.$ |
| 8 | $x_1 \cdot x_2$ | $ID(1) \cdot ID(2)$ |
| 9 | $x_1 \cdot x_3$ | $ID(1) \cdot const.$ |
| 10 | $x_2 \cdot x_3$ | $ID(2) \cdot const.$ |
| 11 | $x_0$ | $ID(0)$ |
| 12 | $x_1$ | $ID(1)$ |
| 13 | $x_2$ | $ID(2)$ |
| 14 | $x_3$ | $const.$ |
| 15 | $(x_0)^0 \cdot (x_1)^0 \cdot (x_2)^0 \cdot (x_3)^0$ | 1 |

FIG. 17B

| ATT= | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|

FIG. 18A

| ELEMENT NUMBER | INDETERMINATE COMPONENT | ELEMENT VALUE |
|---|---|---|
| 0 | $x_0 \cdot x_1 \cdot x_2 \cdot x_3$ | 0 |
| 1 | $x_0 \cdot x_1 \cdot x_2$ | 0 |
| 2 | $x_0 \cdot x_1 \cdot x_3$ | 0 |
| 3 | $x_0 \cdot x_2 \cdot x_3$ | 0 |
| 4 | $x_1 \cdot x_2 \cdot x_3$ | 0 |
| 5 | $x_0 \cdot x_1$ | 0 |
| 6 | $x_0 \cdot x_2$ | 0 |
| 7 | $x_0 \cdot x_3$ | 0 |
| 8 | $x_1 \cdot x_2$ | $\iota_0$ |
| 9 | $x_1 \cdot x_3$ | 0 |
| 10 | $x_2 \cdot x_3$ | 0 |
| 11 | $x_0$ | 0 |
| 12 | $x_1$ | $-\iota_0 \cdot ID'(2)$ |
| 13 | $x_2$ | $-\iota_0 \cdot ID'(1)$ |
| 14 | $x_3$ | $\iota_1$ |
| 15 | $(x_0)^0 \cdot (x_1)^0 \cdot (x_2)^0 \cdot (x_3)^0$ | $\iota_0 \cdot ID'(1) \cdot ID'(2) - \iota_1 \cdot \text{const.}$ |

FIG. 18B

| PRE= | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|

FIG. 22A

| IDENTIFICATION INFORMATION PI | PROTOCOL |
|---|---|
| 0 | KEYWORD SEARCH ENCRYPTION |
| 1 | FORWARD SECURE ENCRYPTION |
| 2 | KEY INSULATED ENCRYPTION |
| 3 | CCA2 SECURE ENCRYPTION |

FIG. 22B

| IDENTIFICATION INFORMATION PI | PROTOCOL |
|---|---|
| 0 | KEYWORD SEARCH ENCRYPTION |
| 1 | FORWARD SECURE + KEYWORD SEARCH ENCRYPTION |
| 2 | KEY INSULATED + KEYWORD SEARCH ENCRYPTION |
| 3 | CCA2 + KEYWORD SEARCH SECURE ENCRYPTION |
| 4 | FORWARD SECURE + CCA2 + KEYWORD SEARCH ENCRYPTION |
| ... | ... |

FIG. 23A

| IDENTIFIER | PROTOCOL | IDENTIFIER VALUE |
|---|---|---|
| ID(0) | KEYWORD SEARCH ENCRYPTION | CHOSEN: SEARCH KEYWORD |
| | | NOT CHOSEN: const. |
| ID(1) | FORWARD SECURE ENCRYPTION | CHOSEN: UNIQUE IDENTIFIER + TIME PERIOD INCLUDING CURRENT TIME POINT |
| | | NOT CHOSEN: const. |
| ID(2) | KEY INSULATED ENCRYPTION | CHOSEN: UNIQUE IDENTIFIER + TIME PERIOD INCLUDING CURRENT TIME POINT |
| | | NOT CHOSEN: const. |
| ID(3) | CCA2 SECURE ENCRYPTION | CHOSEN: ONE-TIME INFORMATION |
| | | NOT CHOSEN: const. |

FIG. 23B

| IDENTIFIER | PROTOCOL | IDENTIFIER VALUE |
|---|---|---|
| ID(0) | KEYWORD SEARCH ENCRYPTION | SEARCH KEYWORD |
| ID(1) | FORWARD SECURE ENCRYPTION | UNIQUE IDENTIFIER + TIME PERIOD INCLUDING CURRENT TIME POINT |
| ID(2) | KEY INSULATED ENCRYPTION | UNIQUE IDENTIFIER + TIME PERIOD INCLUDING CURRENT TIME POINT |
| ID(3) | CCA2 SECURE ENCRYPTION | ONE-TIME INFORMATION |

FIG. 24

| IDENTIFIER | PROTOCOL | IDENTIFIER VALUE |
|---|---|---|
| ID(0) | KEYWORD SEARCH ENCRYPTION | CHOSEN: SEARCH KEYWORD |
| | | NOT CHOSEN: const. |
| ID(1) | FORWARD SECURE + KEYWORD SEARCH ENCRYPTION | CHOSEN: UNIQUE IDENTIFIER + TIME PERIOD INCLUDING CURRENT TIME POINT + SEARCH KEYWORD |
| | | NOT CHOSEN: const. |
| ID(2) | KEY INSULATED + KEYWORD SEARCH ENCRYPTION | CHOSEN: UNIQUE IDENTIFIER + TIME PERIOD INCLUDING CURRENT TIME POINT + SEARCH KEYWORD |
| | | NOT CHOSEN: const. |
| ID(3) | CCA2 + KEYWORD SEARCH SECURE ENCRYPTION | CHOSEN: ONE-TIME INFORMATION + SEARCH KEYWORD |
| | | NOT CHOSEN: const. |
| ID(4) | FORWARD SECURE + CCA2 + KEYWORD SEARCH ENCRYPTION | CHOSEN: INFORMATION IDENTIFYING FUTURE TIME POINT + ONE-TIME INFORMATION + SEARCH KEYWORD |
| | | NOT CHOSEN: const. |
| ... | ... | ... |

FIG. 25

| C(Mr1) | Cr(KWr1,True) | Cr(KWr2,True) | Cr(KWr3,True) | Cr(KWr4,True) |
|---|---|---|---|---|
| C(Mr2) | Cr(KWr1,True) | Cr(KWr4,True) | Cr(KWr7,True) | Cr(KWr9,True) |
| C(Mr3) | Cr(KWr2,True) | Cr(KWr3,True) | Cr(KWr5,True) | Cr(KWr8,True) |
| C(Mr4) | Cr(KWr1,True) | Cr(KWr7,True) | Cr(KWr8,True) | Cr(KWr9,True) |
| ... | ... | ... | ... | ... |
| C(Mr99) | Cr(KWr1,True) | Cr(KWr3,True) | Cr(KWr6,True) | Cr(KWr9,True) |

FIG. 39A

| IDENTIFICATION INFORMATION PI | PROTOCOL |
|---|---|
| 0 | TIMED-RELEASE ENCRYPTION |
| 1 | FORWARD SECURE ENCRYPTION |
| 2 | KEY INSULATED ENCRYPTION |
| 3 | CCA2 SECURE ENCRYPTION |

FIG. 39B

| IDENTIFICATION INFORMATION PI | PROTOCOL |
|---|---|
| 0 | TIMED-RELEASE ENCRYPTION |
| 1 | FORWARD SECURE ENCRYPTION |
| 2 | KEY INSULATED ENCRYPTION |
| 3 | CCA2 SECURE ENCRYPTION |
| 4 | TIMED-RELEASE + CCA2 SECURE ENCRYPTION |
| 5 | FORWARD SECURE + CCA2 SECURE ENCRYPTION |
| 6 | KEY INSULATED + CCA2 SECURE ENCRYPTION |
| ... | ... |

FIG. 40A

| IDENTIFIER | PROTOCOL | IDENTIFIER VALUE (VECTOR) |
|---|---|---|
| ID(1) | TIMED-RELEASE ENCRYPTION | CHOSEN: INFORMATION IDENTIFYING FUTURE TIME POINT |
| | | NOT CHOSEN: const. |
| ID(2) | FORWARD SECURE ENCRYPTION | CHOSEN: UNIQUE IDENTIFIER + TIME PERIOD INCLUDING CURRENT TIME POINT |
| | | NOT CHOSEN: const. |
| ID(3) | KEY INSULATED ENCRYPTION | CHOSEN: UNIQUE IDENTIFIER + TIME PERIOD INCLUDING CURRENT TIME POINT |
| | | NOT CHOSEN: const. |
| ID(4) | CCA2 SECURE ENCRYPTION | CHOSEN: ONE-TIME INFORMATION |
| | | NOT CHOSEN: const. |

FIG. 40B

| IDENTIFIER | PROTOCOL | IDENTIFIER VALUE (VECTOR) |
|---|---|---|
| ID(1) | TIMED-RELEASE ENCRYPTION | INFORMATION IDENTIFYING FUTURE TIME POINT |
| ID(2) | FORWARD SECURE ENCRYPTION | UNIQUE IDENTIFIER + TIME PERIOD INCLUDING CURRENT TIME POINT |
| ID(3) | KEY INSULATED ENCRYPTION | UNIQUE IDENTIFIER + TIME PERIOD INCLUDING CURRENT TIME POINT |
| ID(4) | CCA2 SECURE ENCRYPTION | ONE-TIME INFORMATION |

FIG. 41

| IDENTIFIER | PROTOCOL | IDENTIFIER VALUE (VECTOR) |
|---|---|---|
| ID(1) | TIMED-RELEASE ENCRYPTION | CHOSEN: INFORMATION IDENTIFYING FUTURE TIME POINT |
| | | NOT CHOSEN: const. |
| ID(2) | FORWARD SECURE ENCRYPTION | CHOSEN: UNIQUE IDENTIFIER + TIME PERIOD INCLUDING CURRENT TIME POINT |
| | | NOT CHOSEN: const. |
| ID(3) | KEY INSULATED ENCRYPTION | CHOSEN: UNIQUE IDENTIFIER + TIME PERIOD INCLUDING CURRENT TIME POINT |
| | | NOT CHOSEN: const. |
| ID(4) | CCA2 SECURE ENCRYPTION | CHOSEN: ONE-TIME INFORMATION |
| | | NOT CHOSEN: const. |
| ID(5) | TIMED-RELEASE AND CCA2 SECURE ENCRYPTION | CHOSEN: INFORMATION IDENTIFYING FUTURE TIME POINT + ONE-TIME INFORMATION |
| | | NOT CHOSEN: const. |
| ID(6) | FORWARD SECURE AND CCA2 SECURE ENCRYPTION | CHOSEN: UNIQUE IDENTIFIER + TIME PERIOD INCLUDING CURRENT TIME POINT + ONE-TIME INFORMATION |
| | | NOT CHOSEN: const. |
| ID(7) | KEY INSULATED AND CCA2 SECURE ENCRYPTION | CHOSEN: UNIQUE IDENTIFIER + TIME PERIOD INCLUDING CURRENT TIME POINT + ONE-TIME INFORMATION |
| | | NOT CHOSEN: const. |
| ... | ... | ... |

FIG. 42A

| VSET1= | w(1)→ | w(2)→ | ... | w(Ψ)→ |

FIG. 42B

| VSET2= | v(1)→ | v(2)→ | ... | v(Ψ)→ |

FIG. 48A

| IDENTIFICATION INFORMATION PI | PROTOCOL |
|---|---|
| 0 | KEYWORD SEARCH ENCRYPTION |
| 1 | FORWARD SECURE ENCRYPTION |
| 2 | KEY INSULATED ENCRYPTION |
| 3 | CCA2 SECURE ENCRYPTION |

FIG. 48B

| IDENTIFICATION INFORMATION PI | PROTOCOL |
|---|---|
| 0 | KEYWORD SEARCH ENCRYPTION |
| 1 | FORWARD SECURE + KEYWORD SEARCH ENCRYPTION |
| 2 | KEY INSULATED + KEYWORD SEARCH ENCRYPTION |
| 3 | CCA2 + KEYWORD SEARCH SECURE ENCRYPTION |
| 4 | FORWARD SECURE + CCA2 + KEYWORD SEARCH ENCRYPTION |
| ... | ... |

FIG. 49A

| IDENTIFIER | PROTOCOL | IDENTIFIER VALUE (VECTOR) |
|---|---|---|
| ID(1) | KEYWORD SEARCH ENCRYPTION | CHOSEN: SEARCH KEYWORD |
| | | NOT CHOSEN: const. |
| ID(2) | FORWARD SECURE ENCRYPTION | CHOSEN: UNIQUE IDENTIFIER + TIME PERIOD INCLUDING CURRENT TIME POINT |
| | | NOT CHOSEN: const. |
| ID(3) | KEY INSULATED ENCRYPTION | CHOSEN: UNIQUE IDENTIFIER + TIME PERIOD INCLUDING CURRENT TIME POINT |
| | | NOT CHOSEN: const. |
| ID(4) | CCA2 SECURE ENCRYPTION | CHOSEN: ONE-TIME INFORMATION |
| | | NOT CHOSEN: const. |

FIG. 49B

| IDENTIFIER | PROTOCOL | IDENTIFIER VALUE (VECTOR) |
|---|---|---|
| ID(1) | KEYWORD SEARCH ENCRYPTION | SEARCH KEYWORD |
| ID(2) | FORWARD SECURE ENCRYPTION | UNIQUE IDENTIFIER + TIME PERIOD INCLUDING CURRENT TIME POINT |
| ID(3) | KEY INSULATED ENCRYPTION | UNIQUE IDENTIFIER + TIME PERIOD INCLUDING CURRENT TIME POINT |
| ID(4) | CCA2 SECURE ENCRYPTION | ONE-TIME INFORMATION |

FIG. 50

| IDENTIFIER | PROTOCOL | IDENTIFIER VALUE (VECTOR) |
|---|---|---|
| ID(1) | KEYWORD SEARCH ENCRYPTION | CHOSEN: SEARCH KEYWORD |
| | | NOT CHOSEN: const. |
| ID(2) | FORWARD SECURE + KEYWORD SEARCH ENCRYPTION | CHOSEN: UNIQUE IDENTIFIER + TIME PERIOD INCLUDING CURRENT TIME POINT + SEARCH KEYWORD |
| | | NOT CHOSEN: const. |
| ID(3) | KEY INSULATED + KEYWORD SEARCH ENCRYPTION | CHOSEN: UNIQUE IDENTIFIER + TIME PERIOD INCLUDING CURRENT TIME POINT + SEARCH KEYWORD |
| | | NOT CHOSEN: const. |
| ID(4) | CCA2 + KEYWORD SEARCH ENCRYPTION | CHOSEN: ONE-TIME INFORMATION + SEARCH KEYWORD |
| | | NOT CHOSEN: const. |
| ID(5) | FORWARD SECURE + CCA2 + KEYWORD SEARCH ENCRYPTION | CHOSEN: INFORMATION IDENTIFYING FUTURE TIME POINT + ONE-TIME INFORMATION + SEARCH KEYWORD |
| | | NOT CHOSEN: const. |
| ... | ... | ... |

FIG. 51

| C(Mr1) | Cr(KWr1,True) | Cr(KWr2,True) | Cr(KWr3,True) | Cr(KWr4,True) |
|---|---|---|---|---|
| C(Mr2) | Cr(KWr1,True) | Cr(KWr4,True) | Cr(KWr7,True) | Cr(KWr9,True) |
| C(Mr3) | Cr(KWr2,True) | Cr(KWr3,True) | Cr(KWr5,True) | Cr(KWr8,True) |
| C(Mr4) | Cr(KWr1,True) | Cr(KWr7,True) | Cr(KWr8,True) | Cr(KWr9,True) |
| ... | ... | ... | ... | ... |
| C(Mr99) | Cr(KWr1,True) | Cr(KWr3,True) | Cr(KWr6,True) | Cr(KWr9,True) |

FUNCTIONAL ENCRYPTION APPLIED SYSTEM, INFORMATION OUTPUT APPARATUS, INFORMATION PROCESSING APPARATUS, ENCRYPTION PROTOCOL EXECUTION METHOD, INFORMATION OUTPUT METHOD, INFORMATION PROCESSING METHOD, PROGRAM AND RECORDING MEDIUM

TECHNICAL FIELD

The present invention relates to an encryption technique and, in particular, to a functional encryption technique.

BACKGROUND ART

Identity-based encryption (IBE) is a scheme in which a ciphertext can be generated by using a public parameter and an identifier (ID) and the ciphertext can be decrypted by using key information $SK_{ID}$ which is in one-to-one correspondence with the identifier (See Non-patent literature 1, for example). Various protocols using such an ID-based encryption scheme have been proposed in recent years.

For example, it is known that in an ID-based encryption scheme, Forward-secure encryption or Key-Insulated encryption can be implemented by using as identifiers a value including a value corresponding to a time period including the current date and time and a unique identifier of a recipient apparatus to perform encryption and generation of key information (See Non-patent literatures 2 and 3, for example). It is also known that in an ID-based encryption scheme, Keyword search encryption can be implemented where an encryption database in which a ciphertext generated by using an identifier including a keyword corresponding to an item to be searched for is associated with an encrypted item to be searched for is stored, and key information generated by using an identifier including a keyword is used to search the encryption database (see Non-patent literature 4, for example). Furthermore, Timed-Release encryption can be implemented by using as an identifier a time point at which a ciphertext is to be decrypted; CCA2 (Chosen Ciphertext Attack 2) encryption can be implemented by using one-time information such as a random number as an identifier.

PRIOR ART LITERATURE

Non-Patent Literature

Non-patent literature 1: D. Boneh, M. Franklin, "Identity Based Encryption from the Weil Pairing," Crypto 2001, Lecture Notes in Computer Science, Vol. 2139, Springer-Verlag, pp. 213-229, 2001.

Non-patent literature 2: R. Canetti, S. Halevi, J. Katz, "A Forward-Secure Public-Key Encryption Scheme," EUROCRYPT' 2003, 255-271.

Non-patent literature 3: Y. Dodis, M. Franklin, J. Katz, A. Miyaji and M. Yung, "Intrusion-Resilient Public-Key Encryption," CT RSA 2003, Lecture Notes in Computer Science, 2612 (2003) Springer-Verlag, 19-32.

Non-patent literature 4: D. Boneh, G. Di Crescenzo, R. Ostrovsky, and G Persiano, "Public Key Encryption with Keyword Search," Eurocrypt 2004.

SUMMARY OF THE INVENTION

Problems to be Solved by the Invention

As has been described above, in the ID-based encryption schemes, various protocols can be configured depending on identifiers used. Accordingly, switching can be made among the protocols by selecting identifiers to use. Furthermore, a combination of identifiers corresponding to a plurality of protocols can be used as a new identifier to construct a combination of the plurality of protocols, that is, a new protocol having combined characteristics of the plurality of protocols.

However, pieces of key information and identifiers are in one-to-one correspondence in ID-based encryption schemes. That is, different protocols adopting the ID-based encryption schemes require different pieces of key information. Therefore, if a system is configured in which an apparatus that generates a ciphertext chooses an identifier to use for generating the ciphertext and makes switching from one protocol to another according to the identifier chosen, an apparatus that decrypts the ciphertext needs to hold different pieces of key information corresponding to the different selectable protocols. Such generation and management of key information are complicated and undesirable.

Similarly, an ID-based encryption ciphertext for one plaintext corresponds to an identifier in one-to-one correspondence. That is, different protocols that adopt ID-based encryption schemes require different ciphertexts. Therefore, if a system is configured in which an apparatus that generates key information chooses an identifier to use for generating the key information and makes switching from one protocol to another according to the identifier chosen, an apparatus that generates a ciphertext needs to hold different ciphertexts that correspond to different selectable protocols. Such generation and management of ciphertexts are complicated and undesirable.

These problem also arises when a system is configured in which an apparatus that generates key information can choose an identifier to use for generating the key information and make switching from one protocol to another according to the chosen identifier, while an apparatus that generates a ciphertext can choose an identifier to use for generating the ciphertext and make switching from one protocol to another according to the chosen identifier.

The present invention has been made in light of these circumstances and an object of the present invention is to provide a technique that enables switching from one protocol to another according to a chosen identifier without needing complicated processing/management.

Means to Solve the Problems

To solve the problems described above, the present invention constructs a protocol according to a functional encryption scheme in which a ciphertext is correctly decrypted when the truth value of a logical formula corresponding to a combination of first correspondence information and second correspondence information is true.

An information output apparatus of the present invention identifies one identifier or a plurality of identifiers corresponding to a particular protocol that is in accordance with a functional encryption scheme or a particular combination of protocols that is in accordance with the functional encryption scheme, according to a rule established for each protocol in accordance with the functional encryption scheme or a rule established for each combination of protocols in accordance with the functional encryption scheme, sets a particular piece of first correspondence information corresponding to the one identifier or combination of the plurality of identifiers, and outputs first information which is a ciphertext or key information of the functional encryption scheme corresponding to the particular piece of first correspondence information.

An information processing apparatus of the present invention inputs the first information and second information which is key information or a ciphertext of the functional encryption scheme corresponding to a particular piece of second correspondence information into a decryption function of the functional encryption scheme and generates a decryption result when the truth value of a logical formula corresponding to a combination of the particular piece of first correspondence information corresponding to the first information and the particular piece of second correspondence information corresponding to the second information is true. If the first information is a ciphertext corresponding to the particular piece of first correspondence information, the second information is key information corresponding to the particular piece of second correspondence information; if the first information is key information corresponding to the particular piece of first correspondence information, the second information is a ciphertext corresponding to the particular piece of second correspondence information.

As has been described above, in the functional encryption scheme, when the truth value of a logical formula corresponding to a combination of the particular piece of first correspondence information corresponding to the first information and the particular piece of second correspondence information corresponding to the second information is true, a correct decryption result is generated. The particular piece of first correspondence information is information that is determined for one identifier or a combination of a plurality of identifiers. The particular piece of second correspondence information takes on a value that yields a decryption result for one value or each of a plurality of values that the particular piece of first correspondence information takes on, where the first information corresponding to the particular piece of first correspondence information and the second information corresponding to the particular piece of second correspondence information is input into a decryption function. That is, according to the present invention, the same second information can be used for one or more pieces of first information to accomplish correct decryption.

Effects of the Invention

According to the present invention, the same second information can be used for one or more pieces of first information as has been described above. Therefore, when the information output apparatus chooses one identifier or a combination of two or more identifiers and makes switching from one protocol to another according to the chosen identifier or identifiers to generate first information, the information processing apparatus does not need to generate different pieces of second information for the different protocols. Consequently, according to the present invention, switching can be made among protocols according to a selected identifier without needing complicated processing/management.

BRIEF DESCRIPTION OF THE DRAWINGS

FIG. 5A is a diagram illustrating an example of correspondence between identification information PI for identifying one or more protocols and the protocol(s) in the first embodiment;

FIG. 5B is a diagram illustrating an example of correspondence between identification information PI for identifying one or more protocols and the protocols in the first embodiment;

FIG. 6A is a diagram illustrating exemplary rules, each established for each protocol or each combination of protocols for identifying an identifier ID(h) in the first embodiment;

FIG. 6B is a diagram illustrating an exemplary rule for identifying an identifier ID(h) that is determined for each protocol or each combination of the protocols in the first embodiment;

FIG. 7 is a diagram illustrating exemplary rules, each established for each protocol or each combination of protocols for identifying an identifier ID(h) in the first embodiment;

FIG. 8A is a diagram illustrating an exemplary attribute information table for identifying one piece of attribute information ATT for one identifier ID(h) or a combination of two or more identifiers ID(h);

FIG. 8B is a diagram illustrating a data structure of attribute information ATT that is determined according to the attribute information table;

FIG. 9A is a diagram illustrating an exemplary attribute information table for identifying one piece of attribute information ATT for one identifier ID(h) or a combination of two or more identifiers ID(h);

FIG. 9B is a diagram illustrating a data structure of attribute information ATT that is determined according to the attribute information table;

FIG. 10A is a diagram illustrating exemplary pieces of predicate information PRE, each corresponding to a polynomial $f(x_0, \ldots, x_{H-1})$;

FIG. 10B is a diagram illustrating a data structure of the predicate information PRE;

FIG. 11A is a diagram illustrating exemplary pieces of predicate information PRE, each corresponding to a polynomial $f(x_0, \ldots, x_{H-1})$;

FIG. 11B is a diagram illustrating a data structure of the predicate information PRE;

FIG. 14A is a diagram illustrating an example in which some of the fields of attribute information ATT and predicate information PRE are reserved as spare fields;

FIG. 14B is a diagram illustrating an example in which some of the fields of attribute information ATT and predicate information PRE are reserved as spare fields;

FIG. 15A is a diagram illustrating an example in which some of the fields of attribute information ATT and predicate information PRE are reserved as spare fields;

FIG. 15B is a diagram illustrating an example in which some of the fields of attribute information ATT and predicate information PRE are reserved as spare fields;

FIG. 16 is a diagram illustrating an example in which attribute information ATT and predicate information PRE corresponding to logical formulas including as a part a logical conjunction of propositions that is preset to result in true regardless of the value of identification information PI are set;

FIG. 17A is a diagram illustrating an example in which attribute information ATT and predicate information PRE corresponding to logical formulas including as a part a logical conjunction of propositions that is preset to result in true regardless of the value of identification information PI are set;

FIG. 17B is a diagram illustrating an example in which attribute information ATT and predicate information PRE corresponding to logical formulas including as a part a logical conjunction of propositions that is preset to result in true regardless of the value of identification information PI are set;

FIG. 18A is a diagram illustrating an example in which attribute information ATT and predicate information PRE corresponding to logical formulas including as a part a logical conjunction of propositions that is preset to result in true regardless of the value of identification information PI are set;

FIG. 18B is a diagram illustrating an example in which attribute information ATT and predicate information PRE corresponding to logical formulas including as a part a logical conjunction of propositions that is preset to result in true regardless of the value of identification information PI are set;

FIG. 22A is a diagram illustrating an example of correspondence between identification information PI for identifying one or more protocols and the protocols in the second embodiment;

FIG. 22B is a diagram illustrating correspondence between identification information PI for identifying one or more protocols and the protocols in the second embodiment;

FIG. 23A is a diagram illustrating exemplary rules, each established for each of protocols or each combination of protocols for identifying an identifier ID(h);

FIG. 23B is a diagram illustrating exemplary rules, each established for each protocol or each combination of protocols for identifying an identifier ID(h);

FIG. 24 is a diagram illustrating an exemplary rule, each established for each protocol or each combination of protocols for identifying an identifier ID(h) in the second embodiment;

FIG. 25 is a diagram illustrating an example of an encryption DB of the second embodiment;

FIG. 39A is a diagram illustrating correspondence between identification information PI for identifying one or more protocols and the protocols in the fourth embodiment;

FIG. 39B is a diagram illustrating correspondence between identification information PI for identifying one or more protocols and the protocols in the fourth embodiment;

FIG. 40A is a diagram illustrating exemplary rules, each established for each protocol or each combination of protocols for identifying an identifier ID($\lambda$) in the fourth embodiment;

FIG. 40B is a diagram illustrating an exemplary rule established for each protocol or each combination of protocols for identifying an identifier ID($\lambda$) in the fourth embodiment;

FIG. 41 is a diagram illustrating exemplary rules, each established for each protocol or each combination of protocols for identifying an identifier ID($\lambda$) in the fourth embodiment;

FIG. 42A is a diagram illustrating a data structure of attribute information VSET1;

FIG. 42B is a diagram illustrating a data structure of condition information VSET2;

FIG. 48A is a diagram illustrating correspondence between identification information PI for identifying one or more protocols and the protocols in the fifth embodiment;

FIG. 48B is a diagram illustrating correspondence between identification information PI for identifying one or more protocols and the protocols in the fifth embodiment;

FIG. 49A is a diagram illustrating exemplary rules, each established for each protocol or each combination of protocols for identifying an identifier ID($\lambda$) in the fifth embodiment;

FIG. 49B is a diagram illustrating exemplary rules, each established for each protocol or each combination of protocols for identifying an identifier ID(λ) in the fifth embodiment;

FIG. 50 is a diagram illustrating exemplary rules, each established for each protocol or each combination of protocols for identifying an identifier ID(λ) in the fifth embodiment;

FIG. 51 is a diagram illustrating an example of an encryption DB of the fifth embodiment;

DETAILED DESCRIPTION OF THE EMBODIMENTS

Figure 1:
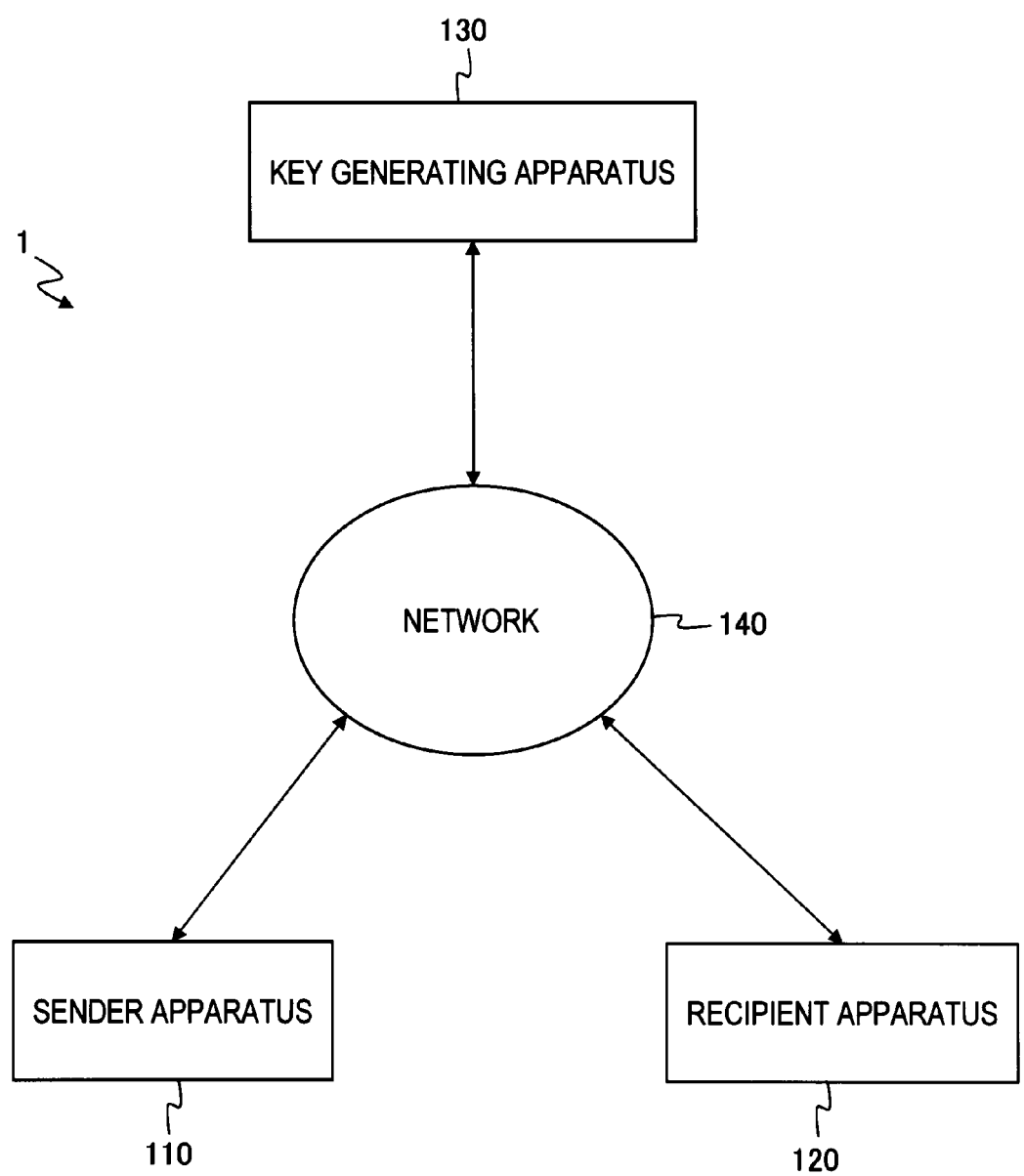
FIG. 1 is a block diagram illustrating a general configuration of a functional encryption applied system of a first embodiment.

Embodiments of the present invention will be described below.
[Definitions in First to Third Embodiments]
Terms and symbols used in the first to third embodiments will be defined first.

Matrix: A "matrix" represents a rectangular array of elements of a set for which an operation is defined. An array of elements in a group as well as an array of elements in a ring is referred to as a "matrix".

$(\cdot)^T$: $(\cdot)^T$ represents the transposed matrix of "·".
$(\cdot)^{-1}$: $(\cdot)^{-1}$ represents the inverse matrix of "·".
∧ : ∧ A represents a logical conjunction (AND).
∨ : ∨ represents a logical disjunction (OR).
Z: Z represents an integer set.
k: k represents a security parameter (k∈Z, k>0).
{0, 1}*: {0, 1}* represents a binary string of an arbitrary bit length. One example of such binary string is a string consisting of integers 0s and 1s. However, {0, 1}* is not limited to a string consisting of integers 0s and 1s. {0, 1}* is synonymous with a finite field of order 2 or an extension field of the finite field.

q: q represents an integer greater than or equal to 1.
$Z_q$: $Z_q$ represents a finite ring of order q. Operations on a finite ring can be easily defined with modulo operations with order q as the modulus, for example.

$F_q$: $F_q$ represents a finite field of order q. In order for $F_q$ to be a finite field, order q must be a prime or a power of a prime. An example of finite field $F_q$ is a prime field or an extension field over a prime field. Operations on a prime finite field $F_q$ can be easily defined by modulo operations with order q as the modulus. Operations on an extension finite field $F_q$ can be easily defined by modulo operations with an irreducible polynomial as the modulus. A specific method for constructing a finite field $F_q$ is disclosed in Reference literature 1: "ISO/IEC 18033-2: Information technology-Security techniques-Encryption algorithms-Part 2: Asymmetric ciphers", for example.

$0_F$: $0_F$ represents an additive identity element (zero element) of a finite field $F_q$.

$1_F$: $1_F$ represents a multiplicative identity element of a finite field $F_q$.

δ(i, j): δ(i, j) represents a Kronecker delta function. When i=j, δ(i, j)=$1_F$ is satisfied; when i≠j, δ(i, j)=$0_F$ is satisfied.

E: E represents an elliptic curve over a finite field $F_q$. The elliptic curve E is defined as a set of points (x, y) consisting of x, y∈$F_q$ that satisfy the Weierstrass equation in affine coordinates $$y^2 + a_1 \cdot x \cdot y + a_3 \cdot y = x^3 + a_2 \cdot x^2 + a_4 \cdot x + a_6 \quad (1)$$

(where $a_1, a_2, a_3, a_4, a_6 \in F_q$), to which a special point O called a point of infinity is added. A binary operation "+" called an elliptic curve addition can be defined for any two points on the elliptic curve E and a unary operation "−" called an elliptic curve additive inverse can be defined for any one point on the elliptic curve E. It is well known that a finite set consisting of rational points on an elliptic curve E form a group with respect to elliptic curve addition and that an operation called an elliptic curve scalar multiplication can be defined using elliptic curve addition. Specific methods for calculating elliptic operations such as the elliptic curve addition on computer are also well known (see Reference literature 1, Reference literature 2: "RFC 5091: Identity-Based Cryptography Standard (IBCS) #1: Supersingular Curve Implementations of the BF and BB1 Cryptosystems", Reference literature 3: "Ian F. Blake, Gadiel Seroussi, Nigel Paul Smart, 'Elliptic Curves in Cryptography', published by Peason Education, ISBN4-89471-431-0", for example).

A finite set consisting of rational points on an elliptic curve E has a subgroup of order p (p≥1). For example, a finite set E[p] of p-division points on an elliptic curve E forms a subgroup of a finite set consisting of rational points on the elliptic curve E, where #E is the number of elements in the finite set consisting of the rational points on the elliptic curve E and p is a large prime that can divide #E. The p-division points on the elliptic curve E are points A on the elliptic curve E which satisfy the elliptic curve scalar multiplications p·A=O.

$G_1, G_2, G_T$: $G_1, G_2, G_T$ represent cyclic groups of order q. Examples of the cyclic groups $G_1$ and $G_2$ include the finite set E[p] of p-division points on the elliptic curve E and subgroups thereof. $G_1=G_2$ may be allowed or $G1≠G_2$ may be allowed. Examples of cyclic group $G_T$ include a subgroup of an extension field over a finite field $F_q$ with respect to addition. One example is a finite set consisting of the p-th roots of 1 in the algebraic closure of a finite field $F_q$.

In the first to third embodiments, operations defined on cyclic groups $G_1$, $G_2$ are expressed additively while operations defined on cyclic group $G_T$ are expressed multiplicatively. That is, $\chi \cdot \Omega \in G_1$ for $\chi \in F_q$ and $\Omega \in G_1$ means that an operation defined on cyclic group $G_1$ is applied to $\Omega \in G_1$, $\chi$ times; $\Omega_1 + \Omega_2 \in G_1$ for $\Omega_1$, $\Omega_2 \in G_1$ means that an operation defined on cyclic group $G_1$ is applied to $\Omega_1 \in G_1$ and $\Omega_2 \in G_1$, for example. Similarly, $\chi \cdot \Omega \in G_2$ for $\chi \in F_q$ and $\Omega \in G_2$ means that an operation defined on cyclic group $G_2$ is applied to $\Omega \in G_2$, $\chi$ times; $\Omega_1 + \Omega_2 \in G_2$ for $\Omega_1$, $\Omega_2 \in G_2$ means that an operation defined on cyclic group $G_2$ is applied to $\Omega_1 \in G_2$ and $\Omega_2 \in G_2$. On the other hand, $\Omega^\chi \in G_T$ for $\chi \in F_q$ and $\Omega \in G_T$ means that an operation defined on cyclic group $G_T$ is applied to $\Omega \in G_T$, $\chi$ times; $\Omega_1 \cdot \Omega_2 \in G_T$ for $\Omega_1$, $\Omega_2 \in G_T$ means that an operation defined on cyclic group $G_T$ is applied to $\Omega_1 \in G_T$ and $\Omega_2 \in G_T$, for example.

$G_1^{n+1}$: $G_1^{n+1}$ represents a direct product of n+1 ($n \geq 1$) cyclic groups $G_1$.

$G_2^{n+1}$: $G_2^{n+1}$ represents a direct product of n+1 cyclic groups $G_2$.

$g_1$, $g_2$, $g_T$: $g_1$, $g_2$, $g_T$ represent generators of cyclic groups $G_1$, $G_2$, $G_T$.

V: V represents an n+1-dimensional vector space formed by the direct product of n+1 cyclic groups $G_1$.

V*: V* represents an n+1-dimensional vector space formed by the direct product of n+1 cyclic groups $G_2$.

e: e represents a nondegenerate bilinear map that maps the direct product $G_1^{n+1} \times G_2^{n+1}$ of direct products $G_1^{n+1}$ and $G_2^{n+1}$ to cyclic group $G_T$. The bilinear map e receives n+1 elements $\gamma_L$ (L=1, ..., n+1) ($n \geq 1$) in cyclic group $G_1$ and n+1 elements $\gamma_L^*$ (L=1, ..., n+1) in cyclic group $G_2$ as inputs and outputs one element in cyclic group $G_T$:

$$e: G_1^{n+1} \times G_2^{n+1} \to G_T \quad (2)$$

The bilinear map e satisfies the following properties:
[Bilinearity] For all $\Gamma_1 \in G_1^{n+1}$, $\Gamma_2 \in G_2^{n+1}$, and $\nu, \kappa \in F_q$, the bilinear map e satisfies the following relationship:

$$e(\nu \cdot \Gamma_1, \kappa \cdot \Gamma_2) = e(\Gamma_1, \Gamma_2)^{\nu \cdot \kappa} \quad (3)$$

[Nondegenerateness] The bilinear map e does not map all $\Gamma_1 \in G_1^{n+1}$, $\Gamma_2 \in G_2^{n+1}$ to an identity element in cyclic group $G_T$.

[Computability] There is an algorithm that efficiently calculates $e(\Gamma_1, \Gamma_2)$ for every $\Gamma_1 \in G_1^{n+1}$, $\Gamma_2 \in G_2^{n+1}$.

In the first to third embodiments, the nondegenerate bilinear map that maps the direct product $G_1 \times G_2$ of cyclic groups $G_1$ and $G_2$ to cyclic group $G_T$ $$\text{Pair}: G_1 \times G_2 \to G_T \quad (4)$$

is used to construct a bilinear map e. The bilinear map e in the first to third embodiments outputs one element in subgroup $G_T$ for inputs of an n+1-dimensional vector $(\gamma_1^*, ..., \gamma_{n+1})$ consisting of n+1 elements $\gamma_L^*$ (L=1, ..., n+1) in cyclic group $G_1$ and an n+1-dimensional vector $(\gamma_1^*, ..., \gamma_{n+1}1^*)$ consisting of n+1 elements $\gamma_L^*$ (L=1, ..., n+1) in cyclic group $G_2$.

$$e = \Pi_{L=1}^{n+1} \text{Pair}(\gamma_L, \gamma_L^*) \quad (5)$$

The bilinear map Pair uses a pair of one element in cyclic group $G_1$ and one element in cyclic group $G_2$ to output one element in cyclic group $G_T$. The bilinear map Pair satisfies the following properties.

[Bilinearity] For all $\Omega_1 \in G_1$, $\Omega_2 \in G_2$, and $\nu, \kappa \in F_q$, the bilinear map Pair satisfies the following relationship.

$$\text{Pair}(\nu \cdot \Omega_1, \kappa \cdot \Omega_2) = \text{Pair}(\Omega_1, \Omega_2)^{\nu \cdot \kappa} \quad (6)$$

[Nondegenerateness] The bilinear map Pair does not map all $\Omega_1 \in G_1$, $\Omega_2 \in G_2$ to an identity element of cyclic group $G_T$.

[Computability] There is an algorithm that efficiently calculates $\text{Pair}(\Omega_1, \Omega_2)$ for all $\Omega_1 \in G_1$, $\Omega_2 \in G_2$.

Specific examples of bilinear map Pair include functions for pairing operations such as Weil pairing and Tate pairing (see Reference literature 4: "Alfred J. Menezes, ELLLIPTIC CURVE PUBLIC KEY CRYPTOSYSTEMS, KLUWER ACADEMIC PUBLISHERS, ISBN 0-7923-9368-6, pp. 61-81", for example). Depending on the type of elliptic curve E, the bilinear map Pair may be a modified pairing function $e(\Omega_1, \text{phi}(\Omega_2))$ ($\Omega_1 \in G_1$, $\Omega_2 \in G_2$), which is a combination of a function for performing a pairing operation such as Tate pairing and a given function phi (see Reference literature 2, for example). Examples of algorithms for performing pairing operations on computer include well-known Miller's algorithm (Reference literature 5: "V. S. Miller, 'Short Programs for functions on Curves,' 1986, Internet <http://crypto.stanford.edu/miller/miller.pdf>"). Methods for constructing elliptic curves and cyclic groups for efficient pairing operations are also well known (see Reference literature 2, Reference literature 6: "A. Miyaji, M. Nakabayashi, S. Takano, 'New explicit conditions of elliptic curve Traces for FR-Reduction,' IEICE Trans. Fundamentals, vol. E84-A, no05, pp. 1234-1243, May 2001", Reference literature 7: "P. S. L. M. Barreto, B. Lynn, M. Scott, 'Constructing elliptic curves with prescribed embedding degrees,' Proc. SCN '2002, LNCS 2576, pp. 257-267, Springer-Verlag. 2003", and Reference literature 8: "R. Dupont, A. Enge, F. Morain, 'Building curves with arbitrary small MOV degree over finite prime fields' http://eprint.iacr.org/2002/094/", for example).

$a_i$ (i=1, n+1): $a_i$ represent n+1-dimensional basis vectors each of which consists of n+1 elements of cyclic group $G_1$. For example, each of the basis vectors $a_i$ is a n+1-dimensional vector in which i-th element is $\nu_1 \cdot g_1 \in G_1$ and the other n elements are identity elements (each of which is expressed additively as "0") of the cyclic group $G_1$. In that case, the elements of the n+1-dimensional basis vectors $a_i$ (i=1, ..., n+1) can be listed as follows.

$$a_1 = (\kappa_1 \cdot g_1, 0, 0, ..., 0) \quad (7)$$
$$a_2 = (0, \kappa_1 \cdot g_1, 0, ..., 0)$$
$$...$$
$$a_{n+1} = (0, 0, 0, ..., \kappa_1 \cdot g_1)$$

Here, $\kappa_1$ is a constant that is an element of a finite field $F_q$ other than an additive identity element $0_F$. An example of $\kappa_1 \in F_q$ is $\kappa_1 = 1_F$. The basis vectors $a_i$ are orthogonal bases. Each n+1-dimensional vector whose elements are n+1 elements of the cyclic group $G_1$ is expressed by a linear sum of the n+1-dimensional basis vectors $a_i$ (i=1, ..., n+1). That is the n+1-dimensional basis vectors $a_i$ span the vector space V described earlier.

$a_i^*$ (i=1, ..., n+1): $a_i^*$ (i=1, ..., n+1) represent n+1-dimensional basis vectors each of which consists of n+1 elements of the cyclic group $G_2$. For example, each of the basis vectors $a_i^*$ is the n+1-dimensional vector in which i-th element is $\kappa_2 \cdot g_2 \in G_2$ and the other n elements are identity elements (each of which is expressed additively as "0") of the cyclic group $G_2$. In that case, the elements of the n+1-dimensional basis vectors $a_i^*$ (i=1, ..., n+1) can be listed as follows.

$$a_1^* = (\kappa_2 \cdot g_2, 0, 0, \ldots, 0) \quad (8)$$

$$a_2^* = (0, \kappa_2 \cdot g_2, 0, \ldots, 0)$$

$$\ldots$$

$$a_{n+1}^* = (0, 0, 0, \ldots, \kappa_2 \cdot g_2)$$

Here, $\kappa_2$ is a constant that is an element of a finite field $F_q$ other than an additive identity element $0_F$. An example of $\kappa_2 \in F_q$ is $\kappa_2 = 1_F$. The basis vectors $a_i^*$ are orthogonal bases. Each n+1-dimensional vector whose elements are n+1 elements of the cyclic group $G_2$ is expressed by a linear sum of n+1-dimensional basis vectors $a_i^*$(i=1, ..., n+1). That is, the n+1-dimensional basis vectors $a_i^*$ span the vector space V* described earlier.

The basis vectors $a_i^*$ and $a_j^*$ satisfy the following formula for an element $\tau = \kappa_1 \cdot \kappa_2$ of the finite field $F_q$ other than $0_F$.

$$e(a_i, a_j^*) = g_T^{\tau \cdot \delta(i,j)} \quad (9)$$

That is, from Formulas (5) and (6), when i=j, the basis vectors satisfy the following formula.

$$e(a_i, a_j^*) = \text{Pair}(\kappa_1 \cdot g_1, \kappa_2 \cdot g_2) \cdot \text{Pair}(0, 0) \cdot \ldots \cdot \text{Pair}(0, 0)$$

$$= \text{Pair}(g_1, g_2)^{\kappa_1 \cdot \kappa_2} \cdot \text{Pair}(g_1, g_2)^{0 \cdot 0} \cdot \ldots \cdot \text{Pair}(g_1, g_2)^{0 \cdot 0}$$

$$= \text{Pair}(g_1, g_2)^{\kappa_1 \cdot \kappa_2}$$

$$= g_T^{\tau}$$

On the other hand, when i≠j, $e(a_i, a_j^*)$ does not include Pair $(\kappa_1 \cdot g_1, \kappa_2 \cdot g_2)$ but is the product of Pair$(\kappa_1 \cdot g_1, 0)$, Pair$(0, \kappa_2 \cdot g_2)$ and/or Pair $(0, 0)$. From Formula (6), Pair$(g_1, 0)$=Pair$(0, g_2)$=Pair$(g_1, g_2)^0$ is satisfied. Therefore, when i≠j, the following formula is satisfied.

$$e(a_i, a_j^*) = e(g_1, g_2)^0 = g_T^0$$

Especially when $\tau = \kappa_1 \cdot \kappa_2 = 1_F$ (for example when $\kappa_1 = \kappa_2 = 1_F$), the following formula is satisfied.

$$e(a_i, a_i^*) = g_{\delta(i,j)} \quad (10)$$

Here, $g_T^0 = 1$ is an identity element of cyclic group $G_T$ and $g_T^1 = g_T$ is the generator of cyclic group $G_T$. In this case, the basis vectors $a_i$ and $a_i^*$ are dual normal orthogonal bases, and the vector spaces V and V* are dual pairing vector spaces (DPVS) in which a bilinear mapping is defined.

A: "A" represents a matrix of n+1 rows and n+1 columns that consists of base vectors $a_i$(i=1, ..., n+1). For example, when the basis vectors $a_i$(i=1, ..., n+1) are expressed by Formula (7), matrix A is as follows.

$$A = \begin{pmatrix} a_1 \\ a_2 \\ \vdots \\ a_{n+1} \end{pmatrix} = \begin{pmatrix} \kappa_1 \cdot g_1 & 0 & \cdots & 0 \\ 0 & \kappa_1 \cdot g_1 & & \vdots \\ \vdots & & \ddots & 0 \\ 0 & \cdots & 0 & \kappa_1 \cdot g_1 \end{pmatrix} \quad (11)$$

A*: "A*" represents a matrix of n+1 rows and n+1 columns that consists of base vectors $a_i^*$(i=1, ..., n+1). For example, when the basis vectors $a_i^*$(i=1, ..., n+1) is expressed by Formula (8), matrix A* is as follow.

$$A^* = \begin{pmatrix} a_1^* \\ a_2^* \\ \vdots \\ a_{n+1}^* \end{pmatrix} = \begin{pmatrix} \kappa_2 \cdot g_2 & 0 & \cdots & 0 \\ 0 & \kappa_2 \cdot g_2 & & \vdots \\ \vdots & & \ddots & 0 \\ 0 & \cdots & 0 & \kappa_2 \cdot g_2 \end{pmatrix} \quad (12)$$

X: X represents a matrix of n+1 rows and n+1 columns that consists of the elements of a finite field $F_q$. The matrix X is used for coordinate transformation of a basis vector $a_i$. The matrix X is as follows:

$$X = \begin{pmatrix} \chi_{1,1} & \chi_{1,2} & \cdots & \chi_{1,n+1} \\ \chi_{2,1} & \chi_{2,2} & & \vdots \\ \vdots & & \ddots & \vdots \\ \chi_{n+1,1} & \chi_{n+1,2} & \cdots & \chi_{n+1,n+1} \end{pmatrix} \quad (13)$$

where each $\chi_{i,j} \in F_q$ is the entry in the i-th row and the j-th column (i=1, ..., n+1, j=1, ..., n+1) of the matrix X.

Each entry $\chi_{i,j}$ of matrix X is referred to as a transformation coefficient.

X*: X* represents the transposed matrix $X^* = (X^{-1})^T$ of the inverse matrix of matrix X. The matrix X* is used for coordinate transformation of the basis vectors $a_i^*$. The matrix X* is expressed as follows:

$$X^* = \begin{pmatrix} \chi_{1,1}^* & \chi_{1,2}^* & \cdots & \chi_{1,n+1}^* \\ \chi_{2,1}^* & \chi_{2,2}^* & & \vdots \\ \vdots & & \ddots & \vdots \\ \chi_{n+1,1}^* & \chi_{n+1,2}^* & \cdots & \chi_{n+1,n+1}^* \end{pmatrix} \quad (14)$$

where the entry in the i-th row and j-th column of the matrix X* is $\chi_{i,j}^* \in F_q$.

Each entry $\chi_{i,j}^*$ of matrix X* is referred to as a transformation coefficient.

In this case, $X \cdot (X^*)^T = I$ is satisfied, where "I" represents an unit matrix of n+1 rows and n+1 columns.

That is, for the unit matrix $$I = \begin{pmatrix} 1_F & 0_F & \cdots & 0_F \\ 0_F & 1_F & & \vdots \\ \vdots & & \ddots & 0_F \\ 0_F & 0_F & \cdots & 1_F \end{pmatrix} \quad (15)$$

The following formula $$\begin{pmatrix} \chi_{1,1} & \chi_{1,2} & \cdots & \chi_{1,n+1} \\ \chi_{2,1} & \chi_{2,2} & & \vdots \\ \vdots & & \ddots & \vdots \\ \chi_{n+1,1} & \chi_{n+1,2} & \cdots & \chi_{n+1,n+1} \end{pmatrix} \cdot \begin{pmatrix} \chi_{1,1}^* & \chi_{2,1}^* & \cdots & \chi_{n+1,1}^* \\ \chi_{1,2}^* & \chi_{2,2}^* & & \vdots \\ \vdots & & \ddots & \vdots \\ \chi_{1,n+1}^* & \chi_{2,n+1}^* & \cdots & \chi_{n+1,n+1}^* \end{pmatrix} = \quad (16)$$

$$\begin{pmatrix} 1_F & 0_F & \cdots & 0_F \\ 0_F & 1_F & & \vdots \\ \vdots & & \ddots & 0_F \\ 0_F & 0_F & \cdots & 1_F \end{pmatrix}.$$

is satisfied.

Here, n+1-dimensional vectors will be defined below.

$$\vec{\chi_i} = (\chi_{i,1}, \ldots, \chi_{i,n+1}) \quad (17)$$

$$\vec{\chi_j}^* = (\chi_{j,1}^*, \ldots, \chi_{j,n+1}^*) \quad (18)$$

From Formula (16), the inner product of the n+1-dimensional vectors $\vec{\chi_i}$ and $\vec{\chi_j}^*$ satisfies the following formula.

$$\vec{\chi_i} \cdot \vec{\chi_j}^* = \delta(i,j) \quad (19)$$

$b_i$: $b_i$ represent n+1-dimensional basis vectors each of which consists of n+1 elements of the cyclic group $G_1$. The basis vectors $b_i$ are obtained by coordinate transformation of the basis vectors $a_i (i=1, \ldots, n+1)$ by using the matrix X. That is, the basis vectors $b_i$ are obtained by the following calculation.

$$b_i = \Sigma_{j=1}^{n+1} \chi_{i,j} \cdot a_j \quad (20)$$

For example, if basis vectors $a_j$ (j=1, ..., n+1) are expressed by Formula (7), each element of the basis vectors $b_i$ is shown below.

$$b_i = (\chi_{i,1} \cdot \kappa_1 \cdot g_1, \chi_{i,2} \cdot \kappa_1 \cdot g_1, \ldots, \chi_{i,n+1} \cdot \kappa_1 \cdot g_1) \quad (21)$$

Each n+1-dimensional vector whose elements are n+1 elements of the cyclic group $G_1$ is expressed by the linear sum of n+1-dimensional basis vectors $b_i$ (i=1, n+1). That is, the n+1-dimensional basis vectors $b_i$ span the vector space V described above.

$b_i^*$: $b_i^*$ represent n+1-dimensional basis vectors each of which consists of n+1 elements of the cyclic group $G_2$. The basis vectors $b_1^*$ are obtained by coordinate transformation of the basis vectors $a_i^*$ (i=1, ..., n+1) by using the matrix $X^*$. That is, the basis vectors $b_i^*$ are obtained by the following calculation.

$$b_i^* = \Sigma_{j=1}^{n+1} \chi_{i,j}^* \cdot a_j^* \quad (22)$$

For example, if basis vectors $a_j^*$ (j=1, ..., n+1) are expressed by Formula (8), each element of the basis vectors $b_i^*$ is shown below.

$$b_i^* = (\chi_{i,1}^* \cdot \kappa_2 \cdot g_2, \chi_{i,2}^* \cdot \kappa_2 \cdot g_2, \ldots, \chi_{i,n+1}^* \cdot \kappa_2 \cdot g_2) \quad (23)$$

Each n+1-dimensional vector whose elements are n+1 elements of the cyclic group $G_2$ is expressed by a linear sum of n+1-dimensional basis vectors $b_i^*$ (i=1, ..., n+1). That is, the n+1-dimensional basis vectors $b_i^*$ span the vector space $V^*$ described earlier.

Basis vectors $b_i$ and $b_i^*$ satisfy the following formula for the element $\tau = \kappa_1 \cdot \kappa_2$ of the finite field $F_q$ other than $0_F$.

$$e(b_i, b_j^*) = g_T^{\tau \cdot \delta(i,j)} \quad (24)$$

That is, from relationship in Formulas (5), (19), (21) and (23), the basis vectors satisfy the following formula.

$$e(b_i, b_j^*) = \prod_{L=1}^{n+1} \mathrm{Pair}(\chi_{i,L} \cdot \kappa_1 \cdot g_1, \chi_{j,L}^* \cdot \kappa_2 \cdot g_2)$$

$$= \mathrm{Pair}(\chi_{i,1} \cdot \kappa_1 \cdot g_1, \chi_{j,1}^* \cdot \kappa_2 \cdot g_2) \cdot \ldots \cdot$$

$$(\chi_{i,n} \cdot \kappa_1 \cdot g_1, \chi_{j,n}^* \cdot \kappa_2 \cdot g_2) \times$$

$$\mathrm{Pair}(\chi_{j,n+1} \cdot \kappa_1 \cdot g_1, \chi_{j,n+1}^* \cdot \kappa_2 \cdot g_2)$$

$$= \mathrm{Pair}(g_1, g_2)^{\kappa_1 \cdot \kappa_2 \cdot \chi_{i,1} \cdot \chi_{j,1}^*} \cdot \ldots \cdot$$

$$\mathrm{Pair}(g_1, g_2)^{\kappa_1 \cdot \kappa_2 \cdot \chi_{i,2} \cdot \chi_{j,2}^*} \times$$

$$\mathrm{Pair}(g_1, g_2)^{\kappa_1 \cdot \kappa_2 \cdot \chi_{i,n+1} \cdot \chi_{j,n+1}^*}$$

$$= \mathrm{Pair}(g_1, g_2)^{\kappa_1 \cdot \kappa_2 (\chi_{i,1} \cdot \chi_{j,1}^* + \chi_{i,2} \cdot \chi_{j,2}^* + \ldots + \chi_{i,n+1} \cdot \chi_{j,n+1}^*)}$$

$$= \mathrm{Pair}(g_1, g_2)^{\kappa_1 \cdot \kappa_2 \cdot \vec{\chi_i} \cdot \vec{\chi_j}^*}$$

$$= \mathrm{Pair}(g_1, g_2)^{\tau \cdot \delta(i,j)}$$

$$= g_T^{\tau \cdot \delta(i,j)}$$

Especially, when $\tau = \kappa_1 \cdot \kappa_2 = 1_F$ (for example, $\kappa_1 = \kappa_2 = 1_F$), the following formula is satisfied.

$$e(b_i, b_j^*) = g_T^{\delta(i,j)} \quad (25)$$

In this case, the basis vectors $b_i$ and $b_i^*$ are the dual normal orthogonal basis of dual pairing vector spaces (vector spaces V and $V^*$).

It should be noted that basis vectors $a_i$ and $a_i^*$ other than those shown in Formulas (7) and (8) and basis vectors $b_i$ and $b_i^*$ other than those shown in formulas (20) and (22) may be used, provided that they satisfy the relationship in Formula (24).

B: B represents a matrix of n+1 rows and n+1 columns that consists of basis vectors $b_i$ (i 1, ..., n+1). B satisfies $B = X \cdot A$. For example, when the basis vectors $b_i$ are expressed by Formula (21), matrix B is as follows.

$$B = \begin{pmatrix} b_1 \\ b_2 \\ \vdots \\ b_{n+1} \end{pmatrix} \quad (26)$$

$$= \begin{pmatrix} \chi_{1,1} \cdot \kappa_1 \cdot g_1 & \chi_{1,2} \cdot \kappa_1 \cdot g_1 & \cdots & \chi_{1,n+1} \cdot \kappa_1 \cdot g_1 \\ \chi_{2,1} \cdot \kappa_1 \cdot g_1 & \chi_{2,2} \cdot \kappa_1 \cdot g_1 & & \vdots \\ \vdots & & \ddots & \chi_{n,n+1} \cdot \kappa_1 \cdot g_1 \\ \chi_{n+1,1} \cdot \kappa_1 \cdot g_1 & \cdots & \chi_{n+1,n} \cdot \kappa_1 \cdot g_1 & \chi_{n+1,n+1} \cdot \kappa_1 \cdot g_1 \end{pmatrix}$$

$B^*$: $B^*$ represents a matrix of n+1 rows and n+1 columns that consists of basis vectors $b_1^*$ (i=1, ..., n+1). $B^*$ satisfies $B^* = X^* \cdot A^*$. For example, when the basis vectors $b_i^*$ (i=1, ..., n+1) are expressed by Formula (23), matrix $B^*$ is as follows.

$$B^* = \begin{pmatrix} b_1^* \\ b_2^* \\ \vdots \\ b_{n+1}^* \end{pmatrix} \quad (27)$$

$$= \begin{pmatrix} \chi_{1,1}^* \cdot \kappa_2 \cdot g_2 & \chi_{1,2}^* \cdot \kappa_2 \cdot g_2 & \cdots & \chi_{1,n+1}^* \cdot \kappa_2 \cdot g_2 \\ \chi_{2,1}^* \cdot \kappa_2 \cdot g_2 & \chi_{2,2}^* \cdot \kappa_2 \cdot g_2 & & \vdots \\ \vdots & & \ddots & \chi_{n,n+1}^* \cdot \kappa_2 \cdot g_2 \\ \chi_{n+1,1}^* \cdot \kappa_2 \cdot g_2 & \cdots & \chi_{n+1,n}^* \cdot \kappa_2 \cdot g_2 & \chi_{n+1,n+1}^* \cdot \kappa_2 \cdot g_2 \end{pmatrix}$$

$\vec{w}$: $\vec{w}$ represents an n-dimensional vector whose elements are the elements of a finite field $F_q$.

$$\vec{w} = (w_1, \ldots, w_n) \in F_q^n \quad (28)$$

$w_\mu$: $w_\mu$ represents the $\mu$-th ($\mu = 1, \ldots, n$) element of an n-dimensional vector.

$\vec{v}$: $\vec{v}$ represents an n-dimensional vector whose elements are the elements of a finite field $F_q$.

$$\vec{v} = (v_1, \ldots, v_n) \in F_q^n \quad (29)$$

$v_\mu$: $v_\mu$ represents the $\mu$-th ($\mu = 1, \ldots, n$) element of an n-dimensional vector.

Enc: Enc represents a common key encryption function for an encryption process of a common key encryption scheme.

Specific examples of the common key encryption scheme include Camellia (registered trademark) and AES.

$Enc_k(M)$: $Enc_k(M)$ represents a ciphertext obtained by encrypting a plaintext M with a common key K according to a common key encryption function Enc.

Dec: Dec represents a common key decryption function for a decryption process of a common key encryption scheme.

$Dec_k(C)$: $Dec_k(C)$ represents a decrypted result obtained by decrypting a ciphertext C with the common key K according to the common key decryption function Dec.

[Inner Product Predicate Encryption]

A basic construction of an inner product predicate encryption, which is a type of a functional encryption, will be described below by way of example.

<Functional Encryption>

The functional encryption is a scheme in which a ciphertext can be decrypted when a combination of information called "attribute information" and information called "predicate information" causes a truth value of a given logical formula to be true. That is, in the functional encryption, one of "attribute information" and "predicate information" is embedded in a ciphertext and the other is embedded in key information. A correct decryption result is generated if a predetermined function in which attribute information corresponding to first information, which is a ciphertext or key information, and predicate information corresponding to second information, which is key information or a ciphertext, are input returns a predetermined value. The predicate encryption disclosed in Reference literature 9 "'Predicate Encryption Supporting Disjunctions, Polynomial Equations, and Inner Products,' with Amit Sahai and Brent Waters, One of 4 papers from Eurocrypt 2008 invited to the Journal of Cryptology", for example is a type of the functional encryption.

<Inner Product Predicate Encryption>

An inner product predicate encryption is the predicate encryption in which vectors of the same dimension are used as attribute information and predicate information and, when the inner product of the vectors is 0, then a ciphertext is decrypted. In the inner product predicate encryption, an inner product of 0 is equivalent to that a logical formula is "true". The predicate encryption described in Reference literature 9 is a type of the inner product predicate encryption.

[Relationship Between Logical formula and Polynomial]

In the inner product predicate encryption, a logical formula including a logical disjunction and/or a logical conjunction is represented by a polynomial.

First, the logical disjunction $(x=\eta_0) \vee (x=\eta_1)$ of a proposition 1 that "x is $\eta_0$" and a proposition 2 that "x is $\eta_1$" is expressed by the following polynomial.

$$(x-\eta_0) \cdot (x-\eta_1) \quad (30)$$

Then the following relationship between truth values and the function values of Formula (30) results.

TABLE 1

| Proposition 1 $(x = \eta_0)$ | Proposition 2 $(x = \eta_1)$ | Logical disjunction $(x = \eta_0) \vee (x = \eta_1)$ | Function value $(x - \eta_0) \cdot (x - \eta_1)$ |
|---|---|---|---|
| True | True | True | 0 |
| True | False | True | 0 |
| False | True | True | 0 |
| False | False | False | Nonzero |

As can be seen from [Table 1], when the logical disjunction $(x=\eta_0) \vee (x=\eta_1)$ is true, the function value of Formula (30) is 0; when the logical disjunction $(x=\eta_0) \vee (x=\eta_1)$ is false, the function value of Formula (30) is nonzero. That is, the logical disjunction $(x=\eta_0) \vee (x=\eta_1)$ being true is equivalent to the function value of Formula (30) being 0. Therefore, the logical disjunction can be written as Formula (30).

The logical conjunction $(x=\eta_0) \wedge (x=\eta_1)$ of proposition 1 that "x is $\eta_0$" and proposition 2 that "x is $\eta_1$" is expressed by the following polynomial:

$$\iota_0 \cdot (x-\eta_0) + \iota_1 \cdot (x-\eta_1) \quad (31)$$

where $\iota_0$ and $\iota_1$ are random numbers (the same applies to $\iota$ with other subscripts). The following relationship between truth values and the function values of Formula (31) results.

TABLE 2

| Proposition 1 $(x = \eta_0)$ | Proposition 2 $(x = \eta_1)$ | Logical conjunction $(x = \eta_0) \wedge (x = \eta_1)$ | Function value $\iota_0 \cdot (x - \eta_0) + \iota_1 \cdot (x - \eta_1)$ |
|---|---|---|---|
| True | True | True | 0 |
| True | False | False | Nonzero |
| False | True | False | Nonzero |
| False | False | False | Nonzero |

As can be seen from [Table 2], when the logical conjunction $(x=\eta_0) \wedge (x=\eta_1)$ is true, the function value of Formula (31) is 0; when the logical conjunction $(x=\eta_0) \wedge (x=\eta_1)$ is false, the function value of Formula (31) is nonzero. That is, the logical conjunction $(x=\eta_0) \wedge (x=\eta_1)$ being true is equivalent to the function value of Formula (31) being 0. Therefore, the logical conjunction can be written as Formula (31).

Thus, a logical formula including logical disjunctions and conjunctions can be represented by a polynomial f(x) using Formula (30) and Formula (31). For example, $\{(x=\eta_0) \vee (x=\eta_1) \vee (x=\eta_2)\} \wedge (x=\eta_3) \wedge (x=\eta_4)$ can be written as the following polynomial.

$$f(x)=\iota_0 \cdot \{(x-\eta_0) \cdot (x-\eta_1) \cdot (x-\eta_2)\} + \iota_1 \cdot (x-\eta_3) + \iota_2 \cdot (x-\eta_4) \quad (32)$$

While one indeterminate x is used to represent the logical disjunction in Formula (30), a plurality of indeterminates can be used to represent a logical disjunction. For example, two indeterminates $x_0$ and $x_1$ can be used to represent the logical disjunction $(x_0=\eta_0) \vee (x_1=\eta_1)$ of proposition 1 that "$x_0$ is $\eta_0$" and proposition 2 that "$x_1$ is $\eta_1$" as the following polynomial.

$$(x_0-\eta_0) \cdot (x_1-\eta_1) \quad (33)$$

Furthermore, three or more indeterminates can be used to represent a logical disjunction as a polynomial.

While one indeterminate x is used to represent the logical conjunction in Formula (31), a plurality of indeterminates can be used to represent a logical conjunction. For example, two indeterminates $x_0$ and $x_1$ can also be used to represent the logical conjunction $(x_0=\eta_0) \wedge (x_1=\eta_1)$ of proposition 1 that "$x_0$ is $\eta_0$" and proposition 2 that "$x_1$ is $\eta_1$" as the following polynomial.

$$\iota_0 \cdot (x_0-\eta_0) + \iota_1 \cdot (x_1-\eta_1) \quad (34)$$

Furthermore, three or more indeterminates can be used to represent a logical conjunction as a polynomial.

In the following, a logical formula including a logical disjunction and/or a logical conjunction represented as a polynomial using H(H≥1) indeterminates $x_0, \ldots, x_{H-1}$ is written as $f(x_0, \ldots, x_{H-1})$. It is assumed that the proposition corresponding to each indeterminate $x_0, \ldots, x_{H-1}$ is "$x_h$ is $\eta_h$", where $\eta_h$ (h=0, ..., H-1) is a constant that is determined for each proposition. In this case, the polynomial $f(x_0, \ldots, x_{H-1})$ represents the logical formula as follows: a polynomial that calculates the difference between an indeterminate $x_h$ and a constant $\eta_h$ represents the proposition that the indeterminate $x_h$ is the constant $\eta_h$, the product of polynomials each of which represents a proposition expresses the logical disjunction of the propositions, the linear sum of polynomials each of which represents a proposition or the logical disjunctions of propositions represents the logical conjunction of the proposition or the logical disjunctions of the propositions, thus expressing the logical formula. For example, five indeterminates $x_0, \ldots, x_4$ can be used to represent a logical formula, $\{(x_0=\eta_0)\vee(x_1=\eta_1)\vee(x_2=\eta_2)\}\wedge(x_3=\eta_3)\wedge(x_4=\eta_4)$ as the following polynomial.

$$f(x_0, \ldots, x_4) = \iota_0 \cdot \{(x_0-\eta_0)\cdot(x_1-\eta_1)\cdot(x_2-\eta_2)\}\iota_1\cdot(x_3-\eta_3) + \iota_2\cdot(x_4-\eta_4).$$

[Relationship Between Polynomial and Inner Product]

The polynomial $f(x_0, \ldots, x_{H-1})$ representing a logical formula can be represented by the inner product of two n-dimensional vectors. Specifically, the polynomial $f(x_0, \ldots, x_{H-1})$ is equal to the inner product of a vector whose elements are the indeterminate components of the terms of the polynomial $f(x_0, \ldots, x_{H-1})$ $$\vec{v} = (v_1, \ldots, v_n) \tag{35}$$

and a vector whose elements are the coefficient components of the terms of the polynomial $f(x_0, \ldots, x_{H-1})$ $$\vec{w} = (w_1, \ldots, w_n) \tag{36}$$

That is, $$f(x_0, \ldots, x_{H-1}) = \vec{w} \cdot \vec{v} \tag{37}$$

For example, a polynomial $f(x)=\theta_0 \cdot x^0 + \theta_1 \cdot x + \ldots + \theta_{n-1} \cdot x^{n-1}$ represented by using one indeterminate x is equal to the inner product of two n-dimensional vectors $$\vec{v} = (v_1, \ldots, v_n) = (x^0, \ldots, x^{n-1}) \tag{38}$$

and $$\vec{w} = (w_1, \ldots, w_n) = (\theta_0, \ldots, \theta_{n-1}) \tag{39}$$

That is, $$f(x) = \vec{w} \cdot \vec{v} \tag{40}$$

In other words, whether the polynomial $f(x_0, \ldots, x_{H-1})$ representing a logical formula is 0 or not is equivalent to whether the inner product of the vector $\vec{v}$ whose elements are indeterminate components of the terms of the polynomial $f(x_0, \ldots, x_{H-1})$ and the vector $\vec{w}$ whose elements are coefficient components of the terms of the polynomial $f(x_0, \ldots, x_{H-1})$ is 0 or not.

$$f(x_0, \ldots, x_{H-1}) = 0 \leftrightarrow \vec{w} \cdot \vec{v} = 0 \tag{41}$$

In the inner product predicate encryption illustrated in the first to third embodiments, attribute information ATT is a vector $\vec{v} = (v_0, \ldots v_{n-1})$ whose elements are the indeterminate components to each of which an identifier determined for each protocol or each combination of protocols is assigned, and predicate information PRE is a vector $\vec{w} = (w_0, \ldots, w_{n-1})$ whose elements are the coefficient components. That is, Attribute information ATT: $\vec{v} = (v_1, \ldots, v_n)$ (42)

Predicate information PRE: $\vec{w} = (w_1, \ldots, w_n)$ (43)

One of the attribute information ATT and the predicate information PRE is embedded in a ciphertext and the other is embedded in key information.

[Exemplary Basic Construction 1 of Inner Product Predicate Encryption]

An example of an inner product predicate encryption will be described below. Exemplary basic construction 1 is an example of the inner product encryption implemented as KEM (Key Encapsulation Mechanisms). In exemplary basic construction 1, a ciphertext corresponding to predicate information PRE is generated and key information corresponding to attribute information ATT is generated. Exemplary basic construction 1 includes Setup($1^k$), GenKey(MSK, $\vec{w}$), Enc (PA, $\vec{v}$), and Dec(SKw, $C_1$, $C_2$).

<<Setup($1^k$): Setup>>

Input: Security parameter k

Output: Master secret information MSK, public parameter PK

In one example of Setup($1^k$), first the security parameter k is set as n and a matrix A of n+1 rows and n+1 columns whose elements are n+1-dimensional basis vectors $a_i$ (i=1, n+1), a matrix A* of n+1 rows and n+1 columns whose elements are basis vectors $a_i^*$(i=1, n+1), and matrices X and X* of n+1 rows and n+1 columns for coordinate transformation are selected. Then, the n+1-dimensional basis vectors $b_i$(i=1, n+1) are calculated by coordinate transformation according to Formula (20) and n+1-dimensional basis vectors $1)b_i^*$(i=1, n+1) are calculated by coordinate transformation according to Formula (22). A matrix B* of n+1 rows and n+1 columns whose elements are the basis vectors $1)_i^*$(i=1, n+1) is output as master secret information MSK, and public parameters PK such as vector spaces V and V*, a matrix B of n+1 rows and n+1 columns whose elements are the basis vectors $b_i$ (i=1, n+1), the security parameter k, a finite field $F_q$, an elliptic curve E, cyclic groups $G_1$, $G_2$, and $G_T$, generators $g_1$, $g_2$, and $g_T$, a bilinear map e are output.

<<GenKey(MSK, $\vec{w}$): Generation of Key Information>>

Input: Master secret information MSK, vector $\vec{w}$

Output: Key information D* corresponding to vector $\vec{w}$

In one example of GenKey(MSK, first an element $\alpha \in F_q$ is selected from the finite field $F_q$. Then, the matrix B*, which is master secret information MSK, is used to generate and output the following key information corresponding to vector $\vec{w}$.

$$D^* = \alpha \cdot (\Sigma_{\mu=1}^n w_\mu \cdot b_\mu^*) + b_{n+1}^* \in G_2^{n+1} \tag{44}$$

It should be noted that if it is difficult to solve a discrete logarithm problem on cyclic group $G_2$, it is difficult to separate and extract components of $w_\mu \cdot b_\mu^*$ and $b_{n+1}^*$ from key information D*.

<<Enc(PA, $\vec{v}$): Encryption>>

Input: Public parameter PK, vector $\vec{v}$, plaintext M

Output: Ciphertexts $C_1$, $C_2$, common key K

In one example of Enc(PA, $\vec{v}$), first a common key K and a random number $v_1$ which is an element of a finite field $F_q$ is generated. Then, public parameters PK such as a matrix B, an element $v_2$ of the finite field $F_q$ corresponding to a value including the common key K, a vector $\vec{v}$, and a random number $v_1$ are used to generate the following ciphertext.

$$C_2 = v_1 \cdot (\Sigma_{\mu=1}^n v_\mu \cdot b_\mu) + v_2 \cdot b_{n+1} \in G_1^{n+1} \tag{45}$$

Then, the following ciphertext is generated.

$$C_1 = Enc_k(M) \tag{46}$$

The ciphertexts $C_1$ and $C_2$ and the common key K are output. One example of the common key K is $K = g_T^{\Sigma \cdot v2} \in G_T$, where the superscript v2 means $v_2$. As has been described above, one example of $\tau$ is $\tau = 1_F$. It should be noted that if it is difficult to solve a discrete logarithm problem on cyclic group $G_1$, it is difficult to separate and extract components of $v_\mu \cdot b_\mu$ and $v_2 \cdot b_{n+1}$ from the ciphertext $C_2$.

<<Dec(SKw, $C_1$, $C_2$): Sharing of Key/Decryption>>

Input: Key information $D_1^*$ corresponding to vector $\vec{w}$, ciphertexts $C_1$, $C_2$ Output: Common key K, plaintext M In one example of Dec(SKw, $C_1$, $C_2$), a ciphertext $C_2$ and key information $D_1^*$ are input into a bilinear map e in Formula (2). From the properties of Formulas (3) and (24), the following formula is satisfied.

$$e(C_2, D^*) = e\left(v_1 \cdot \left(\sum_{\mu=1}^{n} v_\mu \cdot b_\mu\right) + v_2 \cdot b_{n+1},\right. \qquad (47)$$

$$\left.\alpha \cdot \left(\sum_{\mu=1}^{n} w_\mu \cdot b_\mu^*\right) + b_{n+1}^*\right)$$

$$= g_T^{\tau \cdot v_1 \cdot v_1 \cdot \alpha \cdot w_1} \cdot \ldots \cdot g_T^{\tau \cdot v_1 \cdot v_n \cdot \alpha \cdot w_n} \cdot g_T^{\tau \cdot v_2}$$

$$= g_T^{\tau \cdot v_1 \cdot \alpha \cdot \vec{v} \cdot \vec{w}} \cdot g_T^{\tau \cdot v_2}$$

Here, if inner product $\vec{w} \cdot \vec{v} = 0$, then Formula (47) can be rewritten as follows.

$$e(C_2, D^*) = g_T^{\tau \cdot v_1 \cdot \alpha \cdot 0} \cdot g_T^{\tau \cdot v_2} \qquad (48)$$

$$= g_T^{\tau \cdot v_2}$$

From the result of this, the common key K is generated and output. One example of the common key K is $K = g_T^{\tau \cdot v_2} \in G_T$ Then, the common key K and the ciphertext $C_1$ are used to calculate and output the following decryption result.

$$M = Dec_k(C_1) \qquad (49)$$

[Exemplary Basic Construction 2 of Inner Product Predicate Encryption]

Like the exemplary basic construction 1, exemplary basic construction 2 is an example of the inner product predicate encryption implemented as key encapsulation mechanisms KEM. However, in exemplary basic construction 2, a ciphertext corresponding to the attribute information ATT is generated and key information corresponding to the predicate information PRE is generated. This construction includes Setup($1^k$), GenKey(MSK, $\vec{v}$), Enc(PA, $\vec{w}$), and Dec(SKv, $C_1$, $C_2$). In exemplary basic construction 2, vector $\vec{v}$ and $\vec{w}$ in exemplary basic construction 1 are replaced with each other.

That is, in GenKey(MSK, $\vec{v}$), key information $$D^* = \alpha \cdot (\Sigma_{\mu=1}^{n} v_\mu \cdot b_\mu^*) + b_{n+1}^* \in G_2^{n+1} \qquad (50)$$

instead of Formula (44), is generated and output. In Enc(PA, $\vec{w}$), a ciphertext $$C_2 = v_1 \cdot (\Sigma_{\mu=1}^{n} w_\mu \cdot b_\mu) + v_2 \cdot b_{n+1} \in G_1^{n+1} \qquad (51)$$

instead of Formula (45), is generated and output. In Dec(SKv, $C_1$, $C_2$), the key information generated by Formula (50) is used instead of the key information generated by Formula (44). The rest of exemplary basic construction 2, is the same as exemplary basic construction 1.

[Principles of First to Third Embodiments]

Principles of the first to third embodiments will be described below.

In the first to third embodiments, the predicate encryption is used as a functional encryption. Functional encryption applied systems of the first to third embodiments include a sender apparatus (information output apparatus) and a recipient apparatus (information processing apparatus) and execute a predicate-encryption-scheme-applied protocol (a protocol according to a functional encryption scheme) in which attribute information ATT (first correspondence information) and predicate information PRE (second correspondence information) is used.

First, identification information for identifying one or more predicate-encryption-scheme-applied protocols is input into an identifier identifying unit of the sender apparatus. The identifier identifying unit identifies an identifier for each of protocols or a combination of the protocols according to a rule established for each of the protocols or each combination of the protocols that is identified by the identification information, and outputs the identified identifier or identifiers.

The type of attribution information ATT (in other words, a property of attribute information ATT) to be used is determined for each of the predicate-encryption-scheme-applied protocols. The rule identifies an identifier which determines attribute information ATT of the type to be used for a protocol or a combination of protocols identified by identification information. For example, the rule in the case where the protocol is a Timed-Release encryption protocol is that an identifier should be information that identifies a time point after the time of generation of first information. The rule in the case where the protocol is a Forward Secure encryption protocol or Key Insulated encryption protocol is that an identifier should be information that identifies a time period including the time of generation of first information or a time period after the time of generation of first information. The rule in the case where the protocol is a CCA2 secure encryption protocol is that an identifier should be information that identifies one-time information that is newly set each time first information is generated. The rule in the case where the protocol is a Keyword search encryption protocol is that an identifier should be information that identifies a keyword for searching a database.

One or more identifiers identified by the identifier identifying unit are input into an attribute information setting unit of the sender apparatus. The attribute information setting unit sets one piece of attribution information ATT (a particular piece of first correspondence information) that is determined for the one identifier or combination of the two or more identifiers and outputs the set piece of attribute information ATT. An output unit of the sender apparatus outputs first information, which is the ciphertext or key information of the predicate encryption scheme that corresponds to the attribute information ATT obtained by inputting the attribute information ATT output from the attribute information setting unit into an encryption function or a key generation function of the predicate encryption scheme.

The first information and second information which is read from a storage are input into a decryption unit of the recipient apparatus. The second information is key information or a ciphertext of the predicate encryption scheme. If the first information is a ciphertext corresponding to attribution information ATT, the second information is key information corresponding to predicate information PRE (a particular piece of second correspondence information); if the first information is key information corresponding to attribute information ATT, the second information is a ciphertext corresponding to predicate information PRE (a particular piece of second correspondence information). Predicate information PRE is such information that when the predicate information PRE and any one piece of attribute information ATT is input into a predetermined function, the function returns a predetermined function value for one or more pieces of attribute information ATT. As has been described above, examples of the attribute information ATT and predicate information PRE are vectors of the same dimension; an example of the predetermined function is a function that yields the inner product of the attribute information ATT and the predicate information PRE; and an example of the predetermined value is 0 (zero element).

The decryption unit of the recipient apparatus inputs the first information and the second information into a decryption function of the predicate encryption scheme, performs a decryption process, and outputs an obtained decryption result. The decryption function of the predicate encryption scheme is a function that generates a correct decryption result if a predetermined function returns a predetermined function value when attribute information ATT corresponding to first information and predicate information PRE corresponding to second information are input into the function. In other words, the decryption function is a function that generates the correct decryption result if the truth value of the logical formula corresponding to a combination of the attribute information ATT corresponding to the first information and the predicate information PRE corresponding to the second information is true.

As has been described above, a correct decryption result is generated if a predetermined function returns a predetermined value when attribute information ATT corresponding to first information and predicate information PRE corresponding to second information are input into the function. The attribute information ATT is determined for one identifier or a combination of two or more identifiers. When predicate information PRE and any one piece of attribute information ATT is input into the predetermined function, the function returns a predetermined value for one or more pieces of attribute information ATT. That is, the same second information can be used with one or more pieces of first information to accomplish correct decryption in the first to third embodiments. Accordingly, when the sender apparatus chooses one identifier or a combination of two or more identifiers and switches from one protocol to another according to the chosen identifier to generate first information, the recipient apparatus does not need to generate a different piece of second information for each newly chosen protocol. That is, even if only one piece of second information corresponding to one piece of predicate information PRE is stored in the storage of the recipient apparatus, the recipient apparatus can deal with first information for one or more protocols chosen or a combination of protocols chosen. Consequently, in the first to third embodiments, switching can be made from one protocol to another according to a chosen identifier without needing complicated processing. A greater effect of this can be achieved especially if every piece of predicate information PRE yields a predetermined value of the predetermined function for two or more pieces of attribute information ATT when the predicate information PRE and any one piece of attribute information ATT are input into the function. If the logical formula described above includes a logical disjunction, the value of a predetermined function returns a predetermined value of "0" (zero element) for two or more pieces of attribute information ATT when the predicate information PRE and any one piece of attribute information ATT are input into the function.

When identification information for identifying two or more protocols are input into the identifier identifying unit, the combination of two or more protocols, that is, a new protocol having characteristics of the two or more protocols can be constructed.

Since the predicate encryption scheme is used, protocols can be flexibly combined in the first to third embodiments. That is, a correct decryption result is generated if a predetermined function returns a predetermined value when attribute information ATT corresponding to first information and predicate information PRE corresponding to second information are input into the function in the first to third embodiments. While a combination of two or more protocols corresponds to a combination of identifiers and the combination of the identifiers corresponds to attribute information ATT, there is no restraint on the way of combining the identifiers as long as the function returns a predetermined value.

In contrast, if a hierarchical ID-based encryption scheme adopting an ID-based encryption scheme (for example, Reference literature 10: "C. Gentry, A. Silverberg, 'Hierarchical ID-based cryptography,' Proceedings of ASIACRYPT 2002, Lecture Notes in Computer Science, Springer-Verlag, 2002.") is used, restraints are placed on the way of combining protocols. That is, in the hierarchical ID-based encryption scheme, the way of combination of a plurality of identifiers corresponding to a plurality of protocols is limited. Specifically, a new identifier generated by combining a plurality of identifiers need to constitute a tree structure and the new identifier needs to contain its parent identifier in the hierarchical ID-based encryption scheme. For example, once identifiers ID1 and ID2 have been combined to generate a new identifier, ID1|ID2, identifiers ID1, ID2 and ID3, for example, can be combined to generate another new identifier ID1|ID2|ID3 but identifiers ID1 and ID3 cannot be combined to generate a new identifier ID1|ID3.

The sender apparatus may further include a first switching unit that selects, according to a protocol identified by identification information, whether attribution information ATT is to be input into an encryption function of the predicate encryption scheme or into a key generation function of the predicate encryption scheme. The recipient apparatus may further include a second switching unit that selects whether predicate information PRE is to be input into a key generation function of the predicate encryption scheme or into an encryption function of the predicate encryption scheme, according to a protocol identified by identification information. This provision extends the range of protocols to choose from.

Some of the fields of attribute information ATT and predicate information PRE may be reserved as spare fields for some future use. For example, in a system in which attribute information ATT and predicate information PRE are vectors of the same dimension and, correct decryption can be accomplished when the inner product of the attribute information ATT and the predicate information PRE is 0, the values of some elements (spare fields) of at least some attribute information ATT may be fixed vectors, the values of some elements (spare fields) of predicate information PRE may be fixed vectors, the positions of the spare fields of the attribute information ATT are the same as the positions of the spare fields of the predicate information PRE, and settings may be made so that the inner product of a vector consisting of elements of the spare fields of the attribute information ATT and a vector consisting of elements of the spare fields of the predicate information PRE becomes 0 regardless of the value of identification information. This makes it possible to add selectable protocols and terms of a polynomial representing a logical formula without changing the setting of the system by assigning the additional protocols and terms to spare fields when such a need arises later.

Furthermore, if the values of the spare fields of the attribute information ATT are set to 0 (zero element), the first information corresponding to the attribute information ATT including the spare fields is upward compatible with first information updated with some values placed in the spare fields. That is, when the attribute information ATT and the predicate information PRE are updated by placing some values into the spare fields of the attribute information ATT and the predicate information PRE, correct decryption is accomplished using the first information corresponding to the attribute information ATT before the update and the second information corresponding to the updated predicate information PRE if correct decryption was accomplished before the update. This is because the inner product of a spare field of the attribute information ATT and a spare field of the predicate information PRE is 0 regardless of the values placed in the spare fields of the updated predicate information PRE. For the same reason, if the values in all spare fields of predicate information PRE are set to 0, the second information corresponding to the predicate information PRE including the spare fields are upward compatible with second information updated with some values placed into the spare fields.

If the values in all spare fields of attribute information ATT are set to 0 (zero element) and the values in at least some of the spare fields of predicate information PRE are set to nonzero, the first information corresponding to the attribute information ATT including the spare fields is upward compatible with first information updated with some values placed into the spare fields, whereas the second information corresponding to the predicate information PRE including the spare fields is not upward compatible with second information updated with some values placed into the spare fields. On the other hand, if the values in all spare fields of predicate information PRE are set to 0 and the values in at least some of the spare fields of attribute information ATT are set to nonzero, second information corresponding to the predicate information PRE including the spare fields is upward compatible with second information updated with some values placed into the spare fields, whereas the first information corresponding to the attribute information ATT including the spare fields is not upward compatible with first information updated with some values placed into the spare fields. In this way, upward compatibility with updated information can be varied depending on the values set in the spare fields.

Furthermore, instead of reserving some elements of attribute information ATT and predicate information PRE as spare fields, attribute information ATT and predicate information PRE that correspond to a logical formula including as a part the logical conjunction of propositions preset so as to produce true regardless of the value of a particular piece of information may be set. The propositions preset to produce true regardless of the value of the particular piece of information may be replaced later with propositions that produce true or false depending on the value of the particular piece of information to update the logical formula and attribute information ATT and predicate information PRE that correspond to the updated formula may be set as new attribute information ATT and predicate information PRE.

[First Embodiment]

The first embodiment of the present invention will be described below. In the first embodiment, first information is a ciphertext corresponding to attribute information ATT, second information is key information corresponding to predicate information PRE, a sender apparatus performs encryption, and a recipient apparatus performs decryption. This embodiment can be applied to cases where a predicate-encryption-scheme applied protocol is a Timed-Release encryption protocol, a Forward Secure encryption protocol, a Key Insulated encryption protocol, or a CCA2 secure encryption protocol, or a combination of any of these protocols, for example.

<Configuration>

FIG. 1 is a block diagram illustrating a general configuration of a functional encryption applied system 1 of a first embodiment. As illustrated in FIG. 1, the functional encryption applied system 1 of this embodiment includes a sender apparatus 110 (information output apparatus), a recipient apparatus 120 (information processing apparatus), and a key generating apparatus 130, which are connected onto a network 140. While one sender apparatus 110, one recipient apparatus 120, and one key generating apparatus 130 are depicted in FIG. 1 for convenience of explanation, more than one sender apparatus 110, recipient apparatus 120, and key generating apparatus 130 may exist.

[Sender Apparatus 110 (Information Output Apparatus)]

Figure 2:
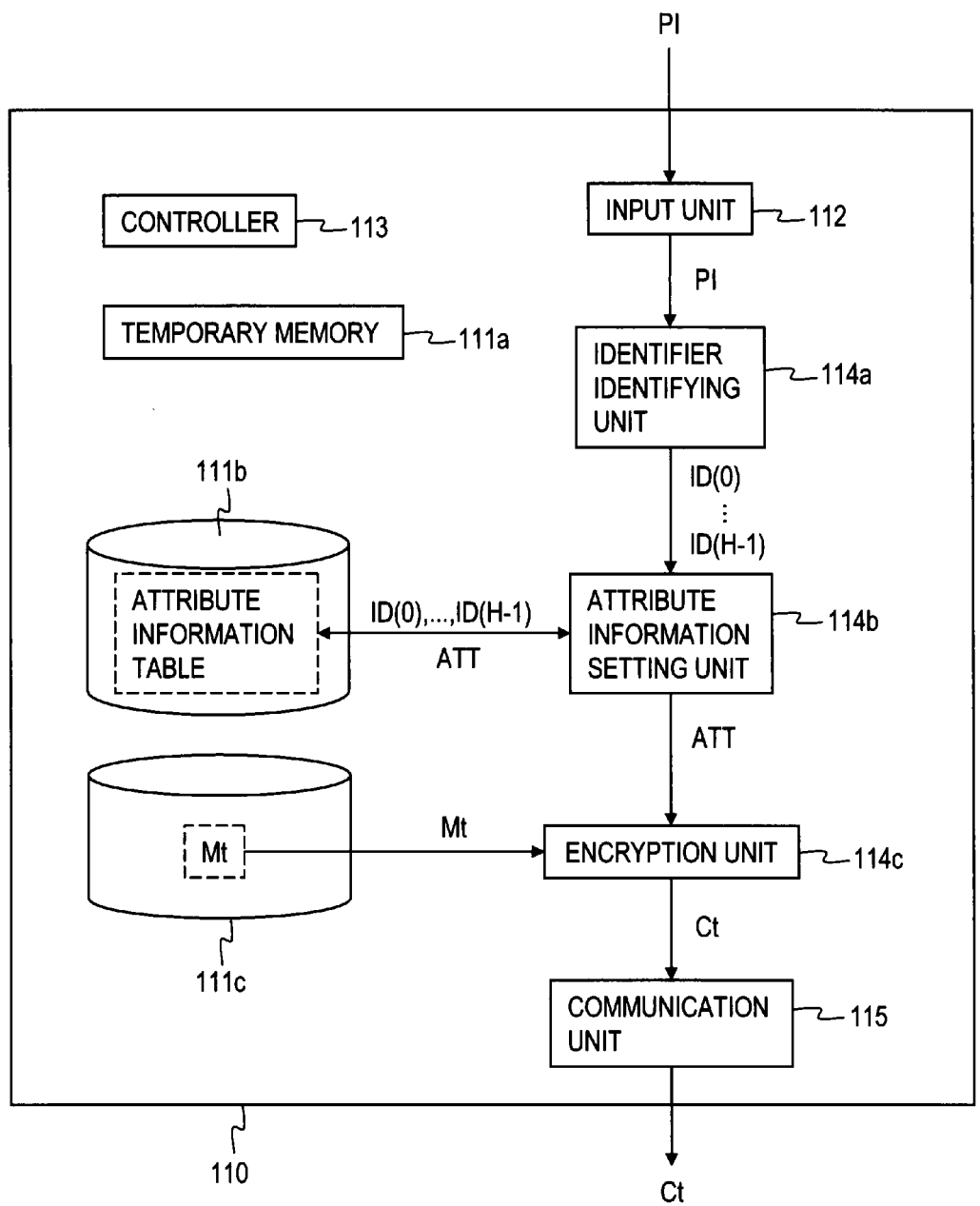
FIG. 2 is a block diagram illustrating a configuration of a sender apparatus (information output apparatus) in FIG. 1.

FIG. 2 is a block diagram illustrating a configuration of the sender apparatus 110 in FIG. 1.

As illustrated in FIG. 2, the sender apparatus 110 of this embodiment includes a temporary memory 111a, storages 111b, 111c, an input unit 112, a controller 113, an identifier identifying unit 114a, an attribute information setting unit 114b (correspondence information setting unit), an encryption unit 114c, and a communication unit 115.

The sender apparatus 110 is a particular apparatus that is configured by loading a particular program into a well-known computer or special-purpose computer including components such as a CPU (central processing unit), a RAM (random-access memory), a ROM (read-only memory), for example, and causing the computer to execute the program. That is, the controller 113, the identifier identifying unit 114a, the attribute information setting unit 114b, and the encryption unit 114c are processing units configured by the CPU executing a given program, for example. At least some of the processing units of the sender apparatus 110 may be integrated circuits. The temporary memory 111a and the storages 111b, 111c are, for example, auxiliary storage devices such as RAMS, registers, cache memories, elements in an integrated circuit, or hard disks, or storage areas implemented by a combination of at least some of these. The input unit 112 is, for example, a keyboard, a mouse, or an input port, and the communication unit 115 is, for example, a communication device such as a modem or a LAN card.

The sender apparatus 110 performs processes under the control of the controller 113. Data output from the processing units of the sender apparatus 110 and data received at the communication unit 115 are temporarily stored in the temporary memory 111a, although description of such storage operations will be omitted in the following description. The data stored in the temporary memory 111a is read as needed, is input into the processing units of the sender apparatus 110, and is used for processing in the processing units.

[Recipient Apparatus 120 (Information Processing Apparatus)]

Figure 3:
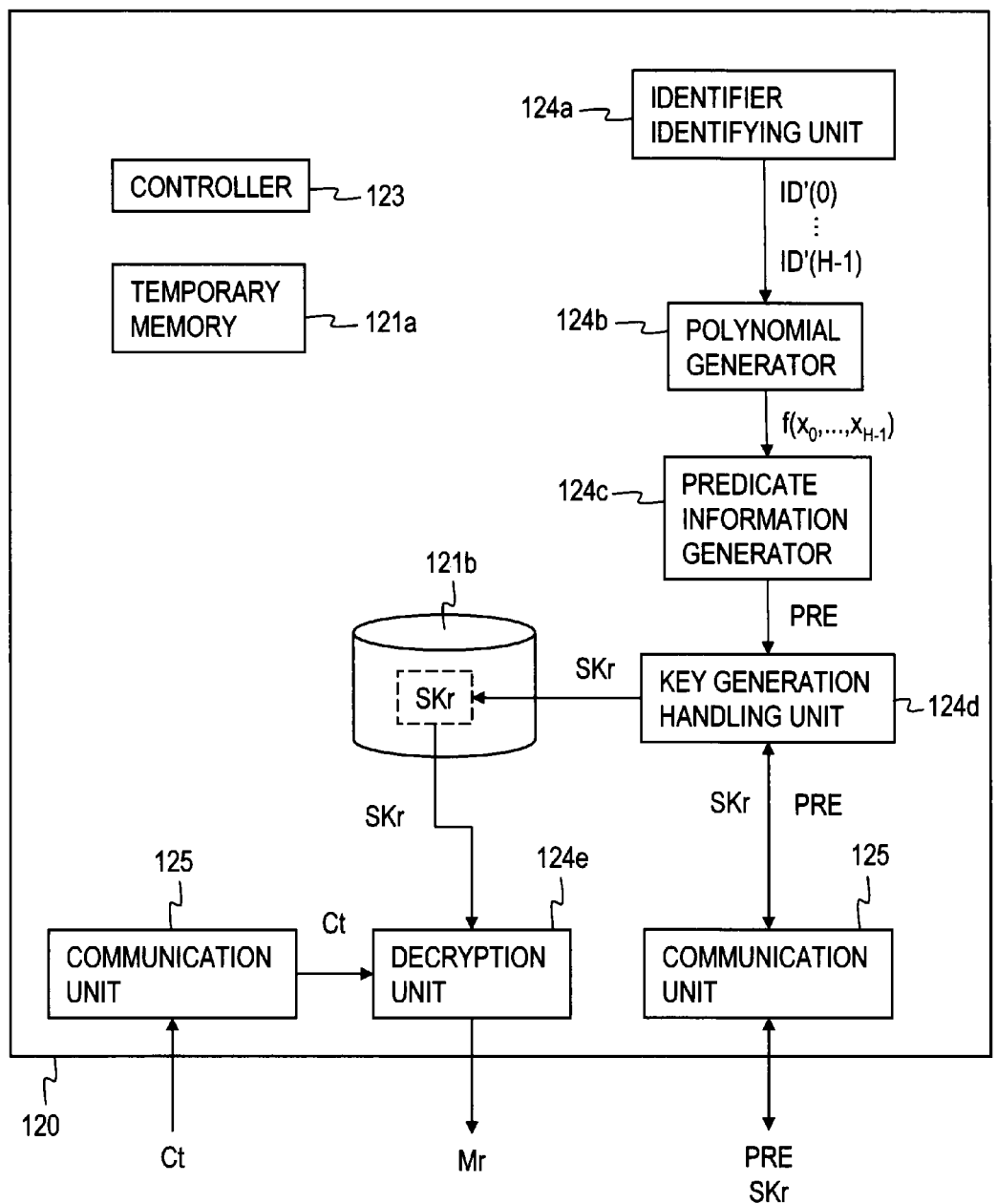
FIG. 3 is a block diagram illustrating a configuration of a recipient apparatus (information processing apparatus) in FIG. 1.

FIG. 3 is a block diagram illustrating a configuration of the recipient apparatus 120 in FIG. 1.

As illustrated in FIG. 3, the recipient apparatus 120 of this embodiment includes a temporary memory 121a, a storage 121b, a controller 123, an identifier identifying unit 124a, a polynomial generator 124b, a predicate information generator 124c, a key generation handling unit 124d, a decryption unit 124e, and a communication unit 125. While two blocks indicating the communication unit 125 are depicted in FIG. 3, this does not imply that two separate communication units 125 are required.

The recipient apparatus 120 is a particular apparatus that is configured by loading a particular program into a well-known computer or special-purpose computer including components such as a CPU, a RAM, and a ROM, for example, and causing the computer to execute the program. That is, the controller 123, the identifier identifying unit 124a, the polynomial generator 124b, the predicate information generator 124c, the key generation handling unit 124d, and the decryption unit 124e are processing units configured by the CPU executing a given program, for example. At least some of the processing units of the recipient apparatus 120 may be integrated circuits. The temporary memory 121a and the storage 121b are, for example, auxiliary storage devices such as RAMs, registers, cache memories, elements in an integrated circuit, or hard disks, or storage areas implemented by a combination of at least some of these. The communication unit 125 is a communication device such as a modem or a LAN card, for example.

The recipient apparatus 120 performs processes under the control of the controller 123. Data output from the processing units of the recipient apparatus 120 and data received at the communication unit 125 are temporarily stored in the temporary memory 121a, although description of such storage operations will be omitted in the following description. The data stored in the temporary memory 121a is read as needed, is input into the processing units of the recipient apparatus 120, and is used for processing in the processing units.

[Key generating apparatus 130]

Figure 4:
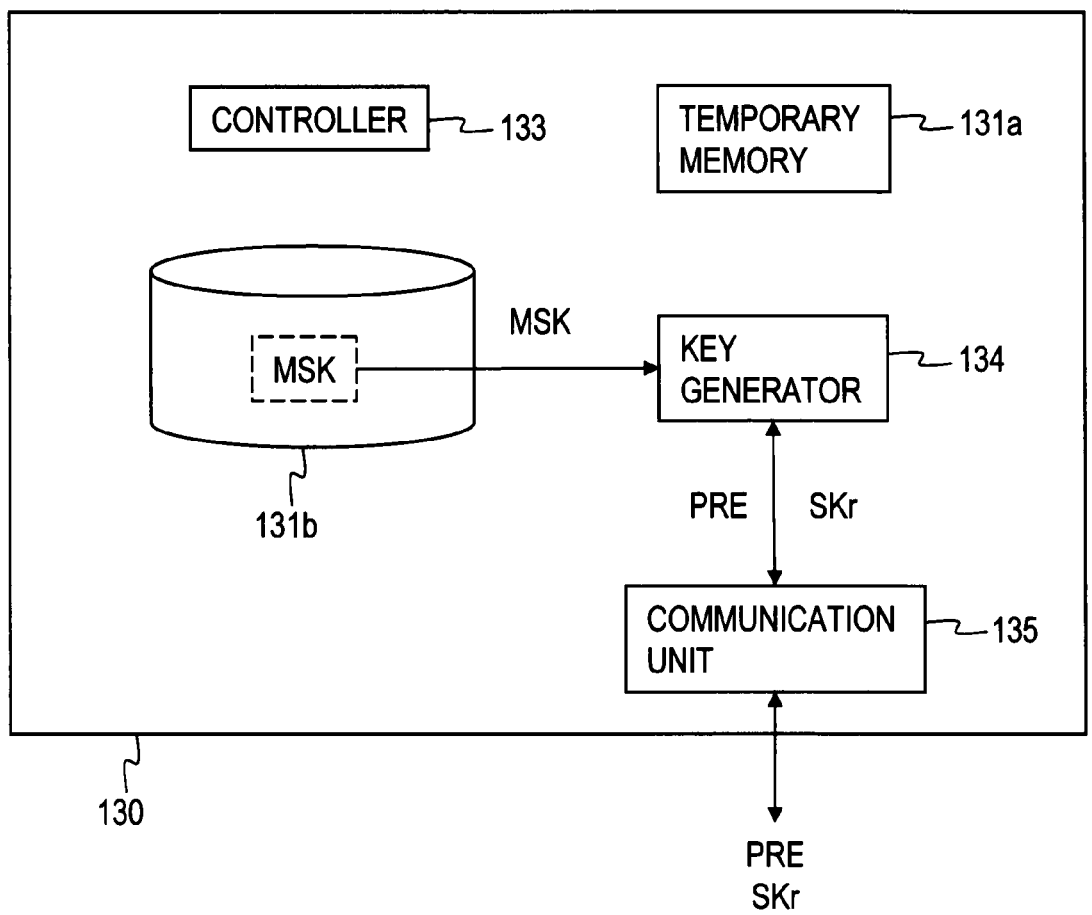
FIG. 4 is a block diagram illustrating a configuration of a key generating apparatus in FIG. 1.

FIG. 4 is a block diagram illustrating a configuration of the key generating apparatus 130 in FIG. 1.

As illustrated in FIG. 4, the key generating apparatus 130 of this embodiment includes a temporary memory 131a, a storage 131b, a controller 133, a key generator 134, and a communication unit 135.

The key generating apparatus 130 is a particular apparatus that is configured by loading a particular program into a well-known computer or special-purpose computer including components such as a CPU, a RAM, and a ROM, for example, and causing the computer to execute the program. That is, the controller 133 and the key generator 134 are processing units configured by the CPU executing a given program, for example. At least some of the processing units of the key generating apparatus 130 may be integrated circuits. The temporary memory 131a and the storage 131b are, for example, auxiliary storage devices such as RAMs, registers, cache memories, elements in an integrated circuit, or hard disks, or storage areas implemented by a combination of at least some of these. The communication unit 135 is a communication device such as a modem or a LAN card, for example.

The key generating apparatus 130 performs processes under the control of the controller 133. Data output from the processing units of the key generating apparatus 130 and data received at the communication unit 135 are temporarily stored in the temporary memory 131a, although description of such storage operations will be omitted in the following description. The data stored in the temporary memory 131a is read as needed, is input into the processing units of the key generating apparatus 130, and is used for processing in the processing units.

<Presetting>

Presetting of the functional encryption applied system 1 of this embodiment will be described below.

[Identification Information]

FIGS. 5A and 5B illustrate correspondence between identification information PI for identifying one or more protocols and the protocols in the first embodiment.

In the example in FIG. 5A, identification information PI is assigned to each protocol. Specifically, a Timed-Release encryption protocol is assigned to identification information PI=0, a Forward Secure encryption protocol is assigned to identification information PI=1, a Key Insulated encryption protocol is assigned to identification information PI=2, and a CCA2 secure encryption protocol is assigned to identification information PI=3 in this example. In this example, when one of the protocol is to be solely chosen, one piece of identification information PI corresponding to that protocol is identified; when a combination of two or more protocols is to be chosen, a combination of pieces of identification information PI corresponding to those two or more protocols is identified.

In the example in FIG. 5B, on the other hand, some identification information PI is assigned to each individual protocol and other identification information PI is assigned to each combination of two or more protocols. In this example, when any one of protocol is to be solely chosen, one piece of identification information PI corresponding to that protocol is identified; when a combination of two or more protocols is to be chosen, a piece of identification information PI corresponding to that combination of the two or more protocols is identified.

The identification information PI illustrated in FIGS. 5A and 5B is illustrative only; identification information PI corresponding to one or more protocols may otherwise be identified.

[Identifier]

FIGS. 6A, 6B and 7 show exemplary rules for identifying an identifier ID(h), each of which is established for one protocol or one combination of protocols in the first embodiment.

In the example in FIG. 6A, an identifier ID(h) is assigned to each of the selectable protocols.

A value determined according to the rule established for a chosen protocol is placed in the identifier ID(h) assigned to the protocol. For example, when the Timed-Release encryption protocol is chosen, information identifying a future time point (date and time or a count value) is placed in identifier ID(O). One example of the "future time point" is a time point after the time of generation of first information. When the Forward Secure encryption protocol or the Key Insulated encryption protocol is chosen, a value (such as a bit combination value) determined by a combination of a unique identifier (such as the mail address, telephone number, or MAC address) of the recipient apparatus 120 or the user of the recipient apparatus 120 and a time period (such as a date and time period or a count value period) including the current time point is placed in identifier ID(1) or ID(2). One example of the "current time point" is the time point of generation of first information. When the CCA2 secure encryption protocol is chosen, for example, one-time information (a random number) is placed in identifier ID(3).

On the other hand, a constant (const.) is placed in an identifier ID(h) assigned to a protocol not chosen. For example when only the Timed-Release encryption protocol is chosen, information identifying a future time point is placed in identifier ID(0) and the constant (const.) is placed in the other identifiers ID(1), ID(2) and ID (3). An example of the constant (const.) is 0 or 1. The constant (const.) placed in the identifiers ID(h) may be the same value or different values.

When a combination of a plurality of protocols is chosen, it is considered that the plurality of protocols of the combination were chosen, and values of the identifiers ID(h) are determined accordingly. For example, when the combination of the Forward Secure encryption protocol and the CCA2 secure encryption protocol is chosen, a value determined by a combination of a unique identifier of the recipient apparatus 120 or its user and a time period including the current time point is placed in identifier ID(1), one-time information is placed in identifier ID(3), and a constant (const.) is placed in the other identifiers ID(0), ID(2).

In the example in FIG. 6B, an identifier ID(h) is assigned only to a chosen protocol. For example, when only the Timed-Release encryption protocol is chosen, only identifier ID(0)

that indicates information identifying a future time point is assigned. When the combination of the Forward Secure encryption protocol and the CCA2 secure encryption protocol is chosen, only identifier ID(1) determined by a combination of a unique identifier of the recipient apparatus 120 or its user and a time period including the current time point and identifier ID(3) indicating one-time information are assigned.

In the example in FIG. 7, an identifier ID(h) is assigned to each of selectable protocols and each selectable combination of protocols. A value that is determined according to a rule established for a chosen protocol or each of the protocols that of a chosen combination is placed in the identifier ID(h) assigned to the protocol or the combination. A constant (const.) is placed in the identifiers ID(h) assigned to the protocols and combinations not chosen. For example, when the combination of the Forward Secure encryption protocol and the CCA2 secure encryption protocol is chosen, a value determined by the combination of a unique identifier of the recipient apparatus 120 or its user, a time period including the current time point, and one-time information is placed in identifier ID(5) and a constant (const.) is placed in the other identifiers ID(h).

The method of determining identifiers described above is illustrative only; other method may be used to determine identifiers. For example, in a variation of the example in FIG. 7, an identifier ID(h) may be assigned to only a chosen protocol or a chosen combination of protocols. Furthermore, identifiers ID(h) obtained as described above may be combined (by bit combination, for example) to construct one identifier.

[Attribute Information (First Correspondence Information)]

FIGS. 8A and 9A illustrate exemplary attribute information tables for identifying one piece of attribute information ATT for one identifier ID(h) or a combination of two or more identifiers ID(h); FIGS. 8B and 9B illustrate data structures of attribute information ATT determined by the attribute information tables.

The attribute information ATT in this embodiment is a vector $\vec{v}=(v_0, \ldots, v_{n-1})$ whose elements are the indeterminate components of the terms of the above-described polynomial $f(x_0, \ldots, x_{H-1})$ representing a logical formula to which identifiers ID(h) are assigned as their values (see Formula (42), for example). The dimension n of the attribute information ATT is the maximum allowable number of terms (including constant terms) of the polynomial $f(x_0, \ldots, x_{H-1})$. In FIGS. 8A and 9A, the indeterminate component of each term, the element value corresponding to the indeterminate component, and the element number corresponding to the element are associated with one another. The numbers in FIGS. 8B and 9B indicate the element numbers in FIGS. 8A and 9A and the element values corresponding to the element numbers in FIGS. 8A and 9A are placed in the positions of the numbers shown in FIGS. 8B and 9B.

FIG. 8A is an example of an attribute information table in which the number of indeterminates is four (H=4) and the polynomial $f(x_0, x_1, x_2, x_3)$ is not allowed to contain a term including a power of an indeterminate. Since the polynomial $f(x_0, x_1, x_2, x_3)$ is not allowed to contain a term including a power of an indeterminate, the maximum number of terms (including constant terms) of the polynomial $f(x_0, x_1, x_2, x_3)$ is 16 and therefore the following 16 indeterminates are allowed: $x_0 \cdot x_1 \cdot x_2 \cdot x_3$, $x_0 \cdot x_1 \cdot x_2$, $x_0 \cdot x_1 \cdot x_3$, $x_0 \cdot x_2 \cdot x_3$, . . . , $\{x_0\}^0 \cdot \{x_1\}^0$, $\{x_2\}^0$, $\cdot \{x_3\}^0$. In the example in FIG. 8A, attribute information ATT is a vector $\vec{v}=(v_0, \ldots, v_{n-1})$ whose elements are these 16 indeterminate components to which identifiers ID(0), . . . , ID(3) are assigned as their values. It should be noted that if only a chosen protocol or a chosen combination of protocols is assigned an identifier ID(h) as in FIG. 6B, a constant (for example 0 or 1) may be set for an identifier ID(h) that is not assigned identifiers and the identifiers may be assigned to indeterminate components. In the example in FIGS. 8A and 8B identifiers ID(h) are assigned to indeterminates $x_h$ to construct attribute information ATT which is a 16-dimensional vector $\vec{v}=(v_0, \ldots, v_{n-1})$ having elements ID(0)·ID(1)·ID(2)·ID(3), ID(0)·ID(1)·ID(2), ID(0)·ID(1)·ID(3), ID(0)·ID(2)·ID(3), . . . , $\{ID(\mathbf{0})\}^0 \cdot \{ID(\mathbf{1})\}^0 \cdot ID(\mathbf{2})\}^0 \cdot \{ID(\mathbf{3})\}^0$.

FIG. 9A is an example of an attribute information table in which the number of indeterminates are four (H=4) and the polynomial $f(x_0, x_1, x_2, x_3)$ is allowed to contain a term including the square of an indeterminate but is not allowed to contain a term including the third or greater power of an indeterminate. In the example in FIG. 9A, attribute information ATT is a vector $\vec{v}=(v_0, \ldots, v_{n-1})$ whose elements are values of such indeterminate components to which identifiers ID(0), . . . , ID(3) are assigned. In the example in FIGS. 9A and 9B, identifiers ID(h) are assigned to the indeterminates $x_h$. If only a chosen protocol or a chosen combination of protocols is assigned an identifier ID(h) as in FIG. 6B, a constant (for example 0 or 1) may be set for an identifier ID(h) that is not assigned and identifiers may be assigned to indeterminate components.

The methods for generating attribute information ATT in FIGS. 8 and 9 are illustrative only; more or less than four indeterminates may be contained or a term including the third or greater power of an indeterminate may be contained in the polynomial $f(x_0, \ldots, x_{H-1})$. Furthermore, attribute information ATT may have a structure that does not contain elements corresponding to indeterminate components that are not allowed to be contained in the polynomial $f(x_0, \ldots, x_{H-1})$, such as a structure in which a term including the square of a certain indeterminate is allowed but terms that include the square of other indeterminates are not allowed. Alternatively, the attribute information table may be a table in which identifiers ID(h) and logical formulas (such as $\{ID(\mathbf{0}) \vee ID(\mathbf{1})\} \wedge ID(\mathbf{3})$) of identifiers ID(h) are associated with the pieces of attribute information ATT that correspond thereto.

[Predicate Information (Second Correspondence Information)]

FIGS. 10A and 11A illustrate an example of predicate information PRE corresponding to a polynomial $f(f_0, \ldots, x_{H-1})$; FIGS. 10B and 11B illustrate data structures of the predicate information PRE.

The predicate information PRE in this embodiment is a vector $\vec{w}=(w_0, \ldots, w_{n-1})$ whose elements are the coefficient components of the terms of the above-described polynomial $f(x_0, \ldots, x_{H-1})$ representing a logical formula (see Formula (43), for example). The dimension n of the predicate information PRE is the maximum allowable number of terms (including constant terms) of the polynomial $f(x_0, \ldots, x_{H-1})$. In FIGS. 10A and 11A, the indeterminate component of each term, the element value which is a coefficient component of the term corresponding to each of the indeterminate components, and the element number corresponding to each of the elements are associated with one another. The numbers in FIGS. 10B and 11B indicate the element numbers in FIGS. 10A and 11A and element values corresponding to the element numbers in FIGS. 10A and 11A are placed in the positions of the numbers shown in FIGS. 10B and 11B.

The example in FIG. 10A corresponds to the following polynomial that is set under the conditions that the number of indeterminates is four (H=4) and a term including a power of an indeterminate is not allowed:

$$f(x_0, x_1, x_2, x_3) = \iota_0 \cdot (x_1 - ID'(1)) \cdot (x_2 - ID'(2)) + \iota_1 \cdot (x_3 - ID'(3)) \quad (52)$$

$$= \iota_0 \cdot x_1 \cdot x_2 - \iota_0 \cdot ID'(2) \cdot x_1 - \iota_0 \cdot ID'(1) \cdot x_2 + \iota_1 \cdot x_3 +$$

$$(\iota_0 \cdot ID'(1) \cdot ID'(2) - \iota_1 \cdot ID'(3))$$

where ID'(1), ID'(2) and ID'(3) are identifiers determined according to rules corresponding to protocols as described above, and the polynomial $f(x_0, x_1, x_2, x_3)$ in this example corresponds to a logical formula $\{(x_1=ID'(1)) \vee (x_2=ID'(2))\} \wedge (x_3=ID'(3))$. For example, if ID'(1), ID'(2) and ID'(3) are identifiers determined according to the rules corresponding to the Forward Secure encryption protocol or Key Insulated encryption protocol and CCA2 secure encryption protocol, the polynomial $f(x_0, x_1, x_2, x_3)$ of Formula (52) corresponds to a logical formula that returns true in a combination of the Forward Secure encryption protocol or the Key Insulated encryption protocol and the CCA2 secure encryption protocol. Predicate information PRE in this example is a 16-dimensional vector $\vec{w}$ in which the element with element number 8 is $\iota_0$, the element with element number 12 is $-\iota_0 \cdot ID'(2)$, the element with element number 13 is $-\iota_0 \cdot ID'(1)$, the element with element number 14 is $\iota_1$, the element with element number 15 is $\iota_0 \cdot ID'(1) \cdot ID'(2) - \iota_1 \cdot ID'(3)$, and the other elements are 0. The inner product of the predicate information PRE in this example and the attribute information ATT generated according to FIG. 8 in the case of $\{(x_1=ID(1)) \vee (x_2=ID(2))\} \wedge (x_3=ID(3))$ is 0.

The example in FIG. 11A corresponds to the following polynomial that is set under the conditions that the number of indeterminates is four (H=4) and a term including the square of an indeterminate is allowed but a term including the third or greater power of an indeterminate is not allowed:

$$f(x_0, x_1, x_2, x_3) = \{\iota_0 \cdot (x_1 - ID'(1)) + \iota_1 \cdot (x_3 - ID'(3))\} \cdot (x_3 - ID'(3)) \quad (53)$$

$$= \iota_1 \cdot (x_3)^2 + \{-\iota_0 \cdot ID'(1) - 2 \cdot \iota_1 \cdot ID'(3)\} \cdot$$

$$x_3 + \iota_0 \cdot x_1 \cdot x_3 -$$

$$\iota_0 \cdot ID'(3) \cdot x_1 + \{\iota_0 \cdot ID'(1) \cdot ID'(3) + \iota_1 \cdot \{ID'(3)\}^2\}$$

where ID'(1), ID'(2) and ID'(3) are identifiers determined according to rules corresponding to protocols as described above, and the polynomial $f(x_0, x_1, x_2, x_3)$ in this example corresponds to a logical formula $\{(x_1=ID'(1)) \vee (x_2=ID'(3))\} \vee (x_3=ID'(3))$. For example, if ID'(1) and ID'(3) are identifiers determined according to the rules corresponding to the Forward Secure encryption protocol and CCA2 secure encryption protocol, the polynomial $f(x_0, x_1, x_2, x_3)$ of Formula (53) corresponds to a logical formula that returns true in a combination of the Forward Secure encryption protocol and the CCA2 secure encryption protocol, or the CCA2 secure encryption protocol. Predicate information PRE in this example is a 16-dimensional vector $\vec{w}$ in which the element with element number 9 is $\iota_0$, the element with element number 12 is $-\iota_0 \cdot ID'(3)$, the element with element number 14 is $-\iota_0 \cdot ID'(1) - 2 \cdot \iota_1 \cdot ID'(3)$, the element with element number 15 is $\iota_0 \cdot ID'(1) \cdot ID'(3) + \iota_1 \cdot \{ID'(3)\}^2$, the element with element number en is $\iota_1$, and the other elements are 0. The inner product of the predicate information PRE in this example and the attribute information ATT generated according to FIG. 9 in the case of $\{(x_1=ID(1)) \vee (x_2=ID(3))\} \vee (x_3=ID(3))$ is 0.

The methods of generating predicate information PRE in FIGS. 10 and 11 are illustrative only; more or less than four indeterminates may be contained or a term including the third or greater power of an indeterminate may be contained in the polynomial $f(x_0, \ldots, x_{H-1})$. Furthermore, predicate information PRE may have a structure in which certain indeterminates are not allowed, such as a structure in which a term including the square of a certain indeterminate is allowed but terms that include the square of other indeterminates are not allowed. Furthermore, more than one piece of predicate information PRE may yield an inner product of 0 with a certain piece of attribute information ATT. Predicate information PRE that yields an inner product of 0 with a desired piece of attribute information ATT may be set by a method other than the method described above.

[Plaintext]

In this embodiment, a plaintext Mt to be encrypted is stored in the storage 111c of the sender apparatus 110.

[Logical Formulas Predetermined at Recipient Apparatus 120]

In this embodiment, a construction of a logical formula (for example $\{(x_1=ID'(1)) \vee (x_2=ID'(2))\} \wedge (x_3=ID'(3))$) corresponding to conditions consisting of protocols and/or combinations of the protocols is predetermined at the recipient apparatus 120. However, values of identifiers ID'(h) constituting the logical formula are not identified and predicate information PRE is determined by values of the identifiers ID'(h) that are determined.

[Master Secret Information]

Master secret information MSK of a predicate encryption scheme is stored in the storage 131b of the key generating apparatus 130 of this embodiment. One example of the master secret information MSK is the above-described matrix B* of n+1 rows and n+1 columns that consists of basis vectors $b_i^*$ (i=1, n+1).

<Processes>

Figure 12A:
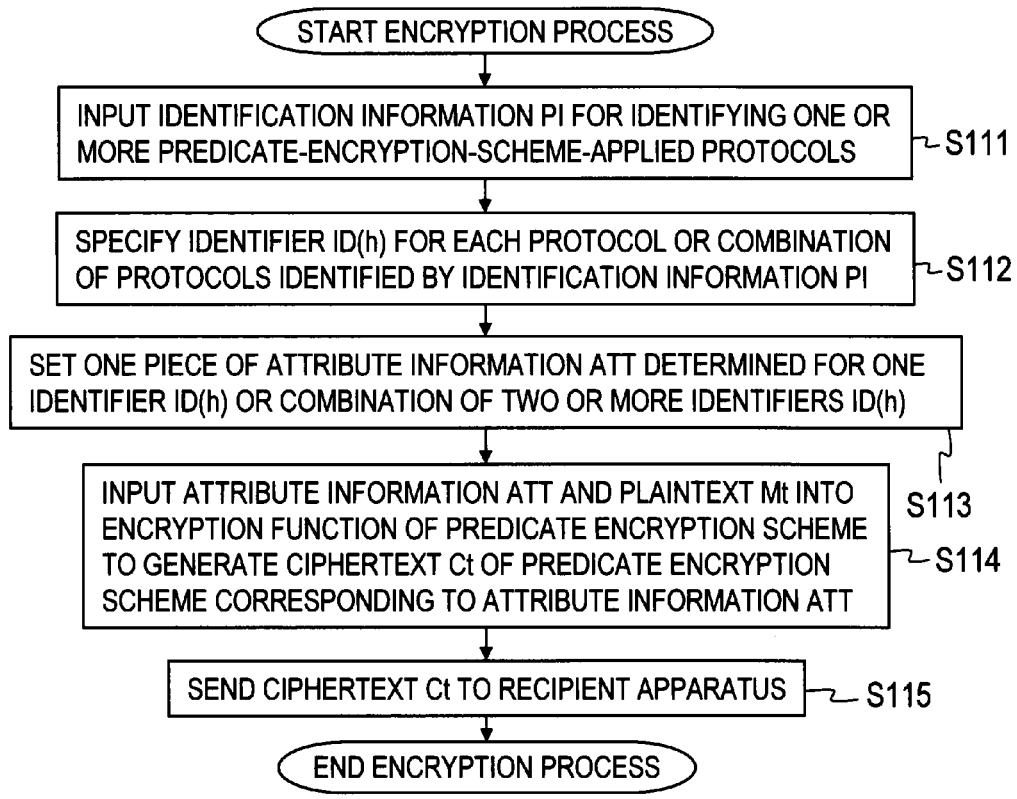
FIG. 12A is a flowchart illustrating an encryption process of the first embodiment.
Figure 12B:
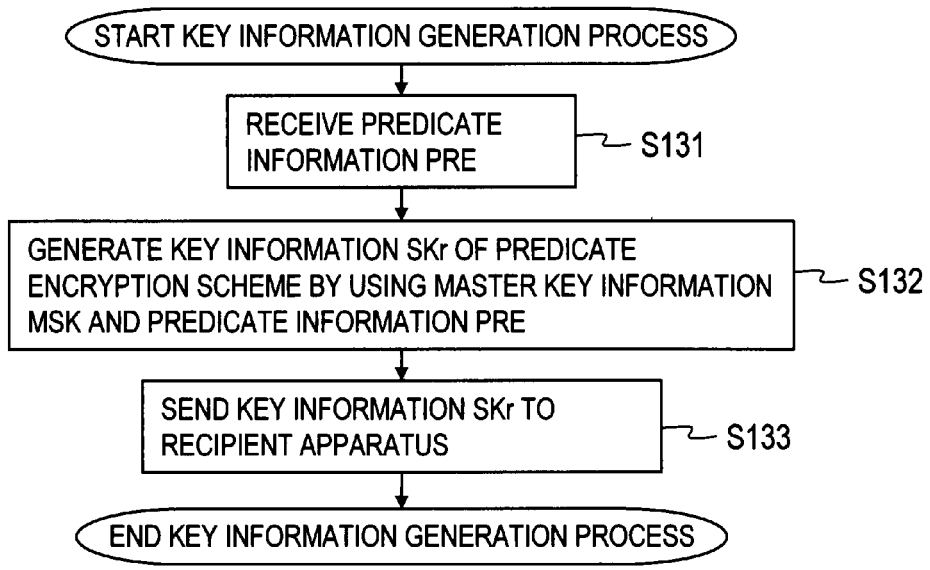
FIG. 12B is a flowchart illustrating a key information generation process of the first embodiment.
Figure 13:
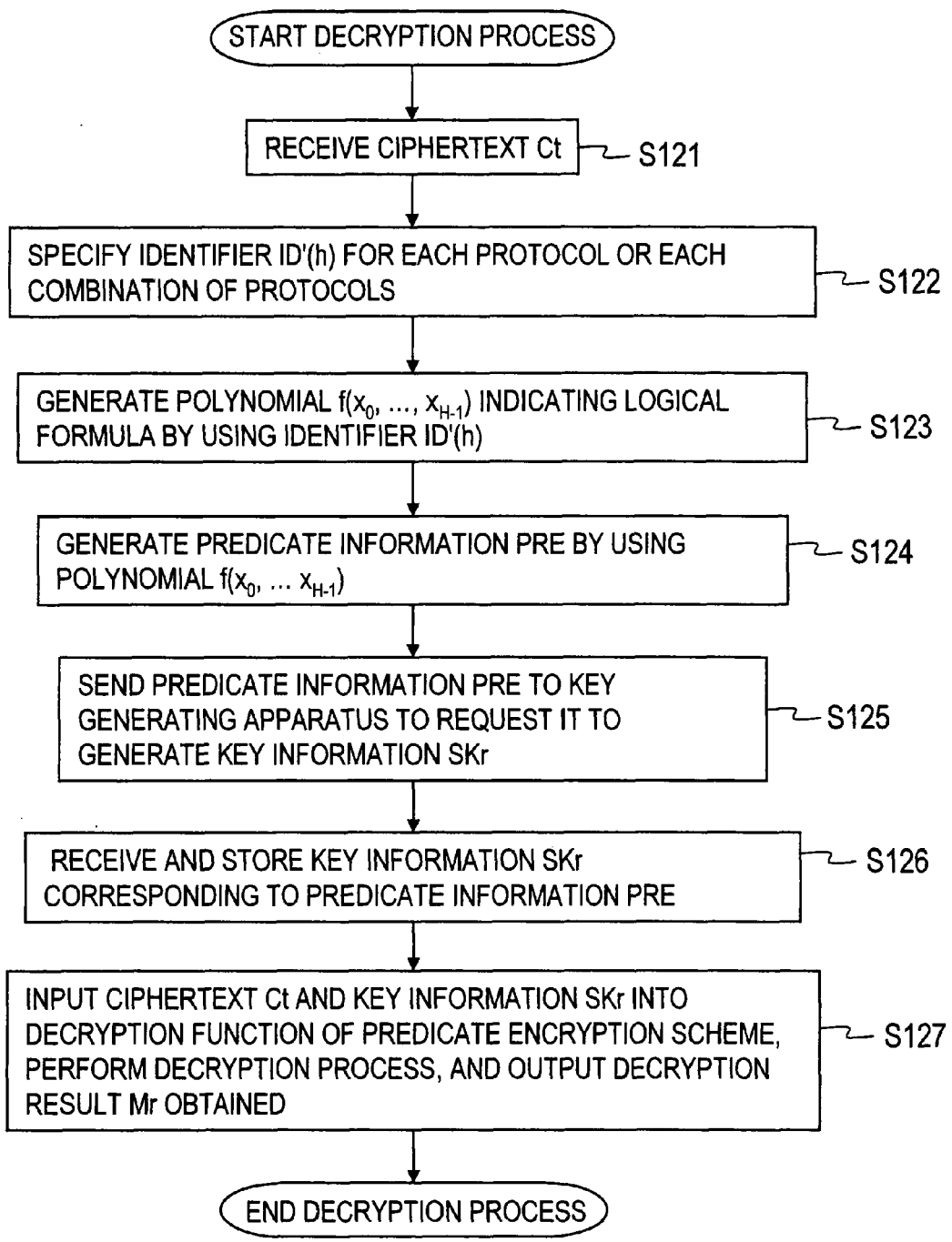
FIG. 13 is a flowchart illustrating a decryption process of the first embodiment.

FIG. 12A is a flowchart illustrating an encryption process of the first embodiment. FIG. 12B is a flowchart illustrating a key information generation process of the first embodiment. FIG. 13 is a flowchart illustrating a decryption process of the first embodiment. The processes of this embodiment will be described with reference to these flowcharts.

[Encryption Process]

In the encryption process of this embodiment, identification information PI for identifying one or more predicate-encryption-scheme-applied protocols to be executed is input into the input unit 112 of the sender apparatus 110 (FIG. 2) (step S111). For example, if the identification information PI is determined as shown in FIG. 5A, a piece of identification information PI corresponding to one protocol chosen by a user or a combination of pieces of identification information PI corresponding to two or more protocols chosen by the user is input into the input unit 112. If identification information PI is determined as illustrated in FIG. 5B, a piece of identification information PI corresponding to one protocol or two or more protocols chosen by the user are input into the input unit 112.

The identification information PI input in the input unit 112 is then input into the identifier identifying unit 114a. The identifier identifying unit 114a identifies an identifier ID(h) for each protocol or each combination of protocols identified by the identification information PI according to a rule established for the protocol or the combination of the protocols (see FIGS. 6 and 7, for example), and outputs the identified one or more identifiers ID(h) (step S112).

One or more identifiers ID(h) output from the identifier identifying unit 114a are input into the attribute information setting unit 114b. The attribute information setting unit 114b uses an attribution information table (see FIGS. 8A to 9B, for example) stored in the storage 111b to set one piece of attribute information ATT determined for the one identifier ID(h) or the combination of the two or more identifiers ID(h) and outputs the set attribute information ATT (step S113).

The attribute information ATT output from the attribute information setting unit 114b is input into the encryption unit 114c. The encryption unit 114c reads a plaintext Mt from the storage 111c, inputs the attribute information ATT and the plaintext Mt into an encryption function of the predicate encryption scheme to generate a ciphertext Ct for the plaintext Mt (step S114). Examples of the encryption function of the predicate encryption scheme is Formulas (45) and (46) described above.

The ciphertext Ct generated is sent to the communication unit 115. The communication unit 115 (output unit) transmits the ciphertext Ct (first information) to the recipient apparatus 120 over the network 140 (step S115).

[Decryption Process/Key Information Generation Process]

In the decryption process of this embodiment, the communication unit 125 of the recipient apparatus 120 (FIG. 3) receives the ciphertext Ct (first information) (step S121).

This triggers the identifier identifying unit 124a to identify, for each protocol or each combination of protocols, one or more identifiers ID'(h) in a logical formula predetermined at the recipient apparatus 120 as described above, according to a rule established for each protocol or each combination of protocols (step S122). It should be noted that the rule is the same as the rule used by the identifier identifying unit 114a of the sender apparatus 110 to identify identifiers ID(h).

The one or more identifiers ID'(h) identified at the identifier identifying unit 124a are input into the polynomial generator 124b. The polynomial generator 124b uses the identifier or identifiers ID'(h) to determine a value(s) of identifier(s) ID'(h) in the logical formula predetermined at the recipient apparatus 120 described above, generates a polynomial $f(x_0, \ldots, x_{H-1})$ corresponding to the logical formula determined by the value(s) (see, for example, Formulas (52) and (53)), and outputs the generated polynomial $f(x_0, \ldots, x_{H-1})$ (step S123).

The polynomial $f(x_0, \ldots, x_{H-1})$ output from the polynomial generator 124b is input into the predicate information generator 124c. The predicate information generator 124c generates a vector $\vec{w}=(w_0, \ldots, w_{n-1})$ whose elements are the coefficient components of the terms of the input polynomial $f(x_0, \ldots, x_{H-1})$ as predicate information PRE (see, for example, FIGS. 10A to 11B) and outputs the predicate information PRE (step S124).

The predicate information PRE output from the predicate information generator 124c is input into the key generation handling unit 124d. The key generation handling unit 124d transmits the predicate information PRE to the key generating apparatus 130 through the communication unit 125 over the network 140 to request the key generating apparatus 130 to generate key information SKr corresponding to the predicate information PRE (step S125).

In the key information generation process of this embodiment, first the communication unit 135 of the key generating apparatus 130 (FIG. 4) receives the predicate information PRE (step S131). The predicate information PRE received at the communication unit 135 is input into the key generator 134. The key generator 134 reads master secret information MSK from the storage 131b, inputs the master secret information MSK and the predicate information PRE into a key generation function of the predicate encryption scheme to generate key information Skr corresponding to the predicate information PRE and outputs the key information SKr (step S132). One example of the key generation function is the function of Formula (44). The generated key information SKr is sent to the communication unit 135. The communication unit 135 transmits the key information SKr to the recipient apparatus 120 over the network 140 (step S133).

The communication unit 125 of the recipient apparatus 120 (FIG. 3) receives the key information SKr transmitted and sends the key information SKr to the key generation handling unit 124d. The key generation handling unit 124d stores the key information SKr (second information) into the storage 121b (step S126).

Then, the ciphertext Ct (first information) received by the communication unit 125 at step S121 and the key information SKr (second information) read from the storage 121b are input into the decryption unit 124e. The decryption unit 124e inputs the ciphertext Ct (first information) and the key information SKr (second information) into a decryption function of the predicate encryption scheme, performs the decryption process and outputs a decryption result Mr obtained through the decryption process (step S127). Examples of the decryption function are Formulas (47) to (49).

Here, if the predetermined function into which the attribute information ATT corresponding to the ciphertext Ct (first information) and the predicate information PRE corresponding to the key information SKr (second information) are input returns a predetermined value (for example, if the inner product of the attribute information ATT and the predicate information PRE is 0), a correct decryption result can be obtained and decryption result Mr=plaintext Mt (see, for example Formulas (48) and (49)). On the other hand, the predetermined function into which the attribute information ATT and the predicate information PRE are input returns a value that is not equal to a predetermined value (for example, if the inner product of the attribute information ATT and the predicate information PRE is not 0), a correct decryption result cannot be obtained. This means that only a ciphertext Ct that satisfies the condition set in a protocol and/or a combination of protocols predetermined at the recipient apparatus 120 is decrypted correctly.

In this way, according to this embodiment, a protocol or a combination of protocols to be used can be chosen at the sender apparatus 110 and conditions for protocols or combinations of protocols for ciphertexts that can be decrypted at the recipient apparatus 120 can be preset at the recipient apparatus 120. The recipient apparatus 120 can correctly decrypt a ciphertext transmitted to it only when a protocol or a combination of protocols chosen at the sender apparatus 110 satisfies the condition set at the recipient apparatus 120. Furthermore, the condition for a protocol and a combination of protocols for a ciphertext that can be decrypted at the recipient apparatus 120 can be set by flexibly combining logical disjunctions and conjunctions. In particular, if a condition including logical disjunctions are set at the recipient apparatus 120, the recipient apparatus 120 does not need to use different pieces of key information for different protocols chosen at the sender apparatus 110.

[Variation 1 of the First Embodiment]

As has been described above, some fields of attribute information ATT and predicate information PRE may be reserved as spare fields. This makes it possible to add selectable protocols and terms of a polynomial representing a logical formula by assigning the additional protocols and terms to the spare fields when such a need arises later.

FIGS. 14A, 14B, 15A and 15B illustrate an example in which some fields of attribute information ATT and predicate information PRE are reserved as spare fields.

FIGS. 14A, 14B, 15A and 15B illustrate spare fields in an example in which attribute information ATT and predicate information PRE are vectors of the same dimension and correct decryption can be accomplished when the inner product of the attribute information ATT and the predicate information PRE is 0. In this example, the values of elements (spare fields) of the attribute information ATT at element numbers 0, ..., 4 are constants const.(0), ..., const.(4), respectively, and the values of elements (spare fields) of the predicate information PRE at element number 0, ..., 4 are constants const.'(0), ..., const.'(4), respectively, regardless of the value of identification information PI. These spare fields are set so that the inner product of a vector made up of the elements of the attribute information ATT at element number 0, ..., 4 and a vector made up of the elements of the predicate information PRE at element number 0, ..., 4 will be 0 regardless of the value of identification information PI. For example, all of the constants, const.(0), ..., const.(4) may be 0; all of the constants const.'(0), ..., const.'(4) may be 0; or all of constants const.(0), ..., const.(4) may be 0 and some of the constants const.'(0), ..., const.'(4) may be nonzero; or all of the constants const.'(0), ..., const.'(4) may be 0 and some of the constants const.(0), ..., const.(4) may be nonzero; or some of the constants const.(0), ..., const.(4) may be nonzero, some of the constants const.'(0), ..., const.'(4) may be nonzero, and const.(0)·const.'(0)+ ... +const.(4)·const.'(4) may be 0.

[Variation 2 of the First Embodiment]

Instead of reserving some elements of attribute information ATT and predicate information PRE as spare fields as described above, attribute information ATT and predicate information PRE corresponding to a logical formula that includes as a part a logical conjunction of the proposition that is preset to become true regardless of the value of identification information PI may be set. This makes it possible to add selectable protocols and terms of a polynomial representing a logical formula by assigning the additional protocols and terms to spare fields when such a need arises later.

FIGS. 16 to 18 illustrate an example of setting attribute information ATT and predicate information PRE corresponding to a logical formula including as a part a logical conjunction of the proposition that is preset to become true regardless of the value of identification information PI.

In this example, identifier ID(3) is an unused identifier and attribute information ATT and predicate information PRE corresponding to a logical formula including as a part a logical conjunction of a proposition, "indeterminate $x_3$ is ID(3)", that is preset to become true regardless of the value of identification information PI.

For example, in the example in FIGS. 16 to 18B, identifiers ID(3) and ID'(3) are the same constant (const.) regardless of the value of identification information PI and, attribute information ATT and predicate information PRE are set as described above. In this setting, the proposition "indeterminate $x_3$ is ID(3)" becomes true regardless of the value of identification information PI. In fact, the inner product of the attribute information ATT in FIGS. 17A and 17B and the predicate information PRE in FIGS. 18A and 18B becomes true regardless of the value of identification information PI. When the system is extended later to use identifier ID(3), a value corresponding to identification information PI can be placed in identifier ID(3) to update the attribute information ATT and the predicate information PRE.

[Second Embodiment]

A second embodiment of the present invention will be described below.

In the second embodiment, first information is key information corresponding to attribute information ATT, second information is a ciphertext corresponding to predicate information PRE, a sender apparatus outputs key information, and a ciphertext stored in a recipient apparatus is decrypted. The embodiment can be applied to a case where a predicate-encryption-scheme-applied protocol is a Keyword search encryption protocol, or a combination of a Keyword search encryption protocol with a Forward Secure encryption protocol, a Key Insulated encryption protocol or a CCA2 secure encryption protocol. The following description will focus on differences from the first embodiment and the same features as those of the first embodiment will be described only briefly.

<Configuration>

Figure 19:
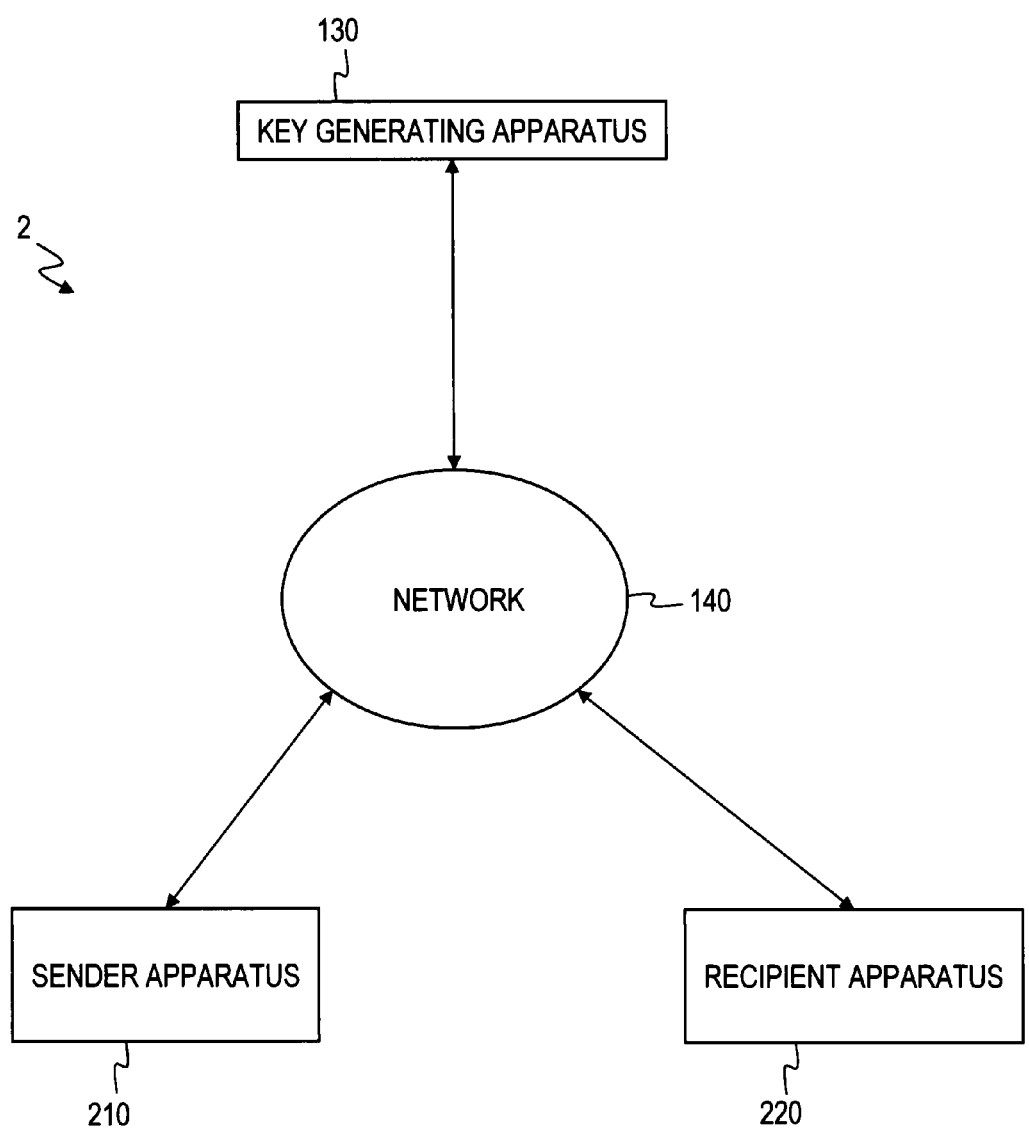
FIG. 19 is a block diagram illustrating a general configuration of a functional encryption applied system according to a second embodiment.

FIG. 19 is a block diagram illustrating a general configuration of a functional encryption applied system 2 of the second embodiment. As illustrated in FIG. 19, the functional encryption applied system 2 of this embodiment includes a sender apparatus 210 (information output apparatus), a recipient apparatus 220 (information processing apparatus), and a key generating apparatus 130, which are connected onto a network 140. While one sender apparatus 210, one recipient apparatus 220 and one key generating apparatus 130 are depicted in FIG. 19, more than one sender apparatus 210, recipient apparatus 220, and key generating apparatus 130 may exist.

[Sender Apparatus 210 (Information Output Apparatus)]

Figure 20:
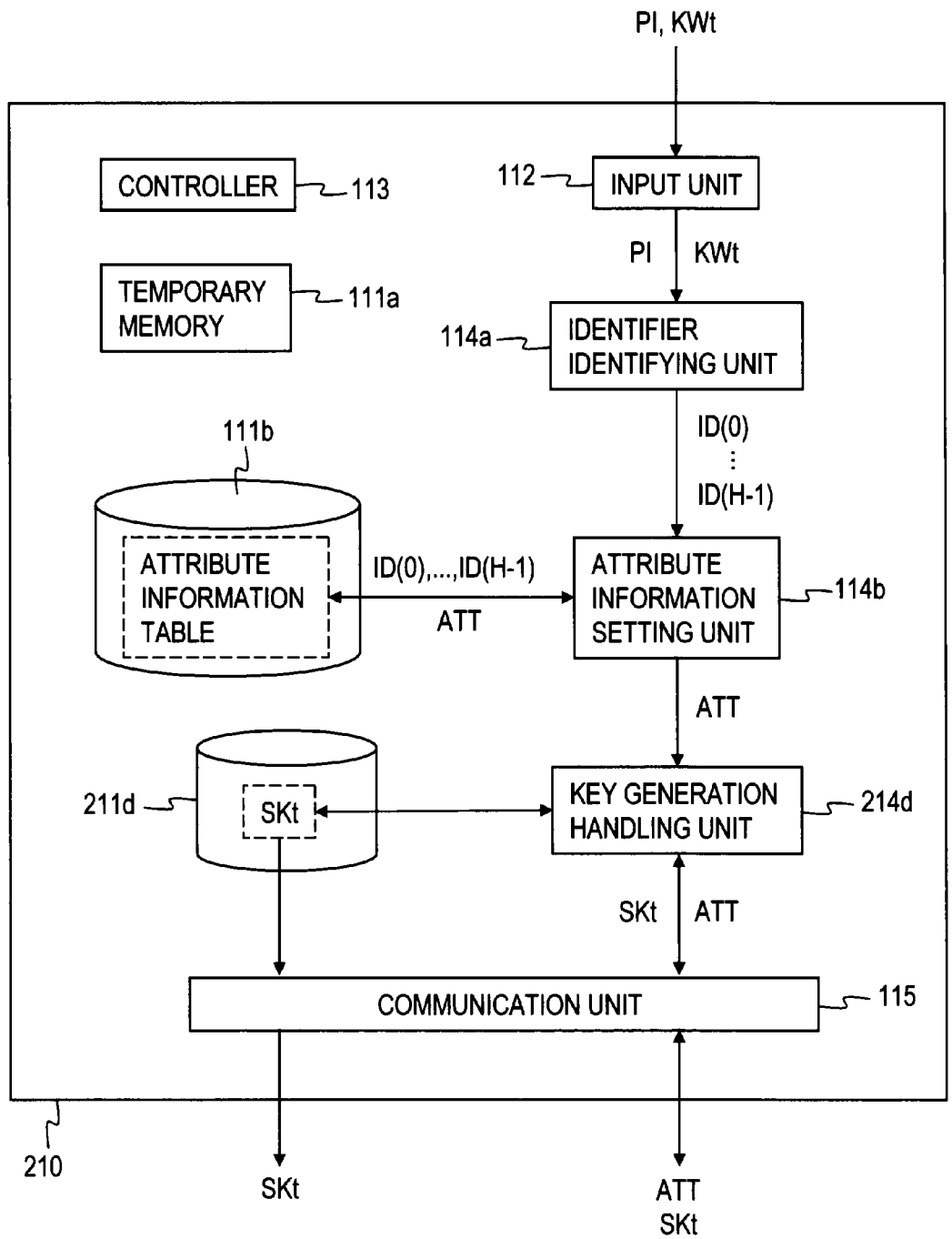
FIG. 20 is a block diagram illustrating a configuration of a sender apparatus (information output apparatus) in FIG. 19.

FIG. 20 is a block diagram illustrating a configuration of the sender apparatus 210 in FIG. 19. The same components as those of the first embodiment are given the same reference numerals and description of the components will be omitted (the same applies to the rest of the description.)

As illustrated in FIG. 20, the sender apparatus 210 of this embodiment includes a temporary memory 111a, storages 111b, 211d, an input unit 112, a controller 113, an identifier identifying unit 114a, an attribute information setting unit 114b, a key generation handling unit 214d, and a communication unit 115.

The sender apparatus 210 is a particular apparatus that is configured by loading a particular program into a well-known computer or special-purpose computer including components such as a CPU, a RAM, and a ROM, for example, and causing the computer to execute the program. For example, the key generation handling unit 214d is a processing unit or an integrated circuit configured by the CPU executing a given program, and the storage 211d is an auxiliary storage device such as a RAM, a register, a cache memory, an element in an integrated circuit, or a hard disk, or a storage area implemented by a combination of at least some of these.

[Recipient Apparatus 220 (Information Processing Apparatus)]

Figure 21:
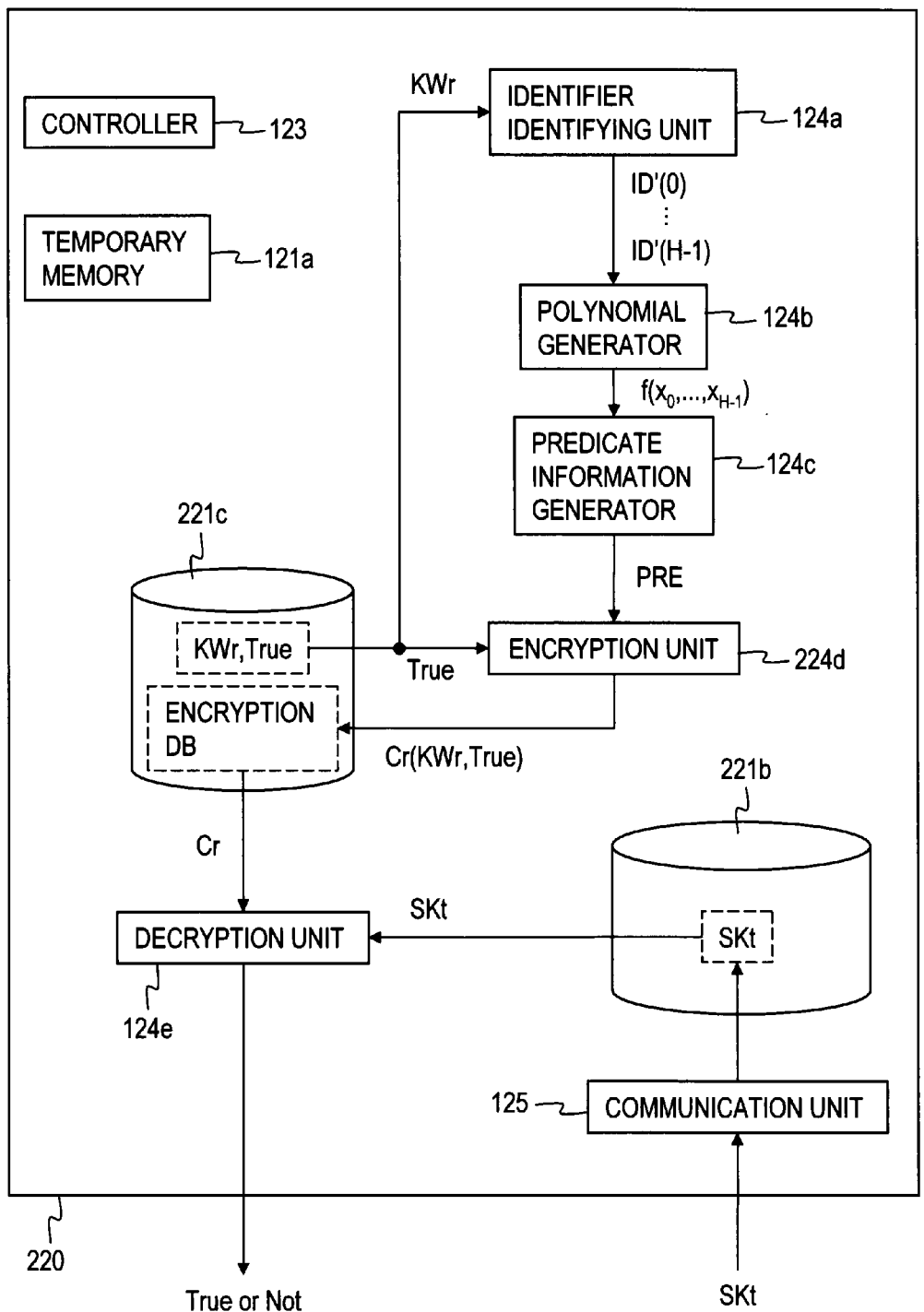
FIG. 21 is a block diagram illustrating a configuration of a recipient apparatus (information processing apparatus) in FIG. 19.

FIG. 21 is a block diagram illustrating a configuration of the recipient apparatus 220 in FIG. 19.

As illustrated in FIG. 21, the recipient apparatus 220 of this embodiment includes a temporary memory 121a, storages 221b, 221c, a controller 123, an identifier identifying unit 124a, a polynomial generator 124b, a predicate information generator 124c, an encryption unit 224d, a decryption unit 124e, and a communication unit 125.

The recipient apparatus 220 is a particular apparatus that is configured by loading a particular program into a well-known computer or special-purpose computer including components such as a CPU, a RAM, and a ROM, for example, and causing the computer to execute the program. For example, the encryption unit 224d is a processing unit or an integrated circuit that is configured by a CPU executing a given program and the storages 221b, 221c are auxiliary storage devices such as RAMs, registers, cache memories, elements in an integrated circuit, or hard disks, or storage areas implemented by a combination of at least some of these.

<Presetting>

Presetting of a functional encryption applied system 2 of this embodiment will be described below.

[Identification Information]

FIGS. 22A and 22B illustrate correspondence between identification information PI for identifying one or more protocols and the protocols in the second embodiment.

In the example in FIG. 22A, identification information PI is assigned to each protocol. That is, a Keyword search encryption protocol is assigned to identification information PI=0, a Forward Secure encryption protocol is assigned to identification information PI=1, a Key Insulated encryption protocol is assigned to identification information PI=2, and a CCA2 secure encryption protocol is assigned to identification information PI=3 in this example. In this example, when one of the protocols is solely chosen, one piece of identification information PI corresponding to that protocol is identified; when a combination of two or more protocols is chosen, a combination of pieces of identification information PI corresponding to those two or more protocols is identified.

In the example in FIG. 22B, on the other hand, some identification information PI is assigned to each individual protocol and other identification information PI is assigned to each combination of two or more protocols. In this example, when any one of the protocols is solely chosen, one piece of identification information PI corresponding to that protocol is identified; when a combination of two or more protocols is chosen, identification information PI corresponding to that combination of the two or more protocols is identified.

The identification information PI illustrated in FIG. 22 is illustrative only; identification information PI corresponding to one or more protocols may otherwise be identified.

[Identifier]

FIGS. 23A, 23B and 24 illustrate exemplary rules for identifying an identifier ID(h), each of which is established for each protocol or a combination of protocols in the second embodiment.

In the example in FIG. 23A, an identifier ID(h) is assigned to each of the selectable protocols. A value determined according to the rule established for a chosen protocol is placed in the identifier ID(h) assigned to the protocol. For example, when the Keyword search encryption protocol is chosen, a search keyword is placed in identifier ID(0). On the other hand, a constant (const.) is placed in an identifier ID(h) assigned to a protocol not chosen. When a combination of a plurality of protocols is chosen, it is considered that the plurality of protocols of the combination were chosen, and values of the identifiers ID(h) are determined accordingly. For example, when the combination of the Keyword search encryption protocol and the CCA2 secure encryption protocol is chosen, a search keyword is placed in identifier ID(0), one-time information is placed in identifier ID(3), and a constant (const.) is placed in the other identifiers ID(1) and ID(2).

In the example in FIG. 23B, only a chosen protocol is assigned an identifier ID(h). For example, when only the Keyword search encryption protocol is chosen, only identifier ID(0) that indicates a search keyword is assigned. When the combination of the Keyword search encryption protocol and the CCA2 secure encryption protocol is chosen, only identifier ID(0) indicating a search keyword and identifier ID(3) indicating one-time information are assigned.

In the example in FIG. 24, an identifier ID(h) is assigned to each of selectable protocols and each selectable combination of protocols. A value that is determined according to a rule established for a chosen protocol or each of the protocols that of a chosen combination is placed in the identifier ID(h) assigned to the protocol or the combination chosen. A constant (const.) is placed in the identifiers ID(h) assigned to the protocols and combinations not chosen. For example, when the combination of the Keyword search encryption protocol and the CCA2 secure encryption protocol is chosen, a value determined by the combipation of a search keyword and one-time information is placed in identifier ID(3) and a constant (const.) is placed in the other identifiers ID(h).

The method of determining identifiers described above is illustrative only; other method may be used to determine identifiers. For example, in a variation of the example in FIG. 24, only a chosen protocol or a chosen combination of protocols may be assigned an identifier ID(h). Furthermore, identifiers ID(h) obtained as described above may be combined (by bit combination, for example) to construct one identifier.

[Attribute Information and Predicate Information]

Attribute information and predicate information are the same as those in the first embodiment and therefore description of attribute information and predicate information will be omitted.

[Encryption Database (DB)]

FIG. 25 illustrates an example of an encryption DB of the second embodiment.

In FIG. 25, Mr1 to Mr99 are information to be searched, such as documents, KWr1 to KWr9 are keywords such as words, True is data such as "1" that means "true". C(Mr1), . . . , C(Mr99) are ciphertexts of the information to be searched Mr1 to Mr99, respectively. The encryption scheme for the ciphertexts C(Mr1), . . . C(Mr99) may be of any type such as common key encryption, public key encryption, ID-based encryption, or predicate encryption schemes. Cr(KWr1, True), . . . , Cr(KWr9, True) are ciphertexts (second information) of a predicate encryption scheme, each of which can be obtained by inputting predicate information PRE and a plaintext True into an encryption function of the predicate encryption scheme. The ciphertexts Cr(KWr1, True), . . . , Cr(KWr9, True) can be correctly decrypted by using key information corresponding to pieces of attribute information ATT corresponding to keywords KWr1 to KWr9, respectively. That is, when attribute information ATT corresponding to keyword KWr1 and predicate information PRE used for encrypting ciphertext Cr (KWr1, True) are input into a predetermined function, the function returns a predetermined function value (for example, the inner product of the attribute information ATT and the predicate information PRE will be 0).

The encryption DB is a DB in which ciphertexts C(Mr1), . . . , C(Mr99) of pieces of information to be searched (generally referred to as "Mr") are associated with ciphertexts Cr(KWr1, True), . . . , Cr(KWr9, True) corresponding to keywords corresponding to the pieces of information to be searched Mr. For example, if the keywords corresponding to information to be searched Mr1 are KWr1, KWr2, KWr3, and KWr4, ciphertext C(Mr1) of the information to be searched Mr1 is associated with ciphertexts Cr(KWr1, True), Cr(KWr2, True), Cr(KWr3, True), and Cr(KWr4, True) corresponding to the keywords KWr1, KWr2, KWr3, KWr4. With this DB, if ciphertext Cr(KWr1, True), for example, can be decrypted using key information corresponding to attribute information ATT corresponding to keyword KWr1, it can be seen that keyword KWr1 corresponds to information to be searched Mr1 without decrypting the ciphertext C(Mr1) of the information to be searched Mr1.

In this embodiment, such an encryption DB as described above is stored in the storage 221c of the recipient apparatus 220 and keywords (generally referred to as "KWr") and plaintexts True are stored in the storage 221c in this embodiment.

Ciphertexts Cr(KWr, True) corresponding to the keywords KWr in the encryption DB are updated successively as will be described later.

[Logical Formula Predetermined at Recipient Apparatus 220]

In this embodiment, a construction of a logical formula corresponding to conditions consisting of protocols and/or combinations of the protocols is predetermined at the recipient apparatus 220. However, values of identifiers ID'(h) constituting the logical formula are not identified and predicate information PRE is determined by values of the identifiers ID'(h) that are determined.

[Master Secret Information]

Master secret information MSK of the predicate encryption scheme is stored in the storage 131b of the key generating apparatus 130 of this embodiment. One example of the master secret information MSK is the above-described matrix B* of n+1 rows and n+1 columns that consists of basis vectors $b_i^*$ (i=1, n+1).

<Processes>

Figure 26A:
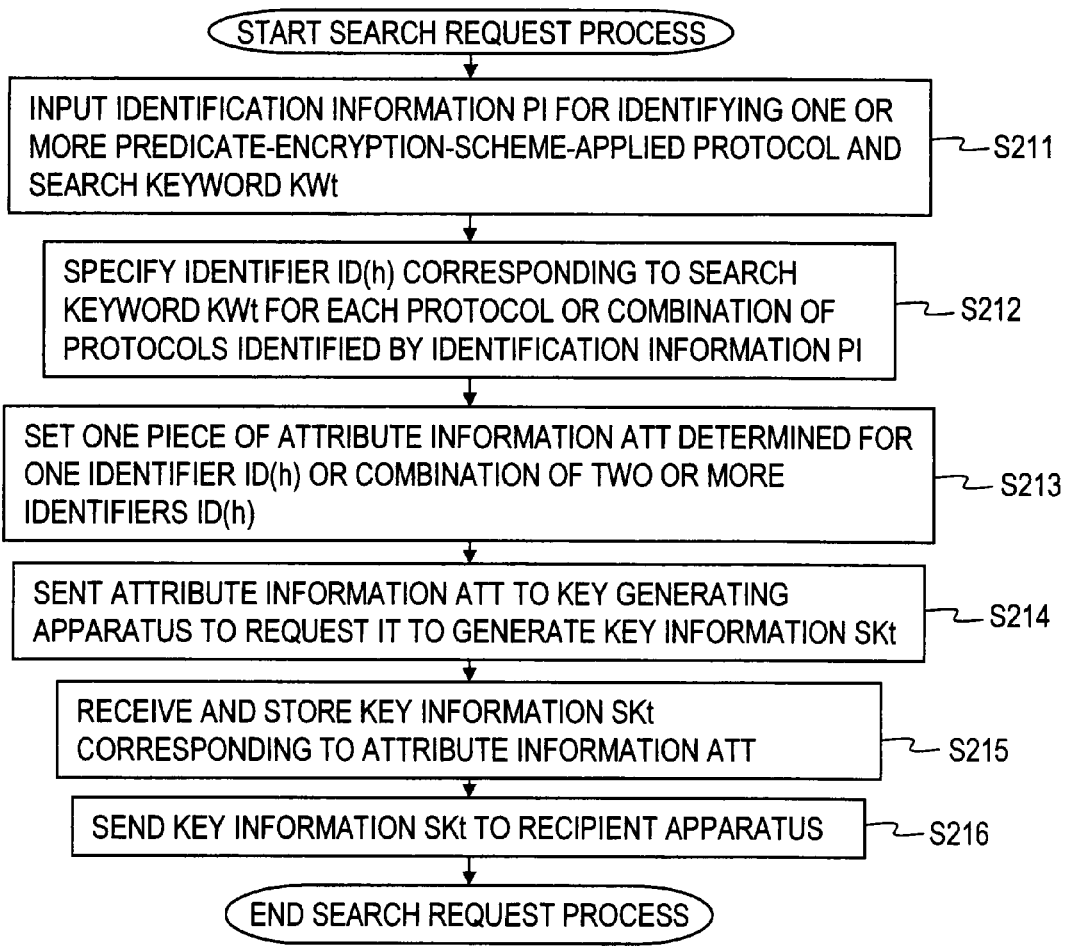
FIG. 26A is a flowchart illustrating a search request process of the second embodiment.
Figure 26B:
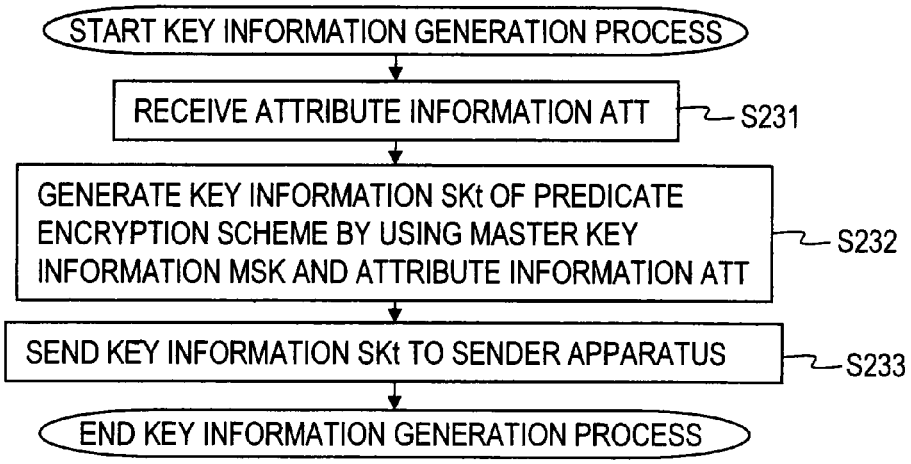
FIG. 26B is a flowchart illustrating a key information generation process of the second embodiment.
Figure 27:
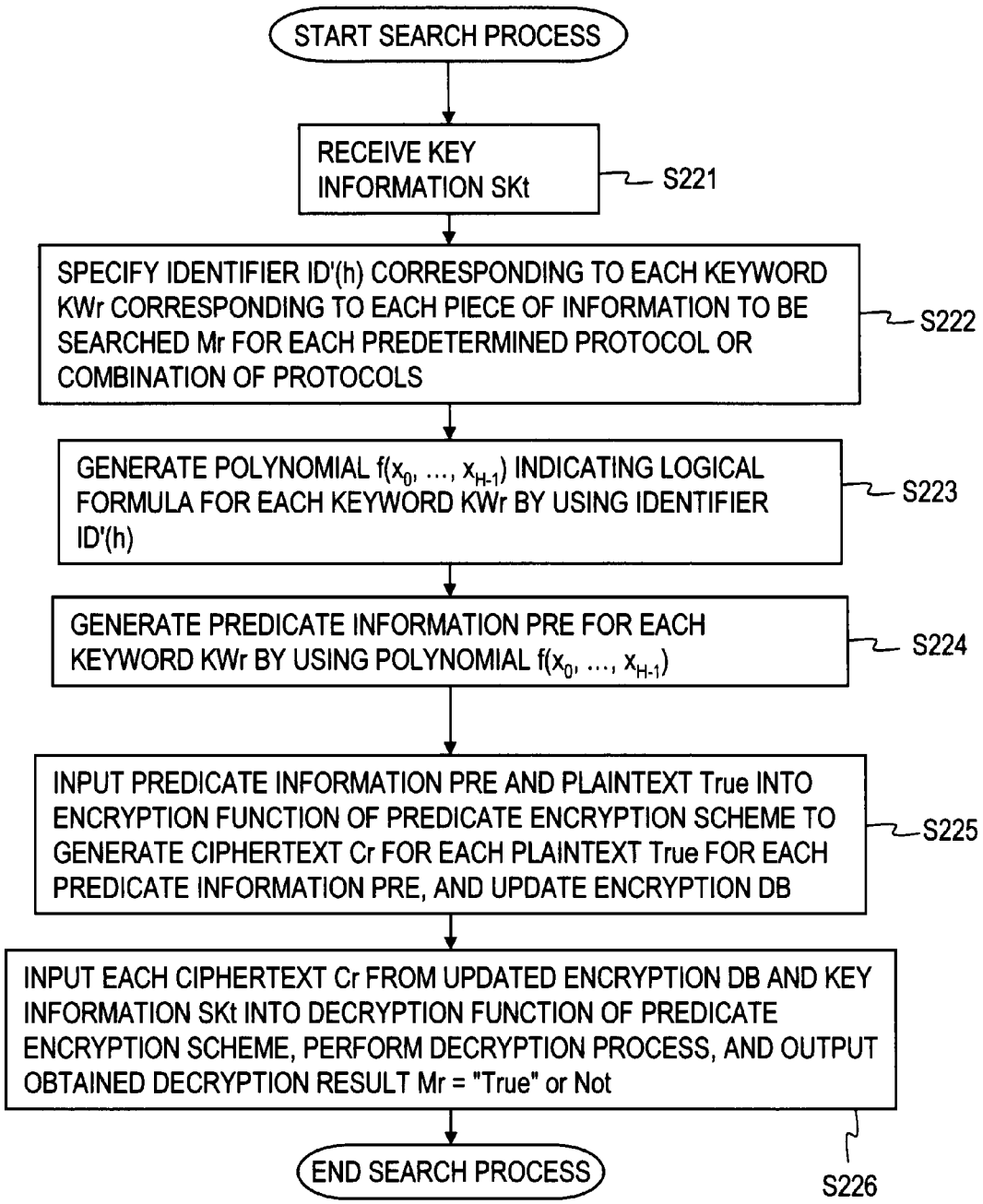
FIG. 27 is a flowchart illustrating a search process of the second embodiment.

FIG. 26A is a flowchart illustrating an search request process of the second embodiment. FIG. 26B is a flowchart illustrating a key information generation process of the second embodiment. FIG. 27 is a flowchart illustrating a search process of the second embodiment. The processes of this embodiment will be described with reference to these flowcharts.

[Search Request Process and Key Information Generation Process]

In the encryption process of this embodiment, identification information PI for identifying one or more predicate-encryption-scheme-applied protocols to be executed and a search keyword KWt are input into the input unit 112 of the sender apparatus 210 (FIG. 20) (step S211). For example, if the identification information PI is determined as illustrated in FIG. 22A, identification information PI corresponding to one protocol chosen by a user or a combination of pieces of identification information PI corresponding to two or more protocols chosen by the user is input into the input unit 112. If identification information PI is determined as illustrated in FIG. 22B, identification information PI corresponding to one protocol or two or more protocols chosen by the user is input into the input unit 112. It is assumed in the present embodiment that protocols or combinations of protocols chosen include a Keyword search encryption protocol.

The identification information PI and the search keyword KWt input into the input unit 112 are then input into the identifier identifying unit 114a. The identifier identifying unit 114a identifies an identifier ID(h) for each protocol or each combination of protocols identified by the identification information PI, according to a rule established for each protocol or the combination of the protocols (see FIGS. 23 and 24, for example), and outputs the identified one or more identifiers ID(h) (step S212).

One or more identifiers ID(h) output from the identifier identifying unit 114a are input into the attribute information setting unit 114b. The attribute information setting unit 114b uses an attribution information table (see FIGS. 8 and 9, for example) stored in the storage 111b to set one piece of attribute information ATT determined for the one identifier ID(h) or the combination of the two or more identifiers ID(h) and outputs the set attribute information ATT (step S213).

The attribute information ATT output from the attribute information setting unit 114b is input into the key generation handling unit 214d. The key generation handling unit 214d transmits the attribute information ATT to the key generating apparatus 130 through the communication unit 115 over the network 140 to request the key generating apparatus 130 to generate key information SKt corresponding to the attribute information ATT (step S214).

In the key information generation process of this embodiment, first the communication unit 135 of the key generating apparatus 130 (FIG. 4) receives the attribute information ATT (step S231). The attribute information ATT received at the communication unit 135 is input into the key generator 134. The key generator 134 reads master secret information MSK from the storage 131b, inputs the master secret information MSK and the attribute information ATT into a key generation function of the predicate encryption scheme to generate key information SKt corresponding to the attribute information ATT, and outputs the key information SKt (step S232). One example of the key generation function is the function in Formula (50). The generated key information SKt is sent to the communication unit 135. The communication unit 135 transmits the key information SKt to the sender apparatus 210 over the network 140 (step S233).

The communication unit 115 of the sender apparatus 210 (FIG. 20) receives the key information SKt and sends the key information SKt to the key generation handling unit 214d. The key generation handling unit 214d stores the key information SKt into the storage 211d (step S215). Then, the key information SKt (first information) corresponding to the search keyword KWt, read from the storage 211d, is sent to the communication unit 115, which transmits the key information SKt to the recipient apparatus 220 over the network 140 (step S216).

[Search Process]

In the search process of this embodiment, first the communication unit 125 of the recipient apparatus 220 (FIG. 21) receives key information SKt (first information) corresponding to a search keyword KWt transmitted and stores the key information SKt (first information) into the storage 221b (step S221).

This triggers the identifier identifying unit 124a to identify, for each protocol or each combination of the protocols corresponding to a logical formula predetermined at the recipient apparatus 220 as described above, one or more identifiers ID'(h) corresponding to keywords KWr corresponding to pieces of information to be searched Mr according to a rule established for each protocol or each combination of protocols (step S222). It should be noted that the rule is the same as the rule used by the identifier identifying unit 114a of the sender apparatus 210 to identify an identifier ID(h).

The one or more identifiers ID'(h) identified for each keyword KWr at the identifier identifying unit 124a is input into the polynomial generator 124b. For the each keyword KWr, the polynomial generator 124b uses the identifier ID'(h) corresponding to each keyword KWr to determine values for the identifiers ID'(h) in the logical formula predetermined at the recipient apparatus 220, generates a polynomial $f(x_0, \ldots, x_{H-1})$ corresponding to a logical formula determined by the values, and outputs the generated polynomial $f(x_0, \ldots, x_{H-1})$ (step S223).

Each polynomials $f(x_0, \ldots, x_{H-1})$ output from the polynomial generator 124b is input into the predicate information generator 124c. The predicate information generator 124c generates, for each keyword KWr, a vector $\vec{w}=(w_0, \ldots, w_{n-1})$ whose elements are coefficient components of the terms of the input polynomial $f(x_0, \ldots, x_{H-1})$ as predicate information PRE and outputs the predicate information PRE (step S224).

Each piece of predicate information PRE corresponding to each keyword KWr output from the predicate information generator 124c is input into the encryption unit 224d. The encryption unit 224d reads a plaintext True from the storage 111c, inputs each piece of predicate information PRE for each keyword KWr and the plaintext True into an encryption function of the predicate encryption scheme to generate a ciphertext Cr(KWr, True) (second information) for the plaintext True for each keyword KWr. The encryption unit 224d updates the ciphertexts corresponding to the keywords in the encryption DB with the ciphertexts Cr(KWr, True) to update the encryption DB (step S225). Examples of the encryption function of the predicate encryption scheme are Formulas (51) and (46) described above.

Then, the key information SKt (first information) corresponding to the search keyword KWt received by the communication unit 125 at step S221 and any of the ciphertexts Cr(KWr, True) (second information) in the encryption DB read from the storage 221c are input into the decryption unit 124e. The decryption unit 124e inputs the key information SKt (first information) and the ciphertext Cr(KWr, True) (second information) into a decryption function of the predicate encryption scheme, performs a decryption process, and outputs a decryption result Mr="True" or Not obtained through the decryption process (step S226). Examples of the decryption function are Formulas (47) to (49).

Here, if a predetermined function into which attribute information ATT corresponding to information SKt (first information) and predicate information PRE corresponding to a ciphertext Cr(KWr, True) (second information) are input returns a predetermined value (for example, if the inner product of the attribute information ATT and the predicate information PRE is 0), a correct decryption result can be obtained and decryption result Mr="plaintext True" (see, for example Formulas (48) and (49)). On the other hand, the predetermined function into which the attribute information ATT and the predicate information PRE are input returns a value that is not equal to a predetermined value (for example, if the inner product of the attribute information ATT and the predicate information PRE is not 0), a correct decryption result cannot be obtained. If a correct decryption result has been obtained, a ciphertext C(Mr) of information to be searched Mr associated with the ciphertext Cr(KWr, True) is extracted as a search result. Such operation at step S226 is performed for every ciphertext Cr(KWr, True) of the encryption DB.

If key information SKt (first information) corresponding to a search keyword KWt satisfies a condition set for a protocol and/or a combination of the protocols and/or a keyword that is predetermined at the recipient apparatus 220, a ciphertext C(Mr) of information to be searched Mr corresponding to the keyword KW identical to the search keyword KWt is extracted as the search result.

On the other hand, if the key information SKt (first information) corresponding to the search keyword KWt does not satisfy the condition set for a protocol and/or a combination of the protocols and/or a keyword that is predetermined at the recipient apparatus 220, correct decryption cannot be achieved and therefore a ciphertext C(Mr) of the information to be searched Mr corresponding to the keyword KW identical to the search keyword KWt is not extracted. That is, the encryption DB cannot be searched in effect.

In this way, according to this embodiment, a protocol or a combination of protocols to use and keywords can be chosen at the sender apparatus 210; and conditions for protocols or combinations of protocols and keywords corresponding to key information SKt (first information) that enables search on the encryption DB can be preset at the recipient apparatus 220. The recipient apparatus 220 in effect performs an encryption DB search only when a protocol or a combination of protocols and a keyword chosen at the sender apparatus 210 satisfies a condition set at the recipient apparatus 220.

[Variation of the Second Embodiment]

In the second embodiment, spare fields described in variations 1 and 2 of the first embodiment may be provided in attribute information ATT and predicate information PRE.

This embodiment has been described with respect to a case where a Keyword-search-encryption-based protocol is executed as an example in which the first information is key information corresponding to attribute information ATT and the second information is a ciphertext corresponding to predicate information PRE. However, the present invention is not limited to this.

[Third Embodiment]

In the third embodiment, switching can be made between the first and second embodiments. That is, a sender apparatus selects whether attribution information ATT is to be input into an encryption function of a predicate encryption scheme or into a key generation function, according to a protocol identified by identification information PI; the recipient apparatus selects whether predicate information is to be input into a key generation function of the predicate encryption scheme or into an encryption function, according to a protocol identified by identification information PI. In the following, description focuses on differences from the first embodiment and description common to the first embodiment will be omitted.

<Configuration>

Figure 28:
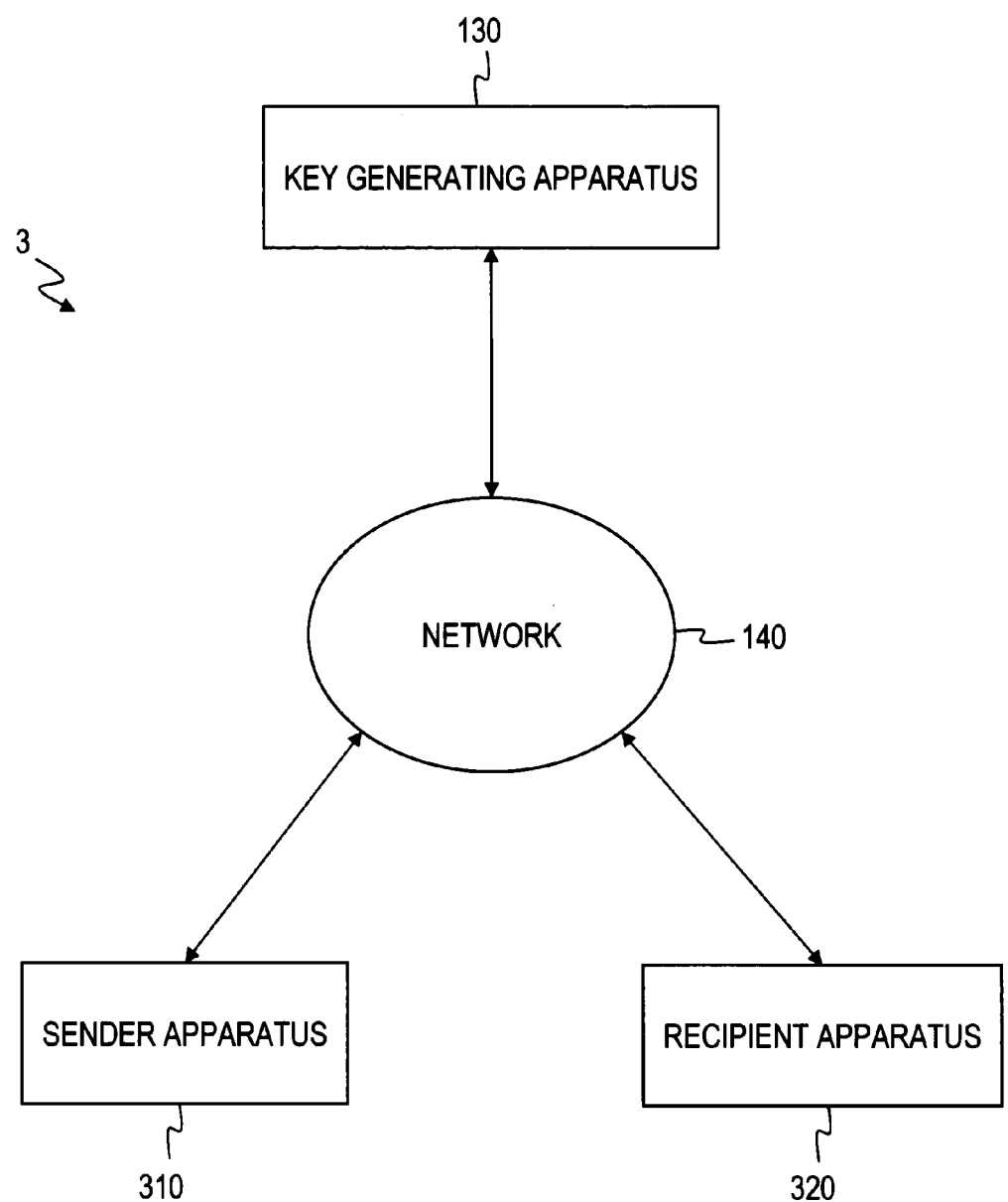
FIG. 28 is a block diagram illustrating a general configuration of a functional encryption applied system of a third embodiment.

FIG. 28 is a block diagram illustrating a general configuration of a functional encryption applied system 3 of the third embodiment. As illustrated in FIG. 28, the functional encryption applied system 3 of this embodiment includes a sender apparatus 310 (information output apparatus), a recipient apparatus 320 (information processing apparatus) and a key generating apparatus 130, which are connected onto a network 140. While one sender apparatus 310, one recipient apparatus 320, and one key generating apparatus 130 are depicted in FIG. 28 for convenience of explanation, more than one sender apparatus 310, recipient apparatus 320, and key generating apparatus 130 may exist.

[Sender Apparatus 310 (Information Output Apparatus)]

Figure 29:
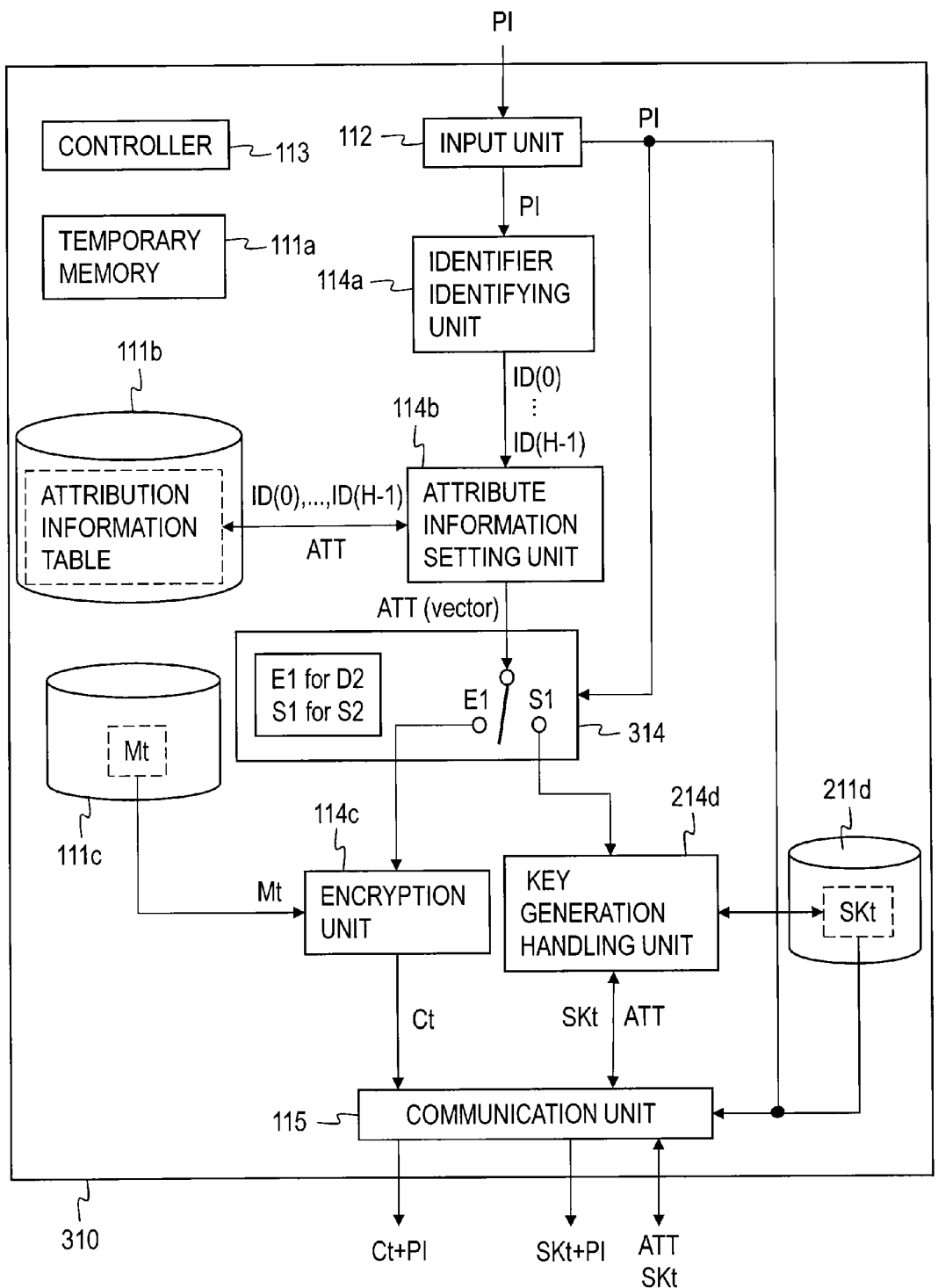
FIG. 29 is a block diagram illustrating a configuration of a sender apparatus (information output apparatus) in FIG. 28.

FIG. 29 is a block diagram illustrating a configuration of the sender apparatus 310 in FIG. 28. The same components as those of the first, second embodiments are given the same reference numerals and description of the components will be omitted (the same applies to the rest of the description.)

As illustrated in FIG. 29, the sender apparatus 310 of this embodiment includes a temporary memory 111a, storages 111b, 111c, 211d, an input unit 112, a controller 113, an identifier identifying unit 114a, an attribute information setting unit 114b, an encryption unit 114c, a key generation handling unit 214d, a switching unit 314, and a communication unit 115.

The sender apparatus 310 is a particular apparatus that is configured by loading a particular program into a well-known computer or special-purpose computer including components such as a CPU, a RAM, and a ROM, for example, and causing the computer to execute the program. For example, a switching unit 314 is a processing part or an integrated circuit configured by the CPU executing a given program.

[Recipient Apparatus 320 (Information Processing Apparatus)]

Figure 30:
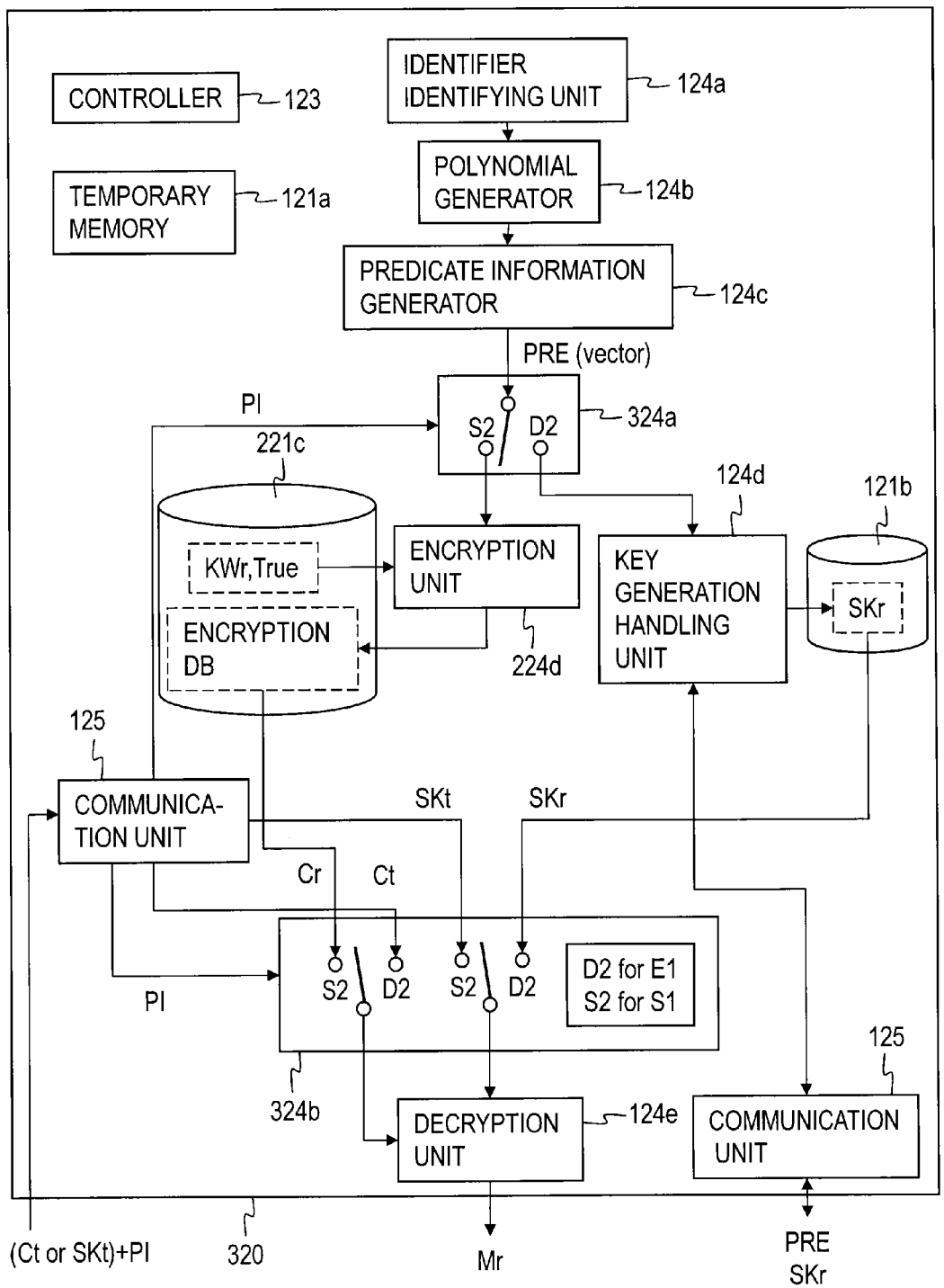
FIG. 30 is a block diagram illustrating a configuration of a recipient apparatus (information processing apparatus) in FIG. 28.

FIG. 30 is a block diagram illustrating a configuration of the recipient apparatus 320 in FIG. 28.

As illustrated in FIG. 30, the recipient apparatus 320 of this embodiment includes a temporary memory 121a, storages 121b, 221c, a controller 123, an identifier identifying unit 124a, a polynomial generator 124b, a predicate information generator 124c, a key generation handling unit 124d, an encryption unit 224d, a decryption unit 124e, switching units 324a, 324b, and a communication unit 125. While two blocks indicating the communication unit 125 are depicted in FIG. 30, this does not imply that two separate communication units 125 are required.

The recipient apparatus 320 is a particular apparatus that is configured by loading a particular program into a well-known computer or special-purpose computer including components such as a CPU, a RAM, and a ROM, for example, and causing the computer to execute the program. For example, the switching units 324a, 324b are processing units or integrated circuits that are configured by a CPU executing a given program.

<Presetting>

Presetting is the same as in the first and second embodiments and therefore description of the presetting will be omitted.

<Processes>

Figure 31A:
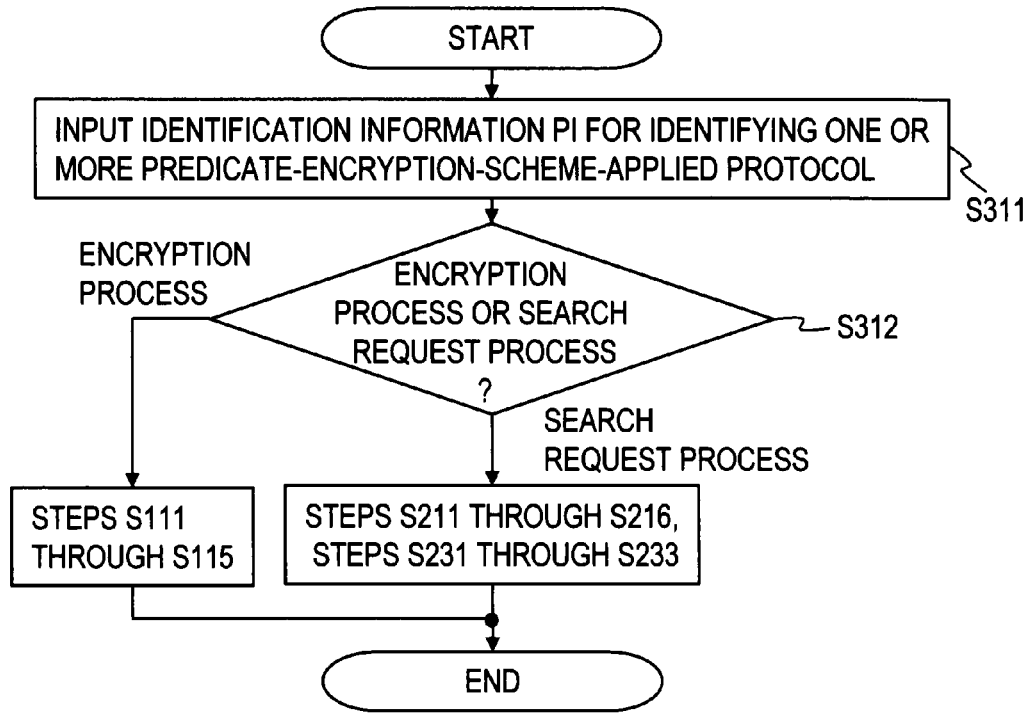
FIG. 31A is a flowchart illustrating a process performed by the sender apparatus of the third embodiment.
Figure 31B:
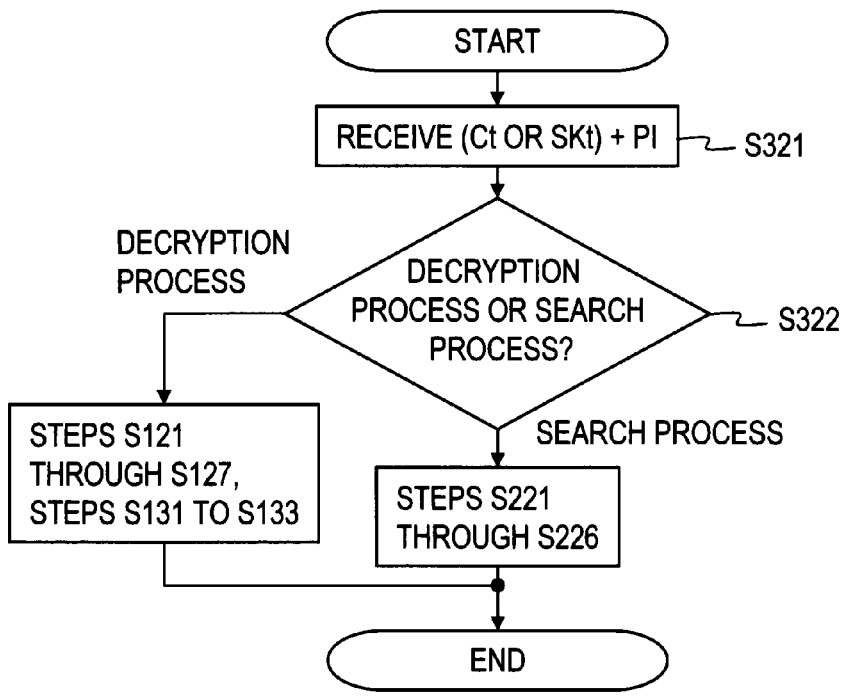
FIG. 31B is a flowchart illustrating a process performed by the recipient apparatus of the third embodiment.

FIG. 31A is a flowchart illustrating a process performed at the sender apparatus 310 of the third embodiment. FIG. 31B is a flowchart illustrating a process performed at the recipient apparatus 320 of the third embodiment. The processes of this embodiment will be described with reference to these flowcharts.

In the process at the sender apparatus 310 of this embodiment, identification information PI for identifying one or more predicate-encryption-scheme-applied protocols to be executed is input into the input unit 112 of the sender apparatus 310 (FIG. 29) (step S311).

Here, if the protocol or the combination of protocols identified by the identification information PI represents an encryption process in which attribute information ATT is input into an encryption function of a predicate encryption scheme to generate a ciphertext as in the first embodiment, the encryption process of step S111 through S115 of the first embodiment is performed under the control of the switching unit 314. However, the sender apparatus 310 of this embodiment transmits identification information PI to the recipient apparatus 320 together with the ciphertext Ct.

On the other hand, if the protocol or combination of protocols identified by the identification information PI represents a search request process and a key information generation process in which attribute information ATT is input into a key generation function of a predicate encryption scheme to generate key information as in the second embodiment, the search request process and the key information generation process of steps S211 through S216 and S231 through S233 of the second embodiment are performed under the control of the switching unit 314. However, the sender apparatus 310 of this embodiment transmits identification information PI to the recipient apparatus 320 together with the key information SKt.

In the process at the recipient apparatus 320 of this embodiment, first the communication unit 125 of the recipient apparatus 320 (FIG. 30) receives a pair of ciphertext Ct and identification information PI or a pair of key information SKt and identification information PI transmitted from the sender apparatus 310 (step S311).

Here, if the protocol or combination of protocols identified by the identification information PI represents a decryption process and a key information generation process in which predicate information PRE is input into a key generation function of a predicate encryption scheme to generate key information as in the first embodiment, the decryption process and the key generation process of steps S121 through S127 and S131 through 133 of the first embodiment are performed under the control of the switching units 324a and 324b.

On the other hand, if the protocol or combination of protocols identified by the identification information PI represents a search process in which predicate information PRE is input into an encryption function of a predicate encryption scheme to generate a ciphertext as in the second embodiment, the search process of steps S221 through S226 of the second embodiment is performed under the control of the switching units 324a and 324b.

[Other Variations of First to Third Embodiments]

The present invention is not limited to the first to third embodiments described above. For example, while the ciphertext $C_2$ given in the basic constructions 1 and 2 described above is constructed with n+1-dimensional basis vectors (Formulas (45) and (51)), the ciphertext $C_2$ may be constructed using mutually orthogonal n+2 or higher dimensional basis vectors $b_1, \ldots, b_{n+\xi}$. For examples, the ciphertext $C_2$ of the following formula (54) or (55) may be generated. Where is an integer greater than or equal to 2 and $v_{\xi+1}$ is a value such as a constant or a variable (such as a random number).

$$C_2 = v_1 \cdot (\Sigma_{\mu=1}^n v_\mu \cdot b_\mu) + v_2 \cdot b_{n+1} + \ldots v_{\xi+1} \cdot b_{n+\xi} \in G_1^{n+\xi} \quad (54)$$

$$C_2 = v_1 \cdot (\Sigma_{\mu=1}^n w_\mu \cdot b_\mu) + v_2 \cdot b_{n+1} + \ldots v_\xi \in G_1^{n+\xi} \quad (55)$$

Furthermore, instead of Formula (44), $$D^* = \alpha \cdot (\Sigma_{\mu=1}^n w_\mu \cdot b_\mu^*) + v_{n+1} \cdot b_{n+1}^* \in G_2^{n+1} \quad (56)$$

or $$D^* = \alpha \cdot (\Sigma_{\mu=1}^n w_\mu \cdot b_\mu^*) + \Sigma_{\iota=n+1}^{n+\xi} v_\iota \cdot b_\iota^* \in G_2^{n+\xi} \quad (57)$$

may be used.

Furthermore, instead of Formula (50), $$D^* = \alpha \cdot (\Sigma_{\mu=1}^n n_\mu \cdot b_\mu^*) + v_{n+1} \cdot b_{n+1}^* \in G_2^{n+1} \quad (58)$$

or $$D^* = \alpha \cdot (\Sigma_{\mu=1}^n v_\mu \cdot b_\mu^*) \Sigma_{\iota=n+1}^{n+\xi} v_\iota \cdot b_\iota^* \in G_2^{n+\xi} \quad (59)$$

may be used. Each $v_\iota$ is a value such as a constant or a variable (such as a random number). In Formulas (57) and (59), each $v_\iota$ may be selected such that $\Sigma_{\iota=n+1}^{n+\xi} v_\iota$ becomes a constant. For example, each $v_\iota$ may be randomly selected such that $v_\iota$ satisfy the following formula.

$$\Sigma_{\iota=n+1}^{n+\xi} v_\iota = 0_F \quad (60)$$

Furthermore, operations defined on the finite field $F_q$ described above may be replaced with operations defined on a finite ring $Z_q$ of order q. One example of the method of replacing operations defined on the finite field $F_q$ with operations defined on the finite ring $Z_q$ is to permit q other than primes and powers of the primes. Moreover, instead of the KEM scheme, a scheme that directly encrypts a plaintext M by inner-product predicate encryption, like the inner-product predicate encryption in Reference literature 9, may be used. Details of the construction of the inner-product predicate encryption scheme in Reference literature 9 is disclosed on pp. 24-25 of Reference literature 9 and therefore description of the scheme will be omitted. In the inner-product predicate encryption scheme of Reference literature 9, correct decryption can be achieved when the inner product of predicate information and attribute information, which are vectors of the same dimension, is 0. Any other predicate encryption schemes may also be used.

While the key generating apparatus is provided externally to the sender apparatus and the recipient apparatus in the first to third embodiments, the sender apparatus or the recipient apparatus may include the function of the key generating apparatus. Such a sender apparatus or recipient apparatus can generate key information by itself without requesting a key generating apparatus to generate key information.

In the first to third embodiments, predicate information PRE is determined at the recipient apparatus after the recipient apparatus has received a ciphertext or key information transmitted from the sender apparatus. However, depending on protocols, predicate information PRE can be determined at the recipient apparatus before the recipient apparatus receives a ciphertext or key information transmitted from the sender apparatus. In that case, the recipient apparatus may determine predicate information PRE and generate key information or a ciphertext corresponding to the predicate information PRE before the recipient apparatus receives a ciphertext or key information transmitted from the sender apparatus.

Furthermore, predicate information PRE may be used instead of attribute information ATT and attribute information ATT may be used instead of predicate information PRE. That is, predicate information PRE may be equivalent to first correspondence information and attribute information ATT may be equivalent to second correspondence information.

Furthermore, while the apparatuses exchange information over a network in the first to third embodiment, the apparatuses may exchange information through a portable recording medium such as a USB memory.

Furthermore, the processes described above can be performed not only in the chronological order presented herein but also may be performed in parallel or separately depending on the processing capacity of the apparatuses that perform the processes or as necessary. It would be understood that other modifications can be made as appropriate without departing from the spirit of the present invention.

[Definitions in the Fourth to Sixth Embodiments]

Terms and symbols used in fourth to sixth embodiments will be defined below.

Matrix: A "Matrix" represents a rectangular array of members of a set for which an operation is defined. An array of elements in a group as well as an array of elements in a ring is referred to as a "matrix".

$(\cdot)^T$: $(\cdot)^T$ represents the transposed matrix of "$\cdot$".

$(\cdot)^{-1}$: $(\cdot)^{-1}$ represents the inverse matrix of "$\cdot$".

$\wedge$ : $\wedge$ is a logical symbol representing a logical conjunction (AND).

$\vee$ : $\vee$ is a logical symbol representing a logical disjunction (OR).

$\neg$ : $\neg$ is a logical symbol representing a logical negation (NOT).

Propositional variable: A propositional variable is a variable on a set {false, true} including "false", "true" of a proposition. A propositional variable and the logical negation of a propositional variable are generally referred to as literal.

Logical formula: A logical formula refers to a formula that has formal syntax representing a proposition in mathematical logic. Specifically, "true" and "false" are logical formulas, a propositional variable is a logical formula, the logical negation of a logical formula is a logical formula, the logical conjunction of logical formulas is a logical formula, and the logical disjunction of logical formulas is a logical formula.

Z: Z represents an integer set.

sec: sec represents a security parameter (sec $\in$Z, sec>0)

0*: 0* represents a string of *0s.

1*: 1* represents a string of *1s.

$F_q$: $F_q$ represents a finite field of order q. Order q is an integer greater than or equal to 1, for example a prime or a power of prime. That is, examples of finite field $F_q$ includes a prime field and an extension field over the a prime field.

Operations on a prime finite field $F_q$ can be easily defined by remainder calculation with order q as the modulus. Operations on an extension finite field $F_q$ can be easily defined by modulo operations with an irreducible polynomial as the modulus, for example. A specific method of constructing a finite field $F_q$ is disclosed in Reference literature 1: "ISO/IEC 18033-2: Information technology-Security techniques-Encryption algorithms-Part 2: Asymmetric ciphers", for example.

$0_F$: $0_F$ represents an additive identity element (zero element) of a finite field $F_q$.

$1_F$: $1_F$ represents a multiplicative identity element of a finite field $F_q$.

$\delta(i, j)$: $\delta(i,j)$ represents a Kronecker delta function. When i=j, it satisfies $\delta(i, j)=1_F$; when i≠j, it satisfies $\delta(i, j)=0_F$.

E: E represents an elliptic curve over a finite field $F_q$. The elliptic curve E is defined as a set of points (x, y) consisting of x, y $\in F_q$ that satisfy the Weierstrass equation in affine coordinates $$y^2+a_1 \cdot x \cdot y+a_3 \cdot y=x^3+a_2 \cdot x^2+a_4 \cdot x+a_6$$

(where $a_1, a_2, a_3, a_4, a_6 \in F_q$), to which a special point O called a point of infinity is added. A binary operation "+" called an elliptic curve addition can be defined for any two points on the elliptic curve and a unary operation "−" called an elliptic curve additive inverse can be defined for any one point on the elliptic curve E. It is well known that a finite set consisting of rational points on an elliptic curve E form a group with respect to elliptic curve addition and that an operation called an elliptic curve scalar multiplication can be defined using elliptic curve addition. Specific methods for calculating elliptic operations such as the elliptic curve addition on computer are also well known (see Reference literature 1, Reference literature 2: "RFC 5091: Identity-Based Cryptography Standard (IBCS) #1: Supersingular Curve Implementations of the BF and BB1 Cryptosystems", Reference literature 3: "Ian F. Blake, Gadiel Seroussi, Nigel Paul Smart, 'Elliptic Curves in Cryptography', published by Peason Education, ISBN4-89471-431-0", for example).

A finite set consisting of rational points on an elliptic curve E has a subgroup of order p (p≥1). For example, a finite set E[p] consisting of p-division points on an elliptic curve E forms a subgroup of a finite set consisting of rational points on the elliptic curve E, where #E is the number of elements in the finite set consisting of the rational points on the elliptic curve E and p is a large prime that can divide #E. The "p-division points on the elliptic curve E are points A on the elliptic curve E which satisfy the elliptic curve scalar multiplications p·A=O.

$G_1, G_2, G_T$: $G_1, G_2, G_T$ represent cyclic groups of order q. Examples of the cyclic groups $G_1$ and $G_2$ include the finite set E[p] of p-division points on the elliptic curve E and subgroups thereof. $G_1=G_2$ may be allowed or $G_1 \neq G_2$ may be allowed. Examples of cyclic group $G_T$ include a finite set that constitutes an extension field over a finite field $F_q$. One example is a finite set consisting of the p-th roots in the algebraically closure of a finite field $F_q$. Security can be increased by making the each order of cyclic groups $G_1, G_2, G_T$ equal to the order of a finite field $F_q$.

In this embodiment, operations defined on cyclic groups $G_1, G_2$ are expressed additively while operations defined on cyclic group $G_T$ are expressed multiplicatively. That is, $\chi \cdot \Omega \in G_1$ for $\chi \in F_q$ and $\Omega \in G_1$ means that an operation defined on cyclic group $G_1$ is applied to $\Omega \in G_1$, $\chi$ times; $\Omega_1+\Omega_2 \in G_1$ for $\Omega_1$ means that an operation defined on cyclic group $G_1$ is applied to $\Omega_1 \in G_1$ and $\Omega_2 \in G_1$, for example. Similarly, $x \cdot \Omega \in G_2$ for $\chi \in F_q$ and $\Omega \in G_2$ means that an operation defined on cyclic group $G_2$ is applied to $\Omega \in G_2$, $\chi$ times; $\Omega_1 + \Omega_2 \in G_2$ for $\Omega_1, \Omega_2 \in G_2$ means that an operation defined on cyclic group $G_2$ is applied to $\Omega_1 \in G_2$ and $\Omega_2 \in G_2$. On the other hand, $\Omega^\chi \in G_T$ for $\chi \in F_q$ and $\Omega \in G_T$ means that an operation defined on cyclic group $G_T$ is applied to $\Omega \in G_T$, $\chi$ times; $\Omega_1 \cdot \Omega_2 \in G_T$ for $\Omega_1, \Omega_2 \in G_T$ means that an operation defined on cyclic group $G_T$ is applied to $\Omega_1 \in G_T$ and $\Omega_2 \in G_T$, for example.

$\Psi$: $\Psi$ represents an integer greater than or equal to 1.

$\psi$: $\psi$ represents an integer greater than or equal to 0 and less than or equal to $\Psi(\psi=0, \ldots, \Psi)$.

$\lambda$: $\lambda$ represents an integer greater than or equal to 1 and less than and equal to $\Psi(\lambda=1, \ldots, \Psi)$ $n(\psi)$: $n(\psi)$ represents an integer greater than or equal to 1.

$\zeta(\psi)$: $\zeta(\psi)$ represents an integer greater than or equal to 0.

$G_1^{n(\psi)+\zeta(\psi)}$: $G_1^{n(\psi)+\zeta(\psi)}$ represents a direct product of $n(\psi)+\zeta(\psi)$ cyclic groups $G_1$.

$G_2^{n(\psi)+\zeta(\psi)}$: $G_2^{n(\psi)+\zeta(\psi)}$ represents a direct product of $n(\psi)+\zeta(\psi)$ cyclic groups $G_2$.

$g_1, g_2, g_T$: $g_1, g_2, g_T$ represent generators of cyclic groups $G$, $G_1, G_2, G_T$.

$V(\psi)$: $V(\psi)$ represents a $n(\psi)+\zeta(\psi)$-dimensional vector space formed by the direct product of $n(\psi)+\zeta(\psi)$ cyclic groups $G_1$.

$V^*(\psi)$: $V^*(\psi)$ represents a $n(\psi)+\zeta(\psi)$-dimensional vector space formed by the direct product of $n(\psi)+\zeta(\psi)$ cyclic groups $G_2$.

$e_\psi$: $e_\psi$ represents a nondegenerate bilinear map that maps the direct product $G_1^{n(\psi)+\zeta(\psi)} \times G_2^{n(\psi)+\zeta(\psi)}$ of direct products $G_1^{n(\psi)+\zeta(\psi)}$ and $G_2^{n(\omega)+\zeta(\psi)}$ to cyclic group $G_T$. The bilinear map $e_\psi$ receives $n(\psi)+\zeta(\psi)$ elements $y_\beta (\beta=1, \ldots, n(\psi)+\zeta(\psi))$ of cyclic group $G_1$ and $n(\psi)+\zeta(\psi)$ elements $y_\beta^* (\beta=1, \ldots, n(\psi)+\zeta(\psi))$ of cyclic group $G_2$ as inputs and yields one element of cyclic group $G_T$.

$$e_\psi : G_1^{n(\psi)+\zeta(\psi)} \times G_2^{n(\psi)+\zeta(\psi)} \to G_T \quad (61)$$

The bilinear map $e_\psi$ satisfies the following properties:

[Bilinearity] For all $\Gamma_1 \in G_1^{n(\psi)+\zeta(\psi)}$, $\Gamma_2 \in G_2^{n(\psi)+\zeta(\psi)}$, and $\nu, \kappa \in F_q$, it satisfies the following relationship.

$$e_\psi(\nu \cdot \Gamma_1, \kappa \cdot \Gamma_2) = e_\psi(\Gamma_1, \Gamma_2)^{\nu \cdot \kappa} \quad (62)$$

[Nondegenerateness] It is not a map that maps all $\Gamma_1 \in G_1^{n(\psi)+\zeta(\psi)}$, $\Gamma_2 \in G_2^{n(\psi)+\zeta(\psi)}$ to an identity element of cyclic group $G_T$.

[Computability] There is an algorithm that efficiently calculates $e_\psi(\Gamma_1, \Gamma_2)$ for all $$\Gamma_1 \in G_1^{n(\psi)+\zeta(\psi)}, \Gamma_2 \in G_2^{n(\psi)+\zeta(\psi)} \quad (63)$$

In this embodiment, the nondegenerate bilinear map $$\text{Pair}: G_1 \times G_2 \to G_T \quad (64)$$

that maps the direct product $G_1 \times G_2$ of cyclic groups $G_1$ and $G_2$ to cyclic group $G_T$ is used to construct a bilinear map $e_\psi$. The bilinear map $e_\psi$ in this embodiment outputs one element of subgroup $G_T$ for inputs of an $n(\psi)+\zeta(\psi)$-dimensional vector $(\gamma_1, \ldots, \gamma_{n(\psi)+\zeta(\psi)})$ consisting of $n(\psi)+\zeta(\psi)$ elements $\gamma_\beta (\beta=1, \ldots, n(\psi)+\zeta(\psi))$ in cyclic group $G_1$ and an $n(\psi)+\zeta(\psi)$ dimensional vector $(\gamma_1^*, \ldots, \gamma_{n(\psi)+\zeta(\psi)}^*)$ consisting of $n(\psi)+\zeta(\psi)$ elements $\gamma_\beta^* (\beta=1, \ldots, n(\psi)+\zeta(\psi))$ in cyclic group $G_2$.

$$e_\psi = \Pi_{\beta=1}^{n(\psi)+\zeta(\psi)} \text{Pair}(\gamma_\beta, \gamma_\beta^*) \quad (65)$$

The bilinear map Pair receives a pair of one element of cyclic group $G_1$ and one element of cyclic group $G_2$ and yields one element of cyclic group $G_T$. The bilinear map Pair satisfies the following properties.

[Bilinearity] For all $\Omega_1 \in G_1$, $\Omega_2 \in G_2$, and $\nu, \kappa \in F_q$, it satisfies the following relationship.

$$\text{Pair}(\nu \cdot \Omega_1, \kappa \cdot \Omega_2) = e(\Omega_1, \Omega_2)^{\nu \cdot \kappa} \quad (66)$$

[Nondegenerateness] It is not a map that map all $$\Omega_1 \in G_1, \Omega_2 \in G_2 \quad (67)$$

to an identity element of cyclic group $G_T$.

[Computability] There is an algorithm that efficiently calculates $\text{Pair}(\Omega_1, \Omega_2)$ for all $\Omega_1 \in G_1, \Omega_2 \in G_2$.

Specific examples of bilinear map Pair includes functions for pairing operations such as Weil pairing and Tate pairing (see Reference literature 4: "Alfred J. Menezes, ELLIPTIC CURVE PUBLIC KEY CRYPTOSYSTEMS, KLUWER ACADEMIC PUBLISHERS, ISBN 0-7923-9368-6, pp. 61-81", for example). Depending on the type of elliptic curve E, the linear map Pair may be a modified pairing function $e(\Omega_1, \text{phi}(\Omega_2))$ ($\Omega_1 \in G_1, \Omega_2 \in G_2$), which is a combination of a function for performing a pairing operation such as Tate pairing and a given function phi (see Reference literature 2, for example). Examples of algorithms for performing pairing operations on computer include well-known Miller's algorithm (Reference literature 5: "V. S. Miller, 'Short Programs for functions on Curves,' 1986, Internet <http://crypto.stanford.edu/miller/miller.pd"). Methods for constructing elliptic curves and cyclic groups for efficient pairing operations are also well known (see Reference literature 2, Reference literature 6: "A. Miyaji, M. Nakabayashi, S. Takano, 'New explicit conditions of elliptic curve Traces for FR-Reduction,' IEICE Trans. Fundamentals, vol. E84-A, no05, pp. 1234-1243, May 2001", Reference literature 7: "P. S. L. M. Barreto, B. Lynn, M. Scott, 'Constructing elliptic curves with prescribed embedding degrees,'Proc. SCN '2002, LNCS 2576, pp. 257-267, Springer-Verlag. 2003", and Reference literature 8: "R. Dupont, A. Enge, F. Morain, 'Building curves with arbitrary small MOV degree over finite prime fields,' http://eprint.iacr.org/2002/094/", for example).

$a_i(\psi)(i=1, \ldots, n(\psi)+\zeta(\psi))$: $a_i(\psi)$ represent $\zeta(\psi)$+dimensional basis vectors each of which consists of $n(\psi)+\zeta(\psi)$ elements of cyclic group $G_1$. For example, each of the basis vectors $a_i(\psi)$ is an $n(\psi)+\zeta(\psi)$-dimensional basis vector whose i-th element is $\kappa_1 \cdot g_1 \in G_1$ and the other $n(\psi)+\zeta(\psi)-1$ elements are identity elements (additively represented as "0") of cyclic group $G_1$. Here, the elements of the $n(\psi)+\zeta(\psi)$-dimensional basis vectors $a_i(\psi)$ ($i=1, \ldots, n(\psi)+\zeta(\psi)$) can be listed as follows.

$$a_1(\psi) = (\kappa_1 \cdot g_1, 0, 0, \ldots, 0) \quad (68)$$
$$a_2(\psi) = (0, \kappa_1 \cdot g_1, 0, \ldots, 0)$$
$$\ldots$$
$$a_{n(\psi)+\zeta(\psi)}(\psi) = (0, 0, 0, \ldots, \kappa_1 \cdot g_1)$$

Here, $\kappa_1$ is a constant that is an element of a finite element $F_q$ other than an additive identity element $0_F$. A specific example of $\kappa_1 \in F_q$ is $\kappa_1 = 1_F$. The basis vectors $a_i(\psi)$ are orthogonal bases. Each $n(\psi)+\zeta(\psi)$-dimensional vector whose elements are $n(\psi)+\zeta(\psi)$ elements of cyclic group $G_1$ can be represented by the linear sum of $n(\psi)+\zeta(\psi)$-dimensional basis vectors $a_i(\psi)$ ($i=1, \ldots, n(\psi)+\zeta(\psi)$). That is, the $n(\psi)+\zeta(\psi)$-dimensional basis vectors $a_i(\psi)$ span the vector space $V(\psi)$ described above.

$a_i^*(\psi)(i=1, \ldots, n(\psi)+\zeta(\psi))$: $a_i^*(\psi)$ represent $n(\psi)+\zeta(\psi)$-dimensional basis vectors each of which consists of $n(\psi)+\zeta(\psi)$ elements of cyclic group $G_2$. For example, each of the basis vectors $a_i^*(\psi)$ is an $n(\psi)+\zeta(\psi)$-dimensional basis vector whose i-th element is $\kappa_2 \cdot g_2 \in G_2$ and the other $n(\psi)+\zeta(\psi)-1$ elements are identity elements (additively represented as "0") of cyclic group $G_2$. Here, the elements of the basis vectors $a_i^*(\psi)(i=1, \ldots, n(\psi)+\zeta(\psi)$ can be listed as follows.

$$a_1^*(\psi) = (\kappa_2 \cdot g_2, 0, 0, \ldots, 0) \tag{69}$$

$$a_2^*(\psi) = (0, \kappa_2 \cdot g_2, 0, \ldots, 0)$$

$$\ldots$$

$$a_{n(\psi)+\zeta(\psi)}^*(\psi) = (0, 0, 0, \ldots, \kappa_2 \cdot g_2)$$

Here, $\kappa_2$ is a constant that is an element of a finite element $F_q$ other than an additive identity element $0_F$. An example of $\kappa_2 \in F_q$ is $\kappa_2 = 1_F$. The basis vectors $a_i^*(\psi)$ are orthogonal bases. Each $n(\psi)+\zeta(\psi)$-dimensional vector whose elements are $n(\psi)+\zeta(\psi)$ elements of cyclic group $G_2$ can be represented by the linear sum of $n(\psi)+\zeta(\psi)$-dimensional basis vectors $a_i^*(\psi)$ ($i=1, \ldots, n(\psi)+\zeta(\psi)$). That is, the $n(\psi)+\zeta(\psi)$-dimensional basis vectors $a_i^*(\psi)$ span the vector space $V^*(\psi)$ described above.

The basis vectors $a_i(\psi)$ and $a_i^*(\psi)$ satisfy $$e_\psi(a_i(\psi), a_j^*(\psi)) = g_T^{\tau \cdot \delta(i,j)} \tag{70}$$

for an element $\tau = \kappa_1 \cdot \kappa_2$ of a finite field $F_q$ other than $0_F$. That is, from relationship in Formulas (65) and (66), when i=j, the basis vectors satisfy the following formula:

$$e_\psi(a_i(\psi), a_j^*(\psi)) = \mathrm{Pair}(\kappa_1 \cdot g_1, \kappa_2 \cdot g_2) \cdot \mathrm{Pair}(0,0) \cdot \ldots \cdot \mathrm{Pair}(0,0)$$

$$= \mathrm{Pair}(g_1, g_2)^{\kappa 1 \cdot \kappa 2} \cdot \mathrm{Pair}(g_1, g_2)^{0 \cdot 0} \cdot \ldots \cdot$$

$$\mathrm{Pair}(g_1, g_2)^{0 \cdot 0}$$

$$= \mathrm{Pair}(g_1, g_2)^{\kappa 1 \cdot \kappa 2}$$

$$= g_T^\tau$$

where the superscripts, $\kappa 1$, $\kappa 2$, represent $\kappa_1$ and $\kappa_2$, respectively. On the other hand, when $i \neq j$, the right-hand side of $e_\psi(a_i(\psi), a_j^*(\psi)) = \Pi_{i=1}^{n(\psi)+\zeta(\psi)} \mathrm{Pair}(a_i(\psi), a_i^*(\psi))$ does not include $\mathrm{Pair}(\kappa_1 \cdot g_1, \kappa_2 \cdot g_2)$ but is the product of $\mathrm{Pair}(\kappa_1 \cdot g_1, 0)$, $\mathrm{Pair}(0, \kappa_2 \cdot g_2)$ and/or $\mathrm{Pair}(0, 0)$. Furthermore, from relationship in Formula (66), $\mathrm{Pair}(g_1, 0) = \mathrm{Pair}(0, g_2) = \mathrm{Pair}(g_1, g_2)^0$ is satisfied. Therefore, when $i \neq j$, $e_\psi(a_i(\psi), a_i^*(\psi))$ satisfies the following formula.

$$e_\psi(a_i(\psi), a_i^*(\psi)) = e_\psi(g_1, g_2)^0 = g_T^0$$

Especially when $\tau = \kappa_1 \cdot \kappa_2 = 1_F$ (for example when $\kappa_1 = \kappa_2 = 1_F$), the following formula is satisfied.

$$e(a_i(\psi), a_j^*(\psi)) = g_T^{\delta(i,j)} \tag{71}$$

Here, $g_T^0 = 1$ is an identity element of cyclic group $G_T$ and $g_T^1 = g_T$ is the generator of cyclic group $G_T$. In this case, the basis vectors $a_i(\psi)$ and $a_i^*(\psi)$ are dual normal orthogonal bases, and the vector spaces $V(\psi)$ and $V^*(\psi)$ are dual pairing vector spaces (DPVS) in which a bilinear mapping is defined.

$A(\psi)$: $A(\psi)$ represents a matrix of $n(\psi)+\zeta(w)$ rows and $n(\psi)+\zeta(\psi)$ columns whose elements are basis vectors $a_i(\psi)$ ($i=1, \ldots, n(\psi)+\zeta(\psi)$). For example, when the basis vectors $a_i(\psi)$ ($i=1, \ldots, n(\psi)+\zeta(\psi)$) are expressed by Formula (68), matrix $A(\psi)$ is as follows.

$$A(\psi) = \begin{pmatrix} a_1(\psi) \\ a_2(\psi) \\ \vdots \\ a_{n(\psi)+\zeta(\psi)}(\psi) \end{pmatrix} = \begin{pmatrix} \kappa_1 \cdot g_1 & 0 & \ldots & 0 \\ 0 & \kappa_1 \cdot g_1 & & \vdots \\ \vdots & & \ddots & 0 \\ 0 & \ldots & 0 & \kappa_1 \cdot g_1 \end{pmatrix} \tag{72}$$

$A^*(\psi)$: $A^*(\psi)$ represents a matrix of $n(\psi)+\zeta(\psi)$ rows and $n(\psi)+\zeta(\psi)$ columns whose elements are basis vectors $a_i^*(\psi)$ ($i=1, \ldots, n(\psi)+\zeta(\psi)$). For example, when the basis vectors $a_i^*(\psi)$ ($i=1, \ldots, n(\psi)+\zeta(\psi)$) are expressed by Formula (69), matrix $A^*(\psi)$ is as follows.

$$A^*(\psi) = \begin{pmatrix} a_1^*(\psi) \\ a_2^*(\psi) \\ \vdots \\ a_{n(\psi)+\zeta(\psi)}^*(\psi) \end{pmatrix} = \begin{pmatrix} \kappa_2 \cdot g_2 & 0 & \ldots & 0 \\ 0 & \kappa_2 \cdot g_2 & & \vdots \\ \vdots & & \ddots & 0 \\ 0 & \ldots & 0 & \kappa_2 \cdot g_2 \end{pmatrix} \tag{73}$$

$X(\psi)$: $X(\psi)$ represents a matrix of $n(\psi)+\zeta(\psi)$ rows and $n(\psi)+\zeta(\psi)$ columns whose elements are the elements of a finite field $F_q$. The matrix $X(\psi)$ is used for coordinate transformation of $a_i(\psi)$. Let the entries of i rows and j columns ($i=1, \ldots, n(\psi)+\zeta(\psi), j=1, \ldots, n(\psi)+\zeta(\psi)$) of matrix $X(\psi)$ be $\chi_{i,j}(\psi) \in F_q$, then matrix $X(\psi)$ is as follows.

$$X(\psi) = \begin{pmatrix} \chi_{1,1}(\psi) & \chi_{1,2}(\psi) & \ldots & \chi_{1,n(\psi)+\zeta(\psi)}(\psi) \\ \chi_{2,1}(\psi) & \chi_{2,2}(\psi) & & \vdots \\ \vdots & & \ddots & \vdots \\ \chi_{n(\psi)+\zeta(\psi),1}(\psi) & \chi_{n(\psi)+\zeta(\psi),2}(\psi) & \ldots & \chi_{n(\psi)+\zeta(\psi),n(\psi)+\zeta(\psi)}(\psi) \end{pmatrix} \tag{74}$$

Each entry $\chi_{i,j}(\psi)$ of matrix $X(\psi)$ is referred to as a transformation coefficient.

$X^*(\psi)$: $X^*(\psi)$ and matrix $X(\psi)$ satisfy the relationship $X^*(\psi) = \tau' \cdot (X(\psi)^{-1})^T$. Here, $\tau' \in F_q$ is an arbitrary constant that belongs to a finite field $F_q$ and, $\tau' = 1_F$, for example. $X^*(\psi)$ is used for coordinate transformation of a basis vector $a_i^*(\psi)$. Let the entries of i rows and j columns of matrix $X^*(\psi)$ be $\chi_{i,j}^* \in F_q$, then matrix $X^*(\psi)$ is as follows.

$$X^*(\psi) = \begin{pmatrix} \chi_{1,1}^*(\psi) & \chi_{1,2}^*(\psi) & \ldots & \chi_{1,n(\psi)+\zeta(\psi)}^*(\psi) \\ \chi_{2,1}^*(\psi) & \chi_{2,2}^*(\psi) & & \vdots \\ \vdots & & \ddots & \vdots \\ \chi_{n(\psi)+\zeta(\psi),1}^*(\psi) & \chi_{n(\psi)+\zeta(\psi),2}^* & \ldots & \chi_{n(\psi)+\zeta(\psi),n(\psi)+\zeta(\psi)}^* \end{pmatrix} \tag{75}$$

Each entry $\chi_{i,j}^*(\psi)$ of matrix $X^*(\psi)$ is referred to as a transformation coefficient.

In this case, matrix $X^*(\psi)$ and matrix $X(\psi)$ satisfy $X(\psi) \cdot (X^*(\psi))^T = \tau' \cdot I(\psi)$, where each $I(\psi)$ is an unit matrix of $n(\psi)+\zeta(\psi)$ rows and $n(\psi)+\zeta(\psi)$ columns.

That is, for the unit matrix $$I(\psi) = \begin{pmatrix} 1_F & 0_F & \ldots & 0_F \\ 0_F & 1_F & & \vdots \\ \vdots & & \ddots & 0_F \\ 0_F & 0_F & \ldots & 1_F \end{pmatrix} \tag{76}$$

Matrix $X^*(\psi)$ and matrix $X(\psi)$ satisfy $$\begin{pmatrix} \chi_{1,1}(\psi) & \chi_{1,2}(\psi) & \ldots & \chi_{1,n(\psi)+\zeta(\psi)}(\psi) \\ \chi_{2,1}(\psi) & \chi_{2,2}(\psi) & & \vdots \\ \vdots & & \ddots & \vdots \\ \chi_{n(\psi)+\zeta(\psi),1}(\psi) & \chi_{n(\psi)+\zeta(\psi),2}(\psi) & \ldots & \chi_{n(\psi)+\zeta(\psi),n(\psi)+\zeta(\psi)}(\psi) \end{pmatrix} \times \tag{77}$$

-continued $$\begin{pmatrix} \chi^*_{1,1}(\psi) & \chi^*_{2,1}(\psi) & \cdots & \chi^*_{n(\psi)+\zeta(\psi),1}(\psi) \\ \chi^*_{1,2}(\psi) & \chi^*_{2,2}(\psi) & & \vdots \\ \vdots & & \ddots & \vdots \\ \chi^*_{1,n(\psi)+\zeta(\psi)}(\psi) & \chi^*_{2,n(\psi)+\zeta(\psi)}(\psi) & \cdots & \chi^*_{n(\psi)+\zeta(\psi),n(\psi)+\zeta(\psi)}(\psi) \end{pmatrix} =$$

$$\tau' \cdot \begin{pmatrix} 1_F & 0_F & \cdots & 0_F \\ 0_F & 1_F & & \vdots \\ \vdots & & \ddots & 0_F \\ 0_F & 0_F & \cdots & 1_F \end{pmatrix}$$

Here, $n(\psi)+\zeta(\psi)$-dimensional vectors will be defined below.

$$\vec{\chi_i}(\psi)=(\chi_{i,1}(\psi),\ldots,\chi_{i,n(\psi)+\zeta(\psi)}(\psi)) \quad (78)$$

$$\vec{\chi_j}^*(\psi)=(\chi_{j,1}^*(\psi),\ldots,\chi_{j,n(\psi)+\zeta(\psi)}^*(\psi)) \quad (79)$$

From relationship in Formula (77), the inner product of $n(\psi)+\zeta(\psi)$-dimensional vectors $\vec{\chi_i}(\psi)$ and $\vec{\chi_j}(\psi)^*$ satisfies the following formula.

$$\vec{\chi_i}(\psi)\cdot\vec{\chi_j}^*(\psi)=\tau'\cdot\delta(i,j) \quad (80)$$

$b_i(\psi)$: $b_i(\psi)$ represent $n(\psi)+\zeta(\psi)$-dimensional basis vectors each of which consists of $n(\psi)+\zeta(\psi)$ elements of cyclic group $G_1$. Here, $b_i(\psi)$ is obtained by coordinate transformation of basis vector $a_i(\psi)$ ($i=1,\ldots,n(\psi)+\zeta(\psi)$) by using matrix $X(\psi)$. That is, the basis vectors $b_i(\psi)$ are obtained by the following calculation.

$$b_i(\psi)=\sum_{j=1}^{n(\psi)+\zeta(\psi)}\chi_{ij}(\psi)\cdot a_j(\psi) \quad (81)$$

For example, if basis vectors $a_j(\psi)$ ($j=1,\ldots,n(\psi)+\zeta(\psi)$) are expressed by Formula (68), each element of the basis vectors $b_i(\psi)$ is shown below.

$$b_i(\psi)=(\chi_{i,1}(\psi)\cdot\kappa_1\cdot g_1,\chi_{i,2}(\psi)\cdot\kappa_1\cdot g_1,\ldots,\chi_{i,n(\psi)+\zeta(\psi)}(\psi)\cdot\kappa_1\cdot g_1) \quad (82)$$

Each $n(\psi)+\zeta(\psi)$-dimensional vector whose elements are $n(\psi)+\zeta(\psi)$ elements of cyclic group $G_1$ can be represented by the linear sum of $n(\psi)+\zeta(\psi)$-dimensional basis vectors $b_i(\psi)$ ($i=1,\ldots,n(\psi)+\zeta(\psi)$). That is, $n(\psi)+\zeta(\psi)$-dimensional basis vectors $b_i(\psi)$ span the vector space $V(\psi)$ described above.

$b_i^*(\psi)$: $b_i^*(\psi)$ represent $n(\psi)+\zeta(\psi)$-dimensional basis vectors each of which consists of $n(\psi)+\zeta(\psi)$ elements of cyclic group $G_2$. The basis vectors $b_i^*(\psi)$ are obtained by coordinate transformation of basis vectors $a_i^*(\psi)$ ($i=1,\ldots,n(\psi)+\zeta(\psi)$) by using matrix $X^*(\psi)$. That is, the basis vectors $b_i^*(\psi)$ are obtained by the following calculation.

$$b_i^*(\psi)=\sum_{j=1}^{n(\psi)+\zeta(\psi)}\chi_{ij}^*(\psi)\cdot a_j^*(\psi) \quad (83)$$

For example, when basis vectors $a_j^*(\psi)$ ($j=1,\ldots,n(\psi)+\zeta(\psi)$) are expressed by Formula (69), each element of basis vectors $b_i^*(\psi)$ is shown below.

$$b_i^*(\psi)=(\chi_{i,1}^*(\psi)\cdot\kappa_2\cdot g_2,\chi_{i,2}^*(\psi)\cdot\kappa_2\cdot g_2,\ldots,\chi_{i,n(\psi)+\zeta(\psi)}^*(\psi)\cdot\kappa_2\cdot g_2) \quad (84)$$

Each $n(\psi)+\zeta(\psi)$-dimensional vector whose elements are $n(\psi)+\zeta(\psi)$ elements of cyclic group $G_2$ is represented by the linear sum of $n(\psi)+\zeta(\psi)$-dimensional basis vectors $b_i^*(\psi)$ ($i=1,\ldots,n(\psi)+\zeta(\psi)$). That is, $n(\psi)+\zeta(\psi)$-dimensional basis vectors $b_i^*(\psi)$ span the vector space $V^*(\psi)$ described above.

Basis vectors $b_i(\psi)$ and $b_i^*(\psi)$ satisfy the following formula for the element $\tau=\kappa_1\cdot\kappa_2$ of the finite field $F_q$ other than $0_F$.

$$e_\psi(b_i(\psi),b_j^*(\psi))=g_T^{\tau\cdot\tau'\cdot\delta(i,j)} \quad (85)$$

That is, from relationship in Formulas (65), (80), (82) and (84), the basis vectors $b_i(\psi)$ and $b_i^*(\psi)$ satisfy the following formula.

$$e_\psi(b_i(\psi),b_j^*(\psi)) = \prod_{\beta=1}^{n(\psi)+\zeta(\psi)} \text{Pair}(\chi_{i,\beta}(\psi)\cdot\kappa_1\cdot g_1, \chi_{j,\beta}^*(\psi)\cdot\kappa_2\cdot g_2)$$

$$= \text{Pair}(g_1,g_2)^{\kappa_1\cdot\kappa_2\cdot\vec{\chi_i}(\psi)\cdot\vec{\chi_j}^*(\psi)}$$

$$= \text{Pair}(g_1,g_2)^{\tau\cdot\tau'\cdot\delta(i,j)}$$

$$= g_T^{\tau\cdot\tau'\cdot\delta(i,j)}$$

Especially when $\tau=\kappa_1\cdot\kappa_2=1_F$ (for example when $\kappa_1=\kappa_2=1_F$) and $\tau'=1_F$, the basis vectors satisfy the following formula.

$$e_\psi(b_i(\psi),b_j^*(\psi))=g_T^{\delta(i,j)} \quad (86)$$

In this case, the basis vectors $b_i(\psi)$ and $b_i^*(\psi)$ are the dual normal orthogonal basis of dual pairing vector spaces (vector spaces $V(\psi)$ and $V^*(\psi)$).

It should be noted that basis vectors $a_i(\psi)$ and $a_i^*(\psi)$ other than those shown in Formulas (68) and (69) and basis vectors $b_i(\psi)$ and $b_i^*(\psi)$ other than those shown in Formulas (81) and (83) may be used, provided that they satisfy the relationship in Formula (85).

$B(\psi)$: $B(\psi)$ represents a matrix of $n(\psi)+\zeta(\psi)$ rows and $n(\psi)+\zeta(\psi)$ columns whose elements are basis vectors $b_i(\psi)$ ($i=1,\ldots,n(\psi)+\zeta(\psi)$). $B(\psi)$ satisfies $B(\psi)=X(\psi)\cdot A(\psi)$. For example, when the basis vectors $b_i(\psi)$ are expressed by Formula (82), matrix $B(\psi)$ is as follows.

$$B(\psi) = \begin{pmatrix} b_1(\psi) \\ b_2(\psi) \\ \vdots \\ b_{n(\psi)+\zeta(\psi)}(\psi) \end{pmatrix} = \quad (87)$$

$$\begin{pmatrix} \chi_{1,1}(\psi)\cdot\kappa_1\cdot g_1 & \cdots & \chi_{1,n(\psi)+\zeta(\psi)}(\psi)\cdot\kappa_1\cdot g_1 \\ \vdots & \ddots & \vdots \\ \chi_{n(\psi)+\zeta(\psi),1}(\psi)\cdot\kappa_1\cdot g_1 & \cdots & \chi_{n(\psi)+\zeta(\psi),n(\psi)+\zeta(\psi)}(\psi)\cdot\kappa_1\cdot g_1 \end{pmatrix}$$

$B^*(\psi)$: $B^*(\psi)$ represents a matrix of $n(\psi)+\zeta(\psi)$ rows and $n(\psi)+\zeta(\psi)$ columns whose elements are basis vectors $b_i^*(\psi)$ ($i=1,\ldots,n(\psi)+\zeta(\psi)$). $B^*(\psi)$ satisfies $B^*(\psi)=X^*(\psi)\cdot A^*(\psi)$. For example, when the basis vectors $b_i^*(\psi)$ ($i=1,\ldots,n(\psi)+\zeta(\psi)$) are expressed by Formula (84), matrix $B^*(\psi)$ is as follows.

$$B^*(\psi) = \begin{pmatrix} b_1^*(\psi) \\ b_2^*(\psi) \\ \vdots \\ b_{n(\psi)+\zeta(\psi)}^*(\psi) \end{pmatrix} = \quad (88)$$

$$\begin{pmatrix} \chi_{1,1}^*(\psi)\cdot\kappa_2\cdot g_2 & \cdots & \chi_{1,n(\psi)+\zeta(\psi)}^*(\psi)\cdot\kappa_2\cdot g_2 \\ \vdots & \ddots & \vdots \\ \chi_{n(\psi)+\zeta(\psi),1}^*(\psi)\cdot\kappa_2\cdot g_2 & \cdots & \chi_{n(\psi)+\zeta(\psi),n(\psi)+\zeta(\psi)}^*(\psi)\cdot\kappa_2\cdot g_2 \end{pmatrix}$$

$\vec{v(\lambda)}$: $\vec{v(\lambda)}$ represents an $n(\lambda)$-dimensional vector whose elements are the elements of a finite field $F_q$.

$$\vec{v(\lambda)}=(v_1(\lambda),\ldots,v_{n(\lambda)}(\lambda))\in F_q^{n(\lambda)} \quad (89)$$

$v_\mu(\lambda)$: $v_\mu(\lambda)$ represents the μ-th element (μ=1, ..., n(λ)) of an n(λ)-dimensional vector $v(\lambda)^\rightarrow$.

$w(\lambda)^\rightarrow$: $w(\lambda)^\rightarrow$ represents an n(λ)-dimensional vector whose elements are the elements of a finite field $F_q$.

$$w(\lambda)^\rightarrow = (w_1(\lambda), \ldots, w_{n(\lambda)}(\lambda)) \in F_q^{n(\lambda)} \quad (90)$$

$w_\mu(\lambda)$: $w_\mu(\lambda)$ represents the μ-th element (μ=1, ..., n(λ)) of an n(λ)-dimensional vector $w(\lambda)^\rightarrow$.

Enc: Enc represents a common key encryption function for an encryption process of a common key encryption scheme.

$Enc_K(M)$: $Enc_K(M)$ represents a ciphertext obtained by encrypting a plaintext M with a common key K according to a common key encryption function Enc.

Dec: Dec represents a common key decryption function for a decryption process of a common key encryption scheme.

$Dec_K(C)$: $Dec_K(C)$ represents a decrypted text obtained by decrypting a ciphertext C with a common key K according to a common key decryption function Dec.

[Functional Encryption Scheme]

A basic construction of a functional encryption scheme in the fourth to sixth embodiments will be described below.

The functional encryption scheme is a scheme in which a ciphertext is decrypted when the truth value of a logical formula determined by a combination of condition information and attribute information is "true". One of the "condition information" and the "attribute information" is embedded in a ciphertext and the other is embedded in key information. For example, the predicate encryption scheme disclosed in "'Predicate Encryption Supporting Disjunctions, Polynomial Equations, and Inner Products,' with Amit Sahai and Brent Waters, One of 4 papers from Eurocrypt 2008 invited to the Journal of Cryptology" (Reference literature 9) is one type of functional encryption.

While there are other well-known functional encryption schemes, an unpublished new functional encryption scheme will be described below. In the new functional encryption scheme, a value corresponding to secret information is hierarchically secret-shared in a mode that depends on a given logical formula. The given logical formula contains propositional variables whose truth values are determined by a combination of conditional information and attribute information and further contains any or all of logical symbols ∧, ∨, and ¬ as necessary. If the truth value of the given logical formula which is determined when the truth values of the propositional variables are determined is true, a value corresponding to the secret information is recovered and a ciphertext is decrypted on the basis of the recovered value.

<Relationship between Logical Formula and Hierarchical Secret Sharing Scheme>

The relationship between a given logical formula and the hierarchical secret sharing described above will be described.

Secret sharing refers to method for dividing secret information into N(N≥2) pieces of share information in such a manner that the secret information is recovered only when at least a threshold number $K_t(K_t \geq 1)$ of pieces of share information is obtained. A secret sharing scheme (SSS) in which $K_t=N$ is satisfied is called N-out-of-N sharing scheme (or "N-out-of-N threshold sharing scheme"); and a secret sharing scheme in which $K_t<N$ is satisfied is called $K_t$-out-of-N sharing scheme (or "$K_t$-out-of-N threshold sharing scheme") (see Reference literature 11: "Kaoru Kurosawa, Wakaha Ogata 'Basic Mathematics of Modern Encryption (Electronics, information and communication lectures series)', Corona Publishing Co., March 2004, pp. 116-119", and Reference literature 12: "A. Shamir, 'How to Share a Secret', Communications of the ACM, November 1979, Volume 22, Number 11, pp. 612-613", for example).

In the N-out-of-N sharing scheme, secret information SE can be recovered when all of the pieces of share information, share(1), ..., share(N), are given; while no secret information SE can be obtained only when any N−1 pieces of share information, share(φ1), ..., share (φ$_{N-1}$), are given. One example is given below.

Randomly select $SH_1, \ldots, SH_{N-1}$.

Calculate $SH_N = SE - (SH_1 + \ldots + SH_{N-1})$.

Set $SH_1, \ldots, SH_N$ as the pieces of share information share(1), ..., share(N).

When all of the pieces of share information, share(1), ..., share(N), are given, the secret information SE can be recovered by the following recovery operation.

$$SE = \text{share}(1) + \ldots + \text{share}(N) \quad (91)$$

In the $K_t$-out-of-N sharing scheme, secret information SE can be recovered when any different $K_t$ pieces of share information, share(φ$_1$), ..., share(φ$_{Kt}$), are given; while no secret information SE can be obtained only when any $K_t$−1 pieces of share information, share(φ$_1$), ..., share (φ$_{Kt-1}$), are given. Here, the subscript Kt represents $K_t$. One example of the $K_t$-out-of N sharing scheme is given below.

Randomly select a $K_t$-1 dimensional polynomial $f(x) = \xi_0 + \xi_1 \cdot x + \xi_2 \cdot x^2 + \ldots + \xi_{Kt-1} \cdot x^{Kt-1}$ that satisfies f(0)=SE. That is, $\xi_0$=SE, and $\xi_1, \ldots, \xi_{Kt-1}$ are selected randomly. The share information is share(ρ)=(ρ, f(ρ)) (ρ=1, ..., N). Here, (ρ, f(ρ)) is information from which values of ρ and f(ρ) can be extracted. An example of (ρ, f(ρ)) is a bit combination value of ρ and f(ρ).

When any different $K_t$ pieces of share information share (φ1), ..., share (φ$_{Kt}$) ((φ$_1$, ..., φKt) ⊂ (1, ..., N)) are given, the secret information SE can be recovered using a Lagrange interpolation formula, for example, by the following recovery operation.

$$SE = f(0) = LA_1 \cdot f(\phi_1) + \ldots + LA_{Kt} \cdot f(\phi_{Kt}) \quad (92)$$

$$LA_\rho(x) = \frac{(x-\phi_1) \ldots \overset{\rho}{\vee} \ldots (x-\phi_{K_t})}{(\phi_\rho - \phi_1) \ldots \overset{\rho}{\vee} \ldots (\phi_\rho - \phi_{K_t})} \in F_q \quad (93)$$

Here, "$\ldots \overset{\rho}{\vee} \ldots$" represents that the ρ-th operands from the left [element (φ$_\rho$−φ$_\rho$) of the denominator and element (x−φ$_\rho$) of the numerator] do not exist. That is, the denominator of Formula (93) is $(\phi_\rho - \phi_1) \cdot \ldots \cdot (\phi_\rho - \phi_{\rho-1}) \cdot (\phi_\rho - \phi_{\rho+1}) \cdot (\phi_\rho - \phi_{Kt})$ and the numerator of Formula (93) is $(x - \phi_1) \cdot \ldots \cdot (x - \phi_{\rho-1}) \cdot (x - \phi_{\rho+1}) \cdot \ldots \cdot (x - \phi_{Kt})$ The secret sharing schemes described above can be executed on a field. Furthermore, these schemes can be extended to divide, by secret sharing, a value dependent on secret information SE into a value dependent on share information "share". A value dependent on secret information SE may be the secret information SE itself or a function value of the secret information SE, and a value dependent on the share information "share" may be the share information "share" itself or a function value of the share information "share." For example, an element $g_T^{SE} \in G_T$ dependent on secret information SE ∈ $F_q$ that is an element of a finite field $F_q$ can be divided, by secret sharing, into elements $g_T^{share(1)}, g_T^{share(2)} \in G_T$ of cyclic group $G_T$ that are dependent on share information, share (1), share(2) of the secret information SE. The secret information SE described above is a linear combination of share information, shares (Formulas (91) and (92)). A secret sharing scheme in which secret information SE is linear combination of share information, shares, is called linear secret sharing scheme.

The given logical formula can be represented by tree-structure data that is obtained by hierarchically secret-sharing of secret information. Specifically, according to De Morgan's lows, the given logical formula can be represented by a logical formula made up of literals or a logical formula made up of at least some of the logical symbols $\wedge$, $\vee$ and literals (such a logical formula will be referred to as "standard logical formula"). The standard logical formula can be represented by tree-structure data that is obtained by hierarchically secret-sharing of secret information.

The tree-structure data representing a standard logical formula includes a plurality of nodes. At least some of the nodes are parent nodes of one or more child nodes, one of the parent nodes is the root node, and at least some of the child nodes are leaf nodes. There is not a parent node of the root node; and there is not a child node of a leaf node. The root node corresponds to a value dependent on secret information; and each child node of each parent node corresponds to a value dependent on share information where the value dependent on share information is obtained by secret sharing of the value corresponding to the parent node. Each secret sharing mode (a secret sharing scheme and a threshold) for each node depends on a standard logical formula. The leaf nodes correspond to the literals in the standard logical formula. The truth value of each of the literals is determined by a combination of condition information and attribute information.

It is assumed that: a value dependent on share information for a leaf node is obtained if the truth value of the literal corresponding to the leaf node is true; whereas a value dependent on share information for a leaf node is not obtained if the truth value of the literal corresponding to the leaf node is false. Because of the nature of the secret sharing, the value dependent on share information for a parent node (if the parent node is the root node, the value dependent on the secret information) is recovered only when the number of the obtained values dependent on share information for its child nodes is greater than or equal to a threshold value corresponding to the parent node. Accordingly, whether the value dependent on the secret information for the root node can be recovered or not is ultimately determined by the leaf nodes whose literal return true and by the configuration (including each secret sharing mode for each node) of the tree-structure data. The tree-structure data represents the standard logical formula if the tree-structure data is configured in such a way that the value dependent on the secret information for the root node can be ultimately recovered only when the truth value of the literal corresponding to each leaf node allows the standard logical formula to return true as its truth value. Such tree-structure data that represents a standard logical formula can be readily configured. A specific example will be given below.

Figure 32:
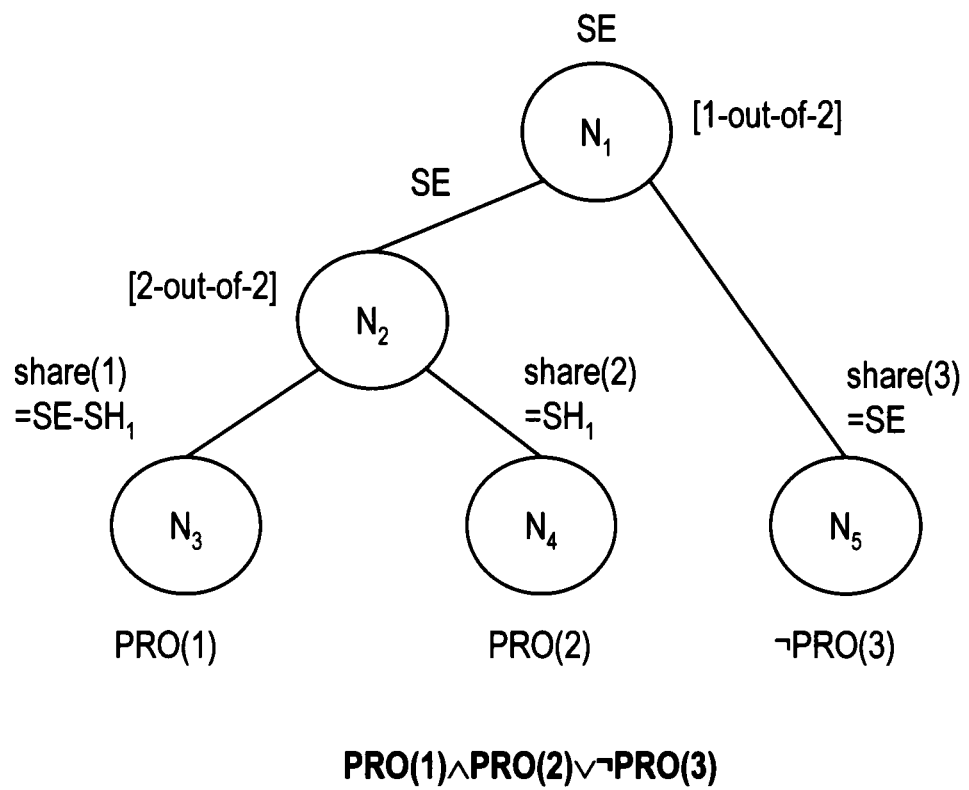
FIG. 32 is a diagram illustrating tree-structure data representing a standard logical formula.

FIG. 32 illustrates tree-structure data representing a standard logical formula PRO(1)$\wedge$PRO(2)$\vee$ $\neg$ PRO(3) containing propositional variables PRO(1) and PRO(2), the logical negation $\neg$ PRO(3) of a propositional variable PRO(3), and logical symbols $\wedge$ and $\vee$. The tree-structure data illustrated in FIG. 32 includes a plurality of nodes $N_1, \ldots, N_5$. The node $N_1$ is set as the parent node of the nodes $N_2$ and $N_5$, the node $N_2$ is set as the parent node of the nodes $N_3$ and $N_4$, the node $N_1$, which is one of the parent nodes, is set as the root node, and the child nodes $N_3$, $N_4$ and $N_5$ among the child nodes are set as leaf nodes. The node $N_1$ corresponds to a value dependent on secret information SE, and child nodes $N_2$ and $N_5$ of node $N_1$ correspond to values dependent on pieces of share information SE, SE, respectively, where the values are obtained by secret sharing of the value corresponding to the secret information SE according to a 1-out-of-2 sharing scheme. Child nodes $N_3$ and $N_4$ of node $N_2$ correspond to values dependent on pieces of share information SE-SH$_1$, SH$_1$, respectively, where the values are obtained by secret sharing of the value corresponding to the share information SE according to a 2-out-of 2 sharing scheme. That is, the leaf node $N_3$ corresponds to a value dependent on share information share(1)=SE-SH$_1$, the leaf node $N_4$ corresponds to a value dependent on share information share(2)=SH$_1$, and the leaf node $N_5$ corresponds to a value dependent on share information share(3)=SE. The leaf nodes $N_3$, $N_4$ and $N_5$ correspond to the literals PRO(1), PRO(2) and $\neg$ PRO(3) of the standard logical formula PRO(1)$\wedge$PRO(2)$\vee$ $\neg$ PRO(3), respectively. The truth value of each of the literals PRO(1), PRO(2) and $\neg$ PRO(3) is determined by a combination of condition information and attribute information. Here, a value dependent on share information for a leaf node is obtained if the truth value of the literal corresponding to the leaf node is true; while a value dependent on share information for a leaf node is not obtained if the truth value of the literal corresponding to the leaf node is false. In this case, the value dependent on the secret information SE is recovered only when a combination of condition information and attribute information causes the standard logical formula PRO(1)$\wedge$PRO(2)$\vee$ $\neg$ PRO(3) to return true.

Figure 33:
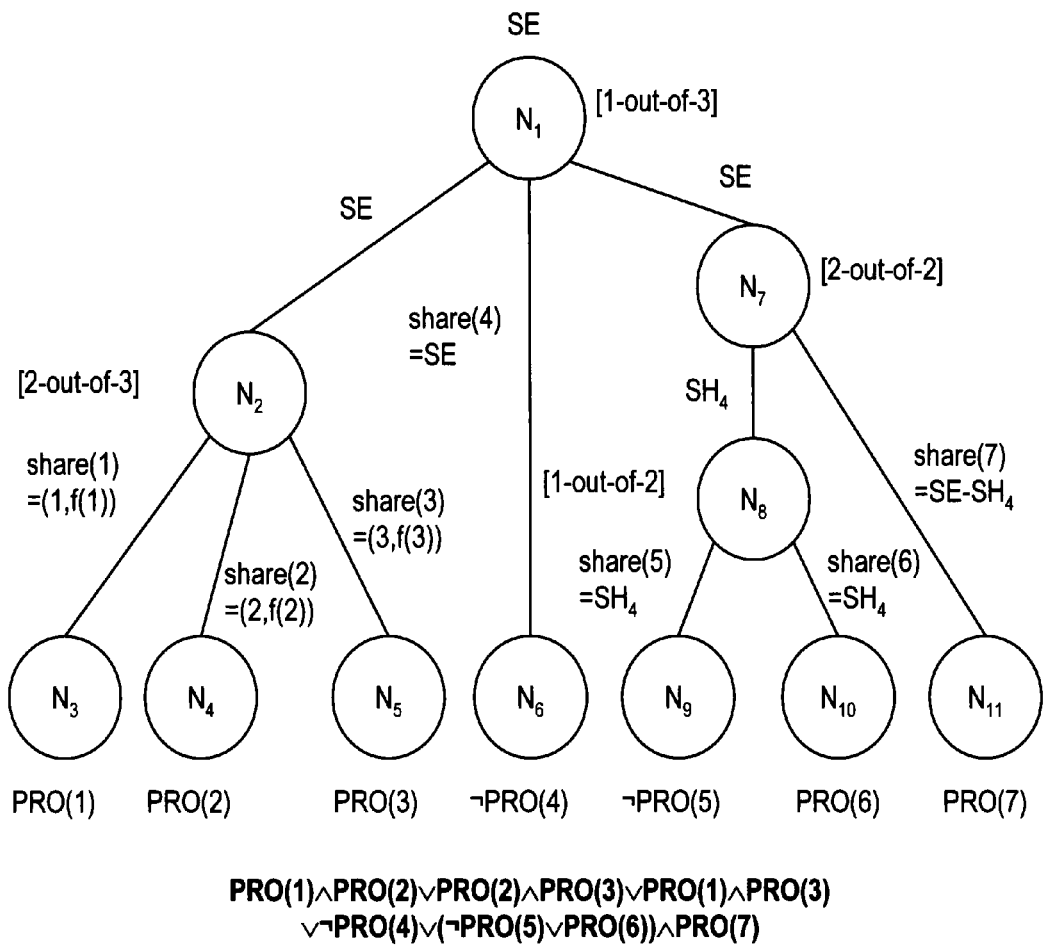
FIG. 33 is a diagram illustrating tree-structure data representing a standard logical formula.

FIG. 33 illustrates tree-structure data that represents a standard logical formula PRO(1)$\wedge$PRO(2)$\vee$PRO(2)$\wedge$PRO(3) $\vee$PRO(1)$\wedge$PRO(3) $\vee$ $\neg$ PRO(4)$\vee$($\neg$ PRO(5)$\wedge$PRO(6)) $\wedge$PRO(7) which includes a propositional variables PRO(1)$\neg$, PRO(2), PRO(3), PRO(6), PRO(7), logical negations $\neg$ PRO (4), $\neg$ PRO(5) of propositional variables PRO(4), PRO(5), and logical symbols $\wedge$, $\vee$.

The tree-structure data illustrated in FIG. 33 includes a plurality of nodes $N_1, \ldots, N_{11}$. The node $N_1$ is set as the parent node of the nodes $N_2$, $N_6$ and $N_7$, the node $N_2$ is set as the parent node of the nodes $N_3$, $N_4$ and $N_5$, the node $N_7$ is set as the parent node of the nodes $N_8$ and $N_{11}$, the node $N_8$ is set as the parent node of the nodes $N_9$ and $N_{10}$, the node $N_1$, which is one of the parent nodes, is set as the root node, and the nodes $N_3$, $N_4$, $N_5$, $N_6$, $N_9$, $N_{10}$ and $N_{11}$ are set as leaf nodes. The node $N_1$ corresponds to a value dependent on secret information SE. The child nodes $N_2$, $N_6$ and $N_7$ of the node $N_1$ correspond to values dependent on pieces of share information SE, SE, SE, respectively, where the values are obtained by secret sharing of the value dependent on the secret information SE according to a 1-out-of-3 sharing scheme. The child nodes $N_3$, $N_4$, and $N_5$ of the node $N_2$ correspond to values dependent on pieces of share information (1, f(1)), (2, f(2)), and (3, f(3)), respectively, where the values are obtained by secret sharing of the value dependent on the share information SE according to a 2-out-of-3 sharing scheme. The child nodes $N_8$ and $N_{11}$ of the node $N_7$ correspond to values dependent on pieces of share information SH$_4$ and SE-SH$_4$, respectively, where the values are obtained by secret sharing of the value corresponding to the share information SE according to a 2-out-of-2 sharing scheme. The child nodes $N_9$ and $N_{10}$ of the node $N_8$ correspond to values dependent on pieces of share information SH$_4$, SH$_4$, respectively, where the values are obtained by secret sharing of the value dependent on share information SH$_4$ according to a 1-out-of-2 sharing scheme. That is, the leaf node $N_3$ corresponds to a value dependent on share information share(1)=(1, f(1)), the leaf node $N_4$ corresponds to a value dependent on share information share(2)=(2, f(2)), the leaf node $N_5$ corresponds to a value dependent on share information share(3)=(3, f(3)), the leaf node $N_6$ corresponds to a value dependent on share information share(4)=SE, the leaf node $N_9$ corresponds to a value dependent on share information share(5)=$SH_4$, the leaf node $N_{10}$ corresponds to a value dependent on share information share(6)=$SH_4$, and the leaf node $N_{11}$ corresponds to a value dependent on share information share(7)=SE-$SH_4$. The leaf nodes $N_3$, $N_4$, $N_5$, $N_6$, $N_9$, $N_{10}$ and $N_{11}$ correspond to the literals PRO(1), PRO(2), PRO(2), PRO(3), PRO(1), PRO(3), ¬ PRO(4), ¬ PRO(5), PRO(6), and PRO(7) of the standard logical formula PRO(1)∧ PRO(2)∨ PRO(2)∧ PRO(3)∨ PRO(1)∧ PRO(3)∨ ¬ PRO(4)∨ (PRO(5) PRO(6))∧ PRO(7), respectively. The truth value of each of the literals PRO(1), PRO(2), PRO(2), PRO(3), PRO(1), PRO(3), ¬ PRO(4), ¬ PRO(5), PRO(6), and PRO(7) is determined by a combination of condition information and attribute information. Here, a value dependent on share information for a leaf node is obtained if the truth value of the literal corresponding to the leaf node is true; while a value dependent on share information for a leaf node is not obtained if the truth value of the literal corresponding to the leaf node is false. In this case, a value dependent on the secret information SE is recovered only when a combination of condition information and attribute information causes the standard logical formula PRO(1)∧ PRO(2)∨ PRO(2)∧ PRO(3)∨ PRO(1)∧ PRO(3)∨ ¬ PRO(4)∨ (¬ PRO(5)∧ PRO(6))∧ PRO(7) to return true.

<Access Structure>

When a given logical formula is represented by tree-structure data obtained by hierarchically secret-sharing of secret information as described above, it can be determined whether the truth value of the logical formula determined by a combination of condition information and attribute information is "true" or "false", on the basis of whether a value dependent on the secret information can be recovered from values dependent on pieces of share information for the leaf nodes, each of which is obtained for a combination of condition information and attribute information. Let's hereinafter refer to the following mechanism as an access structure: the mechanism accepts a combination of condition information and attribute information when the truth value of a logical formula determined by the combination of the condition information and attribute information is "true" but rejects a combination of condition information and attribute information when the truth value is "false".

The total number of the leaf nodes of tree-structure data representing a given logical formula is denoted by $\Psi$; and identifiers corresponding to the leaf nodes are denoted by $\lambda=1, \ldots, \Psi$. Condition information is a set $\{v(\lambda)^{\rightarrow}\}_{\lambda=1, \ldots, \Psi}$ of $n(\lambda)$-dimensional vectors $v(\lambda)^{\rightarrow}$ corresponding to the leaf nodes. Attribute information is a set $\{w(\lambda)^{\rightarrow}\}_{\lambda=1, \ldots, \Psi}$ of $n(\lambda)$-dimensional vectors $w(\lambda)^{\rightarrow}$. The tree-structure data described above is implemented as a labeled matrix LMT (MT, LAB).

The labeled matrix LMT(MT, LAB) includes a matrix of $\Psi$ rows and COL columns (COL≥1)

$$MT = \begin{pmatrix} mt_{1,1} & \cdots & mt_{1,COL} \\ \vdots & \ddots & \vdots \\ mt_{\Psi,1} & \cdots & mt_{\Psi,COL} \end{pmatrix} \quad (94)$$

and labels LAB($\lambda$) associated with the rows $\lambda=1, \ldots, \Psi$ of the matrix MT.

Each of the elements $mt_{\lambda,col}$ (col=1, ..., COL) of the matrix MT satisfies the following two requirements. First, if a value dependent on secret information SE $\in F_q$ corresponds to the root node of the tree-structure data that represents a given logical formula as described above, then, for the following COL-dimensional vector $GV^{\rightarrow}$ whose elements are predetermined elements of the finite field $F_q$ $$GV^{\rightarrow}=(gv_1, \ldots, gv_{COL}) \in F_q^{COL} \quad (95)$$

and the following COL-dimensional vector $CV^{\rightarrow}$ whose elements are the elements of the finite field $F_q$ that the elements are dependent on the secret information SE $$CV^{\rightarrow}=(cv_1, cv_{COL}) \in F_q^{COL} \quad (96),$$

the following formula holds.

$$SE=GV^{\rightarrow}\cdot(CV^{\rightarrow})^T \quad (97)$$

A specific example of the COL-dimensional vector $GV^{\rightarrow}$ is as follows.

$$GV^{\rightarrow}=(1_F, \ldots, 1_F) \in F_q^{COL} \quad (98)$$

However, other COL-dimensional vector such as $GV^{\rightarrow}=(1_F, 0_F, \ldots, 0_F) \in F_q^{COL}$ may be used. Second, if a value dependent on share information share($\lambda$) $\in F_q$ corresponds to a leaf node corresponding to an identifier $\lambda$, the following formula holds.

$$(share(1), \ldots, share(\Psi))^T = MT \cdot (CV^{\rightarrow})^T \quad (99)$$

Once the tree-structure data representing the given logical formula as describe above has been determined, it is easy to choose a matrix MT that satisfies the two requirements. Furthermore, even if the secret information SE and the share information share($\lambda$) are variable, it is easy to choose a matrix MT that satisfies the two requirements. That is, values of the secret information SE and the share information share($\lambda$) may be determined after the matrix MT has been determined.

The labels LAB($\lambda$) associated with the rows $\lambda=1, \ldots, \Psi$ of the matrix MT correspond to the literals (PRO($\lambda$) or ¬ PRO($\lambda$)) corresponding to the leaf nodes corresponding to the identifiers $\lambda$. Here, the truth value "true" of a propositional variable PRO($\lambda$) is treated as being equivalent to that the inner product of $v(\lambda)^{\rightarrow}$ included in condition information VSET2=$\{\lambda, v(\lambda)^{\rightarrow}|\lambda=1, \ldots, \Psi\}$ and $w(\lambda)^{\rightarrow}$ included in attribute information VSET1=$\{\lambda, w(\lambda)^{\rightarrow}|\lambda=1, \ldots, \Psi\}$ is 0; the truth value "false" of the propositional variable PRO($\lambda$) is treated as being equivalent to that the inner product $v(\lambda)^{\rightarrow}\cdot w(\lambda)^{\rightarrow}$ is not 0. It is assumed that the label LAB($\lambda$) corresponding to PRO($\lambda$) represents $v(\lambda)^{\rightarrow}$ and the label LAB($\lambda$) corresponding to ¬ PRO($\lambda$) represents ¬ $v(\lambda)^{\rightarrow}$. Here, ¬ $v(\lambda)^{\rightarrow}$ is a logical formula representing the logical negation of $v(\lambda)^{\rightarrow}$ and $v(\lambda)^{\rightarrow}$ can be determined from ¬ $v(\lambda)^{\rightarrow}$. Furthermore, "LAB($\lambda$)=$v(\lambda)^{\rightarrow}$" denotes that LAB($\lambda$) represents $v(\lambda)^{\rightarrow}$ and "LAB($\lambda$)=¬ $v(\lambda)^{\rightarrow}$" denotes that LAB($\lambda$) represents ¬ $v(\lambda)^{\rightarrow}$. LAB denotes a set $\{LAB(\lambda)\}_{\lambda=1, \ldots, \Psi}$ of LAB($\lambda$) ($\lambda=1, \ldots, \Psi$).

Furthermore, the following $\Psi$-dimensional vector $TFV^{\rightarrow}$ is defined.

$$TFV^{\rightarrow}=(tfv(1), \ldots, tfv(\Psi)) \quad (100)$$

Each element tfv($\lambda$) becomes tfv($\lambda$)=1 when the inner product $v(\lambda)^{\rightarrow}\cdot w(\lambda)^{\rightarrow}$ is 0, and tfv($\lambda$)=0 when the inner product $v(\lambda)^{\rightarrow}\cdot w(\lambda)^{\rightarrow}$ is nonzero.

$$tfv(\lambda)=1 (PRO(\lambda) \text{ is true}) \text{ if } v(\lambda)\cdot w(\lambda)^{\rightarrow}=0 \quad (101)$$

$$tfv(\lambda)=0 (PRO(\lambda) \text{ is false}) \text{ if } v(\lambda)^{\rightarrow}\cdot w(\lambda)^{\rightarrow}\neq 0 \quad (102)$$

Furthermore, when the truth value of the logical formula $$\{(LAB(\lambda)=v(\lambda)^{\rightarrow})\wedge (tfv(\lambda)=1)\}\vee \{(LAB(\lambda)=\neg v(\lambda) \wedge (tfv(\lambda)=0)\} \quad (103)$$

is "true", it is denoted by LIT($\lambda$)=1; when "false", it is denoted by LIT($\lambda$)=0. That is, when the truth value of the literal corresponding to the leaf node corresponding to an identifier $\lambda$ is "true", it is denoted by LIT($\lambda$)=1; when "false", it is denoted by LIT($\lambda$)=0. A submatrix $MT_{TFV}$ that consists of only row vectors $mt_\lambda^\rightarrow = (mt_{\lambda, 1}, \ldots mt_{\lambda, COL})$ that yield LIT($\lambda$)=1 among the row vectors included in the matrix MT is written as follows.

$$MT_{TFV} = (MT)_{LIT(\lambda)=1} \quad (104)$$

If the secret sharing scheme described above is a linear secret sharing scheme, then, that a value dependent on secret information SE can be recovered from values dependent on share information share($\lambda$) corresponding to identifiers $\lambda$, is equivalent to that a COL-dimensional vector $GV^\rightarrow$ belongs to a vector space spanned by row vectors $mt_\lambda^\rightarrow$ corresponding to the identifiers $\lambda$. That is, whether or not a value dependent on secret information SE can be recovered from a value dependent on share information share($\lambda$) corresponding to the identifiers $\lambda$ can be determined by determining whether or not a COL-dimensional vector $GV^\rightarrow$ belongs to a vector space spanned by row vectors $mt_\lambda^\rightarrow$ corresponding to identifiers $\lambda$. A vector space spanned by row vectors $mt_\lambda^\rightarrow$ means a vector space that can be represented by a linear combination of the row vectors $mt_\lambda^\rightarrow$.

It is assumed here that if a COL-dimensional vector $GV^\rightarrow$ belongs to a vector space span<$MT_{TFV}$> that is spanned by the row vectors $mt_\lambda^\rightarrow$ of the submatrix $MT_{TFV}$ described above, a combination of condition information and attribute information is accepted; otherwise the combination of the condition information and attribute information is rejected. This embodies the access structure described above. Here, when the labeled matrix LMT(MT, LAB) corresponds to condition information as described above, "the access structure accepts attribute information" refers to that the access structure accepts a combination of condition information and attribute information; "the access structure rejects attribute information" refers to that the access structure does not accept a combination of condition information and attribute information.

Accept if $GV^\rightarrow \in$ span<$MT_{TFV}$>
Reject if $\neg (GV^\rightarrow \in$ span<$MT_{TFV}$>)
When $GV^\rightarrow \in$ span<$MT_{TFV}$>, there are coefficients const($\mu$) that satisfy the following formula.

$$SE = \Sigma_{\mu \in SET} \text{const}(\mu) \cdot \text{share}(\mu) \quad (105)$$

{const($\mu$) $\in F_q | \mu \in$ SET}, SET $\subseteq \{1, \ldots, \lambda | LIT(\lambda)=1\}$
Such coefficients const($\mu$) can be found in polynomial time of the size of the matrix MT.

<Basic Construction of Functional Encryption Scheme Using Access Structure>

An example of a basic construction where Key Encapsulation Mechanisms (KEM) are constructed by the functional encryption scheme using the access structure will be described below. The construction includes Setup($1^{sec}$, ($\Psi$; n(1), ..., n($\Psi$))), GenKey(PK, MSK, LMT(MT, LAB)), Enc(PK, M, $\{\lambda, v(\lambda)^\rightarrow | \lambda=1, \ldots, \Psi\}$) ($v_1(\lambda)=1_F$), and Dec(PK, SKS, C). The respective first elements $w_1(\lambda)$ of attribute information VSET1=$\{\lambda, w(\lambda)^\rightarrow | \lambda=1, \ldots, \Psi\}$ are $1_F$.

[Setup($1^{sec}$, ($\Psi$; n(1), ..., n($\Psi$))): Setup]
Input: $1^{sec}$, ($\Psi$; n(1), ..., n($\Psi$))
Output: Master secret information MSK, public parameter PK In Setup, the following process is performed for each $\psi=0, \ldots \Psi$.

(Setup-1) An order q, an elliptic curve E, cyclic groups $G_1$, $G_2$, $G_T$, and a bilinear map $e_\psi$ ($\psi=0, \ldots, \Psi$) for a security parameter sec are generated by using $1^{sec}$ as an input (param= (q, E, $G_1$, $G_2$, $G_T$, $e_\psi$)).

(Setup-2) $\tau' \in F_q$ is chosen and matrices X($\psi$) and X*($\psi$) that satisfy X*($\psi$)=$\tau' \cdot (X(\psi)^{-1})^T$ are chosen.

(Setup-3) Basis vectors $a_i(\psi)$ (i=1, ..., n($\psi$)+$\zeta(\psi)$) are coordinate-transformed according to Formula (81) to generate n($\psi$)+$\zeta(\psi)$-dimensional basis vectors $b_i(\psi)$ (i=1, ..., n($\psi$)+$\zeta(\psi)$). A matrix B($\psi$) of n($\psi$)+$\zeta(\psi)$ rows and n($\psi$)+$\zeta(\psi)$ columns whose elements are the basis vectors $b_i(\psi)$ (i=1, ..., n($\psi$)+$\zeta(\psi)$) is generated.

(Setup-4) Basis vectors $a_i^*(\psi)$ (i=1, ..., n($\psi$)+$\zeta(\psi)$) are coordinate-transformed according to Formula (83) to generate n($\psi$)+$\zeta(\psi)$-dimensional basis vectors $b_i^*(\psi)$ (i=1, ..., n($\psi$)+$\zeta(\psi)$). A matrix B*($\psi$) of n($\psi$)+$\zeta(\psi)$ rows and n($\psi$)+$\zeta(\psi)$ columns that consists of the basis vectors $b_i^*(\psi)$ (i=1, ..., n($\psi$)+$\zeta(\psi)$) is generated.

(Setup-5) A set $\{B^*(\psi)^\wedge\}_{\psi=0, \ldots, \Psi}$ of B*($\psi$)$^\wedge$ is set as master secret information MSK=$\{B^*(\psi)^\wedge\}_{\psi=0, \ldots, \Psi}$. A set $\{B(\psi)^\wedge\}_{\psi=0, \ldots, \Psi}$ of B($\psi$)$^\wedge$, $1^{sec}$, and param are set as public parameters PK. Here, B*($\psi$)$^\wedge$ is a matrix B*($\psi$) or its submatrix and B($\psi$)$^\wedge$ is a matrix B($\psi$) or its submatrix. The set $\{B^*(\psi)^\wedge\}_{\psi=0, \ldots, \Psi}$ includes at least $b_1^*(0)$, $b_1^*(\lambda)$, ..., $b_{n(\lambda)}^*(\lambda)$ ($\lambda=1, \ldots, \Psi$). The set $\{B(\psi)^\wedge\}_{\psi=0, \ldots, \Psi}$ includes at least $b_1(0), b_1(\lambda), \ldots, b_{n(\lambda)}(\lambda)$ ($\lambda=1, \ldots, \Psi$). One example is given below.

n(0)+$\zeta$(0)≥5, $\zeta(\lambda)$=3·n($\lambda$)
B(0)$^\wedge$=$(b_1(0) b_3(0) b_5(0))^T$
B($\lambda$)$^\wedge$=$(b_1(\lambda) \ldots b_{n(\lambda)}(\lambda) b_{3 \cdot n(\lambda)+1}(\lambda) \ldots b_{4 \cdot n(\lambda)}(\lambda))^T$ ($\lambda$=1, ..., $\Psi$)
B*(0)$^\wedge$=$(b_1^*(0) b_3^*(0) b_4^*(0))^T$
B*($\lambda$)$^\wedge$=$(b_1^*(\lambda) \ldots b_{n(\lambda)}^*(\lambda) b_{2 \cdot n(\lambda)+1}^*(\lambda) \ldots b_{3 \cdot n(\lambda)}^*(\lambda))^T$ ($\lambda$=1, ..., $\Psi$)

[GenKey(PK, MSK, LMT(MT, LAB)): Key Information Generation]
Input: Public parameter PK, master secret information MSK, labeled matrix LMT(MT, LAB) corresponding to condition information VSET2=$\{\lambda, v(\lambda)^\rightarrow | =1, \ldots, \Psi\}$
Output: Key information SKS (GenKey-1) The following process is performed for secret information SE that satisfies formulas (95) to (99).

$$D^*(0) = -SE \cdot b_1^*(0) + \Sigma_{t=2}^{I} \text{coef}_t(0) \cdot b_t^*(0) \quad (106)$$

where I is a constant greater than or equal 2 and less than or equal to n(0)+$\zeta$(0) and $\text{coef}_t(0) \in F_q$ is a constant or a random number. The term "random number" means a true random number and a pseudo random number. One example of D*(0) is given below. Here, $\text{coef}_4(0)$ in Formula (107) is a random number.

$$D^*(0) = -SE \cdot b_1^*(0) + b_3^*(0) + \text{coef}_4(0) \cdot b_4^*(0) \quad (107)$$

(GenKey-2) The following process is performed for share($\lambda$) ($\lambda$=1, ..., $\Psi$) that satisfies Formulas (95) to (99).
For $\lambda$ that satisfies LAB($\lambda$)=$v(\lambda)^\rightarrow$, $$D^*(\lambda) = (\text{share}(\lambda) + coef(\lambda) \cdot v_1(\lambda)) \cdot b_1^*(\lambda) + \sum_{t=2}^{n(\lambda)} coef(\lambda) \cdot v_t(\lambda) \cdot b_t^*(\lambda) + \sum_{t=n(\lambda)+1}^{n(\lambda)+\zeta(\lambda)} coef_t(\lambda) \cdot b_t^*(\lambda) \quad (108)$$

is generated.
For $\lambda$ that satisfies LAB($\lambda$)=$\neg v(\lambda)^\rightarrow$, $$D^*(\lambda) = \text{share}(\lambda) \cdot \Sigma_{t=1}^{n(\lambda)} v_t(\lambda) \cdot b_t^*(\lambda) + \Sigma_{t=n(\lambda)+1}^{n(\lambda)+\zeta(\lambda)} coef_t(\lambda) \cdot b_t^*(\lambda) \quad (109)$$

is generated. Here, $coef(\lambda)$ and $coef_\iota(\lambda) \in F_q$ are constants or random numbers. One example is given below.

For $\lambda$ that satisfies $LAB(\lambda) = v(\lambda)^\rightarrow$, $$D^*(\lambda) = (share(\lambda) + coef(\lambda) \cdot v_1(\lambda)) \cdot b_1^*(\lambda) + \qquad (110)$$

$$\sum_{\iota=2}^{n(\lambda)} coef(\lambda) \cdot v_\iota(\lambda) \cdot b_\iota^*(\lambda) + \sum_{\iota=2 \cdot n(\lambda)+1}^{3 \cdot n(\lambda)} coef_\iota(\lambda) \cdot b_\iota^*(\lambda)$$

is generated.

For $\lambda$ that satisfies $LAB(\lambda) = \neg v(\lambda)^\rightarrow$, $$D^*(\lambda) = share(\lambda) \cdot \Sigma_{\iota=1}^{n(\lambda)} v_\iota(\lambda) \cdot b_\iota^*(\lambda) + \Sigma_{\iota=2 \cdot n(\lambda)+1}^{3 \cdot n(\lambda)} coef_\iota(\lambda) \cdot b_\iota^*(\lambda) \qquad (111)$$

is generated. Here, $coef(\lambda)$ and $coef_\iota(\lambda)$ in Formulas (110) and (111) are random numbers.

(GenKey-3) Key information $$SKS = (LMT(MT, LAB), D^*(0), D^*(1), D(\Psi)) \qquad (112)$$

is generated.

[Enc(PK, M, VSET1: Encryption)]
Input: Public parameter PK, plaintext M, attribute information $VSET1 = \{\lambda, w(\lambda)^\rightarrow | \lambda = 1, \ldots, \Psi\} (w_1(\lambda) = 1_F)$
Output: Ciphertext C (Enc-1) A ciphertext $C(\psi)$ $(\psi = 0, \ldots, \Psi)$ of the common key K is generated by the following process.

$$C(0) = \upsilon \cdot b_1(0) + \Sigma_{\iota=2}^{I} \upsilon_\iota(0) \cdot b_\iota(0) \qquad (113)$$

$$C(\lambda) = \upsilon \cdot \Sigma_{\iota=1}^{n(\lambda)} w_\iota(\lambda) \cdot b_\iota(\lambda) + \Sigma_{\iota=n(\lambda)+1}^{n(\lambda)+\zeta(\lambda)} \upsilon_\iota(\lambda) \cdot b_\iota(\lambda) \qquad (114)$$

Here, $\upsilon, \upsilon_\iota(\psi) \in F_q$ $(\psi = 0, \ldots, \Psi)$ are constants or random numbers that satisfy $$(coef_2(0), \ldots, coef_I(0)) \cdot (\upsilon_2(0), \ldots, \upsilon_I(0)) = \upsilon' \qquad (115)$$

$$coef_\iota(\lambda) \cdot \upsilon_\iota(\lambda) = 0_F (\iota = n(\lambda)+1, \ldots, n(\lambda)+\zeta(\lambda)) \qquad (116)$$

An example of $\upsilon'$ is any one of $\upsilon_2(0), \ldots, \upsilon_I(0)$. For example, $\upsilon, \upsilon_3(0), \upsilon_5(0), \upsilon_{3 \cdot n(\lambda)+1}(\lambda), \ldots, \upsilon_{4 \cdot n(\lambda)}(\lambda)$ are random numbers, $\zeta(\lambda) = 3 \cdot n(\lambda)$, I=5, and
$(\upsilon_2(0), \ldots, \upsilon_I(0)) = (0_F, \upsilon_3(0), 0_F, \upsilon_5(0))$
$\upsilon' = \upsilon_3(0)$
$(\upsilon_{n(\lambda)+1}(\lambda), \ldots, \upsilon_{3 \cdot n(\lambda)}(\lambda)) = (0_F, \ldots, 0_F)$ (Enc-2) A common key $$K = g_T^{\tau \cdot \tau' \cdot \upsilon'} \in G_T \qquad (117)$$

is generated. For example, when $\tau = \tau' = 1_F$, $$K = g_T^{\upsilon'} \in G_T \qquad (118)$$

(Enc-3) The common key K is used to generate a ciphertext $$C(\Psi+1) = Enc_K(M) \qquad (119)$$

of a plaintext M. The common key encryption scheme Enc may be an encryption scheme that is constructed so that encryption can be achieved with a common key K, such as Camellia (registered trademark), AES, or exclusive OR of a common key and a plaintext. In other simple example, $Enc_K(M)$ may be generated as follows.

$$C(\Psi+1) = g_T^{\upsilon'} \cdot M \qquad (120)$$

In the example in Formula (120), $M \in G_T$.

(Enc-4) A ciphertext $$C = (VSET1, C(0), \{C(\lambda)\}_{(\lambda, w(\lambda)^\rightarrow) \in VSET1}, C(\Psi+1)) \qquad (121)$$

is generated. Here, the subscript "$w(\lambda) \rightarrow$" represents "$w(\lambda)^\rightarrow$".

[Dec(PK, SKS, C: Decryption)]
Input: Public parameter PK, key information SKS, ciphertext C
Output: Plaintext M'

(Dec-1) For $\lambda = 1, \ldots, \Psi$, determination is made as to whether or not the inner product $v(\lambda)^\rightarrow \cdot w(\lambda)^\rightarrow$ of an $n(\lambda)$-dimensional vector $v(\lambda)^\rightarrow$ which is each label $LAB(\lambda)$ of a labeled matrix $LMT(MT, LAB)$ included in key information SKS and an $n(\lambda)$-dimensional vector $w(\lambda)^\rightarrow$ included in VSET1 of the ciphertext C is 0 and then, from the result and each label $LAB(\lambda)$ of $LMT(MT, LAB)$, determination is made as to whether or not $GV^\rightarrow \in span\langle MT_{TFV}\rangle$ (Formulas (100) to (105)). If not $GV^\rightarrow \in span\langle MT_{TFV}\rangle$, the ciphertext C is rejected; if $GV^\rightarrow \in span\langle MT_{TFV}\rangle$, the ciphertext C is accepted.

(Dec-2) When the ciphertext C is accepted, $SET \subseteq \{1, \ldots, \lambda | LIT(\lambda) = 1\}$ and a coefficient $const(\mu)$ $(\mu \in SET)$ that satisfies Formula (105) are calculated.

(Dec-3) A common key $$K = e_0(C(0), D^*(0)) \cdot \prod_{\mu \in SET \wedge LAB(\mu) = v(\mu)^\rightarrow} e_\mu(C(\mu), D^*(\mu))^{const(\mu)} \cdot \qquad (122)$$

$$\prod_{\mu \in SET \wedge LAB(\mu) = \neg v(\mu)^\rightarrow} e_\mu(C(\mu), D^*(\mu))^{const(\mu)/(v(\mu)^\rightarrow \cdot w(\mu)^\rightarrow)}$$

is generated.

Here, from Formulas (66), (85) and (115), $$e_0(C(0), D^*(0)) = e_0\left(\upsilon \cdot b_1(0) + \sum_{\iota=2}^{I} \upsilon_\iota(0) \cdot b_\iota(0), - \qquad (123)\right.$$

$$\left. SE \cdot b_1^*(0) + \sum_{\iota=2}^{I} coef_\iota(0) \cdot b_\iota^*(0) \right)$$

$$= e_0(\upsilon \cdot b_1(0), -SE \cdot b_1^*(0)) \cdot$$

$$\prod_{\iota=2}^{I} e_0(\upsilon_\iota(0) \cdot b_\iota(0), coef_\iota(0) \cdot b_\iota^*(0))$$

$$= e_0(b_1(0), b_1^*(0))^{-SE \cdot \upsilon} \cdot \prod_{\iota=2}^{I} e_0(b_\iota(0), b_\iota^*(0))^{\upsilon_\iota(0) \cdot coef_\iota(0)}$$

$$= g_T^{\tau \cdot \tau' \cdot \delta(1,1) \cdot (-SE \cdot \upsilon)} \cdot \prod_{\iota=2}^{I} g_T^{\tau \cdot \tau' \cdot \delta(\iota,\iota) \cdot \upsilon_\iota(0) \cdot coef_\iota(0)}$$

$$= g_T^{\tau \cdot \tau' \cdot (-SE \cdot \upsilon + \upsilon')}$$

is satisfied.

From Formulas (66), (85), (101), (108), (114), (116) and $w_1(\lambda) = 1_F$, $$\prod_{\mu \in SET \wedge LAB(\mu) = v(\mu)^{\rightarrow}} e_\mu(C(\mu), D^*(\mu))^{const(\mu)} = \prod_{\mu \in SET \wedge LAB(\mu) = v(\mu)^{\rightarrow}} e_\mu \left( \upsilon \cdot \sum_{\iota=1}^{n(\mu)} w_\iota(\mu) \cdot b_\iota(\mu) + \sum_{\iota=n(\mu)+1}^{n(\mu)+\zeta(\mu)} \upsilon_\iota(\mu) \cdot b_\iota(\mu), \text{share}(\mu) \cdot b_1^*(\mu) + \right.$$
$$\left. \sum_{\iota=1}^{n(\mu)} coef_\iota(\mu) \cdot v_\iota(\mu) \cdot b_\iota^*(\mu) + \sum_{\iota=n(\mu)+1}^{n(\mu)+\zeta(\mu)} coef_\iota(\mu) \cdot b_\iota^*(\mu) \right)^{const(\mu)}$$

$$= \prod_{\mu \in SET \wedge LAB(\mu) = v(\mu)^{\rightarrow}} \left\{ \begin{array}{l} e_\mu \left( \upsilon \cdot \sum_{\iota=1}^{n(\mu)} w_\iota(\mu) \cdot b_\iota(\mu), \text{share}(\mu) \cdot b_1^*(\mu) \right) \cdot \\ e_\mu \left( \upsilon \cdot \sum_{\iota=1}^{n(\mu)} w_\iota(\mu) \cdot b_\iota(\mu), \sum_{\iota=1}^{n(\mu)} coef_\iota(\mu) \cdot v_\iota(\mu) \cdot b_\iota^*(\mu) \right) \end{array} \right\}^{const(\mu)}$$

$$= \prod_{\mu \in SET \wedge LAB(\mu) = v(\mu)^{\rightarrow}} \left( g_T^{\tau \cdot \tau' \cdot \upsilon \cdot \text{share}(\mu)} \cdot \prod_{\iota=1}^{n(\mu)} g_T^{\tau \cdot \tau' \cdot \upsilon \cdot coef(\mu) \cdot w_\iota(\mu) \cdot v_\iota(\mu)} \right)^{const(\mu)}$$

$$= \prod_{\mu \in SET \wedge LAB(\mu) = v(\mu)^{\rightarrow}} g_T^{\tau \cdot \tau' \cdot \upsilon \cdot const(\mu) \cdot \text{share}(\mu)}$$

(124)

is satisfied.

From Formulas (66), (85), (102), (109), (114) and (116), $$\prod_{\mu \in SET \wedge LAB(\mu) = \neg v(\mu)^{\rightarrow}} e_\mu(C(\mu), D^*(\mu))^{const(\mu)/(v)(\mu)^{\rightarrow} \cdot w(\mu)^{\rightarrow})} = \prod_{\mu \in SET \wedge LAB(\mu) = \neg v(\mu)^{\rightarrow}} e_\mu \left( \upsilon \cdot \sum_{\iota=1}^{n(\mu)} w_\iota(\mu) \cdot b_\iota(\mu) + \sum_{\iota=n(\mu)+1}^{n(\mu)+\zeta(\mu)} \upsilon_\iota(\mu) \cdot b_\iota(\mu), \text{share}(\mu) \cdot \right.$$
$$\left. \sum_{\iota=1}^{n(\mu)} v_\iota(\mu) \cdot b_\iota^*(\mu) + \sum_{\iota=n(\mu)+1}^{n(\mu)+\zeta(\mu)} coef_\iota(\mu) \cdot b_\iota^*(\mu) \right)^{const(\mu)/(v(\mu)^{\rightarrow} \cdot w(\mu)^{\rightarrow})}$$

$$= \prod_{\mu \in SET \wedge LAB(\mu) = \neg v(\mu)^{\rightarrow}} \left\{ \prod_{\iota=1}^{n(\mu)} e_\mu(b_\iota(\mu), b_\iota^*(\mu))^{\upsilon \cdot \text{share}(\mu) \cdot w_\iota(\mu) \cdot v_\iota(\mu)} \right\}^{const(\mu)/(v(\mu)^{\rightarrow} \cdot w(\mu)^{\rightarrow})}$$

$$= \prod_{\mu \in SET \wedge LAB(\mu) = \neg v(\mu)^{\rightarrow}} \left\{ \prod_{\iota=1}^{n(\mu)} g_T^{\tau \cdot \tau' \cdot \upsilon \cdot \text{share}(\mu) \cdot w_\iota(\mu) \cdot v_\iota(\mu)} \right\}^{const(\mu)/(v)(\mu)^{\rightarrow} \cdot w(\mu)^{\rightarrow})}$$

$$= \prod_{\mu \in SET \wedge LAB(\mu) = \neg v(\mu)^{\rightarrow}} \left\{ g_T^{\tau \cdot \tau' \cdot \upsilon \cdot \text{share}(\mu) \cdot v(\mu)^{\rightarrow} \cdot w(\mu)^{\rightarrow}} \right\}^{const(\mu)/(v(\mu)^{\rightarrow} \cdot w(\mu)^{\rightarrow})}$$

$$= \prod_{\mu \in SET \wedge LAB(\mu) = \neg v(\mu)^{\rightarrow}} g_T^{\tau \cdot \tau' \cdot \upsilon \cdot const(\mu) \cdot \text{share}(\mu)}$$

(125)

is satisfied.

Therefore, from Formulas (105) and (123) to (125), $$K = g_T^{\tau \cdot \tau' \cdot (-SE \cdot \upsilon + \upsilon')} \cdot \prod_{\mu \in SET \wedge LAB(\mu) = v(\mu)^{\rightarrow}} g_T^{\tau \cdot \tau' \cdot \upsilon \cdot const(\mu) \cdot \text{share}(\mu)} \cdot$$
$$\prod_{\mu \in SET \wedge LAB(\mu) = \neg v(\mu)^{\rightarrow}} g_T^{\tau \cdot \tau' \cdot \upsilon \cdot const(\mu) \cdot \text{share}(\mu)} =$$
$$g_T^{\tau \cdot \tau' \cdot (-SE \cdot \upsilon + \upsilon')} \cdot g_T^{\tau \cdot \tau' \cdot \upsilon \cdot SE} = g_T^{\tau \cdot \tau' \cdot \upsilon'}$$

(126)

is satisfied.

For example, when $\tau = \tau' = 1_F$, $$K = g_T^{\upsilon'} \in G_T$$ (127)

is satisfied.

(Dec-4) The common key K is used to generate a plaintext M' as follows.

$$M' = Dec_K(C(\Psi+1))$$ (128)

For example, in the case of the common key encryption scheme shown in Formula (120), the plaintext M' is generated as follows.

$$M' = C(\Psi+1)/K$$ (129)

[Example of the Process of (Dec-1)]

A specific example of the process of (Dec-1) will be described below. For simplicity, an example where the COL-dimensional vector $GV^{\rightarrow}$ in Formula (98) is used will be described here. However, this does not limit the present invention; the process described below may be expanded when a generalized COL-dimensional vector $GV^{\rightarrow}$ as shown in Formula (96) is used.

Figure 34:
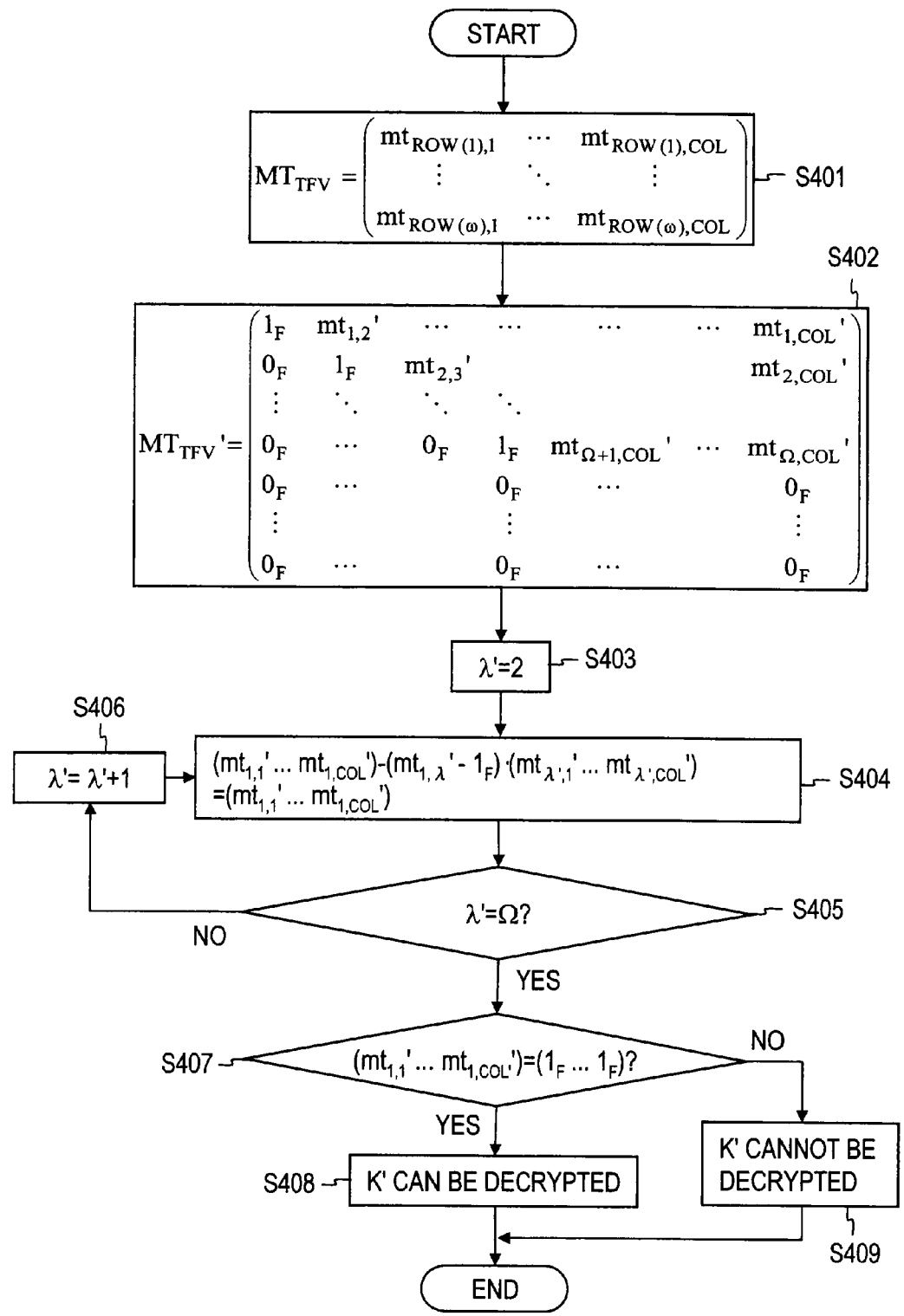
FIG. 34 is a diagram illustrating a specific example of a process (Dec-1) for a functional encryption.

As illustrated in FIG. 34, a decryption unit uses condition information $VSET2 = \{\lambda, v(\lambda)^{\rightarrow} | \lambda = 1, \ldots, \Psi\}$ corresponding to a labeled matrix LMT(MT, LAB), attribute information $VSET1' = \{\lambda, w(\lambda)^{\rightarrow} | \lambda = 1, \ldots, \Psi\}$ contained in a ciphertext $C_1'$, and the labels $LAB(\lambda)$ of the LMT(MT, LAB) to generate a submatrix $MT_{TFV}$ shown in Formulas (101) to (104). Here, $MT_{TFV}$ is written as follows.

$$MT_{TFV} = \begin{pmatrix} mt_{ROW(1),1} & \cdots & mt_{ROW(1),COL} \\ \vdots & \ddots & \vdots \\ mt_{ROW(\omega),1} & \cdots & mt_{ROW(\omega),COL} \end{pmatrix} \quad (130)$$

$MT_{TFV}$ in Formula (130) is a matrix of ω rows and COL columns, where ω is an integer greater than or equal to 1, ROW(1), ..., ROW(ω) are row numbers ROW(1), ..., ROW(ω) ⊂ {1, ..., Ψ} of the matrix MT (Formula (94)) in which LIT(ROW(1))=1, ..., LIT(ROW(ω))=1 (step S401).

Then the decryption unit performs operations on each of the row vectors $mt_{\lambda'}\vec{\ } = (mt_{\lambda',1}, \ldots, mt_{\lambda',COL})$ (λ'= ROW(1)..., ROW(ω)) of $MT_{TFV}$ and operations between the row vectors $mt_{\lambda'}\vec{\ }$ to generate an upper triangular matrix $MT_{TFV}'$, where a submatrix from the first row and column to the Ωth row and column is an Ω×Ω upper triangular matrix in which diagonal elements are multiplicative identities and, all of the elements of the Ω+1 and subsequent vectors $mt_{\lambda'}\vec{\ }$, if any, are additive identities $0_F$. Here, Ω is an integer greater than or equal to 1 and less than or equal to the number of rows and the number of columns of the submatrix $MT_{TFV}$. $MT_{TFV}'$ may be as follows, for example.

$$MT_{TFV}' = \begin{pmatrix} 1_F & mt'_{1,2} & \cdots & \cdots & \cdots & \cdots & mt'_{1,COL} \\ 0_F & 1_F & mt'_{2,3} & & & & mt'_{2,COL} \\ \vdots & \ddots & \ddots & \ddots & & & \\ 0_F & \cdots & 0_F & 1_F & mt'_{\Omega+1,COL} & \cdots & mt'_{\Omega,COL} \\ 0_F & \cdots & & 0_F & \cdots & & 0_F \\ \vdots & & & \vdots & & & \vdots \\ 0_F & \cdots & & 0_F & \cdots & & 0_F \end{pmatrix} \quad (131)$$

Here, there may not be the elements of the Ω+1th or more rows and there may not be the elements of the Ω+1th or more columns.

An upper triangular matrix $MT_{TFV}'$ as given above can be generated by using Gaussian elimination, for example. For example, first the row vector $mt_1\vec{\ } = (mt_{1,1}, \ldots, mt_{1,COL})$ of the submatrix $MT_{TFV}$ is divided by $mt_{1,1}$ and the resulting row vector is set as the first row vector of $MT_{TFV}'$. Then, the first row of $MT_{TFV}'$ multiplied by $mt_{2,1}$ is subtracted from the second row vector $mt_2\vec{\ } = (mt_{2,1}, \ldots, mt_{2,COL})$ to generate a row vector $(0_F, mt_{2,2}'', \ldots, mt_{2,COL}'')$, which then divided by $mt_{2,2}''$ and the resulting vector is set as the second vector of $MT_{TFV}'$. In this way, each previously generated row vector can be used to transform a row vector of a greater row number to generate an upper triangular matrix $MT_{TFV}'$. The operations for generating the upper triangular matrix $MT_{TFV}'$ are operations on row vectors and operations between row vectors; and different operations cannot be performed on different elements in the same row vector. Furthermore, if the modulus for division reached the additive identity $0_F$, a new row vector to be transformed is selected. If a submatrix $MT_{TFV}$ includes multiple row vectors that are not linearly independent of each other (that is, linearly dependent multiple row vectors), one vector that is representative of those row vectors is the row vector containing the elements of the Ω×Ω upper triangular matrix and the other row vectors are row vectors that consists only of the additive identity $0_F$ (step S402).

The decryption unit then sets λ'=2 (step S403). The decryption unit sets $$(mt_{1,1}' \ldots mt_{1,COL}') - (mt_{1,\lambda'}' = 1_F) \cdot (mt_{\lambda',1}' \ldots mt_{\lambda',COL}') \quad (132)$$

as new $(mt_{1,1}' \ldots mt_{1,COL}')$ to update the row vector $(mt_{1,1}' \ldots mt_{1,COL}')$ of the first row of the upper triangular matrix $MT_{TFV}'$. Here, $(mt_{\lambda',1}' \ldots mt_{\lambda',COL}')$ represents the row vector of the λ'-th row of the upper triangular matrix $MT_{TFV}'$. The decryption unit determines whether or not λ'=Ω (step S405). If not λ'=Ω, the decryption unit sets λ'+1 as new λ' (step S406) and then returns to step S404. On the other hand, if λ'=Ω, the decryption unit determines whether or not $$(mt_{1,1}' \ldots mt_{1,COL}') = (1_F, \ldots, 1_F) \quad (133)$$

is satisfied (step S407). If so, the decryption unit determines that K' can be decrypted (step S408); otherwise, the decryption unit determines that K' cannot be decrypted (step S409).

All the specifics of the operation for generating the upper triangular matrix $MT_{TFV}'$ at step S402 and all the specifics of the operation at step S404 can be stored in a storage. These operations can be applied to a matrix that is obtained by substituting the respective elements of the submatrix $MT_{TFV}$ with indeterminate elements to obtain the elements of the first row. The coefficients of the obtained elements can be the coefficients const(ind) that satisfies Formula (105). That is, the coefficients const(ind) can be the coefficients of the row vector of the first row that is obtained by applying the above operations to a matrix that is obtained by substituting the respective elements of the submatrix $MT_{TFV}$ with indeterminate elements, where the obtained row vector of the first row corresponds to the row vector of the submatrix $MT_{TFV}$ corresponding to the ind-th row vector of the matrix MT (see the relationships of Formulas (97) and (99)).

[Variations]

Here, $g_T^\tau$, $g_T^{\tau'}$, $g_T^{\tau \cdot \tau'}$, instead of $g_T$, may be treated as the generator of $G_T$. Furthermore, a map that determines correspondence between λ of key information SKS and λ of a ciphertext may be used to determine a combination of C(λ) and D*(λ) to perform the process of [Dec(PK, SKS, C): Decryption]. Furthermore, $1_F$ may be the n(λ)-th elements $v_{n(\lambda)}(\lambda)$ of condition information VSET2={λ, v(λ)|λ=1, ..., Ψ}, as well as the first elements $w_1(\lambda)$ of attribute information VSET1={λ, w(λ)$\vec{\ }$|λ, ..., Ψ}. If elements $w_1(\lambda)$ are not $1_F$, $w(\lambda)\vec{\ }/w_1(\lambda)$ may be used instead of $w(\lambda)\vec{\ }$; if $v_{n(\lambda)}(\lambda)$ are not $1_F$, $v(\lambda)\vec{\ }/v_{n(\lambda)}(\lambda)$ may be used instead of $v(\lambda)\vec{\ }$.

A scheme in which attribute information VSET1 corresponds to a ciphertext and condition information VSET2 corresponds to key information is called key policy (KP) scheme. Instead of this scheme, a ciphertext (CP) scheme may be used in which attribute information VSET1 corresponds to key information and condition information VSET2 corresponds to a ciphertext. That is, attribute information VSET1={λ, w(λ)$\vec{\ }$|λ=1, ..., Ψ} may be used instead of condition information VSET2={λ, v(λ)$\vec{\ }$|λ=1, ..., Ψ} and condition information VSET2={λ, v(λ)$\vec{\ }$|λ=1, ..., Ψ} may be used instead of attribute information VSET1={λ, w(λ)$\vec{\ }$|λ=1, ..., Ψ}.

In the CP scheme, the first elements $v_1(\lambda)$ of condition information VSET2={λ, v(λ)$\vec{\ }$|λ=1, ..., Ψ} are $1_F$, the label LAB(λ) corresponding to PRO(λ) represents $w(\lambda)\vec{\ }$, and the label LAB(λ) corresponding to ¬PROW represents ¬$w(\lambda)\vec{\ }$. In the CP scheme, instead of Formulas (108) and (109), $$D^*(\lambda) = (\text{share}(\lambda) + \text{coef}(\lambda) \cdot w_1(\lambda)) \cdot b_1^*(\lambda) + \quad (134)$$
$$\sum_{\iota=2}^{n(\lambda)} \text{coef}(\lambda) \cdot w_\iota(\lambda) \cdot b_\iota^*(\lambda) + \sum_{\iota=n(\lambda)+1}^{n(\lambda)+\zeta(\lambda)} \text{coef}_\iota(\lambda) \cdot b_\iota^*(\lambda)$$

is generated for λ that satisfies LAB(λ)=w(λ)$^\rightarrow$, and $$D^*(\lambda)=\text{share}(\lambda)\cdot\Sigma_{\iota=1}^{n(\lambda)}w_\iota(\lambda)\cdot b_\iota^*(\lambda)+\Sigma_{\iota=n(\lambda)+1}^{n(\lambda)+\zeta(\lambda)}\text{coef}_\iota(\lambda)\cdot b_\iota^*(\lambda) \quad (135)$$

is generated for λ that satisfies LAB(λ)=∨ w(λ)$^\rightarrow$. In the CP scheme, instead of Formula (114), $$C(\lambda)=\upsilon\cdot\Sigma_{\iota=1}^{n(\lambda)}v_\iota(\lambda)\cdot b_\iota+\Sigma_{\iota=n(\lambda)+1}^{n(\lambda)+\zeta(\lambda)}\upsilon_\iota(\lambda)\cdot b_\iota(\lambda) \quad (136)$$

is generated and instead of Formula (121), $$C=(VSET2, C(0), \{C(\lambda)\}_{(\lambda, v(\lambda)\rightarrow)\in VSET2}, C(\Psi+1)) \quad (137)$$

is generated. Here, the subscript "v(λ)$^\rightarrow$" represents "v(λ)$^\rightarrow$".

[Principles of Fourth to Sixth Embodiments]

Principles of the fourth to sixth embodiments will be described.

The functional encryption scheme using the access structure described above is used in the fourth to sixth embodiments. Functional encryption applied systems of the fourth to sixth embodiments include a sender apparatus (information output apparatus) and a recipient apparatus (information processing apparatus) and executes functional-encryption-applied protocols (protocols according to a functional encryption scheme) in which a ciphertext is correctly decrypted when the truth value of a logical formula corresponding to a combination of attribute information VSET1 (first correspondence information) and condition information VSET2 (second correspondence information) is true.

First, identification information for identifying one or more functional-encryption-scheme-applied protocols is input into an identifier identifying unit of the sender apparatus. The identifier identifying unit identifies an identifier for each of protocols or a combination of the protocols according to a rule established for each of the protocols or each combination of the protocols that is identified by the identification information, and outputs the identified identifier or identifiers. Identifiers in the fourth to sixth embodiment are vectors.

The type of attribution information VSET1 (in other words, a property of attribute information VSET1) to be used is determined for each of the functional-encryption-scheme-applied protocols. The rule identifies an identifier which determines attribute information VSET1 of the type to be used for a protocol or a combination of protocols identified by identification information. For example, the rule in the case where the protocol is a Timed-Release encryption protocol is that an identifier should be information that identifies a time point after the time of generation of first information. The rule in the case where the protocol is a Forward Secure encryption protocol or Key Insulated encryption protocol is that an identifier should be information that identifies a time period including the time of generation of first information or a time period after the time of generation of first information. The rule in the case where the protocol is a CCA2 secure encryption protocol is that an identifier is information that identifies one-time information that is newly set each time first information is generated. The rule in the case where the protocol is a Keyword search protocol is that an identifier is information that identifies a keyword for searching a database.

One or more identifiers identified by the identifier identifying unit are input into an attribute information setting unit of the sender apparatus. The attribute information setting unit sets one piece of attribution information VSET1 (a particular piece of first correspondence information) that is determined for the one identifier or combination of the two or more identifiers, and outputs the set piece of attribute information VSET1. An output unit of the sender apparatus outputs first information, which is a ciphertext or key information of the functional encryption scheme that corresponds to the attribute information VSET1 output from the attribute information setting unit.

The first information and second information read from a storage are input into a decryption unit of the recipient apparatus. The second information is key information or a ciphertext of the functional encryption scheme. If the first information is a ciphertext corresponding to attribution information VSET1, the second information is key information corresponding to condition information VSET2 (a particular piece of second correspondence information); if the first information is key information corresponding to attribute information VSET1, the second information is a ciphertext corresponding to condition information VSET2 (a particular piece of second correspondence information).

As has been described above, the attribute information VSET1 (first correspondence information) includes one or more vectors w(λ)$^\rightarrow$ (first partial correspondence information) and the condition information VSET2 (second correspondence information) includes one or more vectors v(λ)$^\rightarrow$ (second partial correspondence information). When vectors w(λ)$^\rightarrow$ and v(λ)$^\rightarrow$ are input into a function (a predetermined function) for calculating the inner product of those vectors, the function returns an inner product of 0 (a predetermined value) or a nonzero, depending on a combination of the value of the vector w(λ)$^\rightarrow$ and the value of the vector v(λ)$^\rightarrow$. For each combination of vector w(λ)$^\rightarrow$ and vector v(λ)$^\rightarrow$, it is predetermined whether the combination of the vector w(λ)$^\rightarrow$ and the vector v(λ)$^\rightarrow$ is determined to be true when their inner product is 0 (predetermined value) or whether the combination of the vector w(λ)$^\rightarrow$ and the vector v(λ)$^\rightarrow$ is determined to be true when their inner product is nonzero (Formulas (101) and (102)).

The decryption unit of the recipient apparatus inputs the first information and the second information into a decryption function of the functional encryption scheme, performs a decryption process and outputs a decryption result obtained by the process. As has been described above, the decryption function of the functional encryption scheme using the access structure generates a correct decryption result when a set of combinations of vectors w(λ)$^\rightarrow$ and v(λ)$^\rightarrow$ that yield true satisfies a predetermined condition. Specifically, a vector $(mt_{\lambda,1}, \ldots, mt_{\lambda,COL})$ is associated with each of the vectors w(λ)$^\rightarrow$ or each of the vectors v(λ)$^\rightarrow$ (see the labeled matrix LMT(MT, LAB), Formula (34)). That is, in the KP scheme, a vector $(mt_{\lambda,1}, \ldots, mt_{\lambda,COL})$ (LIT(λ)=1) is associated with a vector v(λ)$^\rightarrow$; in the CP scheme, a vector $(mt_{\lambda,1}, \ldots, mt_{\lambda,COL})$ (LIT(λ)=1) is associated with a vector w(λ)$^\rightarrow$. As has been described above, a decryption function of the functional encryption scheme using the access structure generates a correct decryption result when a particular vector GV$^\rightarrow$ exists in a vector space spanned by vectors $(mt_{\lambda,1}, \ldots, mt_{\lambda,COL})$ (LIT(λ)=1) associated with vectors w(λ)$^\rightarrow$ or vectors v(λ)$^\rightarrow$ included in each combination of the vectors w(λ)$^\rightarrow$ and w(λ)$^\rightarrow$ that yields true (that is, when GV$^\rightarrow$∈span <MT$_{TFV}$>>.) As has been described above, that a particular vector GV$^\rightarrow$ exists in a vector space spanned by vectors $(mt_{\lambda,1}, \ldots, mt_{\lambda,COL})$ (LIT(λ)=1), is equivalent to that the truth value of a logical formula corresponding to the combination of attribute information VSET1 corresponding to first information and condition information VSET2 corresponding to second information is true. That is, in this functional encryption scheme, a ciphertext is correctly decrypted when the truth value of a logical formula corresponding to the combination of attribute information VSET1 and condition information VSET2 is true.

Attribute information VSET1 is information determined for one identifier or a combination of two or more identifiers and takes on such a value that a correct decryption result can be obtained for each of a plurality of values that the attribute information VSET1 takes on when condition information VSET2 and any one piece of attribute information VSET1 are input into a decryption function. That is, the same second information can be used with one or more pieces of first information to accomplish correct decryption in the fourth to sixth embodiments. Accordingly, when the sender apparatus chooses one identifier or a combination of two or more identifiers and switches from one protocol to another according to the chosen identifier to generate first information, the recipient apparatus does not need to generate a different piece of second information for each newly chosen protocol. That is, even if only one piece of second information corresponding to one piece of condition information VSET2 is stored in the storage of the recipient apparatus, the recipient apparatus can deal with first information for one or more protocols chosen or a combination of protocols chosen. Consequently, in the first to third embodiment, switching can be made from one protocol to another according to a chosen identifier without needing complicated processing.

When identification information for identifying two or more protocols are input into the identifier identifying unit, the combination of two or more protocols, that is, a new protocol having characteristics of the two or more protocols can be constructed.

Since a functional encryption scheme is used, protocols can be flexibly combined in the fourth to sixth embodiments. That is, a correct decryption result is generated when a combination of attribute information VSET1 corresponding to first information and condition information VSET2 corresponding to second information causes a logical formula to return true. A combination of two or more protocols corresponds to a combination of identifiers, which corresponds to attribute information VSET1. There is no restraint on the way of combination of the identifiers as long as the function returns a predetermined value.

In contrast, if a hierarchical ID-based encryption scheme adopting an ID-based encryption scheme (for example, Reference literature 10 "C. Gentry, A. Silverberg, 'Hierarchical ID-based cryptography,' Proceedings of ASIACRYPT 2002, Lecture Notes in Computer Science, Springer-Verlag, 2002.") is used, restraints are placed on the way of combining protocols. That is, in the hierarchical ID-based encryption, the way of combination of a plurality of identifiers corresponding to a plurality of protocols is limited. Specifically, a new identifier generated by combining a plurality of identifiers need to constitute a tree structure and the new identifier needs to contain its parent identifier in the hierarchical ID-based encryption scheme. For example, once identifiers ID1 and ID2 have been combined to generate a new identifier, ID1|ID2, identifiers ID1, ID2 and ID3, for example, can be combined to generate another new identifier ID1|ID2|ID3 but identifiers ID1 and ID3 cannot be combined to generate a new identifier ID1|ID3.

The sender apparatus may further include a first switching unit that selects, according to a protocol identified by identification information, whether attribute information VSET1 is brought into correspondence with an encryption function of the functional encryption scheme or whether the attribute information VSET1 is brought into correspondence with a key generation function of the functional encryption. The recipient apparatus may further include a second switching unit that selects, according to a protocol identified by identification information, whether condition information VSET2 is brought into correspondence with a key generation function of the functional encryption scheme or whether the condition information VSET2 is brought into correspondence with and an encryption function of the functional encryption. This provision extends the range of protocols to choose from.

Some of the fields of attribute information VSET1 and condition information VSET2 may be reserved as spare fields for some future use. For example, values of at least some of the vectors $w(\lambda)^{\rightarrow}$ (first partial correspondence information) included in the attribute information VSET1 may be fixed previously, values of at least some of the vectors $v(\lambda)^{\rightarrow}$ (second partial correspondence information) included in the condition information VSET2 (second correspondence information) may be fixed previously, and these vectors having fixed values may be used as spare fields. For example, the inner product of first partial correspondence information which is vectors $w(\lambda)^{\rightarrow}$ whose values are fixed previously and second partial correspondence information which is vectors $v(\lambda)^{\rightarrow}$ whose values are fixed previously may be set to 0 (zero element) regardless of one identifier or a combination of multiple identifiers. This makes it possible to add selectable protocols and propositional variable and logical symbols of a logical formula when such a need arises later.

Furthermore, if vector $w(\lambda)^{\rightarrow}$ reserved as spare fields (first partial correspondence information) is a vector all of whose elements are zero elements (zero vector), the first information corresponding to attribute information VSET1 containing the spare fields is upward compatible with first information updated with some values placed into the spare fields. That is, when attribute information VSET1 and condition information VSET2 are updated by placing some values in the spare fields of attribute information VSET1 and condition information VSET2, correct decryption is accomplished using the first information corresponding to the attribute information VSET1 before the update and the second information corresponding to the updated condition information VSET2, provided that correct decryption was accomplished before the update. This is because the inner product of the spare fields of attribute information VSET1 and condition information VSET2 is 0 regardless of the values placed in the spare fields in the updated condition information VSET2. For the same reason, if $v(\lambda)^{\rightarrow}$ (second partial correspondence information) reserved as spare fields is a vector all of whose elements are zero elements (zero vector), second information corresponding to the condition information VSET2 including the spare spaces is upward compatible with second information updated with some values placed into the spare fields.

If a vector $w(\lambda)^{\rightarrow}$ reserved as spare fields of attribute information VSET1 is a zero vector and a vector $v(\lambda)^{\rightarrow}$ reserved as spare fields of condition information VSET2 is a vector including nonzero elements, first information corresponding to the attribute information VSET1 including the spare fields is upward compatible with first information updated with some values placed in the spare fields whereas second information corresponding to the condition information VSET2 including the spare fields is not upward compatible with second information updated with some values placed into the spare fields. On the other hand, if a vector $v(\lambda)^{\rightarrow}$ reserved as spare fields of condition information VSET2 is a zero vector and a vector $w(\lambda)^{\rightarrow}$ reserved as spare vectors of first attribute information VSET1 is a vector including nonzero-elements, the second information corresponding to the condition information VSET2 including the spare fields is upward compatible with second information updated with some values placed into the spare fields whereas the first information corresponding to the attribute information VSET1 including the spare fields is not upward compatible with the first information updated with some values placed into the spare fields. In this way, upward compatibility with updated information can be varied depending on the values in spare fields.

[Fourth Embodiment]

The fourth embodiment of the present invention will be described below. In the fourth embodiment, first information is a ciphertext corresponding to attribute information VSET1, second information is key information corresponding to condition information VSET2, a sender apparatus performs encryption, and a recipient apparatus performs decryption. This embodiment can be applied to cases where a functional-encryption-scheme applied protocol is a Timed-Release encryption protocol, a Forward Secure encryption protocol, a Key Insulated encryption protocol, or a CCA2 secure encryption protocol, or a combination of any of these protocols, for example. A KP scheme is used in this embodiment.

<Configuration>

Figure 35:
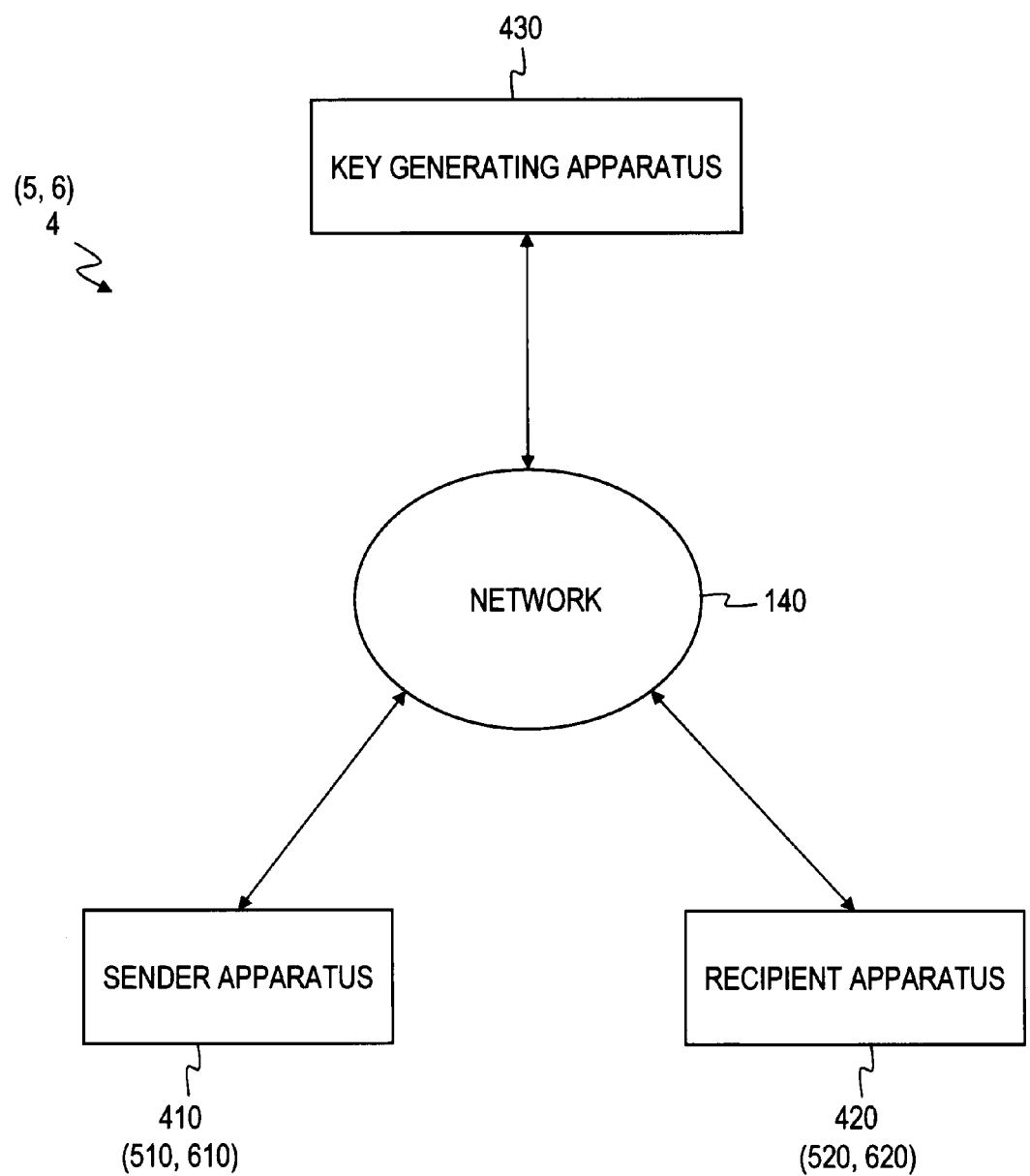
FIG. 35 is a block diagram illustrating a general configuration of a functional encryption applied system of a fourth embodiment.

FIG. 35 is a block diagram illustrating a general configuration of a functional encryption applied system 4 of the fourth embodiment. As illustrated in FIG. 35, the functional encryption applied system 4 of the embodiment includes a sender apparatus 410 (information output apparatus), a recipient apparatus 420 (information processing apparatus), and a key generating apparatus 430, which are connected onto a network 140. While one sender apparatus 410, one recipient apparatus 420, and one key generating apparatus 430 in FIG. 35 for convenience of explanation, more than one sender apparatus 410, recipient apparatus 420, and key generating apparatus 430 may exist.

[Sender Apparatus 410 (Information Output Apparatus)]

Figure 36:
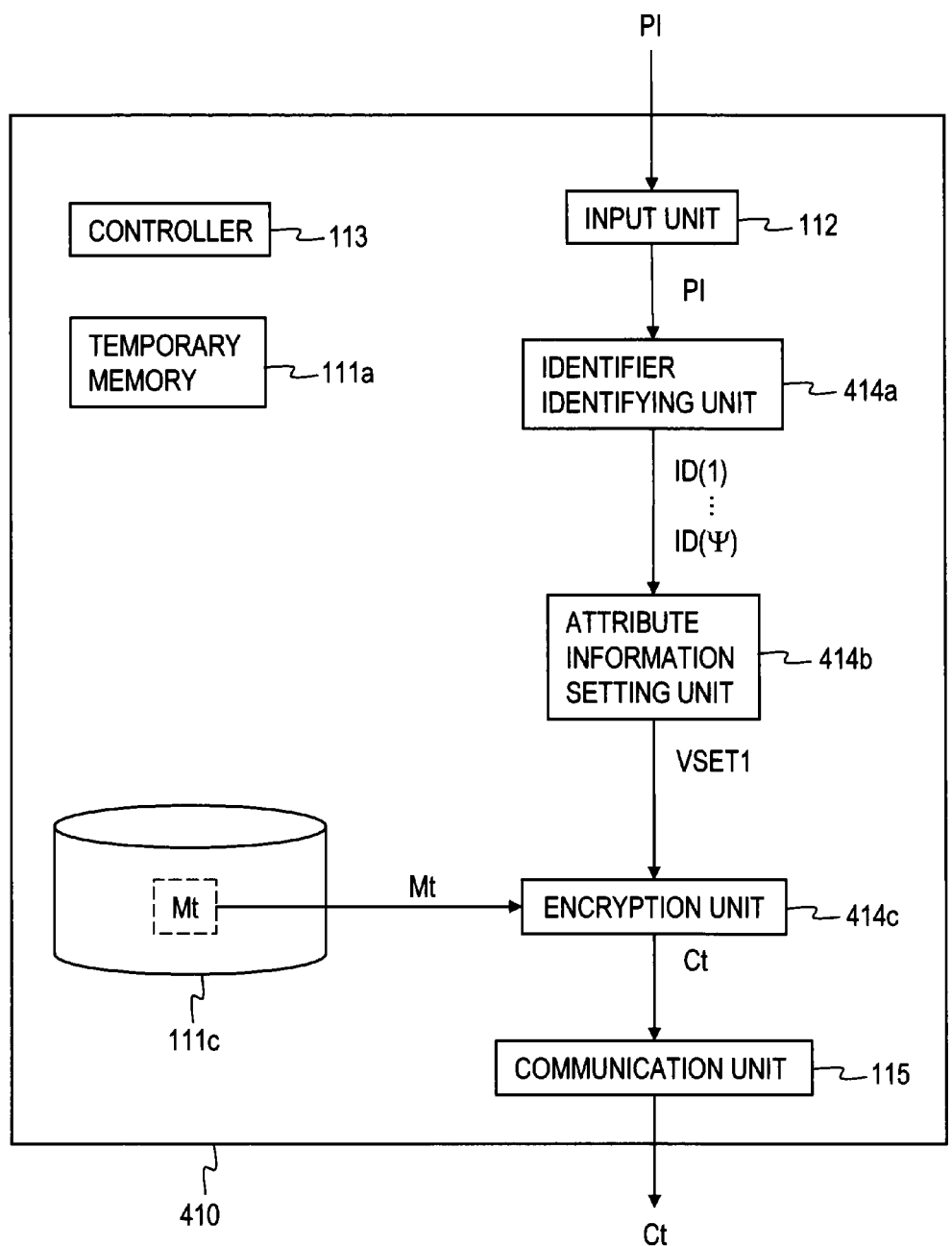
FIG. 36 is a block diagram illustrating a configuration of a sender apparatus (information output apparatus) of the fourth embodiment.

FIG. 36 is a block diagram illustrating a configuration of the sender apparatus 410 in FIG. 35.

As illustrated in FIG. 36, the sender apparatus 410 of the embodiment includes a temporary memory 111a, a storage 111c, an input unit 112, a controller 113, an identifier identifying unit 414a, an attribute information setting unit 414b (correspondence information setting unit), an encryption unit 414c, and a communication unit 115.

The sender apparatus 410 is a particular apparatus that is configured by loading a particular program into a well-known computer or special-purpose computer including components such as a CPU (central processing unit), a RAM (random-access memory), a ROM (read-only memory), for example, and causing the computer to execute the program. That is, the controller 113, the identifier identifying unit 414a, the attribute information setting unit 414b, and the encryption unit 414c are processing units configured by the CPU executing a given program, for example. At least some of the processing units of the sender apparatus 410 may be integrated circuits. The temporary memory 111a and the storage 111c are, for example, auxiliary storage devices such as RAMs, registers, cache memories, elements in an integrated circuit, or hard disks, or storage areas implemented by a combination of at least some of these. The input unit 112 is, for example, a keyboard, a mouse, or an input port, and the communication unit 115 is, for example, a communication device such as a modem or a LAN card.

The sender apparatus 410 performs processes under the control of the controller 113. Data output from the processing units of the sender apparatus 410 and data received at the communication unit 115 are temporarily stored in the temporary memory 111a, although description of such storage operations will be omitted in the following description. The data stored in the temporary memory 111a is read as needed, is input into the processing units of the sender apparatus 410, and is used for processing in the processing units.

[Recipient Apparatus 420 (Information Processing Apparatus)]

Figure 37:
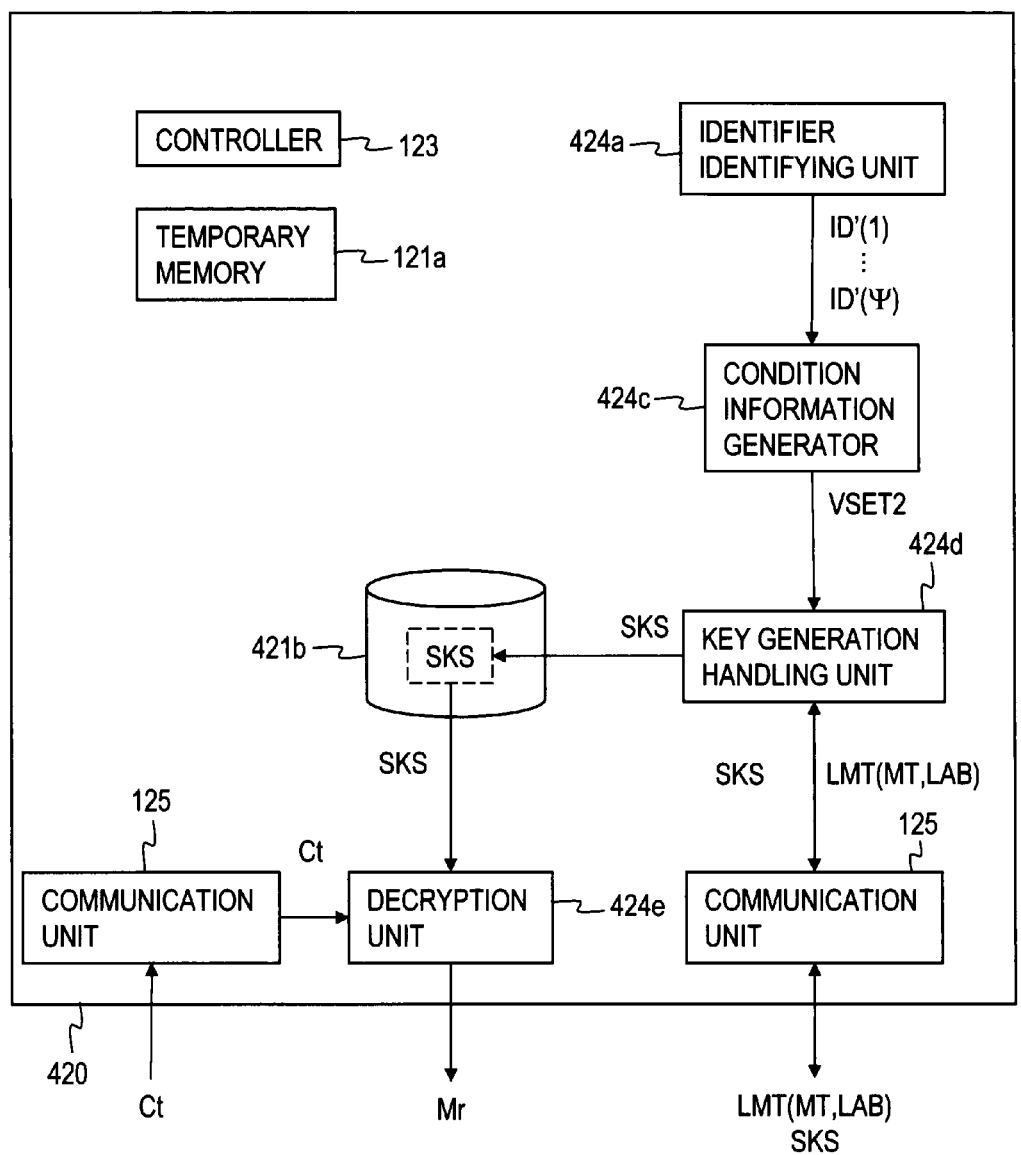
FIG. 37 is a block diagram illustrating a configuration of a recipient apparatus (information processing apparatus) of the fourth embodiment.

FIG. 37 is a block diagram illustrating a configuration of the recipient apparatus 420 in FIG. 35.

As illustrated in FIG. 37, the recipient apparatus 420 of this embodiment includes a temporary memory 121a, a storage 421b, a controller 123, an identifier identifying unit 424a, a condition information generator 424c, a key generation handling unit 424d, a decryption unit 424e, and a communication unit 125. While two blocks indicating the communication unit 125 are depicted in FIG. 37, this does not imply that two separate communication units 125 are required.

The recipient apparatus 420 is a particular apparatus that is configured by loading a particular program into a well-known computer or special-purpose computer including components such as a CPU, a RAM, and a ROM, for example, and causing the computer to execute the program. That is, the controller 123, the identifier identifying unit 424a, the condition information generator 424c, the key generation handling unit 424d, and the decryption unit 424e are processing units configured by the CPU executing a given program, for example. At least some of the processing units of the recipient apparatus 420 may be integrated circuits. The temporary memory 121a and the storage 421b are, for example, auxiliary storage devices such as RAMs, registers, cache memories, elements in an integrated circuit, or hard disks, or storage areas implemented by a combination of at least some of these. The communication unit 115 is a communication device such as a modem or a LAN card, for example.

The recipient apparatus 420 performs processes under the control of the controller 123. Data output from the processing units of the recipient apparatus 420 and data received at the communication unit 125 are temporarily stored in the temporary memory 121a, although description of such storage operations will be omitted in the following description. The data stored in the temporary memory 121a is read as needed, is input into the processing units of the recipient apparatus 420, and is used for processing in the processing units.

[Key Generating Apparatus 430]

Figure 38:
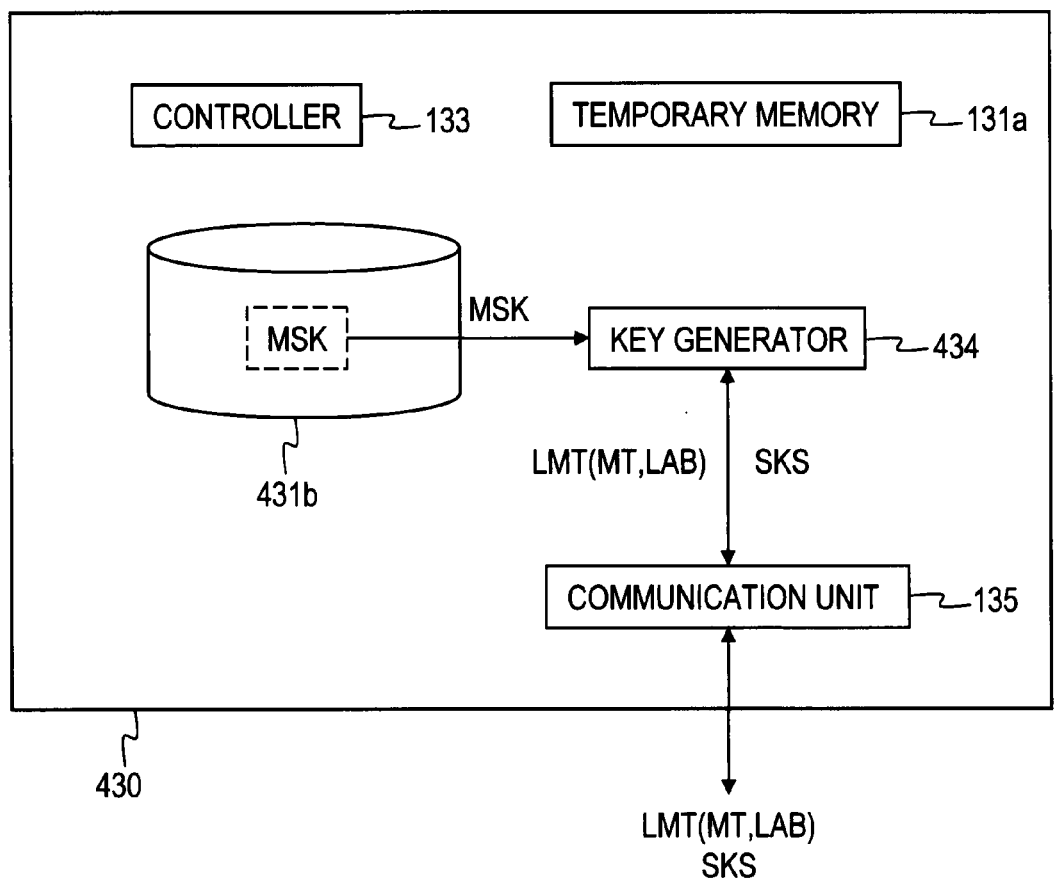
FIG. 38 is a block diagram illustrating a configuration of a key generating apparatus of the fourth embodiment.

FIG. 38 is a block diagram illustrating a configuration of the key generating apparatus 430 in FIG. 35.

As illustrated in FIG. 38, the key generating apparatus 430 of this embodiment includes a temporary memory 131a, a storage 431b, a controller 133, a key generator 434, and a communication unit 135.

The key generating apparatus 430 is a particular apparatus that is configured by loading a particular program into a well-known computer or special-purpose computer including components such as a CPU, a RAM, and a ROM, for example, and causing the computer to execute the program. That is, the controller 133 and the key generator 434 are processing units configured by the CPU executing a given program, for example. At least some of the processing units of the key generating apparatus 430 may be integrated circuits. The temporary memory 131a and the storage 431b are, for example, auxiliary storage devices such as RAMs, registers, cache memories, elements in an integrated circuit, or hard disks, or storage areas implemented by a combination of at least some of these. The communication unit 135 is a communication device such as a modem or a LAN card, for example.

The key generating apparatus 430 performs processes under the control of the controller 133. Data output from the processing units of the key generating apparatus 430 and data received at the communication unit 135 are temporarily stored in the temporary memory 131a, although description of such storage operations will be omitted in the following description. The data stored in the temporary memory 131*a* is read as needed, is input into the processing units of the key generating apparatus 430, and is used for processing in the processing units.

<Presetting>

Presetting of the functional encryption applied system 4 of this embodiment will be described below.

[Identification Information]

FIGS. 39A and 39B illustrate correspondence between identification information PI for identifying one or more protocols and the protocols in the fourth embodiment.

In the example in FIG. 39A, identification information PI is assigned to each protocol. Specifically, a Timed-Release encryption protocol is assigned to identification information PI=0, a Forward Secure encryption protocol is assigned to identification information PI=1, a Key Insulated encryption protocol is assigned to identification information PI=2, and a CCA2 secure encryption protocol is assigned to identification information PI=3 in this example. In this example, when one of the protocol is to be solely chosen, one piece of identification information PI corresponding to that protocol is identified; when a combination of two or more protocols is to be chosen, a combination of pieces of identification information PI corresponding to those two or more protocols is identified.

In the example in FIG. 39B, on the other hand, some identification information PI is assigned to each individual protocol and other identification information PI is assigned to each combination of two or more protocols. In this example, when any one of protocol is to be solely chosen, one piece of identification information PI corresponding to that protocol is identified; when a combination of two or more protocols is to be chosen, a piece of identification information PI corresponding to that combination of the two or more protocols is identified.

The identification information PI illustrated in FIG. 39 is illustrative only; identification information PI corresponding to one or more protocols may otherwise be identified.

[Identifier]

FIGS. 40A, 40B and 41 are diagrams for illustrating exemplary rules for identifying an identifier ID($\lambda$), each of which is established for each protocol or combination of protocols in the fourth embodiment. Each of the identifiers ID($\lambda$) in this embodiment is an n($\lambda$)-dimensional vector whose elements are the elements of a finite field $F_q$.

In the example in FIG. 40A, an identifier ID($\lambda$) is assigned to each selectable protocol.

A value determined according to the rule established for a chosen protocol is placed in the identifier ID($\lambda$) assigned to the protocol. For example, when the Timed-Release encryption protocol is chosen, information identifying a future time point (n($\lambda$)-dimensional vector corresponding to date and time or a count value) is placed in identifier ID(1). One example of the "future time point" is a time point after the time of generation of first information. When the Forward Secure encryption protocol or the Key Insulated encryption protocol is chosen, a value (n($\lambda$)-dimensional vector) determined by a combination of a unique identifier (such as the mail address, telephone number, or MAC address) of the recipient apparatus 420 or the user of the recipient apparatus 420 and a time period (such as a date and time period or a count value period) including the current time point is placed in identifier ID(2) or ID(3). One example of the "current time point" is the time of generation of first information. When the CCA2 secure encryption protocol is chosen, for example, one-time information (a random vector whose elements are random numbers) which is an n($\lambda$)-dimensional vector is placed in identifier ID(4).

In the other hand, a constant (const.) which is an n($\lambda$)-dimensional vector is placed in an identifier ID($\lambda$) assigned to a protocol not chosen. For example when only the Timed-Release encryption protocol is chosen, information identifying a future time point is placed in identifier ID(1) and the constant (const.) is placed in the other identifiers ID(2), ID(3) and ID (4). An example of the constant (const.) is an n($\lambda$)-dimensional zero vector. The constant placed in the identifiers ID($\lambda$) may be the same value or different values.

When a combination of a plurality of protocols is chosen, it is considered that the plurality of protocols of the combination were chosen, and values of the identifiers ID($\lambda$) are determined accordingly. For example, when the combination of the Forward Secure encryption protocol and the CCA2 secure encryption protocol is chosen, a value determined by a combination of a unique identifier of the recipient apparatus 420 or its user and a time period including the current time point is placed in identifier ID(2), one-time information is placed in identifier ID(4), and a constant (const.) is placed in the other identifiers ID(1), ID(3).

In the example in FIG. 40B, an identifier ID($\lambda$) is assigned only to a chosen protocol. For example, when only the Timed-Release encryption protocol is chosen, only identifier ID(1) that indicates information identifying a future time point is assigned. When the combination of the Forward Secure encryption protocol and the CCA2 secure encryption protocol is chosen, only identifier ID(2) determined by a combination of a unique identifier of the recipient apparatus 420 or its user and a time period including the current time point and identifier ID(4) indicating one-time information are assigned.

In the example in FIG. 41, an identifier ID($\lambda$) is assigned to each of selectable protocols and each selectable combination of protocols. A value that is determined according to a rule established for a chosen protocol or each of the protocols that of a chosen combination is placed in the identifier ID($\lambda$) assigned to the protocol or the combination. A constant (const.) is placed in the identifiers ID($\lambda$) assigned to the protocols and combinations not chosen. For example, when the combination of the Forward Secure encryption protocol and the CCA2 secure encryption protocol is chosen, a value determined by the combination of a unique identifier of the recipient apparatus 420 or its user, a time period including the current time point, and one-time information is placed in identifier ID(6) and a constant (const.) is placed in the other identifiers ID($\lambda$).

The method of determining identifiers described above is illustrative only; other method may be used to determine identifiers. For example, in a variation of the example in FIG. 41, an identifier ID($\lambda$) may be assigned to only a chosen protocol or a chosen combination of protocols. Furthermore, identifiers ID($\lambda$) obtained as described above may be combined (by bit combination, for example) to construct one identifier.

[Attribute Information (First Correspondence Information)]

Figures 42A, 42B:
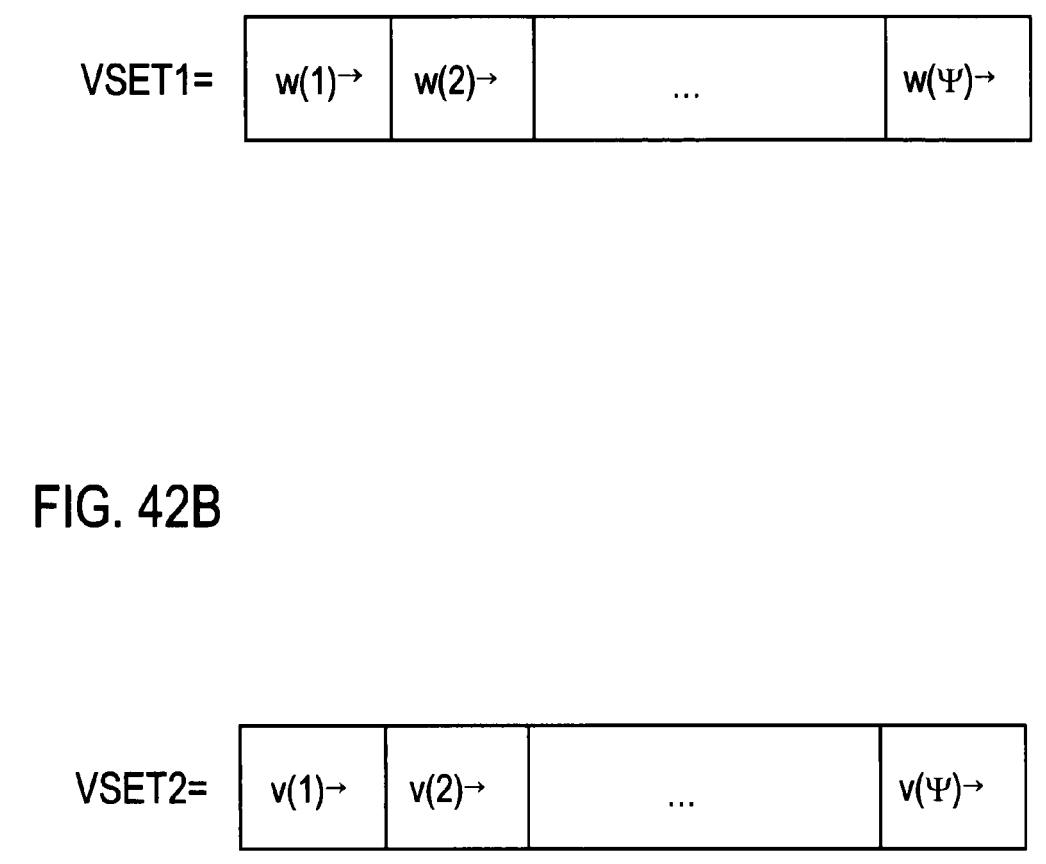

FIG. 42A illustrates a data structure of attribute information VSET1.

In this embodiment, each identifier ID($\lambda$) is an n($\lambda$)-dimensional vector $w(\lambda)^{\rightarrow}$ (first partial correspondence information) ($w(\lambda)^{\rightarrow} = ID(\lambda)$) and attribute information VSET1 is a set $\{w(\lambda)^{\rightarrow}\}_{\lambda=1, \ldots, \Psi}$ of n($\lambda$)-dimensional vectors $w(\lambda)^{\rightarrow}$ ($\lambda=1, \ldots, \Psi$).

[Condition Information (Second Correspondence Information)]

FIG. 42B illustrates a data structure of condition information VSET2.

In this embodiment, each identifier $ID'(\lambda)$ is an $n(\lambda)$-dimensional vector $v(\lambda)^{\rightarrow}$ (second partial correspondence information) ($v(\lambda)^{\rightarrow}=ID'(\lambda)$)) and condition information VSET2 is a set $\{v(\lambda)^i\}_{\lambda=,\ldots,\Psi}$ of $n(\lambda)$-dimensional vectors $v(\lambda)^{\rightarrow}$ ($\lambda=1, \ldots, \Psi$).

An identifier $ID'(\lambda)$ is an $n(\lambda)$-dimensional vector corresponding to an identifier $ID(\lambda)$ having a given value(s) assumed at the recipient apparatus 420. That is, a value for the identifier $ID'(\lambda)$ is determined such that the inner product of the identifier $ID'(\lambda)$ and the identifier $ID(\lambda)$ having the assumed given value(s) becomes 0. For example, if identifiers $ID(\lambda)$ are set according to the example in FIG. 40A, identifiers $ID'(\lambda)$ that yield inner products $ID(1)\cdot ID'(1)=0$, $ID(2)\cdot ID'(2)=0$, $ID(3)\cdot ID'(3)=0$, and $ID(4)\cdot ID'(4)=0$ are determined for identifiers $ID(1)$, $ID(2)$, $ID(3)$ and $ID(4)$, respectively, which have assumed given values determined according to the rules in FIG. 40A.

The "assumed given value(s)" corresponds to a condition set for a protocol and/or a combination of protocols assumed at the recipient apparatus 420. Specifically, the "assumed given value(s)" corresponds to a literal of a standard logical formula assumed at the recipient apparatus 420. For example, if a literal corresponding to $\lambda=1$ in a standard logical formula is a propositional variable PRO(1) of the proposition that "Identifier ID(2) takes on a value corresponding to a Timed-Release encryption protocol that enables decryption at a predetermined time point" or its logical negation $\vee$ PRO(1), an identifier ID'(1) that yields the inner product $ID(1)\cdot ID'(1)=0$ for identifier ID(1) having a value corresponding to the Timed-Release encryption protocol that enables decryption at a predetermined time point is set. For example, if a literal corresponding to $\lambda=2$ of a standard logical formula is a propositional variable PRO(2) of the proposition that "Identifier ID(1) takes on a value corresponding to that a Forward Secure encryption protocol is not chosen" or its logical negation $\vee$ PRO(2), then, identifier ID'(2) that yields the inner product $ID(2)\cdot ID'(2)=0$ for identifier ID(2)=const. that corresponds to that the Forward Secure encryption protocol is not chosen is set. Such rules for determining identifiers $ID'(\lambda)$ are predetermined and are set in the identifier identifying unit 424a of the recipient apparatus 420. Furthermore, whether a literal of a standard logical formula returns true or false when the inner product $ID(\lambda)\cdot ID'(\lambda)$ is 0, that is, whether a literal is set as a propositional variable PRO($\lambda$) or its logical negation $\vee$ PRO ($\lambda$) can be identified by a label LAB($\lambda$) of a labeled matrix LMT(MT, LAB).

[Logical Formulas Predetermined at Recipient Apparatus 420]

In this embodiment, a standard logical formula (for example PRO(1)$\wedge$ PRO(2)$\vee \neg$ PRO(3)) corresponding to conditions for a protocol and/or a combination of protocols are preset at the key generation handling unit 424d and the decryption unit 424e of the recipient apparatus 420. In other words, a labeled matrix LMT(MT, LAB) corresponding to the standard logical formula is preset in the key generation handling unit 424d and the decryption unit 424e. However, values for literals PRO($\lambda$) of standard logical formulas that identify PRO($\lambda$) and $\vee$ PRO($\lambda$) which are literals of standard logical formula and values for $n(\lambda)$-dimensional vectors $v(\lambda)^{\rightarrow}$ that identify labels LAB($\lambda$) are not preset. That is, whether a label is LAB($\lambda$)=$v(\lambda)^{\rightarrow}$ or LAB($\lambda$)=$\vee$ $v(\lambda)^{\rightarrow}$ is preset whereas values for $n(\lambda)$-dimensional vectors $v(\lambda)^{\rightarrow}$ are not preset. By setting a $n(\lambda)$-dimensional vector $v(\lambda)^{\rightarrow}$ that corresponds to an identifier $ID'(\lambda)$, a value for the $n(\lambda)$-dimensional vector $v(\lambda)^{\rightarrow}$ that identifies PROW and label LAB($\lambda$) is determined and the standard logical formula and the labeled matrix LMT (MT, LAB) are identified.

[Plaintext]

In this embodiment, a plaintext Mt to be encrypted is stored in the storage 111c of the sender apparatus 410.

[Master Secret Information]

Master secret information MSK (see [Setup($1^{sec}$, ($\Psi$; n(1), ..., n($\Psi$))): Setup]) of the functional encryption scheme is stored in the storage 431b of the key generating apparatus 430 of this embodiment.

<Processes>

Figure 43A:
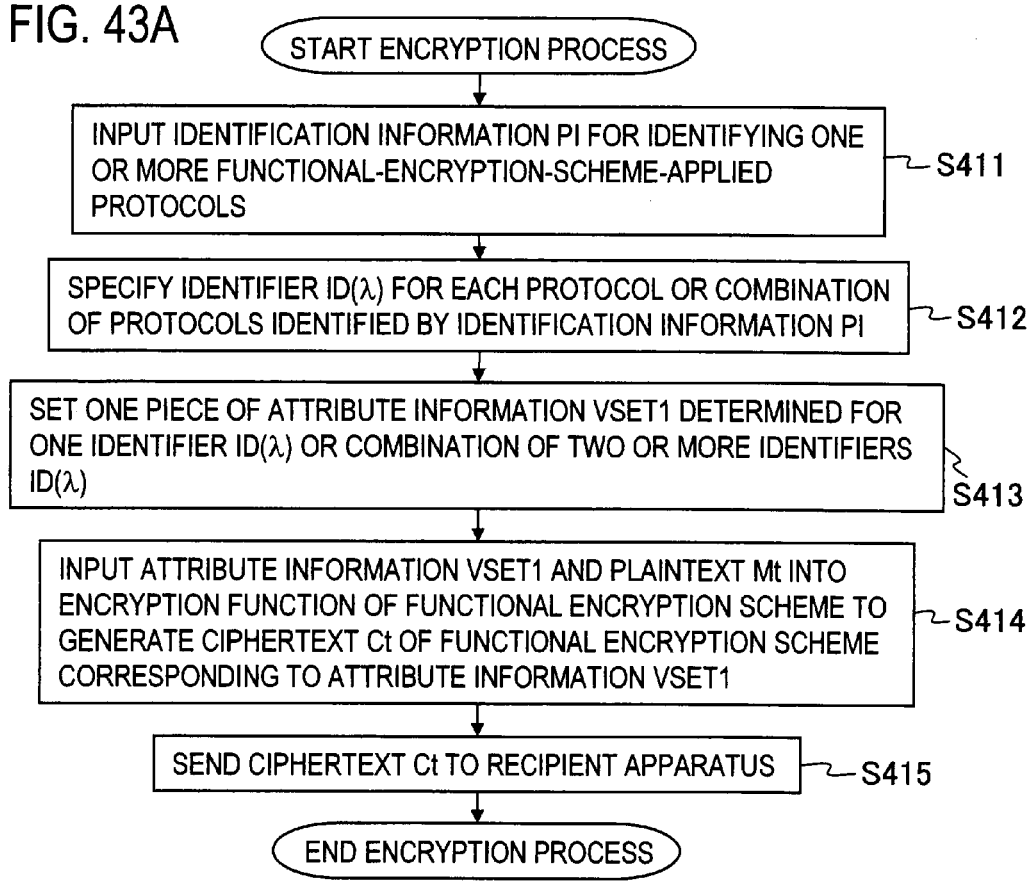
FIG. 43A is a flowchart illustrating an encryption process of the fourth embodiment.
Figure 43B:
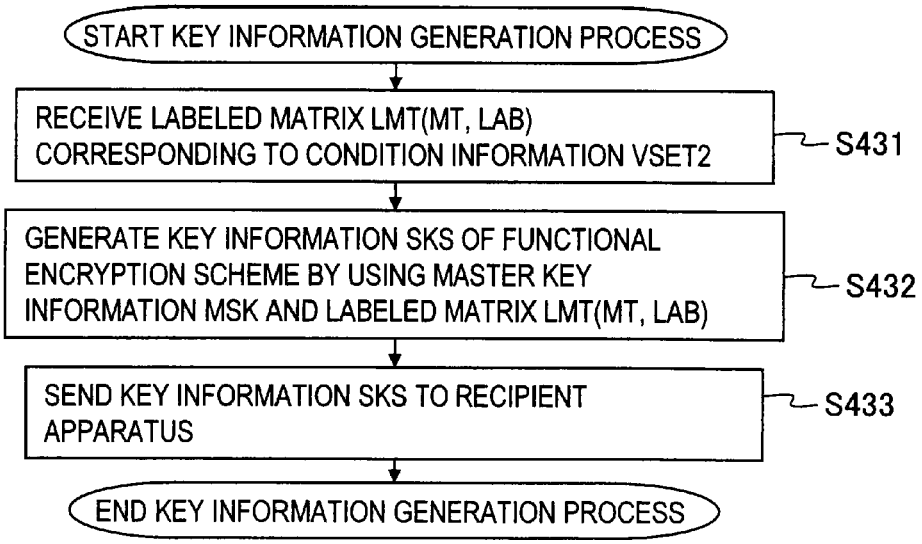
FIG. 43B is a flowchart illustrating a key information generation process of the fourth embodiment.
Figure 44:
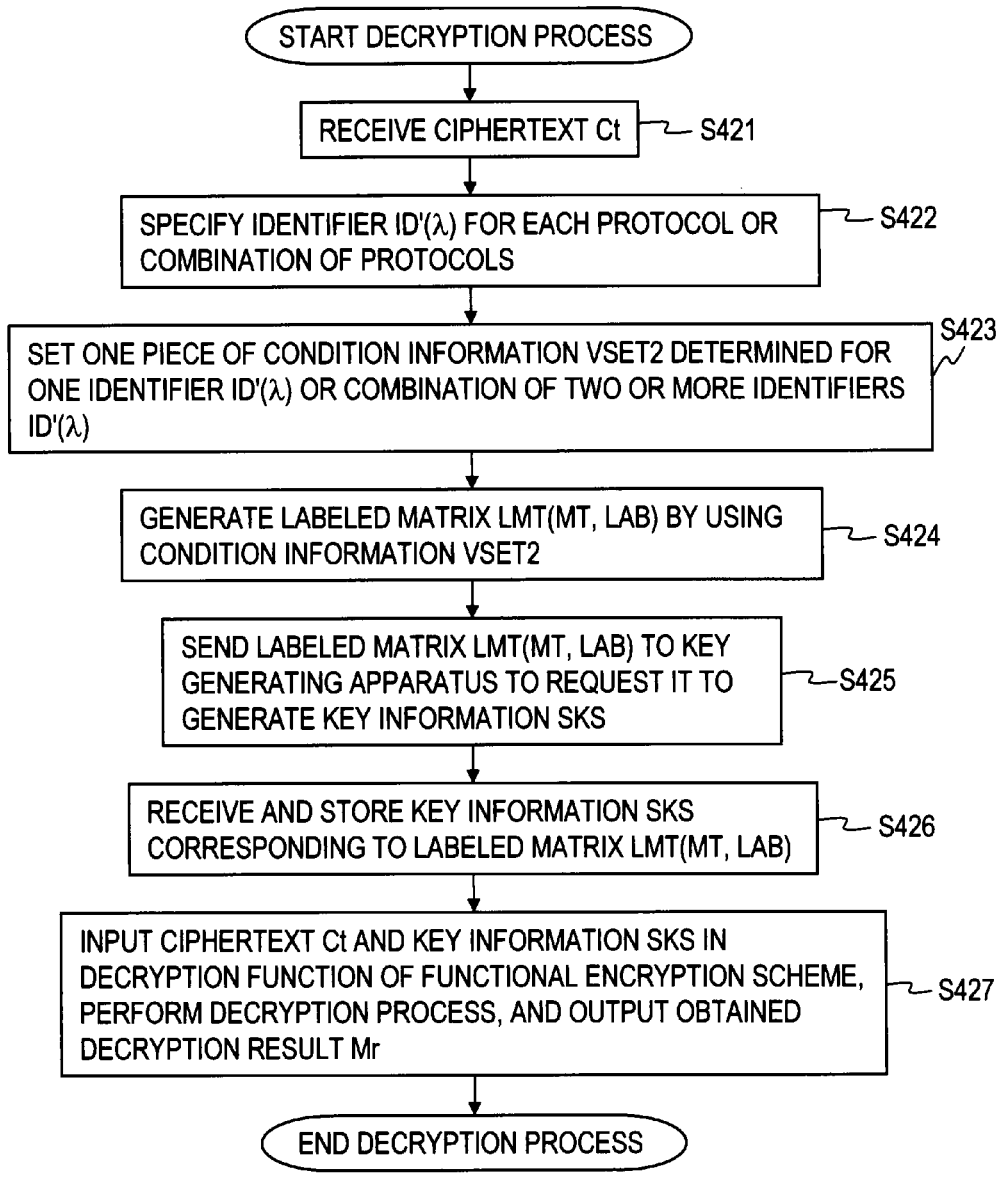
FIG. 44 is a flowchart illustrating a decryption process of the fourth embodiment.

FIG. 43A is a flowchart illustrating an encryption process of the fourth embodiment. FIG. 43B is a flowchart illustrating a key information generation process of the fourth embodiment. FIG. 44 is a flowchart illustrating a decryption process of the fourth embodiment. The processes of this embodiment will be described with reference to these flowcharts.

[Encryption Process]

In the encryption process of this embodiment, identification information PI for identifying one or more functional-encryption-scheme-applied protocols to be executed is input into the input unit 112 of the sender apparatus 410 (FIG. 36) (step S411). For example, if the identification information PI is determined as illustrated in FIG. 39A, a piece of identification information PI corresponding to one protocol chosen by a user or a combination of pieces of identification information PI corresponding to two or more protocols chosen by the user is input into the input unit 112. If identification information PI is determined as illustrated in FIG. 39B, a piece of identification information PI corresponding to one protocol or two or more protocols chosen by the user is input into the input unit 112.

The identification information PI input in the input unit 112 is then input into the identifier identifying unit 414a. The identifier identifying unit 414a identifies an identifier $ID(\lambda)$ for each protocol or each combination of protocols identified by the identification information PI according to a rule established for the protocol or the combination of the protocols (see FIGS. 40A, 40B and 41 for example), and outputs the identified one or more identifiers $ID(\lambda)$ (step S412).

One or more identifiers $ID(\lambda)$ output from the identifier identifying unit 414a are input into the attribute information setting unit 414b. The attribute information setting unit 414b sets one piece of attribute information VSET1= $\{w(\lambda)^{\rightarrow}\}_{\lambda=1,\ldots,\Psi}$ (particular piece of first correspondence information) determined for the one identifier $ID(\lambda)$ or the combination of the two or more identifiers $ID(\lambda)$ and outputs the set attribute information VSET1 (step S413).

The attribute information VSET1 output from the attribute information setting unit 414b is input into the encryption unit 414c. The encryption unit 414c reads a plaintext Mt from the storage 111c, inputs the attribute information VSET1 and the plaintext Mt into an encryption function of a functional encryption scheme to generate a ciphertext Ct for the plaintext Mt (step S414). Examples of the encryption function of the functional encryption scheme is Formula (121) determined by Formulas (113), (114) and (119) described above (C=Ct, M=Mt).

The ciphertext Ct generated is sent to the communication unit 115. The communication unit 115 (output unit) transmits the ciphertext Ct (first information) to the recipient apparatus 420 over the network 140 (step S415).

[Decryption Process/Key Generation Process]

In the decryption process of this embodiment, the communication unit 125 of the recipient apparatus 420 (FIG. 37) receives a ciphertext Ct (first information) (step S421).

This triggers the identifier identifying unit 424a to identify, for each protocol or each combination of protocols, one or more identifiers $ID'(\lambda)$ in the logical formula predetermined at the recipient apparatus 420 described above according to a rule established for each protocol or each combination of protocols (step S422).

The one or more identifiers ID'(λ) identified by the identifier identifying unit 424a are input into the condition information generator 424c. The condition information generator 424c sets $$v(\lambda)^{\rightarrow} = ID'(\lambda) \quad (138),$$

and sets a set $\{v(\lambda)^{\rightarrow}\}_{\lambda=1,\ldots,\Psi}$ of n(A)-dimensional vectors $v(\lambda)^{\rightarrow}$ ($\lambda=1,\ldots,\Psi$) as condition information VSET2 (particular piece of second correspondence information) and outputs the condition information VSET2 (step 423).

The condition information VSET2 output from the condition information generator 424c is input into the key generation handling unit 424d. The key generation handling unit 424d uses an n(λ)-dimensional vector $v(\lambda)^{\rightarrow}$ to identify labels LAB(λ) and determines a labeled matrix LMT(MT, LAB) (step S424). The labeled matrix LMT(MT, LAB) with the identified labels is sent to the communication unit 125. The communication unit 125 transmits the labeled matrix LMT (MT, LAB) to the key generating apparatus 430 over the network 140 to ask the key generating apparatus 430 to generate key information SKS corresponding to the labeled matrix LMT(MT, LAB) (step S425).

In the key generation process of this embodiment, the communication unit 135 of the key generating apparatus 430 (FIG. 38) receives the labeled matrix LMT(MT, LAB) corresponding to the condition information VSET2 (step S431). The labeled matrix LMT(MT, LAB) received at the communication unit 135 is input into the key generator 434.

The key generator 434 reads master secret information MSK from the storage 431b, uses the master secret information MSK and the labeled matrix LMT(MT, LAB) to generate key information SKS corresponding to the labeled matrix LMT(MT, LAB) and outputs the key information SKS (step S432). For example, the key generator 434 generates the key information SKS of Formula (112) determined by Formulas (95) to (99), (106), (108), and (109) and outputs the key information SKS. For example, the key generator 434 arbitrarily selects a COL-dimensional vector $CV^{\rightarrow} \in F_q^{COL}$ (Formula (36)) whose elements are the elements of the finite field $F_q$, uses a matrix MT (Formula (94)) and the COL-dimensional vector $CV^{\rightarrow}$ to calculate share information share $(\lambda) \in F_q$ ($\lambda=1,\ldots,\Psi$) according to Formula (99), uses the COL-dimensional vector $CV^{\rightarrow}$ to generate secret information SE according to Formula (97), generates key information D*(0) according to Formula (106). The key generator 434 uses label information LAB(λ) ($\lambda=1,\ldots,\Psi$) to generate key information D*(λ) ($\lambda=1,\ldots,\Psi$) according to Formulas (108) and (109) and generates key information SKS according to Formula (112). The key information SKS generated is sent to the communication unit 135. The communication unit 135 transmits the key information SKS to the recipient apparatus 420 over the network 140 (step S433).

The communication unit 125 of the recipient apparatus 420 (FIG. 37) receives the transmitted key information SKS and sends the key information SKS to the key generation handling unit 424d. The key generation handling unit 424d stores the key information SKS (second information) in the storage 421b (step S426).

Then, the ciphertext Ct (first information) received by the communication unit 125 at step S421 and the key information SKS (second information) read from the storage 421b are input into the decryption unit 424e. The decryption unit 424e inputs the ciphertext Ct (first information) and the key information SKS (second information) into a decryption function of the functional encryption scheme, performs a decryption process, and outputs a decryption result Mr obtained through the decryption process (step S427). For example, the decryption unit 424e uses C=Ct (Formula (121) and the key information SKS (Formula (112)) to perform the process according to (Dec-1) to (Dec-4) described above (Formulas (122) and (128)).

Here, if the attribute information VSET1 corresponding to the ciphertext Ct (first information) and the condition information VSET2 corresponding to the key information SKS (second information) cause a standard logical formula set in the key generation handling unit 424d to return true as the truth value, then $GV^{\rightarrow} \in$ span<$MT_{TFV}$> holds and a correct decryption result can be obtained as Mr=Mt (Mt=M'=M). On the other hand, if the attribute information VSET1 and the condition information VSET2 cause the standard logical formula set in the key generation handling unit 424d to return false as the truth value, then $GV^{\rightarrow} \in$ span <$MT_{TFV}$> does not hold and a correct decryption result cannot be obtained. This means that only the ciphertext Ct that satisfies a condition set for a protocol and/or a combination of protocols predetermined at the recipient apparatus 420 is correctly decrypted.

In this way, according to this embodiment, a protocol or a combination of protocols to be used can be chosen at the sender apparatus 410 and conditions for protocols or combinations of protocols for ciphertexts that can be decrypted at the recipient apparatus 420 can be preset at the recipient apparatus 420. The recipient apparatus 420 can correctly decrypt a ciphertext transmitted only when a protocol or a combination of protocols chosen at the sender apparatus 410 satisfies the condition set at the recipient apparatus 420. Furthermore, the condition for a protocol and a combination of protocols for a ciphertext that can be decrypted at the recipient apparatus 420 can be set by flexibly combining logical disjunctions, conjunctions, and negations. In particular, if a condition including logical disjunctions are set at the recipient apparatus 420, the recipient apparatus 420 does not need to use different pieces of key information for different protocols chosen at the sender apparatus 410.

[Variation 1 of the Fourth Embodiment]

As has been described above, some of fields of attribute information VSET1 and condition information VSET2 may be reserved as spare fields. Specifically, at least some of the vectors (first partial correspondence information) included in attribute information VSET1 and at least some of the vectors (second partial correspondence information) included in condition information VSET2 may be reserved as spare fields. This makes it possible to add selectable protocols and terms of a polynomial representing a logical formula by assigning the additional protocols and terms to spare fields when such a need arises later.

Figure 45A:
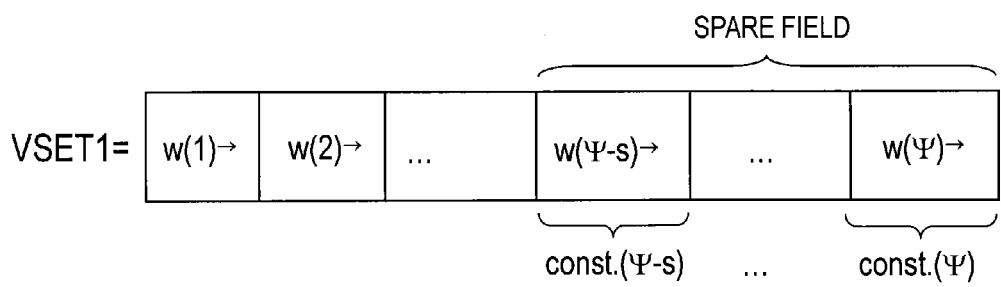
FIG. 45A is a diagram illustrating an example in which some of the fields of attribute information VSET1 are reserved as spare fields.
Figure 45B:
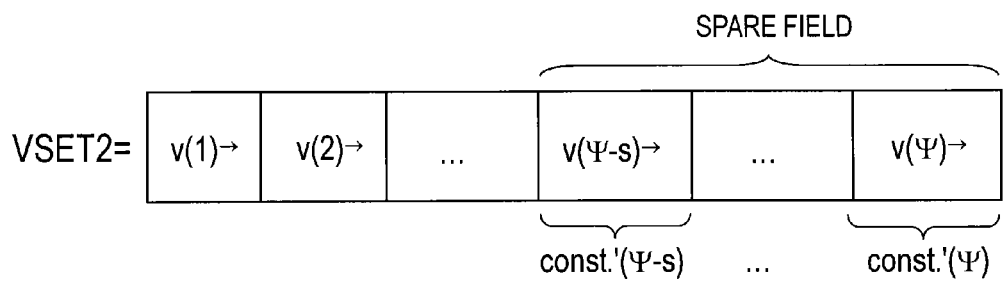
FIG. 45B is a diagram illustrating an example in which some of the field of condition information VSET2 are reserved as spare fields.

FIGS. 45A and 45B illustrate examples in which some fields of attribute information VSET1 and condition information VSET2 are reserved as spare fields.

In FIGS. 45A and 45B, vectors $v(\Psi-s)^{\rightarrow},\ldots, v(\Psi)^{\rightarrow}$ included in attribute information VSET1 and vectors $w(\Psi-s)^{\rightarrow},\ldots, w(\Psi)^{\rightarrow}$ included in condition information VSET2 are reserved as spare fields. Here, s is an integer constant greater than or equal to 1 and less than Ψ. In this example, the vectors $v(\Psi-s)^{\rightarrow},\ldots, v(\Psi)^{\rightarrow}$ are constant vectors const.(Ψ−s), ..., const.(Ψ), each consisting of constant elements, and the vectors $w(\Psi-s)^{\rightarrow},\ldots, w(\Psi)^{\rightarrow}$ are constant vectors const.'(Ψ−s), ..., const.'(Ψ), each consisting of constant elements. These spare fields are set so that the inner product of a spare field vector $w(\lambda)^{\rightarrow}$ and a spare field vector $v(\lambda)^{\rightarrow}$ will be 0 regardless of the value of identification information PI. For example, all of the constant vectors const.(Ψ−s), ..., const.($\Psi$) may be zero vectors and all of the constant vectors const.'($\Psi$−s), ..., const.($\Psi$) may be zero vectors. Alternatively, all of the constant vectors const.($\Psi$−s), ..., const.'($\Psi$) may be zero vectors and some of the constant vectors const.' ($\Psi$−s), ..., const.'($\Psi$) may be nonzero vectors. Alternatively, all of the constant vectors const.'($\Psi$−s), ..., const.'($\Psi$) may be zero vectors and at least some of the constant vectors const. ($\Psi$−s), ..., const.($\Psi$) may be nonzero vectors. At least some of the constant vectors const.($\Psi$−s), ..., const.($\Psi$) may be nonzero vectors and some of the constant vectors const.'($\Psi$−s), ..., const.'($\Psi$) may be nonzero vectors and the inner product of a spare field vectors $w(\lambda)$ and a spare field vectors $v(\lambda)^{\rightarrow}$ may be 0. When a label in $\lambda$ corresponding to a spare field is $LAB(\lambda)=v(\lambda)^{\rightarrow}$, $LIT(\lambda)=1$ regardless of the value of identification information PI; when a label in $\lambda$ corresponding to a spare field is $LAB(\lambda)=\vee v(\lambda)^{43}$, $LIT(\lambda)=0$ regardless of the value of identification information PI (Formulas (101) to (103)).

[Fifth Embodiment]

The fifth embodiment of the present invention will be described below.

In the fifth embodiment, first information is key information corresponding to attribute information VSET1, second information is a ciphertext corresponding to condition information VSET2, a sender apparatus outputs key information, and a ciphertext stored in a recipient apparatus is decrypted. The embodiment can be applied to a case where a functional-encryption-scheme-applied protocol is a Keyword search encryption protocol, or a combination of a Keyword search encryption protocol with a Forward Secure encryption protocol, a Key Insulated encryption protocol or a CCA2 secure encryption protocol. In this embodiment, a CP encryption scheme is used. The following description will focus on differences from the fourth embodiment and the same features as those of the fourth embodiment will be described only briefly.

<Configuration>

As illustrated in FIG. 35, the functional encryption applied system 5 of this embodiment includes a sender apparatus 510 (information output apparatus), a recipient apparatus 520 (information processing apparatus), and a key generating apparatus 430, which are connected onto a network 140. While one sender apparatus 510, one recipient apparatus 520 and one key generating apparatus 430 are depicted in FIG. 35 for a simple description, more than one sender apparatus 510, recipient apparatus 520, and key generating apparatus 430 may exist.

[Sender Apparatus 510 (Information Output Apparatus)]

Figure 46:
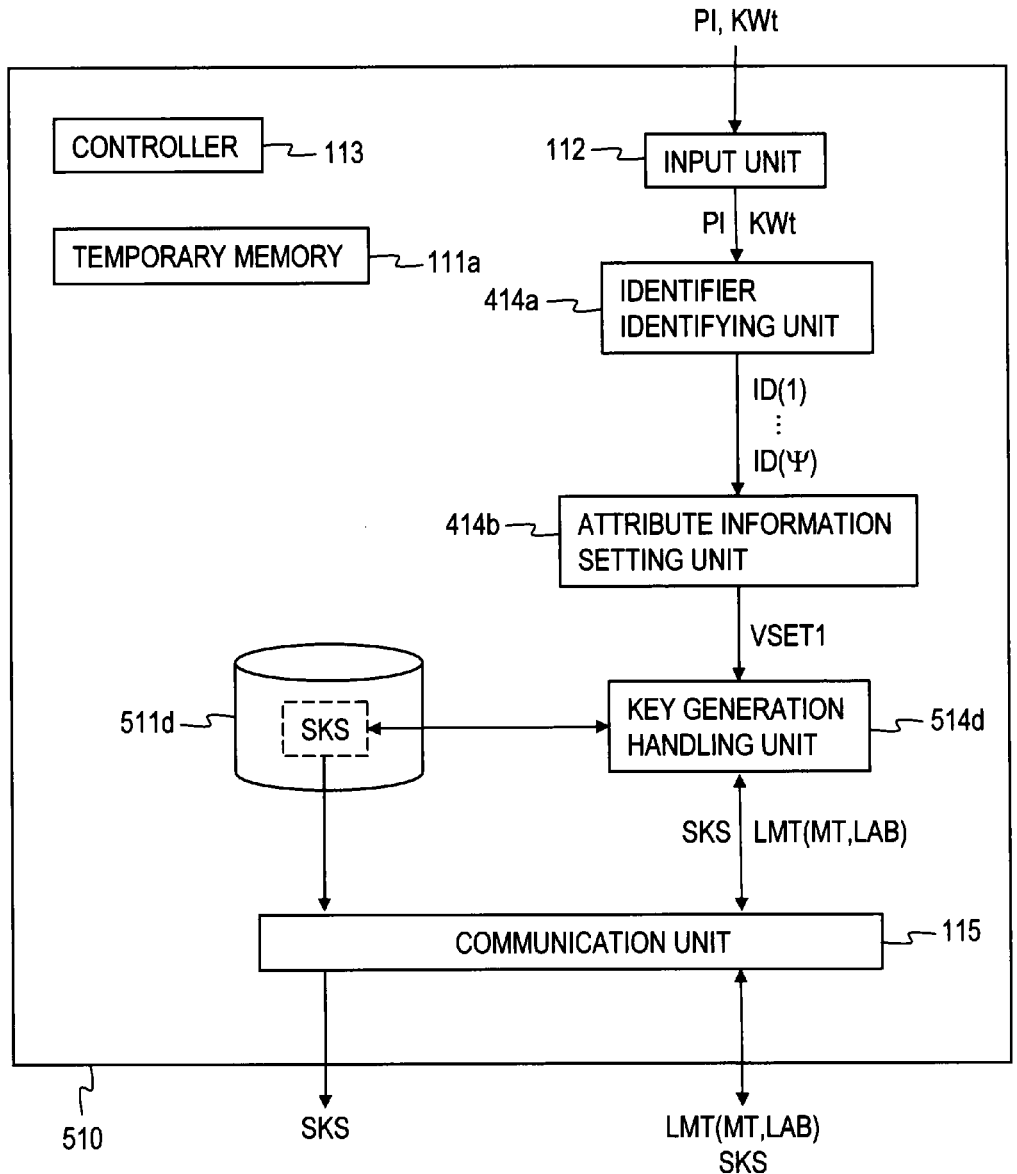
FIG. 46 is a block diagram illustrating a configuration of a sender apparatus (information output apparatus) of a fifth embodiment.

FIG. 46 is a block diagram illustrating a configuration of the sender apparatus 510 of this embodiment. The same components as those of the fourth embodiment are given the same reference numerals and description of the components will be omitted (the same applies to the rest of the description.)

As illustrated in FIG. 46, the sender apparatus 510 of this embodiment includes a temporary memory 111a, a storage 511d, an input unit 112, a controller 113, an identifier identifying unit 414a, an attribute information setting unit 414b, a key generation handling unit 514d, and a communication unit 115.

The sender apparatus 510 is a particular apparatus that is configured by loading a particular program into a well-known computer or special-purpose computer including components such as a CPU, a RAM, and a ROM, for example, and causing the computer to execute the program. For example, the key generation handling unit 514d is a processing unit or an integrated circuit configured by the CPU executing a given program, and the storage 511d is an auxiliary storage device such as a RAM, a register, a cache memory, an element in an integrated circuit, or a hard disk, or a storage area implemented by a combination of at least some of these.

[Recipient Apparatus 520 (Information Processing Apparatus)]

Figure 47:
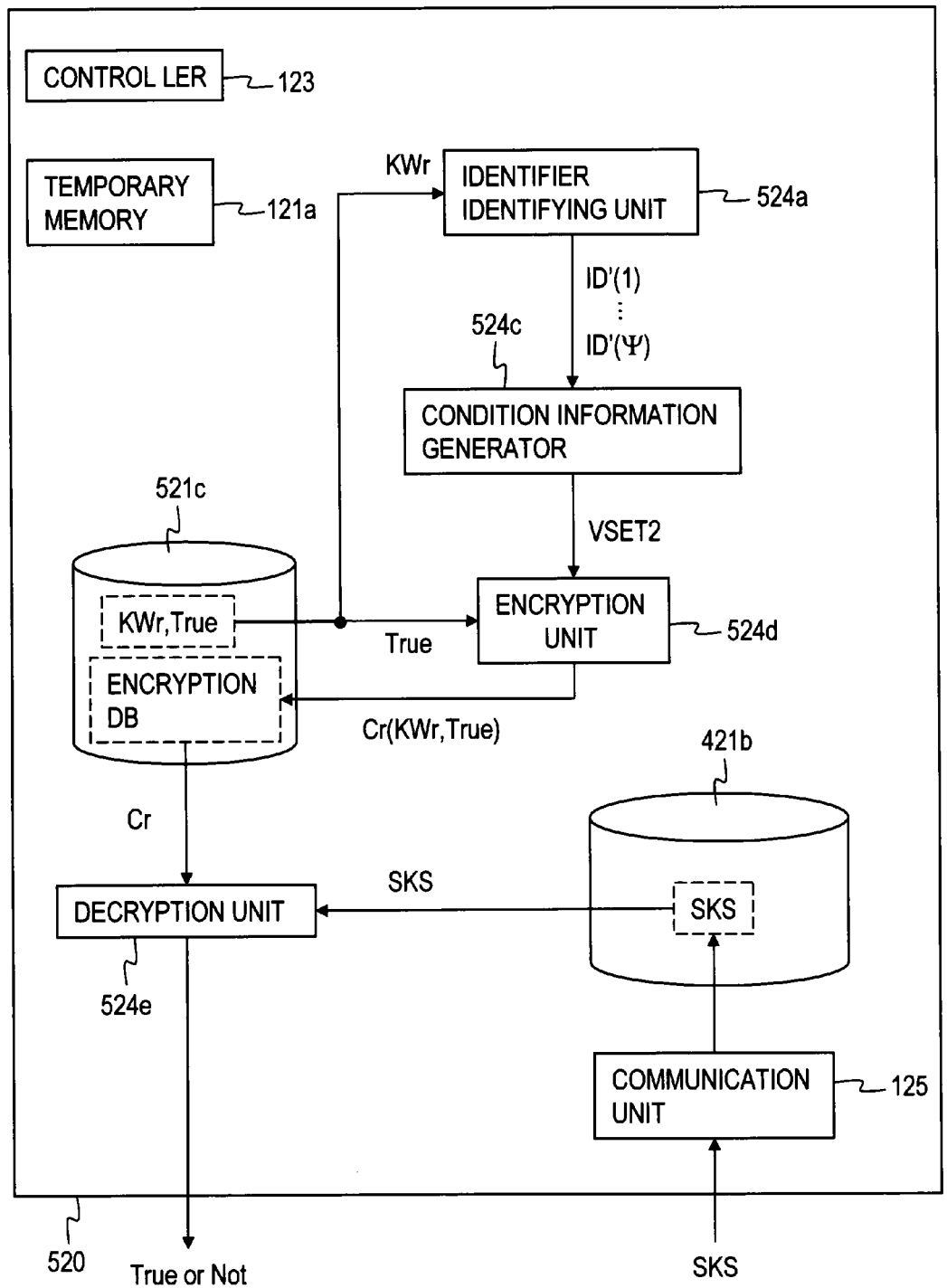
FIG. 47 is a block diagram illustrating a configuration of a recipient apparatus (information processing apparatus) of the fifth embodiment.

FIG. 47 is a block diagram illustrating a configuration of the recipient apparatus 520 of this embodiment.

As illustrated in FIG. 47, the recipient apparatus 520 of this embodiment includes a temporary memory 121a, storages 421b, 521c, a controller 123, an identifier identifying unit 524a, a condition information generator 524c, an encryption unit 524d, a decryption unit 524e, and a communication unit 125.

The recipient apparatus 520 is a particular apparatus that is configured by loading a particular program into a well-known computer or special-purpose computer including components such as a CPU, a RAM, and a ROM, for example, and causing the computer to execute the program. For example, the encryption unit 524d is a processing unit or an integrated circuit that is configured by a CPU executing a given program and the storages 421b, 521c are auxiliary storage devices such as RAMs, registers, cache memories, elements in an integrated circuit, or hard disks, or storage areas implemented by a combination of at least some of these.

<Presetting>

Presetting of a functional encryption applied system 5 of this embodiment will be described.

[Identification Information]

FIGS. 48A and 48B illustrate correspondence between identification information PI for identifying one or more protocols and the protocols in the fifth embodiment.

In the example in FIG. 48A, identification information PI is assigned to each protocol. That is, a Keyword search encryption protocol is assigned to identification information PI=0, a Forward Secure encryption protocol is assigned to identification information PI=1, a Key Insulated encryption protocol is assigned to identification information PI=2, and a CCA2 secure encryption protocol is assigned to identification information PI=3 in this example. In this example, when one of the protocols is solely chosen, one piece of identification information PI corresponding to that protocol is identified; when a combination of two or more protocols is chosen, a combination of pieces of identification information PI corresponding to those two or more protocols is identified.

In the example in FIG. 48B, on the other hand, some identification information PI is assigned to each individual protocol and other identification information PI is assigned to each combination of two or more protocols. In this example, when any one of the protocols is solely chosen, one piece of identification information PI corresponding to that protocol is identified; when a combination of two or more protocols is chosen, identification information PI corresponding to that combination of the two or more protocols is identified.

The identification information PI illustrated in FIGS. 48A and 48B is illustrative only; identification information PI corresponding to one or more protocols may otherwise be identified.

[Identifier]

FIGS. 49A, 49B and 50 are diagrams illustrating exemplary rules for identifying an identifier $ID(\lambda)$, each of which is established for each protocol or a combination of protocols in the fifth embodiment. Identifiers $ID(\lambda)$ in this embodiment are $n(\lambda)$-dimensional vectors, each consisting of the elements of the finite field $F_q$.

In the example in FIG. 49A, an identifier $ID(\lambda)$ is assigned to each of the selectable protocols. A value determined according to the rule established for a chosen protocol is placed in the identifier ID(λ) assigned to the protocol. For example, when the Keyword search encryption protocol is chosen, an n(λ)-dimensional vector corresponding to a search keyword is placed in identifier ID(1). On the other hand, a constant (const.) which is an n(λ)-dimensional vector is placed in an identifier ID(λ) assigned to a protocol not chosen. When a combination of a plurality of protocols is chosen, it is considered that the plurality of protocols of the combination were chosen, and values of the identifiers ID(λ) are determined accordingly. For example, when the combination of the Keyword search encryption protocol and the CCA2 secure encryption protocol is chosen, an n(λ)-dimensional vector corresponding to a search keyword is placed in identifier ID(1), one-time information which is an n(λ)-dimensional vector is placed in identifier ID(4), and a constant (const.) which is an n(λ)-dimensional vector is placed in the other identifiers ID(2) and ID(3).

In the example in FIG. 49B, an identifier ID(λ) is assigned only to a chosen protocol. For example, when only the Keyword search encryption protocol is chosen, only identifier ID(1) which is an n(λ)-dimensional vector indicating a search keyword is assigned. When the combination of the Keyword search encryption protocol and the CCA2 secure encryption protocol is chosen, only identifier ID(1) which is an n(λ)-dimensional vector indicating a search keyword and identifier ID(3) indicating one-time information which is an n(λ)-dimensional vector are assigned.

In the example in FIG. 50, an identifier ID(λ) is assigned to each of selectable protocols and each selectable combination of protocols. A value that is determined according to a rule established for a chosen protocol or each of the protocols that of a chosen combination is placed in the identifier ID(λ) assigned to the protocol or the combination chosen. A constant (const.) which is an n(λ)-dimensional vector is placed in the identifiers ID(λ) assigned to the protocols and combinations not chosen. For example, when the combination of the Keyword search encryption protocol and the CCA2 secure encryption protocol is chosen, an n(λ)-dimensional vector determined by the combination of a search keyword and one-time information is placed in identifier ID(4) and a constant (const.) which is an n(λ)-dimensional vector is placed in the other identifiers ID(λ).

The method of determining identifiers described above is illustrative only; other method may be used to determine identifiers. For example, in a variation of the example in FIG. 50, only a chosen protocol or a chosen combination of protocols may be assigned an identifier ID(λ).

[Attribute Information (First Correspondence Information)]

Attribute information is the same as that in the fourth embodiment and therefore description of attribute information will be omitted.

[Condition Information (Second Correspondence Information)] In this embodiment, each identifier ID'(λ) is an n(λ)-dimensional vector $v(\lambda)^{\rightarrow}$ (second partial correspondence information) ($v(\lambda)^{\rightarrow}$=ID'(λ)) and condition information VSET2 is a set $\{v(\lambda)^{\rightarrow}\}_{\lambda=1,\ldots,\Psi}$ of n(λ)-dimensional vectors $v(\lambda)^{\rightarrow}$ (λ=1, ..., Ψ).

An identifier ID'(λ) is an n(λ)-dimensional vector corresponding to an identifier(s) ID(λ) having an given value(s) assumed. That is, a value for the identifier ID'(λ) is determined such that the inner product of the identifier ID'(λ) and the identifier(s) ID(λ) having the assumed given value(s) becomes 0. For example, if identifiers ID(λ) are set according to the example in FIG. 49A, identifiers ID'(λ) that yield inner products ID(1)·ID'(1)=0, ID(2)·ID'(2)=0, ID(3)·ID'(3)=0, and ID(4)·ID'(4)=0 are determined for identifiers ID(1), ID(2), ID(3) and ID(4), respectively, which have assumed given values determined according to the rules in FIG. 49A.

The "assumed given value(s)" corresponds to a condition set for a protocol and/or a combination of protocols and/or a keyword assumed at the recipient apparatus 520. Specifically, the "assumed given value(s)" corresponds to a literal of a standard logical formula assumed at the recipient apparatus 520. For example, if a literal corresponding to λ=1 in the standard logical formula is a propositional variable PRO(1) of the proposition that "Identifier ID(1) takes on a value corresponding to a keyword KWr", an identifier ID'(1) that yields inner product ID(1)·ID'(1)=0 for identifier ID(1) corresponding to the keyword KWr is set. Such rules for determining identifiers ID'(λ) are predetermined and are set in the identifying unit 524a of the recipient apparatus 520.

[Encryption Database (DB)]

FIG. 51 illustrates an example of an encryption DB of the fifth embodiment. In FIG. 51, Mr1 to Mr99 are information to be searched, such as documents, KWr1 to KWr9 are keywords such as words, True is data such as "1" that means "true". C(Mr1), ..., C(Mr99) are ciphertexts of the information to be searched Mr1 to Mr99, respectively. The encryption scheme for the ciphertexts C(Mr1), ..., C(Mr99) may be of any type such as common key encryption, public key encryption, ID-based encryption, or functional encryption schemes. Cr(KWr1, True), ..., Cr(KWr9, True) are ciphertexts (second information) of a functional encryption scheme, each of which can be obtained by inputting condition information VSET2 and a plaintext True into an encryption function of the functional encryption scheme. The ciphertexts Cr(KWr1, True), ..., CR(KWr9, True) can be correctly decrypted with key information corresponding to pieces of attribute information VSET1 corresponding to keywords KWr1 to KWr9, respectively. For example, attribute information VSET1 corresponding to a keyword KWr1 and condition information VSET2 used for encrypting a ciphertext Cr(KWr1, True) cause a logical formula to return true as its truth value.

The encryption DB is a DB in which ciphertexts C(Mr1), C(Mr99) of pieces of information to be searched (generally referred to as "Mr") are associated with ciphertexts Cr(KWr1, True), ..., Cr(KWr9, True) corresponding to keywords corresponding to the pieces of information to be searched Mr. For example, if the keywords corresponding to information to be searched Mr1 are KWr1, KWr2, KWr3, and KWr4, ciphertext C(Mr1) of the information to be searched Mr1 is associated with ciphertexts Cr(KWr1, True), Cr(KWr2, True), Cr(KWr3, True), and Cr(KWr4, True) corresponding to the keywords KWr1, KWr2, KWr3, KWr4. With this DB, if ciphertext Cr(KWr1, True), for example, can be decrypted with key information corresponding to attribute information VSET1 corresponding to keyword KWr1, it can be seen that keyword KWr1 corresponds to information to be searched Mr1 without decrypting the ciphertext C(Mr1) of the information to be searched Mr1.

In this embodiment, such an encryption DB as described above is stored in the storage 521c of the recipient apparatus 520 and keywords (generally referred to as "KWr") and plaintexts True are stored in the storage 521c in this embodiment. Ciphertexts Cr(KWr, True) corresponding to the keywords KWr in the encryption DB are updated successively as will be described later.

[Logical formulas Predetermined at Sender Apparatus 510]

In this embodiment, standard logical formulas (for example PRO(1)∧ PRO(2)∨ ¬ PRO(3)) corresponding to conditions for a protocol and/or a combination of protocol and/or a keyword, are preset at the key generation handling unit 514d of the sender apparatus 510 and the decryption unit 524e of the recipient apparatus 520. In other words, labeled matrices LMT(MT, LAB) corresponding to the standard logical formulas are preset in the key generation handling unit 514d and the decryption unit 524e. However, values for literals PRO(λ) of standard logical formulas that identify PRO (λ) and ¬ PRO(λ) which are literals of standard logical formula and values for n(λ)-dimensional vectors $w(\lambda)^\rightarrow$ that identify labels LAB(λ) are not preset. That is, whether a label is LAB(λ)=$w(\lambda)^\rightarrow$ or LAB(λ)=∨ $w(\lambda)^\rightarrow$ is preset whereas values for n(λ)-dimensional vectors are not preset. A label (label of λ=1 in the example in FIG. 49A) corresponding to an n(λ)-dimensional vector $w(\lambda)^\rightarrow$ corresponding to a search keyword is LAB(λ)=$w(\lambda)^\rightarrow$. By setting a n(λ)-dimensional vector $w(\lambda)^\rightarrow$ that corresponds to an identifier ID(λ), a value for the n(λ)-dimensional vector $w(\lambda)^\rightarrow$ that identifies PRO(λ) and label LAB(λ) is determined and a standard logical formula and labeled matrix LMT(MT, LAB) can be identified.

[Master Secret Information]

Master secret information MSK (see [Setup($1^{sec}$(Ψ; n(1), . . . , n(Ψ))): Setup]) of the functional encryption scheme is stored in the storage 431b of the key generating apparatus 430 of this embodiment.

<Processes>

Figure 52:
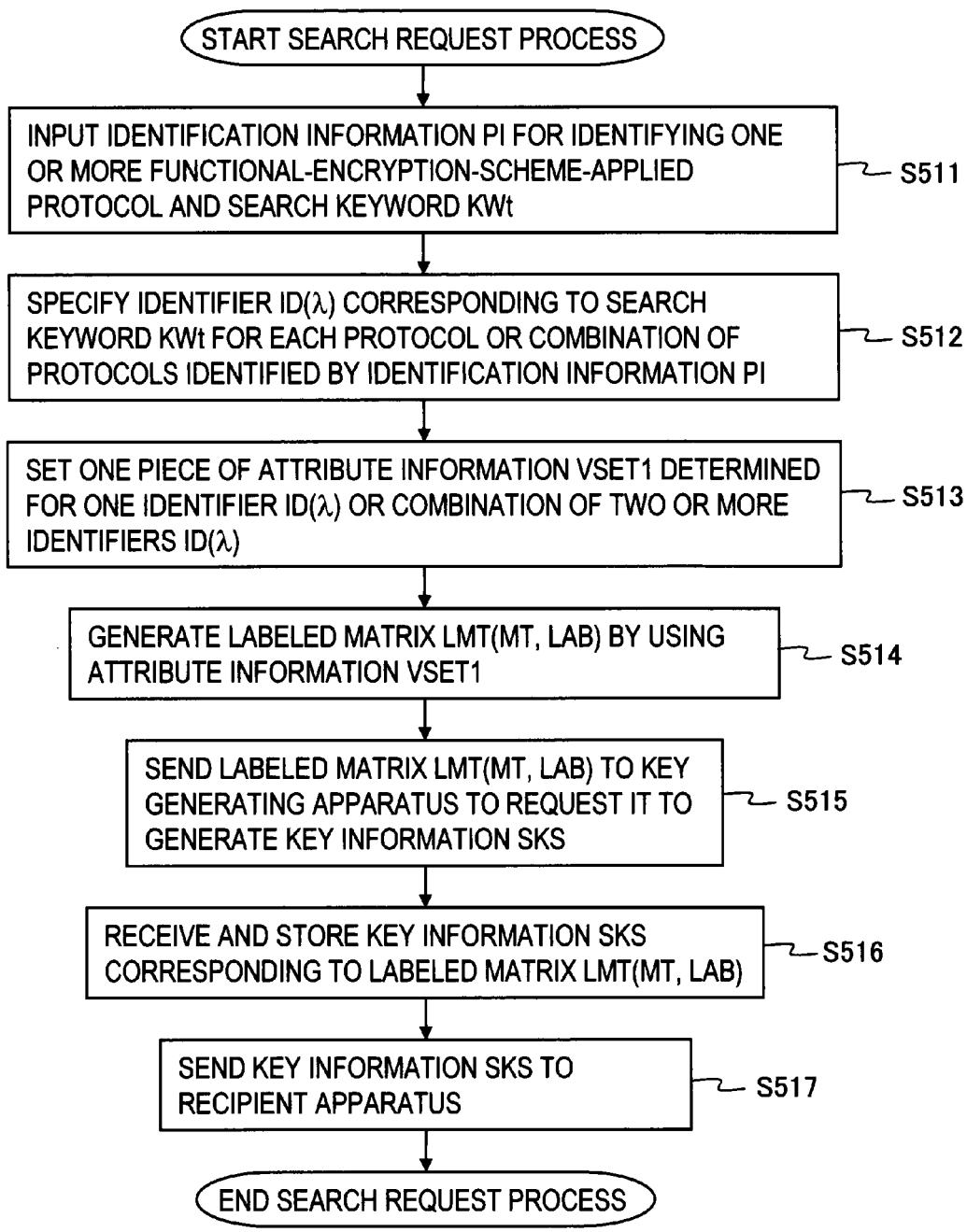
FIG. 52 is a flowchart illustrating a search request process of the fifth embodiment.
Figure 53A:
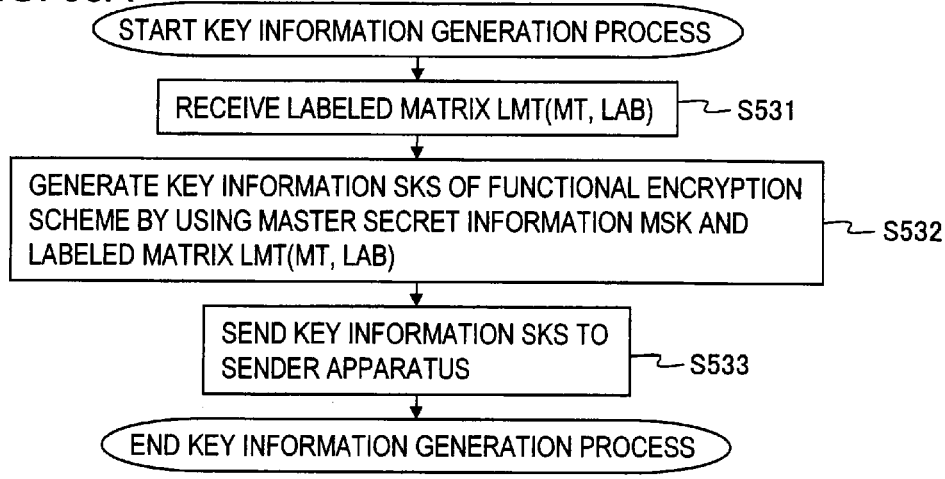
FIG. 53A is a flowchart illustrating a key information generation process of the fifth embodiment.
Figure 53B:
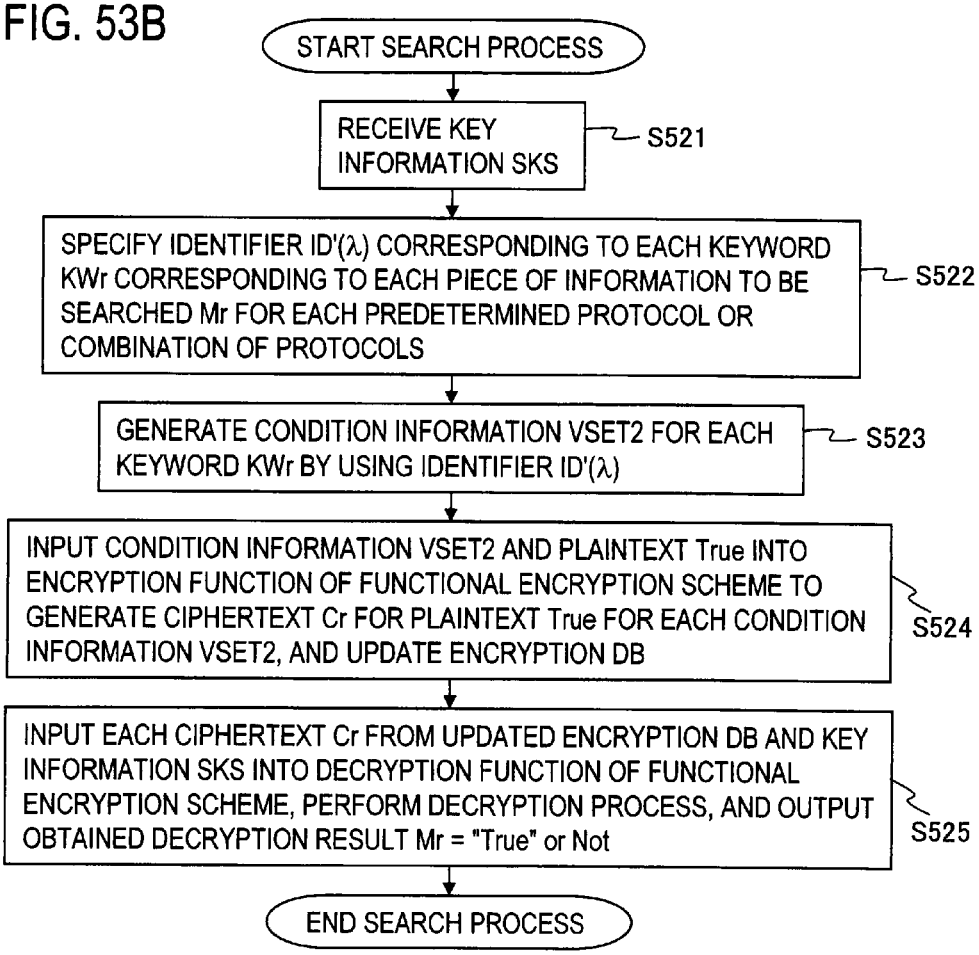
FIG. 53B is a flowchart illustrating a search process of the fifth embodiment.

FIG. 52 is a flowchart illustrating a search request process of the fifth embodiment. FIG. 53A is a flowchart illustrating a key information generation process of the fifth embodiment. FIG. 53B is a flowchart illustrating a search process of the fifth embodiment. Processes of this embodiment will be described with reference to these flowcharts.

[Search Request Process and Key Information Generation Process]

In the encryption process of this embodiment, identification information PI for identifying one or more functional-encryption-scheme-applied protocols to be executed and a search keyword KWt are input into the input unit 112 of the sender apparatus 510 (FIG. 46) (step S511). For example, if the identification information PI is determined as illustrated in FIG. 48A, identification information PI corresponding to one protocol chosen by a user or a combination of pieces of identification information PI corresponding to two or more protocols chosen by the user is input into the input unit 112. If identification information PI is determined as illustrated in FIG. 48B, identification information PI corresponding to one protocol or two or more protocols chosen by the user is input into the input unit 112. It is assumed in the present invention that protocols or combinations of protocols chosen include a Keyword search encryption protocol.

The identification information PI and the search keyword KWt input into the input unit 112 are then input into the identifier identifying unit 414a. The identifier identifying unit 414a identifies an identifier ID(λ) for each protocol or each combination of protocols identified by the identification information PI, according to a rule established for each protocol or the combination of the protocols (see FIGS. 49A, 49B and 50, for example), and outputs the identified one or more identifiers ID(λ) corresponding to the search keyword KWt (step S512).

One or more identifiers ID(λ) output from the identifier identifying unit 414a are input into the attribute information setting unit 414b. The attribute information setting unit 414b sets $$w(\lambda)^\rightarrow = ID(\lambda) \qquad (139),$$

sets a set $\{w(\lambda)^\rightarrow\}_{\lambda=1, \ldots, \Psi}$ of n(λ)-dimensional vectors $w(\lambda)^\rightarrow$ (λ=1, . . . , Ψ) as attribute information VSET1 (particular piece of first correspondence information), and outputs the attribute information VSET1 (step S513).

The attribute information VSET1 output from the attribute information setting unit 414b is input into the key generation handling unit 514d. The key generation handling unit 514d uses the n(λ)-dimensional vector $w(\lambda)^\rightarrow$ included in the attribute information VSET1 to identify labels LAB(λ) and determines a labeled matrix LMT(MT, LAB) (step S514). The labeled matrix LMT(MT, LAB) with the identified labels LAB(λ) is sent to the communication unit 115. The communication unit 115 transmits the labeled matrix LMT(MT, LAB) to the key generating apparatus 430 over the network 140 to ask the key generating apparatus 430 to generate key information SKS corresponding to the labeled matrix LMT (MT, LAB) (key information SKS corresponding to the search keyword KWt) (step S515).

In the key generation process of this embodiment, the communication unit 135 of the key generating apparatus 430 (FIG. 38) receives the labeled matrix LMT(MT, LAB) corresponding to the attribute information VSET1(step S531). The labeled matrix LMT(MT, LAB) received at the communication unit 135 is input into the key generator 434. The key generator 434 reads master secret information MSK from the storage 431b, uses the master secret information MSK and the labeled matrix LMT(MT, LAB) to generate key information SKS corresponding to the labeled matrix LMT(MT, LAB), and output the key information SKS (step S532). Details of the generation procedure are the same as the procedure in the fourth embodiment, except that $w(\lambda)^\rightarrow$ is used instead of $v(\lambda)^\rightarrow$. The generated key information SKS is sent to the communication unit 135. The communication unit 135 transmits the key information SKS to the sender apparatus 510 over the network 140 (step S533).

The communication unit 115 of the sender apparatus 510 (FIG. 46) receives the key information SKS and sends the key information SKS to the key generation handling unit 514d. The key generation handling unit 514d stores the key information SKS in the storage 511d (step S516). Then, the key information SKS (first information) corresponding to the search keyword KWt, read from the storage 511d, is sent to the communication unit 115, which transmits the key information SKS to the recipient apparatus 520 over the network 140 (step S517).

[Search Process]

In the search process of this embodiment, first the communication unit 125 of the recipient apparatus 520 (FIG. 47) receives key information SKS (first information) corresponding to a search keyword KWt transmitted and stores the key information SKS (first information) in the storage 421b (step S521).

This triggers the identifier identifying unit 524a to identify one or more identifiers ID'(λ) corresponding to keywords KWr corresponding to pieces of information to be searched Mr, according to rules, each of which is determined for each protocol or each combination of protocols (step S522).

The one or more identifiers ID'(λ) identified for each keyword KWr by the identifier identifying unit 524a are input into the condition information generator 524c. For each of the keywords KWr, the condition information generator 524c sets $$v(\lambda)^\rightarrow = ID'(\lambda) \qquad (140),$$

and sets a set $\{v(\lambda)^\rightarrow\}_{\lambda=1, \ldots, \Psi}$ of n(λ)-dimensional vectors $v(\lambda)^\rightarrow$ (λ=1, . . . , Ψ) as condition information VSET2 (particular piece of second correspondence information) and outputs the pieces of condition information VSET2 corresponding to the keywords KWr (step S523).

The pieces of condition information VSET2 corresponding to the keywords KWr output from the condition information generator 524c are input into the encryption unit 524d. The encryption unit 524d reads plaintexts True from the storage 111c, inputs each piece of condition information VSET2 corresponding to each keyword KWr and each plain text True into an encryption function of the functional encryption scheme to generate a ciphertext Cr(KWr, True) (second information) for the plain text True for each keyword KWr, and updates the ciphertexts corresponding to the keywords in the encryption DB with these ciphertexts Cr(KWr, True) to update the encryption DB (step S524). One example of the encryption function of the functional encryption scheme is Formula (137) determined by Formulas (113) and (136) described above (C=Cr(KWr, True), M=KWr).

Then, the key information SKS (first information) corresponding to the search keyword KWt received by the communication unit 125 at step S521 and any of the ciphertexts Cr(KWr, True) (second information) in the encryption DB read from the storage 521c are input into the decryption unit 524e. The decryption unit 524e inputs the key information SKS (first information) and the ciphertext Cr(KWr, True) (second information) into a decryption function of the functional encryption scheme, performs a decryption process, and outputs a decryption result Mr="True" or Not obtained through the decryption process (step S525). For example, the decryption unit 524e uses C=Cr(KWr, True) (Formula (137)) and the key information SKS (Formula (112)) to perform a process in which attribute information VSET1=$\{\lambda, w(\lambda)^{\rightarrow}|\lambda=1,\ldots,\Psi\}$ is used instead of condition information VSET2=$\{\lambda, v(\lambda)^{\rightarrow}|\lambda=1,\ldots,\Psi\}$ in the process (Dec-1) through (Dec-4) described above and condition information VSET2=$\{\lambda, v(\lambda)^{\rightarrow}|\lambda=1,\ldots,\Psi\}$ is used instead of attribute information VSET1=$\{\lambda, w(\lambda)^{\rightarrow}|\lambda=1,\ldots,\Psi\}$ (Formulas (122) and (128)).

Here, if the attribute information VSET1 corresponding to the key information SKS (first information) and the condition information VSET2 corresponding to the ciphertext Cr(KWr, True) (second information) cause a standard logical formula, which is set in the key generation handling unit 514d and the decryption unit 524e, to return true, then $GV^{\rightarrow} \in \text{span}<MT_{TFV}>$ holds and a correct decryption result can be obtained as Mr=plaintext True. On the other hand, if the attribute information VSET1 and the condition information VSET2 cause the standard logical formula, which is set in the key generation handling unit 514d and the decryption unit 524e, to return false, then $GV^{\rightarrow} \in \text{span}<MT_{TFV}>$ does not hold and a correct decryption result cannot be obtained. If a correct decryption result has been obtained, a ciphertext C(Mr) for information to be searched Mr associated with the ciphertext Cr(KWr, True) is extracted as a search result. The operation at step 525 as described is performed for every ciphertext Cr(KWr, True) is the encryption DB.

If key information SKS (first information) corresponding to a search keyword KWt satisfies a condition set for a protocol and/or a combination of the protocols and/or a keyword that is predetermined at the recipient apparatus 520, a ciphertext C(Mr) of information to be searched Mr corresponding to the keyword KW identical to the search keyword KWt is extracted as the search result.

On the other hand, if the key information SKS (first information) corresponding to the search keyword KWt does not satisfy the condition set for a protocol and/or a combination of the protocols and/or a keyword that is predetermined at the recipient apparatus 520, correct decryption cannot be achieved and therefore a ciphertext C(Mr) of the information to be searched Mr corresponding to the keyword KW identical to the search keyword KWt is not extracted. That is, the encryption DB cannot be searched in effect.

In this way, according to this embodiment, a protocol or a combination of protocols and keywords to be used at the sender apparatus 510 can be chosen; and conditions for protocols and/or combinations of protocols and/or keywords corresponding to key information SKS (first information) that enables search on the encryption DB can be preset at the recipient apparatus 520. The recipient apparatus 520 in effect performs an encryption DB search only when a protocol and/or a combination of protocols and/or a keyword chosen at the sender apparatus 510 satisfies a condition set at the recipient apparatus 520.

[Variation of the Fifth Embodiment]

In the fifth embodiment, spare fields described in variation 1 of the fourth embodiment may be provided in attribute information VSET1 and condition information VSET2.

This embodiment has been described with respect to a case where a Keyword-search-encryption-based protocol is executed as an example in which the first information is key information corresponding to attribute information VSET1 and the second information is a ciphertext corresponding to condition information VSET2. However, the present invention is not limited to this.

[Sixth Embodiment]

In the sixth embodiment, switching can be made between the fourth and fifth embodiments. Specifically, a sender apparatus of this embodiment selects whether a ciphertext corresponding to attribute information VSET1 or key information corresponding to attribute information VSET1 is to be generated, depending on a protocol identified by identification information PI. A recipient apparatus of this embodiment selects whether key information corresponding to condition information or a ciphertext corresponding to condition information is to be generated, depending on a protocol identified by identification information PI. The following description will focus on differences from the fourth embodiment and description of the same features as those of the fourth embodiment will be omitted.

<Configuration>

As illustrated in FIG. 35, a functional encryption applied system 6 of this embodiment includes a sender apparatus 610 (information output apparatus), a recipient apparatus 620 (information processing apparatus) and a key generating apparatus 430, which are connected onto a network 140. While one sender apparatus 610, one recipient apparatus 620, and one key generating apparatus 430 are depicted in FIG. 35 for convenience of explanation, more than one sender apparatus 610, recipient apparatus 620, and key generating apparatus 430 may exist.

[Sender Apparatus 610 (Information Output Apparatus)]

Figure 54:
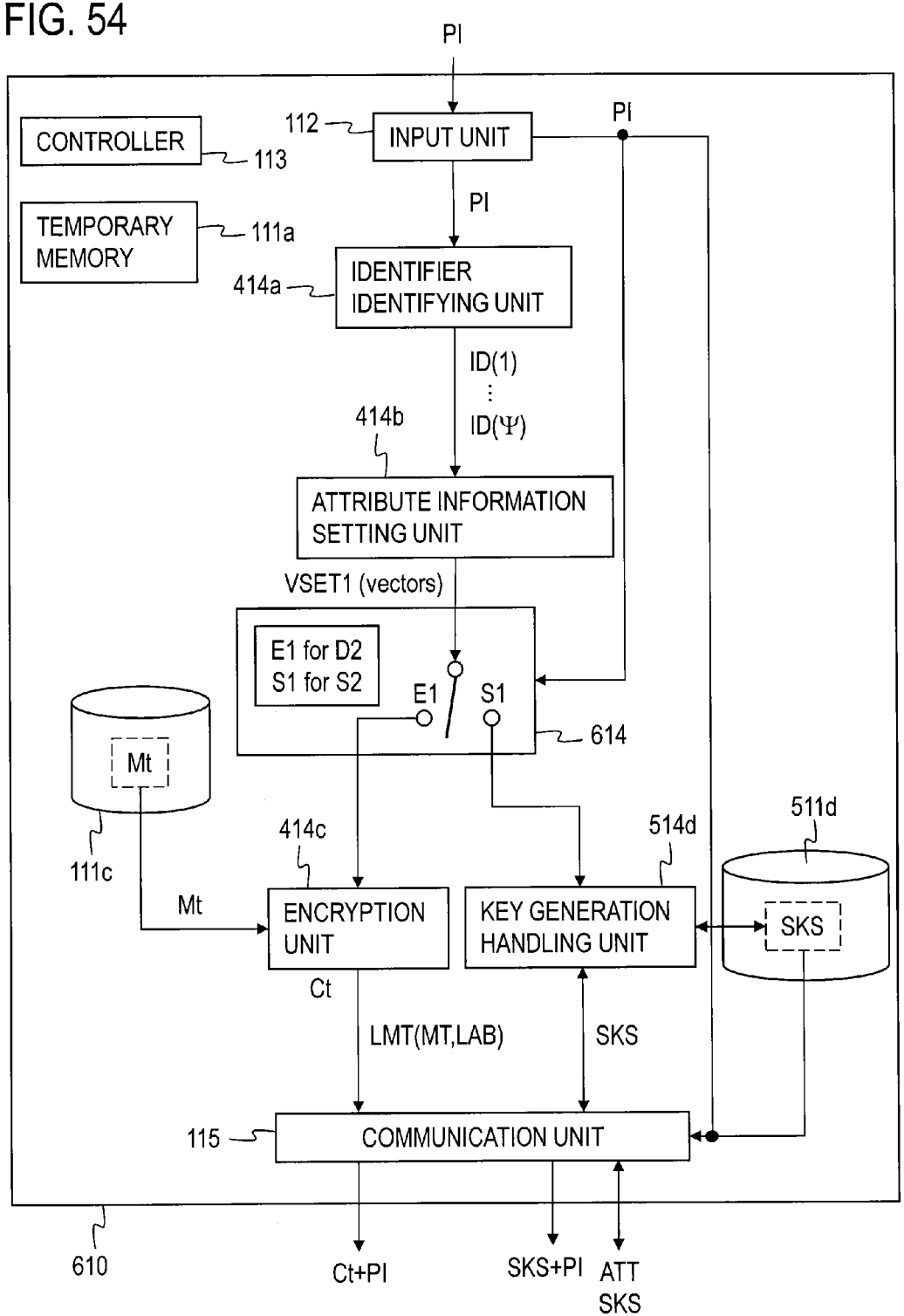
FIG. 54 is a block diagram illustrating a configuration of a sender apparatus (information output apparatus) of a sixth embodiment.

FIG. 54 is a block diagram illustrating a configuration of the sender apparatus 610 of this embodiment. The same components as those of the embodiments described above are given the same reference numerals used in the embodiments described above and description of the components will be omitted (the same applies to the rest of the description.)

As illustrated in FIG. 54, the sender apparatus 610 of this embodiment includes a temporary memory 111a, storages 111c, 511d, an input unit 112, a controller 113, an identifier identifying unit 414a, an attribute information setting unit 414b, an encryption unit 414c, a key generation handling unit 514d, a switching unit 614, and a communication unit 115.

The sender apparatus 610 is a particular apparatus that is configured by loading a particular program into a well-known computer or special-purpose computer including components such as a CPU, a RAM, and a ROM, for example, and causing the computer to execute the program. For example, a switching unit 614 is a processing unit or an integrated circuit configured by the CPU executing a given program.

[Recipient Apparatus 620 (Information Processing Apparatus)]

Figure 55:
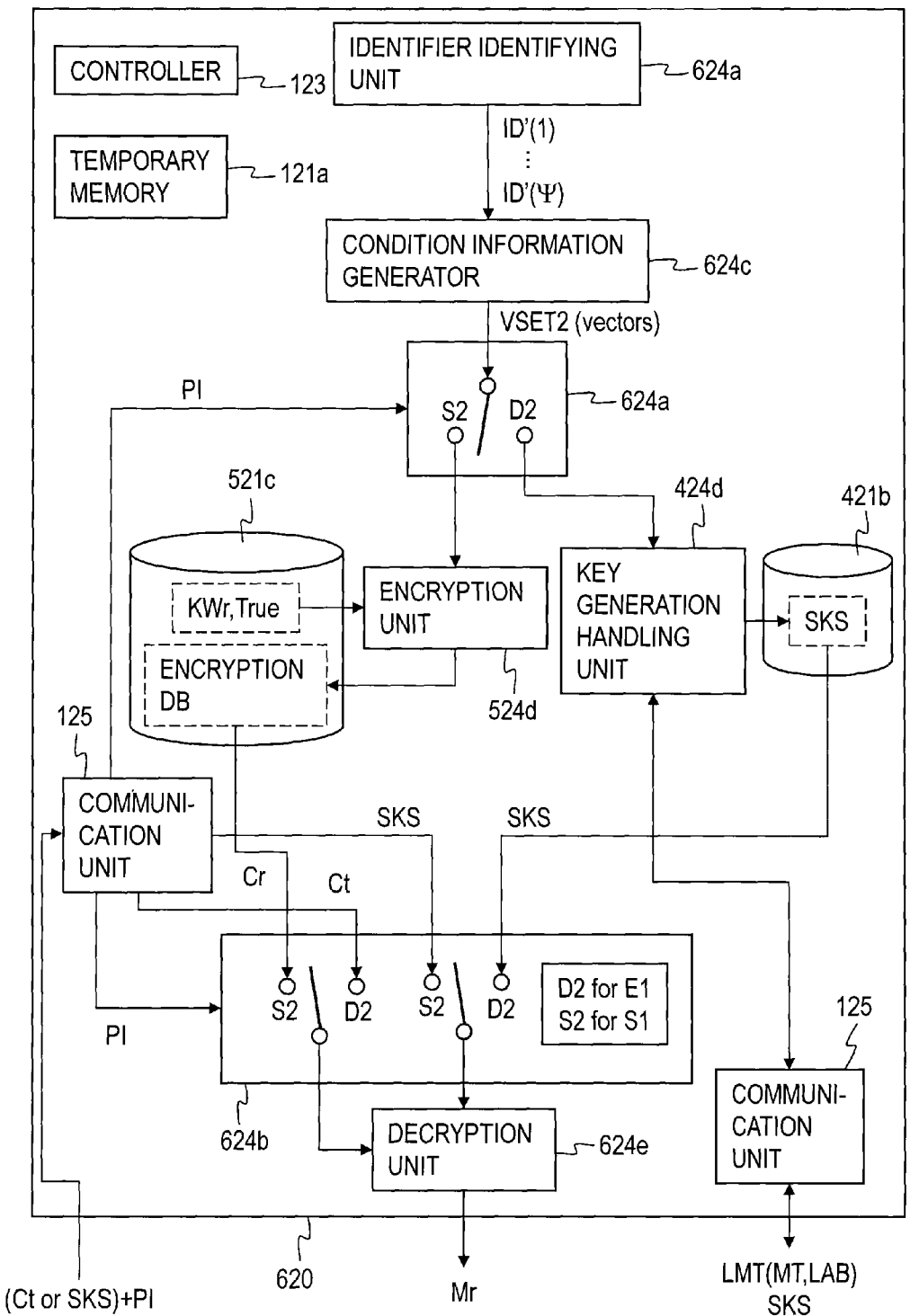
FIG. 55 is a block diagram illustrating a configuration of a recipient apparatus (information processing apparatus) of the sixth embodiment.

FIG. 55 is a block diagram illustrating a configuration of the recipient apparatus 620 of this embodiment.

As illustrated in FIG. 55, the recipient apparatus 620 of this embodiment includes a temporary memory 121a, storages 421b, 521c, a controller 123, an identifier identifying unit 624a, a condition information generator 624c, key generation handling unit 424d, an encryption unit 524d, a decryption unit 624e, switching units 624a, 624b, and a communication unit 125. The identifier identifying unit 624a includes the functions of both of the identifier identifying units 424a and 524a described above. The condition information generator 624c includes the functions of both of the condition information generators 424c and 524c. The decryption unit 624e includes the functions of both of the decryption units 424e and 524e described above. While two blocks indicating the communication unit 125 are depicted in FIG. 55, this does not imply that two separate communication units 125 are required.

The recipient apparatus 620 is a particular apparatus that is configured by loading a particular program into a well-known computer or special-purpose computer including components such as a CPU, a RAM, and a ROM, for example, and causing the computer to execute the program. For example, the switching units 624a, 624b are processing units or integrated circuits that are configured by a CPU executing a given program.

<Presetting>

Presetting is the same as in the fourth and fifth embodiments and therefore description of presetting will be omitted.

<Processes>

Figure 56A:
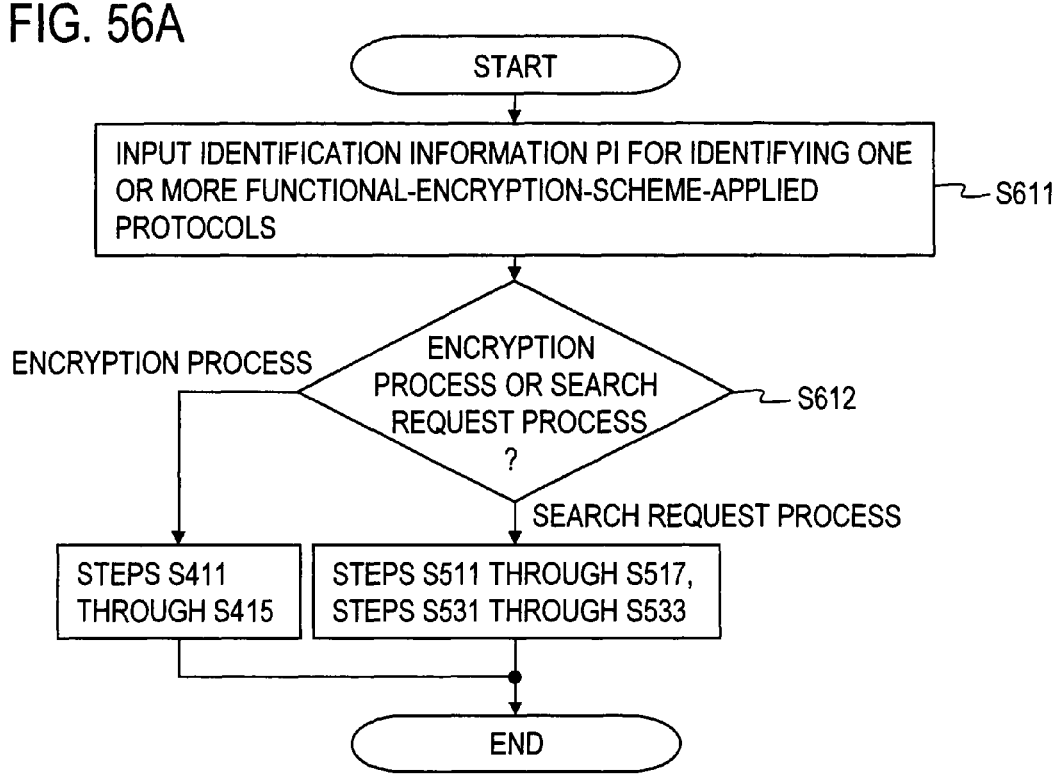
FIG. 56A is a flowchart illustrating a process performed by the sender apparatus of the sixth embodiment.
Figure 56B:
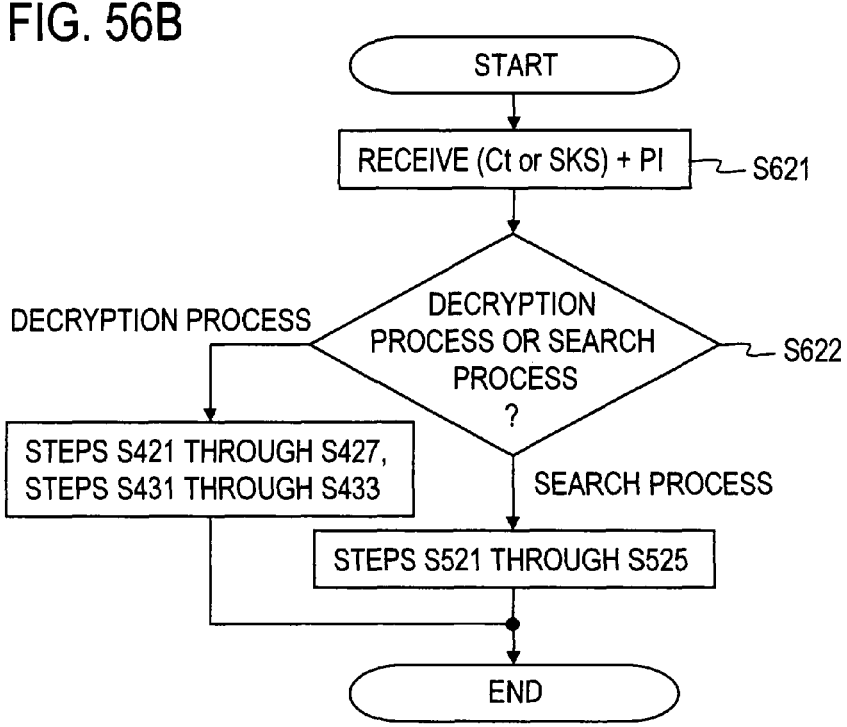
FIG. 56B is a flowchart illustrating a process performed by the recipient apparatus of the sixth embodiment.
Figure 57A:
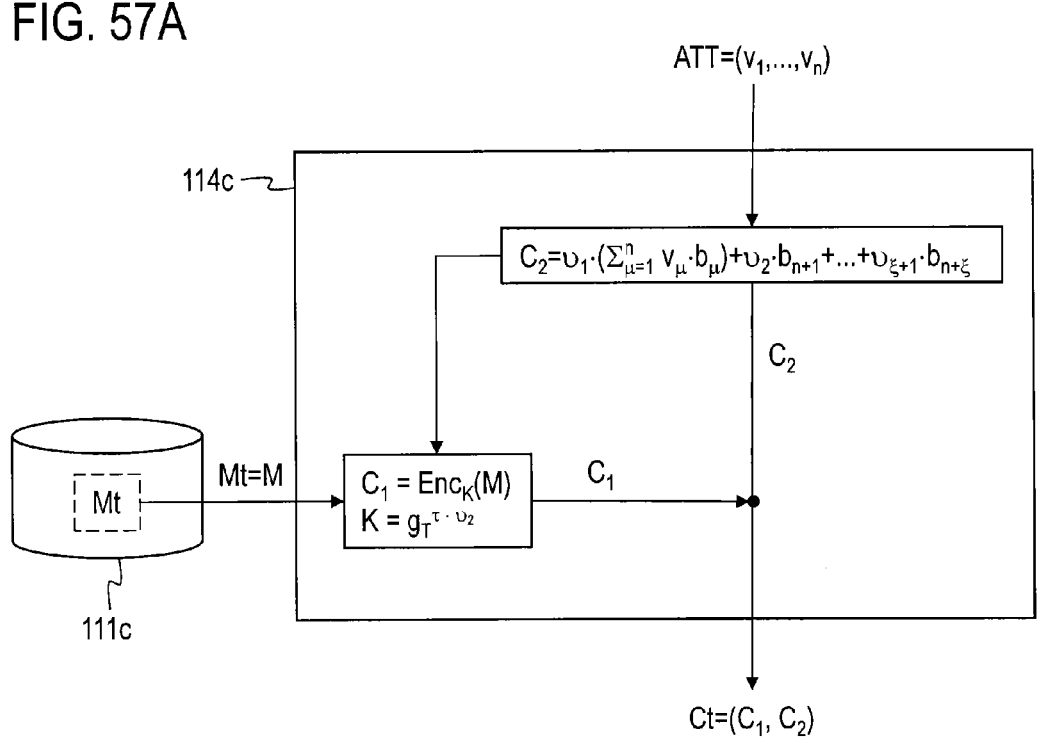
FIG. 57A is a diagram illustrating examples of the storage 111c and the encryption unit 114c in FIG. 2
Figure 57B:
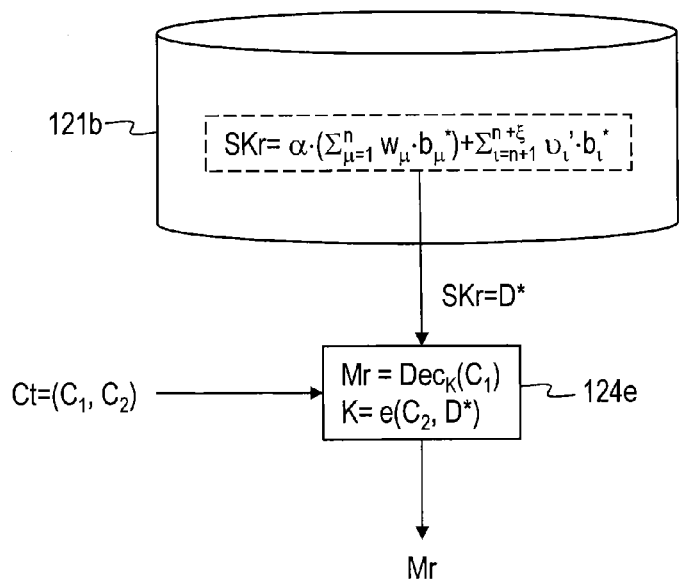
FIG. 57B is a diagram illustrating examples of the storage 121b and the decryption unit in 124e in FIG. 3.
Figure 58A:
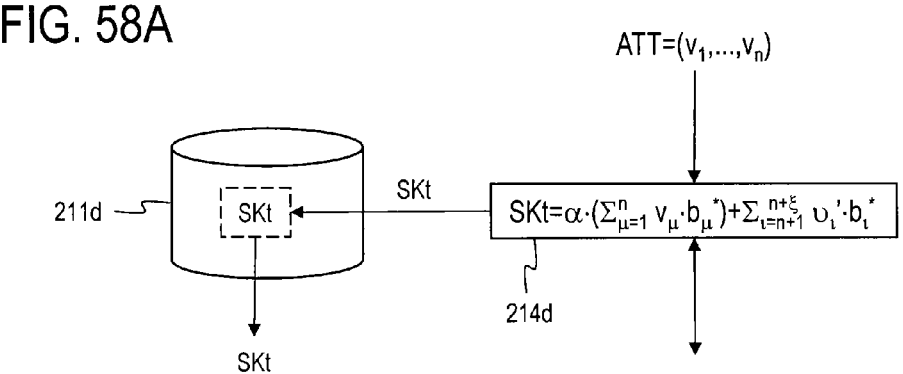
FIG. 58A is a diagram illustrating examples of the storage 211d and the key generation handling unit 214d in FIG. 20.
Figure 58B:
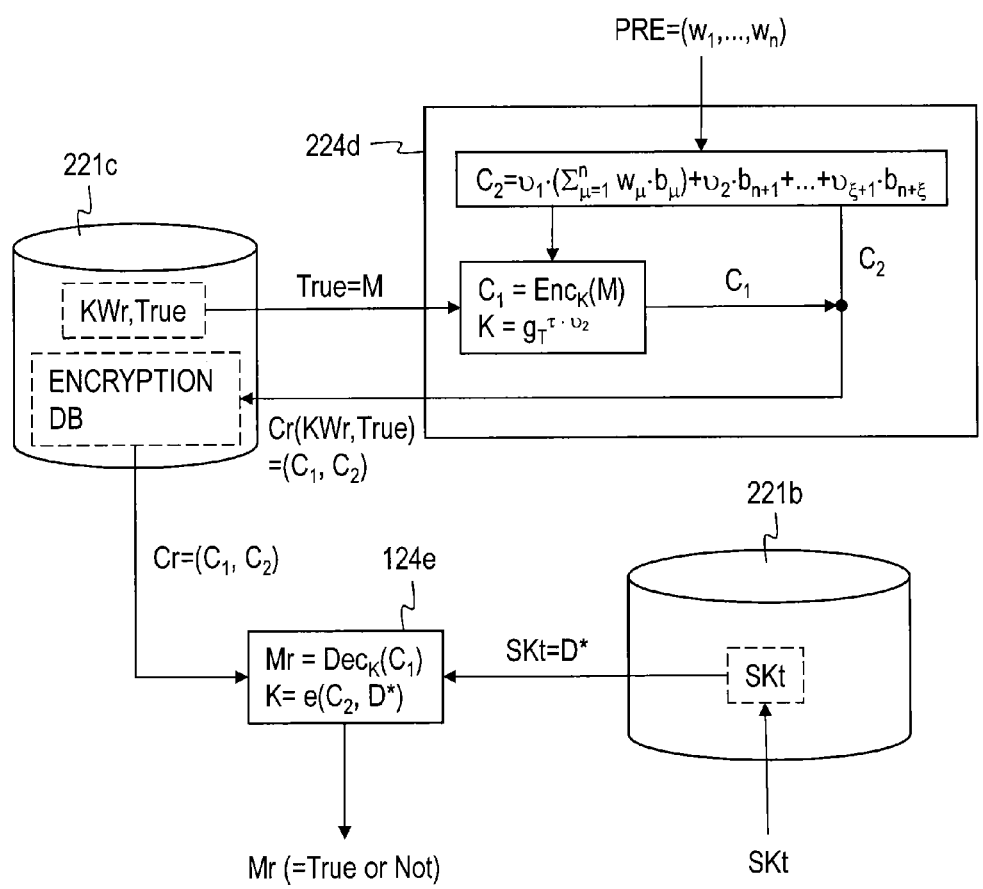
FIG. 58B is a diagram illustrating exmaples of the storages 221b, 221c and the encryption unit 224d, and the decryption unit 124e in FIG. 21.
Figure 59:
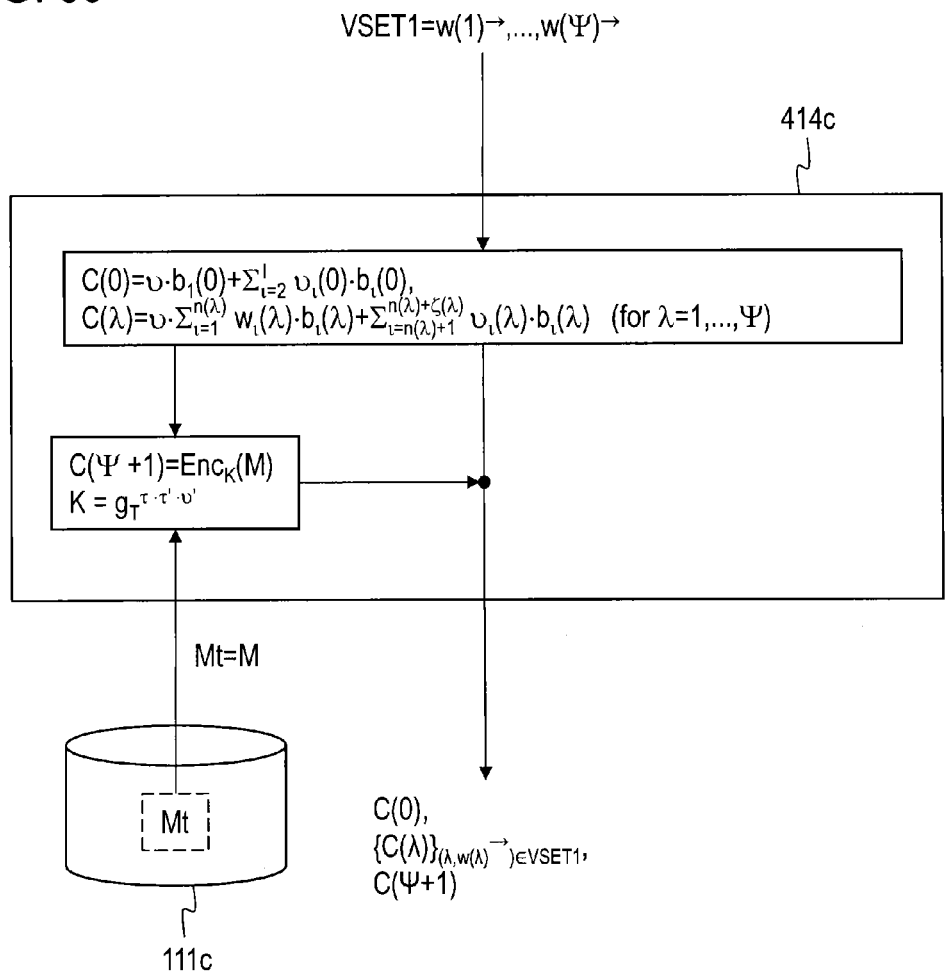
FIG. 59 is a diagram illustrating examples of the storage 111c and the encryption unit 414c in FIG. 36.
Figure 60:
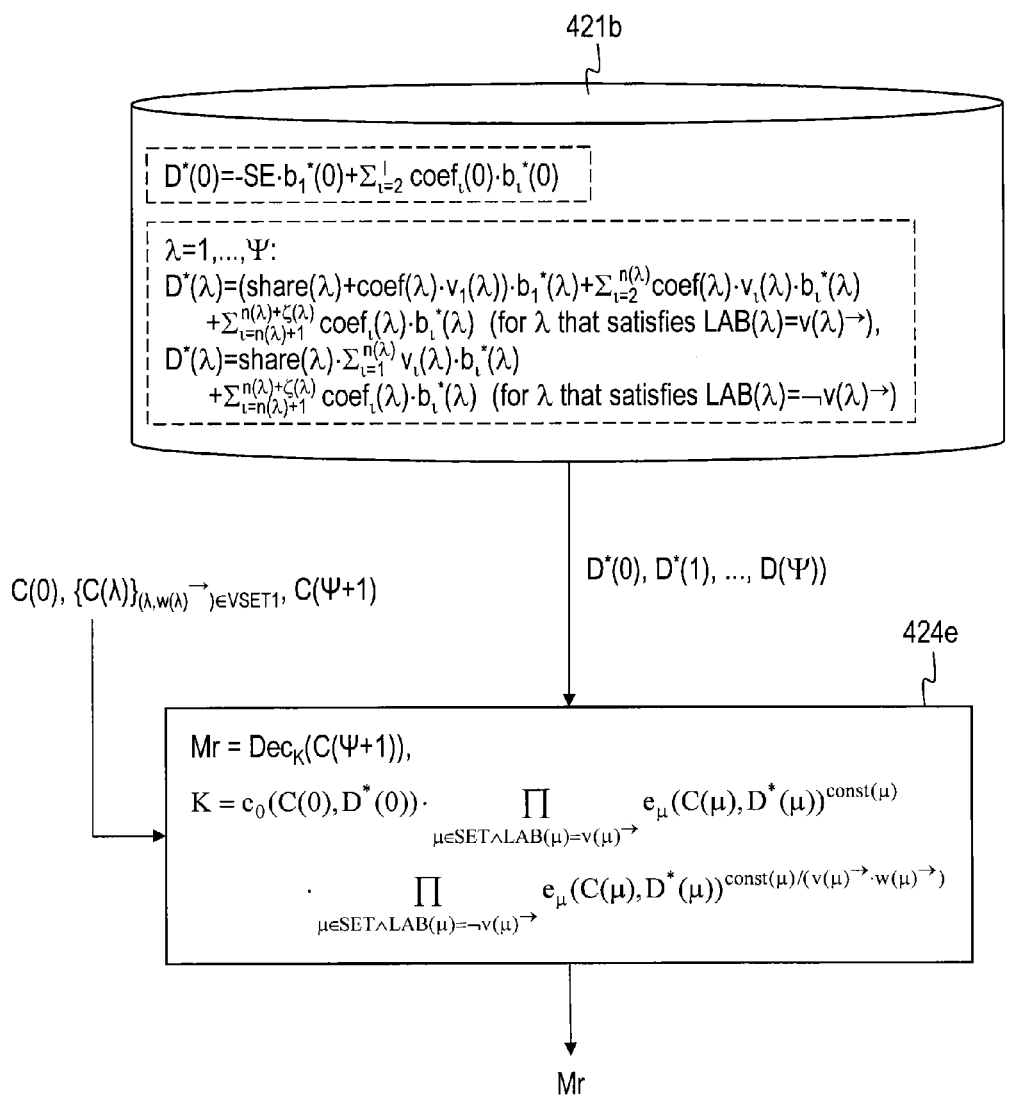
FIG. 60 is a diagram illustrating examples of the storage 421b and the decryption unit 424e in FIG. 37.
Figure 61:
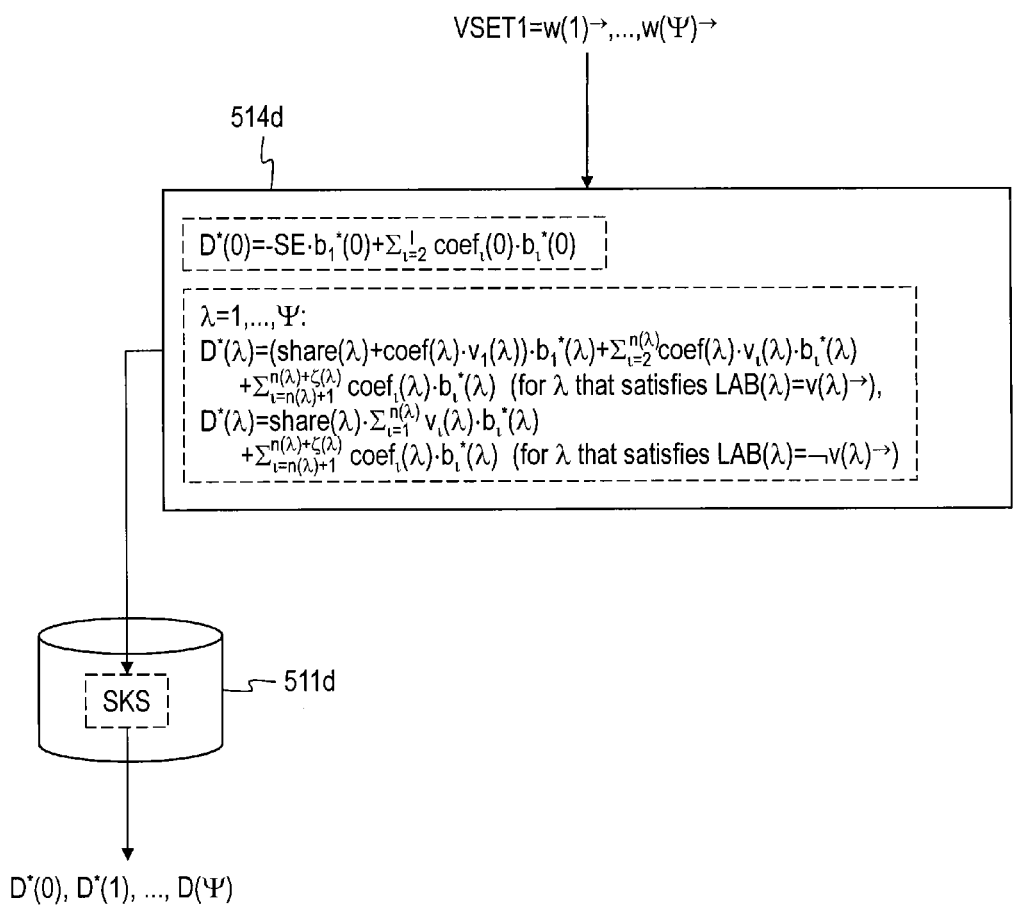
FIG. 61 is a diagram illustrating examples of the storage 511d and the key generation handling unit 514d in FIG. 46.
Figure 62:
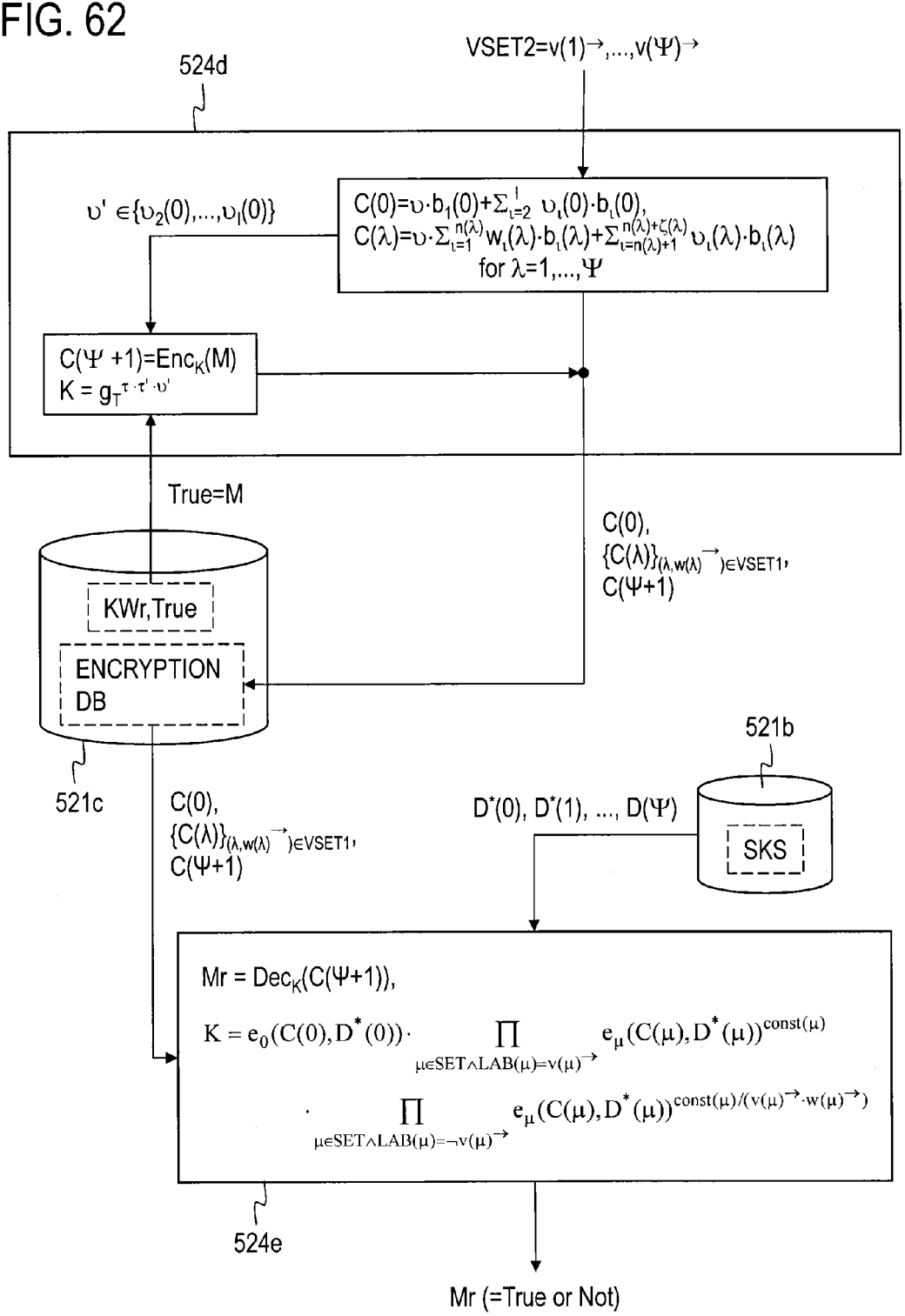
FIG. 62 is a diagram illustrating examples of the storages 521b, 521c, the encryption unit 524d, and the decryption unit 524e in FIG. 47.

FIG. 56A is a flowchart illustrating a process performed at the sender apparatus 610 of the sixth embodiment. FIG. 56B is a flowchart illustrating a process performed at the recipient apparatus 620 of the sixth embodiment. The processes of the present invention will be described with reference to these flowcharts.

In the process at the sender apparatus 610 of this embodiment, identification information PI for identifying one or more functional encryption-scheme-applied protocols to be executed is input into the input unit 112 of the sender apparatus 610 (FIG. 54) (step S611).

Here, if the protocol or the combination of protocols identified by the identification information PI represents an encryption process in which a ciphertext corresponding to attribute information VSET1 is generated as in the fourth embodiment, the encryption process of steps S411 through S415 of the fourth embodiment is performed under the control of the switching unit 614. However, the sender apparatus 610 of this embodiment transmits identification information PI to the recipient apparatus 620 together with a ciphertext Ct.

On the other hand, if the protocol or combination of protocols identified by the identification information PI represents a search request process and a key information generation process in which key information corresponding to attribute information VSET1 is generated as in the fifth embodiment, the search request process and the key information generation process of steps S511 through S517 and S531 through S533 of the fifth embodiment are performed under the control of the switching unit 614. However, the sender apparatus 610 of this embodiment transmits identification information PI to the recipient apparatus 620 together with key information SKS.

In the process at the recipient apparatus 620 of this embodiment, the communication unit 125 of the recipient apparatus 620 (FIG. 55) receives a pair of ciphertext Ct and identification information PI or a pair of key information SKS and identification information PI transmitted from the sender apparatus 610 (step S621).

Here, if the protocol or combination of protocols identified by the identification information PI represents a decryption process and a key information generation process in which key information corresponding to condition information VSET2 is generated as in the fourth embodiment, the decryption process and the key information generation process of steps S421 through S427 and S431 through S433 of the fourth embodiment are performed under the control of switching units 624a and 624b.

On the other hand, if the protocol or combination of protocols identified by the identification information PI represents a search process in which a ciphertext according to condition information VSET2 is generated as in the fifth embodiment, the search process of steps S521 through S525 of the fifth embodiment is performed under the control of the switching units 624a and 624b.

[Other Variations of Fourth to Sixth Embodiments]

The present invention is not limited to the fourth to sixth embodiments described above. For example, the operations defined on the finite field $F_q$ described above may be replaced with operations defined on a finite ring $Z_q$ of order q. One example of the method of replacing operations defined on the finite field $F_q$ with operations defined on a finite ring $Z_q$ is to permit q other than primes and powers of primes.

While the key generating apparatus is provided externally to the sender apparatus and the recipient apparatus in the fourth to sixth embodiments, the sender apparatus or the recipient apparatus may include the function of the key generating apparatus. Such a sender apparatus or recipient apparatus can generate key information by itself without requesting a key generating apparatus to generate key information.

In the fourth to sixth embodiments, condition information VSET2 is determined at the recipient apparatus after the recipient apparatus has received a ciphertext or key information transmitted from the sender apparatus. However, depending on protocols, condition information VSET2 can be determined at the recipient apparatus before the recipient apparatus receives a ciphertext or key information transmitted from the sender apparatus. In that case, the recipient apparatus may determine condition information VSET2 and generate key information or a ciphertext corresponding to the condition information VSET2 before the recipient apparatus receives a ciphertext or key information transmitted from the sender apparatus.

Furthermore, condition information VSET2 may be used instead of attribute information VSET1 and attribute information VSET1 may be used instead of condition information VSET2. That is, condition information VSET2 may be equivalent to first correspondence information and attribute information VSET1 may be equivalent to second correspondence information.

Furthermore, while the apparatuses exchange information over a network in the fourth to sixth embodiment, the apparatuses may exchange information through a portable recording medium such as a USB memory.

Furthermore, the processes described above can be performed not only in the chronological order presented herein but also may be performed in parallel or separately depending on the processing capacity of the apparatuses that perform the processes or as necessary. It would be understood that other modifications can be made as appropriate without departing from the spirit of the present invention.

[Program and Recording Medium]

If the configuration of any of the first to sixth embodiments described above are implemented by a computer, processes of functions the apparatuses need to include are described by a program. The processes of the functions are implemented on the computer by executing the program on the computer. The program describing the processes can be recorded on a computer-readable recording medium. The computer-readable recording medium may be any recording medium such as a magnetic recording device, an optical disc, a magneto-optical recording medium, or a semiconductor memory, for example.

The program is distributed by selling, transferring, or lending a portable recording medium on which the program is recorded, such as a DVD or a CD-ROM. The program may be stored on a storage device of a server computer and transferred from the server computer to other computers over a network, thereby distributing the program.

A computer that executes the program first stores the program recorded on a portable recording medium or transferred from a server computer into a storage device of the computer. When the computer executes the processes, the computer reads the program stored on the recording medium of the computer and executes the processes according to the read program. In another execution mode of the program, the computer may read the program directly from the portable recording medium or the computer may execute the processes according to the program each time the program is transferred from the server computer to the computer. Alternatively, the processes may be executed using a so-called ASP (Application Service Provider) service in which the program is not transferred from a server to the computer but process functions are implemented by instructions to execute program and acquisition of the results of the execution. The program in the present embodiments encompasses information that is provided for processing by an electronic computer and is equivalent to a program (such as data that is not direct commands to a computer but has the nature that defines processing of the computer).

While the apparatuses are configured by causing a computer to execute a given program in the embodiments, at least some of the processes may be implemented by hardware.

DESCRIPTION OF SYMBOLS 1-3: Functional encryption applied system
110, 210, 310: Sender apparatus (information output apparatus)
120, 220, 320: Recipient apparatus (information processing apparatus)
130: Key generating apparatus

What is claimed is:

1. A functional encryption applied system comprising an information output apparatus and an information processing apparatus, wherein
the information output apparatus includes:
a determiner that identifies a first identifier or a plurality of first identifiers according to a rule for a combination of protocols or each of the protocols that are in accordance with a functional encryption scheme, the first identifier or the plurality of the first identifiers corresponding to the protocols or each of the protocols;
a setter that sets a particular piece of first correspondence information corresponding to the first identifier or a combination of the plurality of the first identifiers; and
a transmitter that outputs first information, the first information being a first ciphertext or first key information of the functional encryption scheme, and the first information corresponding to the particular piece of first correspondence information,
the information processing apparatus includes:
a decryptor that inputs the first information and second information corresponding to a particular piece of second correspondence information into a decryption function of the functional encryption scheme and, generating a decryption result when a truth value of a logical formula corresponding to a combination of the particular piece of first correspondence information and the particular piece of second correspondence information is true, the second information being second key information of the functional encryption scheme when the first information is the first ciphertext, and the second information being a second ciphertext of the functional encryption scheme when the first information is the first key information, the particular piece of second correspondence information corresponding to a second identifier or a combination of a plurality of second identifiers, the second identifier or the second identifiers being identified in according to the rule,
the information output apparatus further comprises a first selector that selects whether the first information is to be the first ciphertext or the first key information, depending on the protocol or each of the protocols, the first key information being used for decryption of the second ciphertext, the second ciphertext being generated without the first key information;
the information processing apparatus further comprising a second selector that selects whether the second information is to be the second ciphertext or the second key information, depending on the protocol or each of the particular protocols, the second key information being used for decryption of the first ciphertext, the first ciphertext being generated without the second key information; and
the first correspondence information is a first vector or first vectors, and the second correspondence information is a second vector or second vectors.

2. A functional encryption applied system comprising an information output apparatus and an information processing apparatus, wherein
the information output apparatus includes:
a determiner that identifies a first identifier or a plurality of first identifiers according to a rule for a combination of protocols or each of the protocols that are in accordance with a functional encryption scheme, the first identifier or the plurality of the first identifiers corresponding to the protocols or each of the protocols;
a setter that sets a first vector corresponding to the first identifier or a combination of the plurality of the first identifiers; and
a transmitter that outputs first information, the first information being a first ciphertext or first key information of the functional encryption scheme, and the first information corresponding to the first vector,
the information processing apparatus includes:
a decryptor that inputs the first information and second information corresponding to a second vector into a decryption function of the functional encryption scheme and, generating a decryption result when an inner product of the first vector and the second vector is 0, the second information being second key information of the functional encryption scheme when the first information is the first ciphertext, and the second information being a second ciphertext of the functional encryption scheme when the first information is the first key information, the second vector corresponding to a second identifier or a combination of a plurality of second identifiers, the second identifier or the second identifiers being identified in according to the rule, the first vector is $v^{\rightarrow} = (v_1, \ldots, v_n)$ and the second vector is $w^{\rightarrow} = (w_1, \ldots, w_n)$, the first ciphertext includes $\upsilon_1 \cdot (\Sigma_{\mu=1}^{n} v_\mu \cdot b_\mu) + \upsilon_2 \cdot b_{n+1} + \ldots + \upsilon_{\xi+1} \cdot b_{n+\xi}$ and the second key information is $\alpha \cdot (\Sigma_{\mu=1}^{n} -w_\mu \cdot b_\mu^*) + \Sigma_{\iota=n+1}^{n+\xi} -\upsilon_\iota' \cdot b_\iota^*$ or;

the second ciphertext includes $\upsilon_1 \cdot (\Sigma_{\mu=1}^{n} w_\mu \cdot b_\mu) + \upsilon_2 \cdot b_{n+1} + \ldots + \upsilon_{\xi+1} \cdot b_{n+\xi}$ and the first key information is $\alpha \cdot (\Sigma_{\mu=1}^{n} -v_\mu \cdot b_\mu^*) + \Sigma_{\iota=n+1}^{n+\xi} -\upsilon_\iota' \cdot b_\iota^*$, where $\mu = 1, \ldots, n$, n represents an integer greater than or equal to 1, $\xi$ is an integer greater than or equal to 1, $i = 1, \ldots, n+\xi$, $b_i$ represent an $n+\xi$-dimensional basis vector, $b_i^*$ represent an $n+\xi$-dimensional basis vector, $\Sigma$ represents summation, $v_\mu$ represents the $\mu$-th element of $v^{\rightarrow} = (v_1, \ldots, v_n)$, $w_\mu$, represents a element of $w^{\rightarrow} = (w_1, \ldots, w_n)$, and $\alpha, \upsilon_1, \ldots, \upsilon_{\xi+1}, \upsilon_\iota'$ are elements of a finite field or a finite ring.

3. The functional encryption applied system according to claim 2, wherein:

at least some elements of the first vector are first spare fields whose values are fixed;

at least some elements of the second vector are second spare fields whose values are fixed;

first positions of the first spare fields of the first vector including the first spare fields are identical to second positions of the second spare fields of the second vector; and an inner product of a third vector constituting the first spare fields and a fourth vector constituting the second spare fields is 0 regardless of the first identifier or the combination of the plurality of the first identifiers.

4. The functional encryption applied system according to claim 3, wherein values in all of the first spare fields are 0.

5. The functional encryption applied system according to claim 3, wherein values in all of the second spare fields are 0.

6. The functional encryption applied system according to claim 4, wherein values in at least some of the second spare fields are nonzero.

7. The functional encryption applied system according to claim 5, wherein values in at least some of the first spare fields are nonzero.

8. A functional encryption applied system comprising an information output apparatus and an information processing apparatus, wherein the information output apparatus includes:

a determiner that identifies a first identifier or a plurality of first identifiers according to a rule for a combination of protocols or each of the protocols that are in accordance with a functional encryption scheme, the first identifier or the plurality of first identifiers corresponding to the protocols or each of the protocols;

a setter that sets a particular piece of first correspondence information corresponding to the first identifier or the combination of the plurality of the first identifiers; and a transmitter that outputs first information, the first information being a first ciphertext or first key information of the functional encryption scheme, and the first information corresponding to the particular piece of first correspondence information, the information processing apparatus includes:

a decryptor that inputs the first information and second information corresponding to a particular piece of second correspondence information into a decryption function of the functional encryption scheme, and generating a decryption result, the second information being second key information of the functional encryption scheme when the first information is the first ciphertext, and the second information being second ciphertext of the functional encryption scheme when the first information is the first key information, the particular piece of second correspondence information corresponding to a second identifier or a combination of a plurality of second identifiers, the second identifier or the second identifiers being identified in according to the rule, the first correspondence information includes a plurality of pieces of first partial correspondence information and the second correspondence information includes a plurality of pieces of second partial correspondence information, partial combinations each consisting of each of the pieces of the first partial correspondence information and each of the pieces of the second partial correspondence information, each of the partial combinations is true or false, a first partial combination of the partial combinations is true when a predetermined function returns a particular value for the first partial combination, a second partial combination of the partial combinations is true when the predetermined function does not return the particular value for the second partial combination, and the decryption function returns the decryption result when a fifth vector exists in a vector space formed by particular vectors, each of the particular vectors being associated with each of the pieces of the first partial correspondence information or the second partial correspondence information of the partial combinations being true, the pieces of the first partial correspondence information are first vectors and the pieces of the second partial correspondence information are second vectors, and the predetermined function calculates an inner product of each vector of the first vectors and each vector of the second vectors, and the particular value is 0.

9. The functional encryption applied system according to claim 8, wherein at least one vector of the first vectors is a third vector whose all elements are fixed, at least one vector of the second vectors is a fourth vector whose all elements are fixed, and an inner product of the third vector and the fourth vector is 0 regardless of the first identifier or the combination of the plurality of the first identifiers.

10. The functional encryption applied system according to claim 9, wherein all elements of the third vector are 0.

11. The functional encryption applied system according to claim 9, wherein all elements of the fourth vector are 0.

12. The functional encryption applied system according to claim 10, wherein the fourth vector includes nonzero element.

13. The functional encryption applied system according to claim 11, wherein the third vector includes nonzero elements.

14. The functional encryption applied system according to claim 8, wherein the first vectors are $v(1)^{\rightarrow}, \ldots, v(\Psi)^{\rightarrow}$ and second vectors are $w(1)^{\rightarrow}, \ldots, w(\Psi)^{\rightarrow}$ or, the first vectors are $w(1)^{\rightarrow}, \ldots, w(\Psi)^{\rightarrow}$ and the second vectors are $v(1)^{\rightarrow}, \ldots, v(\Psi)^{\rightarrow}$, the first key information includes $D^*(0), D^*(1), \ldots, D^*(\Psi)$ and the second ciphertext includes $C(0), C(1), \ldots, C(\Psi)$ or, the second key information includes $D^*(0), D^*(1), \ldots, D^*(\Psi)$ and the first ciphertext includes $C(0), C(1), \ldots, C(\Psi)$, where $$D^*(0) = -SE \cdot b_1^*(0) + \Sum_{\iota=2}^{I} -\text{coef}_\iota(0) \cdot b_\iota^*(0),$$

$$D^*(\lambda) = (\text{share}(\lambda) + \text{coef}(\lambda) \cdot v_1(\lambda)) \cdot b_1^*(\lambda)$$

$$+ \Sum_{\iota=2}^{n(\lambda)} -\text{coef}(\lambda) \cdot v_\iota(\lambda) \cdot b_\iota^*(\lambda)$$

$$+ \Sum_{\iota=n(\lambda)+1}^{n(\lambda)+\zeta(\lambda)} -\text{coef}_\iota(\lambda) \cdot b_\iota^*(\lambda)$$

for $\lambda$ that satisfies LAB $(\lambda) = v(\lambda)^{\rightarrow}$, $$D^*(\lambda) = \text{share}(\lambda) \cdot \Sum_{\iota=1}^{n(\lambda)} -v_\iota(\lambda) \cdot b_\iota^*(\lambda)$$

$$+ \Sum_{\iota=n(\lambda)+1}^{n(\lambda)+\zeta(\lambda)} -\text{coef}_\iota(\lambda) \cdot b_\iota^*(\lambda)$$

for $\lambda$ that satisfies LAB$(\lambda) = \neg\, v(\lambda)^{\rightarrow}$, $$C(0) = \upsilon \cdot b_1(0) + \Sum_{\iota=2}^{I} \upsilon_\iota(0) \cdot b_\iota(0),$$

$$C(\lambda) = \upsilon \cdot \Sum_{\iota=1}^{n(\lambda)} w_\iota(\lambda) \cdot b_\iota(\lambda) + \Sum_{\iota=n(\lambda)+1}^{n(\lambda)+\zeta(\lambda)} \upsilon_\iota(\lambda) \cdot b_\iota(\lambda),$$

$\psi$ represents an integer greater than or equal to 1,
$n(\psi)$ represents an integer greater than or equal to 1,
$\zeta(\psi)$ represents an integer greater than or equal to 0,
$\psi = 0, \ldots, \Psi$,
$\lambda = 1, \ldots, \Psi$,
LAB($\lambda$) are labels associated with $\lambda = 1, \ldots, \Psi$,
LAB($\lambda$) represents $v(\lambda)^{\rightarrow}$ or $\neg\, v(\lambda)^{\rightarrow}$,
$\neg$ represents logical negation,
$\Sum$ represents summation,
SE is secret information,
share($\lambda$) is share information of SE,
$b_i(\psi)$ represents an $n(\psi)+\zeta(\psi)$-dimensional basis vector,
$b_i^*(\psi)$ represents an $n(\psi)+\zeta(\psi)$-dimensional basis vector,
$i = 1, \ldots, n(\psi)+\zeta(\psi)$,
$v_\mu(\lambda)$ represents a $\mu$-th element of $v(\lambda)^{\rightarrow} = (v_1(\lambda), \ldots, v_{n(\lambda)}(\lambda))$,
$w_\mu(\lambda)$ represents a $\mu$-th element of $w(\lambda)^{\rightarrow} = (w_1(\lambda), \ldots, w_{n(\lambda)}(\lambda))$,
$\mu = 1, \ldots, n(\lambda)$,
I is a constant greater than or equal 2 and less than or equal to $n(0)+\zeta(0)$, and
$\text{coef}_\iota(0)$, $\text{coef}(\lambda)$, $\text{coef}_\iota(\lambda)$, $\upsilon$ and $\upsilon_\iota(\Psi)$ are elements of a finite field or a finite ring.

15. A functional encryption applied system comprising an information output apparatus and an information processing apparatus, wherein the information output apparatus includes:
a determiner that identifies first identifier or a plurality of first identifiers according to a rule for a combination of protocols or each of the protocols that are in accordance with a functional encryption scheme, the first identifier or the plurality of the first identifiers corresponding to the protocols or each of the protocols;
a setter that sets a particular piece of first correspondence information corresponding to the first identifier or a combination of the plurality of the first identifiers; and
a transmitter that outputs first information, the first information being a first ciphertext or first key information of the functional encryption scheme, and the first information corresponding to the particular piece of first correspondence information, the information processing apparatus includes
a decryptor that inputs the first information and second information corresponding to a particular piece of second correspondence information into a decryption function of the functional encryption scheme and, generating a decryption result when a truth value of a logical formula corresponding to a combination of the particular piece of first correspondence information and the particular piece of second correspondence information is true, the second information being second key information of the functional encryption scheme when the first information is the first ciphertext, and the second information being a second ciphertext of the functional encryption scheme when the first information is the first key information, the particular piece of second correspondence information corresponding to a second identifier or a combination of a plurality of second identifiers, the second identifier or the second identifiers being identified in according to the rule, the protocols are selected from a set including at least one of a Timed-Release encryption protocol, a Forward Secure encryption protocol, a Key Insulated encryption protocol, a CCA2 secure encryption protocol, and a Keyword search encryption protocol;

when the protocols include the Timed-Release encryption protocol, the first identifier or any of the plurality of the first identifiers represents information identifying a time point after the time of generation of the first information;

when the protocols include the Forward Secure encryption protocol or the Key Insulated encryption protocol, the first identifier or any of the plurality of the first identifiers represents information identifying a time period including a time of generation of the first information or a time period after a time of generation of the first information;

when the protocols include the CCA2 secure encryption protocol, the first identifier or any of the plurality of the first identifiers represents one-time information which is newly set each time the first information is generated;

when the protocols include the Keyword search encryption protocol, the first identifier or any of the plurality of the first identifiers represents information identifying a keyword corresponding to the first key information for searching a database in which a third ciphertext of information to be searched is associated with the second ciphertext, the keyword corresponding to the information to be searched; and the first correspondence information is a first vector, and the second correspondence information is a second vector.

16. The functional encryption applied system according to claim 15, wherein the combination of the protocols are selected from the Timed-Release encryption protocol, the Forward Secure encryption protocol, the Key Insulated encryption protocol, the CCA2 secure encryption protocol, or the Keyword search encryption protocol.

17. An information output apparatus comprising:
a determiner that identifies a first identifier or a plurality of first identifiers according to a rule for a combination of protocols or each of the protocols that are in accordance with a functional encryption scheme, the one identifier or the plurality of the first identifiers corresponding to the protocols or each of the protocols;

a setter that sets a particular piece of first correspondence information corresponding to the first identifier or a combination of the plurality of the first identifiers;

a transmitter that outputs first information, the first information being a first ciphertext or first key information of the functional encryption scheme, and the first information corresponding to the particular piece of first correspondence information; and a first selector that selects whether the first information is to be the first ciphertext or the first key information, using identification information PI for identifying the protocols or each of the protocols to be executed, the first key information being used for decryption of a second ciphertext, the second ciphertext being generated without the first key information, wherein the first correspondence information is a first vector.

18. An information output apparatus comprising:

a determiner that identifies a first identifier or a plurality of the first identifiers according to a rule for a combination of protocols or each of the protocols that are in accordance with a functional encryption scheme, the first identifier or the plurality of the first identifiers corresponding to the protocols or each of the protocols;

a setter that sets a first vector corresponding to the first identifier or a combination of the plurality of the first identifiers; and a transmitter that outputs first information, the first information being a first ciphertext or first key information of the functional encryption scheme, and the first information corresponding to the first vector, wherein the first vector is $v^{\rightarrow}=(v_1,\ldots,v_n)$, the first ciphertext includes $\upsilon_1 \cdot (\Sigma_{\mu=1}^n v_\mu \cdot b_\mu) + \upsilon_2 \cdot b_{n+1} + \ldots + \upsilon_{\xi+1} \cdot b_{n+\xi}$ or; the first key information is $\alpha \cdot (\Sigma_{\mu=1}^n v_\mu \cdot b_\mu^*) + \Sigma_{\iota=n+1}^{n+\xi} \upsilon_\iota' \cdot b_\iota^*$, where $\mu=1,\ldots,n$, n represents an integer greater than or equal to 1, ξ is an integer greater than or equal to 1, $i=1,\ldots,n+\xi$, $b_i$ represent an n+ξ-dimensional basis vector, $b_i^*$ represent an n+ξ-dimensional basis vector, Σ represents summation, $v_\mu$ represents the μ-th element of $v^{\rightarrow}=(v_1,\ldots,v_n)$, $w_\mu$ represents a μ-th element of $w^{\rightarrow}=(w_1,\ldots,w_n)$, and $\alpha, \upsilon_1,\ldots,\upsilon_{\xi+1}, \upsilon_\iota'$ are elements of a finite field or a finite ring.

19. An information output apparatus comprising:

a determiner that identifies a first identifier or a plurality of first identifiers according to a rule for a combination of protocols or each of the protocols that are in accordance with a functional encryption scheme, the first identifier or the plurality of the first identifiers corresponding to the protocols or each of the protocols;

a setter that sets a particular piece of first correspondence information corresponding to the first identifier or the combination of the plurality of the first identifiers; and a transmitter that outputs first information, the first information being a first ciphertext or first key information of the functional encryption scheme, and the first information corresponding to the particular piece of first correspondence information, wherein the first correspondence information includes first vectors, the first vectors are $v(1)^{\rightarrow},\ldots,v(\Psi)^{\rightarrow}$ or, $w(1)^{\rightarrow},\ldots,w(\Psi)^{\rightarrow}$, the first key information includes $D^*(0), D^*(1),\ldots,D^*(\Psi)$ or, the first ciphertext includes $C(0), C(1),\ldots,C(\Psi)$, where $D^*(0) = -SE \cdot b_1^*(0) + \Sigma_{\iota=2}^I -coef_\iota(0) \cdot b_\iota^*(0)$, $D^*(\lambda) = (share(\lambda) + coef(\lambda) \cdot v_1(\lambda)) \cdot b_1^*(\lambda)$ $+\Sigma_{\iota=2}^{n(\lambda)} -coef(\lambda) \cdot v_\iota(\lambda) \cdot b_\iota^*(\lambda)$ $+\Sigma_{\iota=n(\lambda)+1}^{n(\lambda)+\zeta(\lambda)} -coef_\iota(\lambda) \cdot b_\iota^*(\lambda)$ for λ that satisfies $LAB(\lambda)=v(\lambda)^{\rightarrow}$, $D^*(\lambda) = share(\lambda) \cdot \Sigma_{\iota=1}^{n(\lambda)} -v_\iota(\lambda) \cdot b_\iota^*(\lambda)$ $+\Sigma_{\iota=n(\lambda)+1}^{n(\lambda)+\zeta(\lambda)} -coef_\iota(\lambda) \cdot b_\iota^*(\lambda)$ for λ that satisfies $LAB(\lambda)=\lnot v(\lambda)^{\rightarrow}$, $C(0) = \upsilon \cdot b_1(0) + \Sigma_{\iota=2}^I -\upsilon_\iota(0) \cdot b_\iota(0)$, $C(\lambda) = \upsilon \cdot \Sigma_{\iota=1}^{n(\lambda)} -w_\iota(\lambda) \cdot b_\iota(\lambda) + \Sigma_{\iota=n(\lambda)+1}^{n(\lambda)+\zeta(\lambda)} -\upsilon_\iota(\lambda) \cdot b_\iota(\lambda)$, Ψ represents an integer greater than or equal to 1, n(ψ) represents an integer greater than or equal to 1, ζ(ψ) represents an integer greater than or equal to 0, $\psi=0,\ldots,\Psi$, $\lambda=1,\ldots,\Psi$, LAB(λ) are labels associated with $\lambda=1,\ldots,\Psi$, LAB(λ) represents $v(\lambda)^{\rightarrow}$ or $\lnot v(\lambda)^{\rightarrow}$, ¬ represents logical negation, Σ represents summation, SE is secret information, share(λ) is share information of SE, $b_i(\psi)$ represents an n(ψ)+ζ(ψ)-dimensional basis vector, $b_i^*(\psi)$ represents an n(ψ)+ζ(ψ)-dimensional basis vector, $i=1,\ldots,n(\psi)+\zeta(\psi)$, $v_\mu(\lambda)$ represents a μ-th element of $v(\lambda)^{\rightarrow}=(v_1(\lambda),\ldots,v_{n(\lambda)}(\lambda))$, $w_\mu(\lambda)$ represents a μ-th element of $w(\lambda)^{\rightarrow}=(w_1(\lambda),\ldots,w_{n(\lambda)}(\lambda))$, $\mu=1,\ldots,n(\lambda)$, I is a constant greater than or equal 2 and less than or equal to n(0)+ζ(0), and $coef_\iota(0), coef(\lambda), coef_\iota(\lambda), \upsilon$ and $\upsilon_\iota(\psi)$ are elements of a finite field or a finite ring.

20. An information processing apparatus comprising:

a decryptor that inputs a first information corresponding to a particular piece of first correspondence information and second information corresponding to a particular piece of second correspondence information into a decryption function of a functional encryption scheme and, generating a decryption result when a truth value of a logical formula corresponding to a combination of the particular piece of first correspondence information and the particular piece of second correspondence information is true, the first information being a first ciphertext or first key information of the functional encryption scheme, the second information being second key information of the functional encryption scheme when the first information is the first ciphertext, and the second information being a second ciphertext of the functional encryption scheme when the first information is the first key information; and a second selector that selects whether the second information is to be the second ciphertext or the second key information, using identification information PI for identifying the protocols or each of the particular protocols to be executed, the second key information being used for decryption of the first ciphertext, the first ciphertext being generated without the second key information.

21. An information processing apparatus comprising:

a decryptor that inputs a first information corresponding to a first vector and second information corresponding to a second vector into a decryption function of a functional encryption scheme and, generating a decryption result, the first information being a first ciphertext or first key information of the functional encryption scheme, the second information being second key information of the functional encryption scheme when the first information is the first ciphertext, and the second information being a second ciphertext of the functional encryption scheme when the first information is the first key information, the first vector corresponding to a first identifier or a combination of a plurality of first identifiers, the second vector corresponding to a second identifier or a combination of a plurality of second identifiers, the first identifier or the first identifiers being identified in according to a rule for a combination of protocols or each of the protocols that are in accordance with the functional encryption scheme, and the second identifier or the second identifiers being identified in according to the rule, wherein the first vector is $\vec{v}=(v_1,\ldots,v_n)$ and the second vector is $\vec{w}=(w_1,\ldots,w_n)$, the first ciphertext includes $\upsilon_1\cdot(\Sigma_{\mu=1}^{n} v_\mu \cdot b_\mu)+\upsilon_2\cdot b_{n+1}+\ldots+\upsilon_{\xi+1}\cdot b_{n+\xi}$ and the second key information is $\alpha\cdot(\Sigma_{\mu=1}^{n}-w_\mu\cdot b_\mu^*)+\Sigma_{\iota=n+1}^{n+\xi}-\upsilon_\iota'\cdot b_\iota^*$ or;

the second ciphertext includes $\upsilon_1\cdot(\Sigma_{\mu=1}^{n} w_\mu \cdot b_\mu)+\upsilon_2\cdot b_{n+1}+\ldots+\upsilon_{\xi+1}\cdot b_{n+\xi}$ and the first key information is $\alpha\cdot(\Sigma_{\mu=1}^{n}-v_\mu\cdot b_\mu^*)+\Sigma_{\iota=n+1}^{n+\xi}-\upsilon_\iota'\cdot b_\iota^*$, where $\mu=1,\ldots,n$, n represents an integer greater than or equal to 1, $\xi$ is an integer greater than or equal to 1, $i=1,\ldots,n+\xi$, $b_i$ represent an $n+\xi$-dimensional basis vector, $b_i^*$ represent an $n+\xi$-dimensional basis vector, $\Sigma$ represents summation, $v_\mu$ represents the $\mu$-th element of $\vec{v}=(v_1,\ldots,v_n)$, $w_\mu$ represents a $\mu$-th element of $\vec{w}=(w_1,\ldots,w_n)$, and $\alpha,\upsilon_1,\ldots,\upsilon_{\xi+1},\upsilon_\iota'$ are elements of a finite field or a finite ring.

22. An information processing apparatus comprising:

a decryptor that inputs information corresponding to a particular piece of first correspondence information and second information corresponding to a particular piece of second correspondence information into a decryption function of a functional encryption scheme, and generating a decryption result, the first information being a first ciphertext or first key information of the functional encryption scheme, the second information being second key information of the functional encryption scheme when the first information is the first ciphertext, and the second information being second ciphertext of the functional encryption scheme when the first information is the first key information, the first correspondence information corresponding to a first identifier or a combination of a plurality of first identifiers, the second correspondence information corresponding to a second identifier or a combination of a plurality of second identifiers, the first identifier or the first identifiers being identified in according to a rule for a combination of protocols or each of the protocols that are in accordance with the functional encryption scheme, and the second identifier or the second identifiers being identified in according to the rule, wherein the first correspondence information includes a plurality of pieces of first partial correspondence information and the second correspondence information includes a plurality of pieces of second partial correspondence information, partial combinations each consisting of each of the pieces of the first partial correspondence information and each of the pieces of the second partial correspondence information, each of the partial combinations is true or false, a first partial combination of the partial combinations is true when the predetermined function returns a particular value for the first partial combination, a second partial combination of the partial combinations is true when the predetermined function does not return the particular value for the second partial combination, and the decryption function returns the decryption result when a fifth vector exists in a vector space formed by particular vectors, each of the particular vectors being associated with each of the pieces of the first partial correspondence information or the second partial correspondence information of the partial combinations being true, the pieces of the first partial correspondence information are first vectors and the pieces of the second partial correspondence information are second vectors, and the predetermined function calculates an inner product of each vector of the first vectors and each vector of the second vectors, and the particular value is 0.

23. The information processing apparatus according to claim 22, wherein the pieces of the first partial correspondence information are first vectors and the pieces of the second partial correspondence information are second vectors, and the predetermined function calculates an inner product of each vector of the first vectors and each vector of the second vectors, and the particular value is 0, the first vectors are $v(1)^{\rightarrow},\ldots,v(\Psi)^{\rightarrow}$ and second vectors are $w(1)^{\rightarrow},\ldots,w(\Psi)^{\rightarrow}$, or the first vectors are $w(1)^{\rightarrow},\ldots,w(\Psi)^{\rightarrow}$ and the second vectors are $v(1)^{\rightarrow},\ldots,v(\Psi)^{\rightarrow}$, the first key information includes $D^*(0), D^*(1),\ldots,D^*(\Psi)$ and the second ciphertext includes $C(0), C(1),\ldots,C(\Psi)$ or, the second key information includes $D^*(0), D^*(1),\ldots,D^*(\Psi)$ and the first ciphertext includes $C(0), C(1),\ldots,C(\Psi)$, where $$D^*(0)=-SE\cdot b_1^*(0)+\Sigma_{\iota=2}^{I}-\mathrm{coef}_\iota(0)\cdot b_\iota^*(0),$$

$$D^*(\lambda)=(\mathrm{share}(\lambda)+\mathrm{coef}(\lambda)\cdot v_1(\lambda))\cdot b_1^*(\lambda)$$
$$+\Sigma_{\iota=2}^{n(\lambda)}-\mathrm{coef}(\lambda)\cdot v_\iota(\lambda)\cdot b_\iota^*(\lambda)$$
$$+\Sigma_{\iota=n(\lambda)+1}^{n(\lambda)+\zeta(\lambda)}-\mathrm{coef}_\iota(\lambda)\cdot b_\iota^*(\lambda)$$

for $\lambda$ that satisfies $\mathrm{LAB}(\lambda)=v(\lambda)^{\rightarrow}$, $$D^*(\lambda)=\mathrm{share}(\lambda)\cdot \Sigma_{\iota=1}^{n(\lambda)}-v_\iota(\lambda)\cdot b_\iota^*(\lambda)$$
$$+\Sigma_{\iota=n(\lambda)+1}^{n(\lambda)+\zeta(\lambda)}-\mathrm{coef}_\iota(\lambda)\cdot b_\iota^*(\lambda)$$

for $\lambda$ that satisfies $\mathrm{LAB}(\lambda)=\neg v(\lambda)^{\rightarrow}$, $$C(0)=\upsilon\cdot b_1 1(0)+\Sigma_{\iota=2}^{I}-\upsilon_\iota(0)\cdot b_\iota(0),$$

$$C(\lambda)=\upsilon\cdot \Sigma_{\iota=1}^{n(\lambda)}-w_\iota(\lambda)\cdot b_\iota(\lambda)+\Sigma_{\iota=n(\lambda)+1}^{n(\lambda)+\zeta(\lambda)}-\upsilon_\iota(\lambda)\cdot b_\iota(\lambda),$$

$\Psi$ represents an integer greater than or equal to 1, $n(\psi)$ represents an integer greater than or equal to 1, $\zeta(\psi)$ represents an integer greater than or equal to 0, $\psi=0,\ldots,\Psi$, $\lambda=1,\ldots,\Psi$, $\mathrm{LAB}(\lambda)$ are labels associated with $\lambda=1,\ldots,\Psi$ $\mathrm{LAB}(\lambda)$ represents $v(\lambda)^{\rightarrow}$ or $\neg v(\lambda)^{\rightarrow}$, $\neg$ represents logical negation, Σ represents summation,
SE is secret information,
share(λ) is share information of SE,
$b_i(\psi)$ represents an $n(\psi)+\zeta(\psi)$-dimensional basis vector,
$b_i^*(\psi)$ represents an $n(\psi)+\zeta(\psi)$-dimensional basis vector,
$i=1,\ldots,n(\psi)+\zeta(\psi)$,
$v_\mu(\lambda)$ represents a μ-th element of $v(\lambda)^\rightarrow=(v_1(\lambda),\ldots,v_{n(\lambda)}(\lambda))$,
$w_\mu(\lambda)$ represents a μ-th element of $w(\lambda)^\rightarrow=(w_1(\lambda),\ldots,w_{n(\lambda)}(\lambda))$,
$\mu=1,\ldots,n(\lambda)$,
I is a constant greater than or equal 2 and less than or equal to $n(0)+\zeta(0)$, and
$coef_\iota(0)$, $coef(\lambda)$, $coef_\iota(\lambda)$, $\upsilon$ and $\upsilon_\iota(\Psi)$ are elements of a finite field or a finite ring.

24. An information processing apparatus comprising:
a decryptor that inputs a first information corresponding to a particular piece of first correspondence information and second information corresponding to a particular piece of second correspondence information into a decryption function of a functional encryption scheme and, generating a decryption result when a truth value of a logical formula corresponding to a combination of the particular piece of first correspondence information and the particular piece of second correspondence information is true, the first information being a first ciphertext or first key information of the functional encryption scheme, the second information being second key information of the functional encryption scheme when the first information is the first ciphertext, and the second information being a second ciphertext of the functional encryption scheme when the first information is the first key information, the first correspondence information corresponding to a first identifier or a combination of a plurality of first identifiers, the second correspondence information corresponding to a second identifier or a combination of a plurality of second identifiers, the first identifier or the first identifiers being identified in according to a rule for a combination of protocols or each of the protocols that are in accordance with the functional encryption scheme, and the second identifier or the second identifiers being identified in according to the rule, wherein
the protocols are selected from a set including at least one of a Timed-Release encryption protocol, a Forward Secure encryption protocol, a Key Insulated encryption protocol, a CCA2 secure encryption protocol, and a Keyword search encryption protocol;
when the protocols include the Timed-Release encryption protocol, the first identifier or any of the plurality of the first identifiers represents information identifying a time point after the time of generation of the first information;
when the protocols include the Forward Secure encryption protocol or the Key Insulated encryption protocol, the first identifier or any of the plurality of the first identifiers represents information identifying a time period including a time of generation of the first information or a time period after a time of generation of the first information;
when the protocols include the CCA2 secure encryption protocol, the first identifier or any of the plurality of the first identifiers represents one-time information which is newly set each time the first information is generated; and
when the protocols include the Keyword search encryption protocol, the first identifier or any of the plurality of the first identifiers represents information identifying a keyword corresponding to the first key information for searching a database in which a third ciphertext of information to be searched is associated with the second ciphertext, the keyword corresponding to the information to be searched.

25. An information output method comprising:
identifying, by determiner, a first identifier or a plurality of first identifiers according to a rule for a combination of protocols or each of the protocols that are in accordance with a functional encryption scheme, the one identifier or the plurality of the first identifiers corresponding to the protocols or each of the protocols;
setting, by a setter, a particular piece of first correspondence information corresponding to the first identifier or a combination of the plurality of the first identifiers;
outputting first information from a transmitter, the first information being a first ciphertext or first key information of the functional encryption scheme, and the first information corresponding to the particular piece of first correspondence information; and
selecting, by a first unitselector, whether the first information is to be the first ciphertext or the first key information, using identification information PI for identifying the protocols or each of the protocols to be executed, the first key information being used for decryption of a second ciphertext, wherein
the first correspondence information is a first vector.

26. An information output method comprising:
identifying, by a determiner a first identifier or a plurality of the first identifiers according to a rule for a combination of protocols or each of the protocols that are in accordance with a functional encryption scheme, the first identifier or the plurality of the first identifiers corresponding to the protocols or each of the protocols;
setting, by a setter, a first vector corresponding to the first identifier or a combination of the plurality of the first identifiers; and
outputting first information from a transmitter, the first information being a first ciphertext or first key information of the functional encryption scheme, and the first information corresponding to the first vector, wherein
the first vector is $v^\rightarrow=(v_1,\ldots,v_n)$,
the first ciphertext includes $\upsilon_1\cdot(\Sigma_{\mu=1}^n v_\mu\cdot b_\mu)+\upsilon_2\cdot b_{n+1}+\ldots+\upsilon_{\xi+1}\cdot b_{n+\xi}$ or; the first key information is $\alpha\cdot(\Sigma_{\mu=1}^n -v_\mu\cdot b_\mu^*)+\Sigma_{\iota=n+1}^{n+\xi}-\upsilon_\iota'\cdot b_\iota^*$, where
$\mu=1,\ldots,n$,
n represents an integer greater than or equal to 1,
ξ is an integer greater than or equal to 1,
$i=1,\ldots,n+\xi$,
$b_i$ represent an n+ξ-dimensional basis vector,
$b_i^*$ represent an n+ξ-dimensional basis vector,
Σ represents summation,
$v_\mu$ represents the μ-th element of $v^\rightarrow=(v_1,\ldots,v_n)$,
$w_\mu$ represents a μ-th element of $w^\rightarrow=(w_1,\ldots,w_n)$, and
$\alpha,\upsilon_1,\ldots,\upsilon_{\xi+1},\upsilon_\iota'$ are elements of a finite field or a finite ring.

27. An information output method comprising:
identifying, by a determiner, a first identifier or a plurality of first identifiers according to a rule for a combination of protocols or each of the protocols that are in accordance with a functional encryption scheme, the first identifier or the plurality of the first identifiers corresponding to the protocols or each of the protocols;
setting, by a setter, a particular piece of first correspondence information corresponding to the first identifier or the combination of the plurality of the first identifiers; and outputting first information from a transmitter, the first information being a first ciphertext or first key information of the functional encryption scheme, and the first information corresponding to the particular piece of first correspondence information, wherein the first correspondence information includes first vectors, the first vectors are $v(1)^\rightarrow, \ldots, v(\Psi)^\rightarrow$ or, $w(1)^\rightarrow, \ldots, w(\Psi)^\rightarrow$, the first key information includes $D^*(0), D^*(1), \ldots, D^*(\Psi)$ or, the first ciphertext includes $C(0), C(1), \ldots, C(\Psi)$, where $$D^*(0) = -SE \cdot b_1^*(0) + \Sigma_{\iota=2}^I - \text{coef}_\iota(0) \cdot b_\iota^*(0),$$

$$D^*(\lambda) = (\text{share}(\lambda) + \text{coef}(\lambda) \cdot v_1(\lambda)) \cdot b_1^*(\lambda)$$
$$+ \Sigma_{\iota=2}^{n(\lambda)} - \text{coef}(\lambda) \cdot v_{\iota(\lambda)} \cdot b_\iota^*(\lambda)$$
$$+ \Sigma_{\iota=n(\lambda)+1}^{n(\lambda)+\zeta(\lambda)} - \text{coef}_\iota(\lambda) \cdot b_\iota^*(\lambda)$$

for $\lambda$ that satisfies $LAB(\lambda) = v(\lambda)^\rightarrow$, $$D^*(\lambda) = \text{share}(\lambda) \cdot \Sigma_{\iota=1}^{n(\lambda)} - v_\iota(\lambda) \cdot b_\iota^*(\lambda)$$
$$+ \Sigma_{\iota=n(\lambda)+1}^{n(\lambda)+\zeta(\lambda)} - \text{coef}_\iota(\lambda) \cdot b_\iota^*(\lambda)$$

for $\lambda$ that satisfies $LAB(\lambda) = \neg v(\lambda)^\rightarrow$, $$C(0) = \upsilon \cdot b_1(0) + \Sigma_{\iota=2}^I - \upsilon_\iota(0) \cdot b_\iota(0),$$

$$C(\lambda) = \upsilon \cdot \Sigma_{\iota=1}^{n(\lambda)} - w_\iota(\lambda) \cdot b_\iota(\lambda) + \Sigma_{\iota=n(\lambda)+1}^{n(\lambda)+\zeta(\lambda)} - \upsilon_\iota(\lambda) \cdot b_\iota(\lambda),$$

$\Psi$ represents an integer greater than or equal to 1,
$n(\psi)$ represents an integer greater than or equal to 1,
$\zeta(\psi)$ represents an integer greater than or equal to 0,
$\psi = 0, \ldots, \Psi$,
$\lambda = 1, \ldots, \Psi$,
$LAB(\lambda)$ are labels associated with $\lambda = 1, \ldots, \Psi$,
$LAB(\lambda)$ represents $v(\lambda)^\rightarrow$ or $\neg v(\lambda)^\rightarrow$,
$\neg$ represents logical negation,
$\Sigma$ represents summation,
SE is secret information,
share($\lambda$) is share information of SE,
$b_i(\psi)$ represents an $n(\psi)+\zeta(\psi)$-dimensional basis vector,
$b_i^*(\psi)$ represents an $n(\psi)+\zeta(\psi)$-dimensional basis vector,
$i = 1, \ldots, n(\psi)+\zeta(\psi)$,
$v\lambda_\mu(\lambda)$ represents a $\mu$-th element of $v(\lambda)^\rightarrow = (v_1(\lambda), \ldots, v_{n(\lambda)}(\lambda))$,
$w\lambda_\mu(\lambda)$ represents a $\mu$-th element of $w(\lambda)^\rightarrow = (w_1(\lambda), \ldots, w_{n(\lambda)}(\lambda))$,
$\mu = 1, \ldots, n(\lambda)$,
I is a constant greater than or equal 2 and less than or equal to $n(0)+\zeta(0)$, and
$\text{coef}_\iota(0), \text{coef}(\lambda), \text{coef}_\iota(\lambda), \upsilon$ and $\upsilon_\iota(\psi)$ are elements of a finite field or a finite ring.

28. An information processing method comprising:
inputting, by a decryptor, a first information corresponding to a particular piece of first correspondence information and second information corresponding to a particular piece of second correspondence information into a decryption function of a functional encryption scheme and, generating a decryption result by the decryptor, when a truth value of a logical formula corresponding to a combination of the particular piece of first correspondence information and the particular piece of second correspondence information is true, the first information being a first ciphertext or first key information of the functional encryption scheme, the second information being second key information of the functional encryption scheme when the first information is the first ciphertext, and the second information being a second ciphertext of the functional encryption scheme when the first information is the first key information; and selecting, by a second selector, whether the second information is to be the second ciphertext or the second key information, using identification information PI for identifying the protocols or each of the particular protocols to be executed, the second key information being used for decryption of the first ciphertext.

29. An information processing method comprising:
inputting, by a decryptor, a first information corresponding to a first vector and second information corresponding to a second vector into a decryption function of a functional encryption scheme and, generating a decryption result by the decryptor, the first information being a first ciphertext or first key information of the functional encryption scheme, the second information being second key information of the functional encryption scheme when the first information is the first ciphertext, and the second information being a second ciphertext of the functional encryption scheme when the first information is the first key information, the first vector corresponding to a first identifier or a combination of a plurality of first identifiers, the second vector corresponding to a second identifier or a combination of a plurality of second identifiers, the first identifier or the first identifiers being identified in according to a rule for a combination of protocols or each of the protocols that are in accordance with the functional encryption scheme, and the second identifier or the second identifiers being identified in according to the rule, wherein the first vector is $v^\rightarrow = (v_1, \ldots, v_n)$ and the second vector is $w^\rightarrow = (w_1, \ldots, w_n)$, the first ciphertext includes $\upsilon_1 \cdot (\Sigma_{\mu=1}^n v_\mu \cdot b_\mu) + \upsilon_2 \cdot b_{n+1} + \ldots + \upsilon_{\xi+1} \cdot b_{n+\xi}$ and the second key information is $\alpha \cdot (\Sigma_{\mu=1}^n - w_\mu \cdot b_\mu^*) + \Sigma_{\iota=n+1}^{n+\xi} - \upsilon_\iota' \cdot b_\iota^*$, or;

the second ciphertext includes $\upsilon_1 \cdot (\Sigma_{\mu=1}^n w_\mu \cdot b_\mu) + \upsilon_2 \cdot b_{n+1} + \ldots + \upsilon_{\xi+1} \cdot b_{n+\xi}$ and the first key information is $\alpha \cdot (\Sigma_{\mu=1}^n v_\mu \cdot b_\mu^*) + \Sigma_{\iota=n+1}^{n+\xi} - \upsilon_\iota' \cdot b_\iota^*$, where $\mu = 1, \ldots, n$,
n represents an integer greater than or equal to 1,
$\xi$ is an integer greater than or equal to 1,
$i = 1, \ldots, n+\xi$,
$b_i$ represent an $n+\xi$-dimensional basis vector,
$b_i^*$ represent an $n+\xi$-dimensional basis vector,
$\Sigma$ represents summation,
$v_\mu$ represents the $\mu$-th element of $v^\rightarrow = (v_1, \ldots, v_n)$,
$w_\mu$ represents a $\mu$-th element of $w^\rightarrow = (w_1, \ldots, w_n)$, and
$\alpha, \upsilon_1, \ldots, \upsilon_{\xi+1}, \upsilon_\iota'$ are elements of a finite field or a finite ring.

30. An information processing method comprising:
inputting, by a decryptor, information corresponding to a particular piece of first correspondence information and second information corresponding to a particular piece of second correspondence information into a decryption function of a functional encryption scheme, and generating a decryption result by the decryptor, the first information being a first ciphertext or first key information of the functional encryption scheme, the second information being second key information of the functional encryption scheme when the first information is the first ciphertext, and the second information being second ciphertext of the functional encryption scheme when the first information is the first key information, the first correspondence information corresponding to a first identifier or a combination of a plurality of first identifiers, the second correspondence information corresponding to a second identifier or a combination of a plurality of second identifiers, the first identifier or the first identifiers being identified in according to a rule for a combination of protocols or each of the protocols that are in accordance with the functional encryption scheme, and the second identifier or the second identifiers being identified in according to the rule, wherein the first correspondence information includes a plurality of pieces of first partial correspondence information and the second correspondence information includes a plurality of pieces of second partial correspondence information, partial combinations each consisting of each of the pieces of the first partial correspondence information and each of the pieces of the second partial correspondence information, when each of the partial combinations is input into a predetermined function, each of the partial combinations is true or false, a first partial combination of the partial combinations is true when the predetermined function returns the particular value for the first partial combination, a second partial combination of the partial combinations is true when the predetermined function does not return the particular value for the second partial combination, the decryption function returns the decryption result when a fifth vector exists in a vector space formed by particular vectors, each of the particular vectors being associated with each of the pieces of the first partial correspondence information or the second partial correspondence information of the partial combinations being true, the pieces of the first partial correspondence information are first vectors and the pieces of the second partial correspondence information are second vectors, and the predetermined function calculates an inner product of each vector of the first vectors and each vector of the second vectors, and the particular value is 0.

31. The information processing method according to claim 30, wherein the pieces of the first partial correspondence information are first vectors and the pieces of the second partial correspondence information are second vectors, and the predetermined function calculates an inner product of each vector of the first vectors and each vector of the second vectors, and the particular value is 0, the first vectors are $v(1)^\rightarrow, \ldots, v(\Psi)^\rightarrow$ and second vectors are $w(1)^\rightarrow, \ldots, w(\Psi)^\rightarrow$ or, the first vectors are $w(1)^\rightarrow, \ldots, w(\Psi)^\rightarrow$ and the second vectors are $v(1)^\rightarrow, \ldots, v(\Psi)^\rightarrow$, the first key information includes $D^*(0), D^*(1), \ldots, D^*(\Psi)$ and the second ciphertext includes $C(0), C(1), \ldots, C(\Psi)$ or, the second key information includes $D^*(0), D^*(1), \ldots, D^*(\Psi)$ and the first ciphertext includes $C(0), C(1), \ldots, C(\Psi)$, where $$D^*(0) = -SE \cdot b_1^*(0) + \Sigma_{\iota=2}^{I} -\mathrm{coef}_\iota(0) \cdot b_\iota^*(0),$$

$$D^*(\lambda) = (\mathrm{share}(\lambda) + \mathrm{coef}(\lambda) \cdot v_1(\lambda)) \cdot b_1^*(\lambda)$$

$$+ \Sigma_{\iota=2}^{n(\lambda)} -\mathrm{coef}(\lambda) \cdot v_\iota(\lambda) \cdot b_\iota^*(\lambda)$$

$$+ \Sigma_{\iota=n(\lambda)+1}^{n(\lambda)+\zeta(\lambda)} -\mathrm{coef}_\iota(\lambda) \cdot b_\iota^*(\lambda)$$

for $\lambda$ that satisfies $\mathrm{LAB}(\lambda) = v(\lambda)^\rightarrow$, $$D^*(\lambda) = \mathrm{share}(\lambda) \cdot \Sigma_{\iota=1}^{n(\lambda)} -v_\iota(\lambda) \cdot b_\iota^*(\lambda)$$

$$+ \Sigma_{\iota=n(\lambda)+1}^{n(\lambda)+\zeta(\lambda)} -\mathrm{coef}_\iota(\lambda) \cdot b_\iota^*(\lambda)$$

for $\lambda$ that satisfies $\mathrm{LAB}(\lambda) = \neg v(\lambda)^\rightarrow$, $$C(0) = \upsilon \cdot b_1(0) + \Sigma_{\iota=2}^{I} -\upsilon_\iota(0) \cdot b_\iota(0),$$

$$C(\lambda) = \upsilon \cdot \Sigma_{\iota=1}^{n(\lambda)} -w_\iota(\lambda) \cdot b_\iota(\lambda) + \Sigma_{\iota=n(\lambda)+1}^{n(\lambda)+\zeta(\lambda)} -\upsilon_\iota(\lambda) \cdot b_\iota(\lambda),$$

and $\Psi$ represents an integer greater than or equal to 1,
$n(\psi)$ represents an integer greater than or equal to 1,
$\zeta(\psi)$ represents an integer greater than or equal to 0,
$\psi = 0, \ldots, \Psi$,
$\lambda = 1, \ldots, \Psi$,
$\mathrm{LAB}(\lambda)$ represents $v(\lambda)^\rightarrow$ or $\neg v(\lambda)^\rightarrow$,
$\neg$ represents logical negation,
$\Sigma$ represents summation,
SE is secret information,
$\mathrm{share}(\lambda)$ is share information of SE,
$b_i(\psi)$ represents an $n(\psi)+\zeta(\psi)$-dimensional basis vector,
$b_i^*(\psi)$ represents an $n(\psi)+\zeta(\psi)$-dimensional basis vector,
$i = 1, \ldots, n(\psi)+\zeta(\psi)$,
$v_\mu(\lambda)$ represents a $\mu$-th element of $v(\lambda)^\rightarrow = (v_1(\lambda), \ldots, v_{n(\lambda)}(\lambda))$,
$w_\mu(\lambda)$ represents a $\mu$-th element of $w(\lambda)^\rightarrow = (w_1(\lambda), \ldots, w_{n(\lambda)}(\lambda))$,
$\mu = 1, \ldots, n(\lambda)$,
I is a constant greater than or equal 2 and less than or equal to $n(0)+\zeta(0)$, and
$\mathrm{coef}_\iota(0)$, $\mathrm{coef}(\lambda)$, $\mathrm{coef}_\iota(\lambda)$, $\upsilon$ and $\upsilon_\iota(\psi)$ are elements of a finite field or a finite ring.

32. An information processing method comprising:

inputting, by a decryptor, a first information corresponding to a particular piece of first correspondence information and second information corresponding to a particular piece of second correspondence information into a decryption function of a functional encryption scheme and, generating a decryption result by the decryptor, when a truth value of a logical formula corresponding to a combination of the particular piece of first correspondence information and the particular piece of second correspondence information is true, the first information being a first ciphertext or first key information of the functional encryption scheme, the second information being second key information of the functional encryption scheme when the first information is the first ciphertext, and the second information being a second ciphertext of the functional encryption scheme when the first information is the first key information, the first correspondence information corresponding to a first identifier or a combination of a plurality of first identifiers, the second correspondence information corresponding to a second identifier or a combination of a plurality of second identifiers, the first identifier or the first identifiers being identified in according to a rule for a combination of protocols or each of the protocols that are in accordance with the functional encryption scheme, and the second identifier or the second identifiers being identified in according to the rule, wherein the protocols are selected from a set including at least one of a Timed-Release encryption protocol, a Forward Secure encryption protocol, a Key Insulated encryption protocol, a CCA2 secure encryption protocol, and a Keyword search encryption protocol;

when the protocols include the Timed-Release encryption protocol, the first identifier or any of the plurality of the first identifiers represents information identifying a time point after the time of generation of the first information;

when the protocols include the Forward Secure encryption protocol or the Key Insulated encryption protocol, the first identifier or any of the plurality of the first identifiers represents information identifying a time period including a time of generation of the first information or a time period after a time of generation of the first information;

when the protocols include the CCA2 secure encryption protocol, the first identifier or any of the plurality of the first identifiers represents one-time information which is newly set each time the first information is generated; and when the protocols include the Keyword search encryption protocol, the first identifier or any of the plurality of the first identifiers represents information identifying a keyword corresponding to the first key information for searching a database in which a third ciphertext of information to be searched is associated with the second ciphertext, the keyword corresponding to the information to be searched.

33. A non-transitory computer-readable recording medium on which a program for causing a computer to function as the information output apparatus according to any one of claims 17 to 19 is recorded.

34. A non-transitory computer-readable recording medium on which a program for causing a computer to function as the information processing apparatus according to any one of claims 20 to 21, and 22 to 24 is recorded.

* * * * *

UNITED STATES PATENT AND TRADEMARK OFFICE
CERTIFICATE OF CORRECTION

PATENT NO. : 8,938,068 B2
APPLICATION NO. : 13/387764
DATED : January 20, 2015
INVENTOR(S) : Tetsutaro Kobayashi et al.

It is certified that error appears in the above-identified patent and that said Letters Patent is hereby corrected as shown below:

IN THE SPECIFICATION

Column 10, line 37, change "$v_1 \cdot g_1 \in G_1$" to --$\kappa_1 \cdot g_1 \in G_1$--.

Column 18, line 53, change "$C_2 = v_1 \cdot (\Sigma_{\mu=1}^{n} v_\mu \cdot b_\mu) + v_2 \cdot b_{n+1} \in G_1^{n+1}$ (45)" to --$C_2 = \upsilon_1 \cdot (\Sigma_{\mu=1}^{n} v_\mu \cdot b_\mu) + \upsilon_2 \cdot b_{n+1} \in G_1^{n+1}$ ... (45)--.

Column 18, line 58, change "$K = g_T^{\tau \cdot v2} \in G_T$" to --$K = g_T^{\tau \cdot \upsilon 2} \in G_T$--.

Column 18, line 59, change "v2 means $v_2$." to --υ2 means $\upsilon_2$.--.

Column 18, line 63, change "$v_2 \cdot b_{n+1}$" to --$\upsilon_2 \cdot b_{n+1}$--.

Column 19, line 27, change "$K = g_T^{\tau \cdot v2} \in G_T$" to --$K = g_T^{\tau \cdot \upsilon 2} \in G_T$--.

Column 19, line 52, change "$C_2 = v_1 \cdot (\Sigma_{\mu=1}^{n} w_\mu \cdot b_\mu) + v_2 \cdot b_{n+1} \in G_1^{n+1}$ (51)" to --$C_2 = \upsilon_1 \cdot (\Sigma_{\mu=1}^{n} w_\mu \cdot b_\mu) + \upsilon_2 \cdot b_{n+1} \in G_1^{n+1}$ ... (51)--.

Column 42, line 21, change "$v_{\xi+1}$" to --$\upsilon_{\xi+1}$--.

Column 42, line 25, change "$C_2 = v_1 \cdot (\Sigma_{\mu=1}^{n} v_\mu \cdot b_\mu) + v_2 \cdot b_{n+1} + \ldots v_{\xi+1} \cdot b_{n+\xi} \in G_1^{n+\xi}$ (54)" to --$C_2 = \upsilon_1 \cdot (\Sigma_{\mu=1}^{n} v_\mu \cdot b_\mu) + \upsilon_2 \cdot b_{n+1} + \ldots \upsilon_{\xi+1} \cdot b_{n+\xi} \in G_1^{n+\xi}$ ... (54)--.

Column 42, line 26, change "$C_2 = v_1 \cdot (\Sigma_{\mu=1}^{n} w_\mu \cdot b_\mu) + v_2 \cdot b_{n+1} + \ldots v_\xi \in G_1^{n+\xi}$" to --$C_2 = \upsilon_1 \cdot (\Sigma_{\mu=1}^{n} w_\mu \cdot b_\mu) + \upsilon_2 \cdot b_{n+1} + \ldots \upsilon_{\xi+1} \cdot b_{n+\xi} \in G_1^{n+\xi}$ ... (55)--.

Signed and Sealed this
Fifth Day of January, 2016

Michelle K. Lee
*Director of the United States Patent and Trademark Office*

CERTIFICATE OF CORRECTION (continued)
U.S. Pat. No. 8,938,068 B2

IN THE SPECIFICATION

Column 42, line 29, change "$D^* = \alpha \cdot (\Sigma_{\mu=1}^{n} w_\mu \cdot b_\mu^*) + v_{n+1} \cdot b_{n+1}^* \in G_2^{n+1}$ (56)" to
-- $D^* = \alpha \cdot (\Sigma_{\mu=1}^{n} w_\mu \cdot b_\mu^*) + \upsilon_{n+1} \cdot b_{n+1}^* \in G_2^{n+1}$ ... (56) --.

Column 42, line 32, change "$D^* = \alpha \cdot (\Sigma_{\mu=1}^{n} w_\mu \cdot b_\mu^*) + \Sigma_{\iota=n+1}^{n+\xi} v_\iota \cdot b_\iota^* \in G_2^{n+\xi}$ (57)" to
-- $D^* = \alpha \cdot (\Sigma_{\mu=1}^{n} w_\mu \cdot b_\mu^*) + \Sigma_{\iota=n+1}^{n+\xi} \upsilon_\iota \cdot b_\iota^* \in G_2^{n+\xi}$ ... (57) --.

Column 42, line 36, change "$D^* = \alpha \cdot (\Sigma_{\mu=1}^{n} n_\mu \cdot b_\mu^*) + v_{n+1} \cdot b_{n+1}^* \in G_2^{n+1}$ (58)" to
-- $D^* = \alpha \cdot (\Sigma_{\mu=1}^{n} v_\mu \cdot b_\mu^*) + \upsilon_{n+1} \cdot b_{n+1}^* \in G_2^{n+1}$ ... (58) --.

Column 42, line 39, change "$D^* = \alpha \cdot (\Sigma_{\mu=1}^{n} v_\mu \cdot b_\mu^*) \Sigma_{\iota=n+1}^{n+\xi} v_\iota \cdot b_\iota^* \in G_2^{n+\xi}$ (59)" to
-- $D^* = \alpha \cdot (\Sigma_{\mu=1}^{n} v_\mu \cdot b_\mu^*) + \Sigma_{\iota=n+1}^{n+\xi} \upsilon_\iota \cdot b_\iota^* \in G_2^{n+\xi}$ ... (59) --.

Column 42, line 40, change "$v_\iota$" to --$\upsilon_\iota$--.

Column 42, line 42, change may "$v_\iota$ may" to --$\upsilon_\iota$ may--, and change "$\Sigma_{\iota=n+1}^{n+\xi} v_\iota$" to --$\Sigma_{\iota=n+1}^{n+\xi} \upsilon_\iota$ --.

Column 42, line 43, change "$v_\iota$ may" to --$\upsilon_\iota$ may--, and change "that $v_\iota$" to --that $\upsilon_\iota$ may--.

Column 42, line 46, change "$\Sigma_{\iota=n+1}^{n+\xi} v_\iota = 0_F$ (60)" to -- $\Sigma_{\iota=n+1}^{n+\xi} \upsilon_\iota = 0_F$ ... (60) --.

Column 89, line 8, change "$v^{43} = (v_1, \ldots, v_n)$" to --$\vec{v} = (v_1, \ldots, v_n)$--.

Column 89, line 9, change "$w^{43} = (w_1, \ldots, w_n)$" to --$\vec{w} = (w_1, \ldots, w_n)$--.

Column 89, line 10, change "$\upsilon_1 \cdot (\Sigma_{\mu=1}^{n} v_\mu \cdot b_\mu) + \upsilon_2 \cdot b_{n+1} + \ldots + \upsilon_{\xi+1} \cdot b_{n+\xi}$" to
-- $\upsilon_1 \cdot (\sum_{\mu=1}^{n} v_\mu \cdot b_\mu) + \upsilon_2 \cdot b_{n+1} + \ldots + \upsilon_{\xi+1} \cdot b_{n+\xi}$ --.

Column 89, line 12, change "$\alpha \cdot (\Sigma_{\mu=1} - w_\mu \cdot b_\mu^*) + \Sigma_{\iota=n+1}^{n+\xi} - \upsilon_\iota' \cdot b_\iota^*$" to
-- $\alpha \cdot (\sum_{\mu=1}^{n} w_\mu \cdot b_\mu^*) + \sum_{\iota=n+1}^{n+\xi} \upsilon_\iota' \cdot b_\iota^*$ --.

CERTIFICATE OF CORRECTION (continued)
U.S. Pat. No. 8,938,068 B2

IN THE SPECIFICATION

Column 89, line 13, change "$\upsilon_1 \cdot (\Sigma_{\mu=1}{}^n \ w_\mu \cdot b_\mu) + \upsilon_2 \cdot b_{n+1} + \ldots + \upsilon_{\xi+1} \cdot b_{n+\xi}$" to -- $\upsilon_1 \cdot (\sum_{\mu=1}^{n} w_\mu \cdot b_\mu) + \upsilon_2 \cdot b_{n+1} + \ldots + \upsilon_{\xi+1} \cdot b_{n+\xi}$ --.

Column 89, line 16, change "$\alpha \cdot (\Sigma_{\mu=1}{}^n - v_\mu \cdot b_\mu{}^*) + \Sigma_{\iota=n+1}{}^{n+\xi} - \upsilon_\iota{}' \cdot b_\iota{}^*$" to -- $\alpha \cdot (\sum_{\mu=1}^{n} v_\mu \cdot b_\mu{}^*) + \sum_{\iota=n+1}^{n+\xi} \upsilon_\iota{}' \cdot b_\iota{}^*$ --.

Column 89, line 25, change "a element" to --a $\mu$-th element--.

Column 91, line 1, change "v(1)$^\rightarrow$,...,v($\Psi$)$^{43}$" to --v(1)$^\rightarrow$,...,v($\Psi$)$^\rightarrow$--.

Column 91, line 2, change "w(1)$^{43}$,...,w($\Psi$)$^\rightarrow$" to --w(1)$^\rightarrow$,...,w($\Psi$)$^\rightarrow$--.

Column 91, line 5, change "D$^*$(1),...,D($\Psi$)" to --D$^*$(1),...,D$^*$($\Psi$)--.

Column 91, line 8, change "D$^*$(1),...,D($\Psi$)" to --D$^*$(1),...,D$^*$($\Psi$)--.

Column 91, line 10, change "$D^*(0) = -SE \cdot b_1{}^*(0) + \Sigma_{\iota=2}{}^I - \text{coef}_\iota(0) \cdot b_\iota{}^*(0),$" to -- $D^*(0) = -SE \cdot b_1{}^*(0) + \sum_{\iota=2}^{I} \text{coef}_\iota(0) \cdot b_\iota{}^*(0),$ --.

Column 91, line 15, change "$+\Sigma_{\iota=2}{}^{n(\lambda)} - \text{coef}(\lambda) \cdot v_\iota(\lambda) \cdot b_\iota{}^*(\lambda),$" to -- $+\sum_{\iota=2}^{n(\lambda)} \text{coef}(\lambda) \cdot v_\iota(\lambda) \cdot b_\iota{}^*(\lambda)$ --.

Column 91, line 17, change "$+\Sigma_{\iota=n(\lambda)+1}{}^{n(\lambda)+\zeta(\lambda)} - \text{coef}_\iota(\lambda) \cdot b_\iota{}^*(\lambda)$" to -- $+\sum_{\iota=n(\lambda)+1}^{n(\lambda)+\zeta(\lambda)} \text{coef}_\iota(\lambda) \cdot b_\iota{}^*(\lambda)$ --.

Column 91, line 20, change "$D^*(\lambda) = \text{share}(\lambda) \cdot \Sigma_{\iota=1}{}^{n(\lambda)} - v_\iota(\lambda) \cdot b_\iota{}^*(\lambda)$" to -- $D^*(\lambda) = \text{share}(\lambda) \cdot \sum_{\iota=1}^{n(\lambda)} v_\iota(\lambda) \cdot b_\iota{}^*(\lambda)$ --.

Column 91, line 23, change "$+\Sigma_{\iota=n(\lambda)+1}{}^{n(\lambda)+\zeta(\lambda)} - \text{coef}_\iota(\lambda) \cdot b_\iota{}^*(\lambda)$" to -- $+\sum_{\iota=n(\lambda)+1}^{n(\lambda)+\zeta(\lambda)} \text{coef}_\iota(\lambda) \cdot b_\iota{}^*(\lambda)$ --.

CERTIFICATE OF CORRECTION (continued)
U.S. Pat. No. 8,938,068 B2

IN THE SPECIFICATION

Column 91, line 24, change "LAB($\lambda$)=✓ v($\lambda$)$^{\rightarrow}$," to --LAB($\lambda$)=¬v($\lambda$)$^{\rightarrow}$,--.

Column 91, line 26, change " $C(0)=\upsilon \cdot b_1(0)+\Sigma_{\iota=2}^{I}\upsilon_\iota(0)\cdot b_\iota(0),$ " to -- $C(0)=\upsilon \cdot b_1(0)+\sum_{\iota=2}^{I} \upsilon_\iota(0)\cdot b_\iota(0),$ --.

Column 91, lines 28-29, change " $C(\lambda)=\upsilon\cdot\Sigma_{\iota=1}^{n(\lambda)}w_\iota(\lambda)\cdot b_\iota(\lambda)+\Sigma_{\iota=n(\lambda)+1}^{n(\lambda)+\zeta(\lambda)}\upsilon_\iota(\lambda)\cdot b_\iota(\lambda),$ " to -- $C(\lambda)=\upsilon\cdot\sum_{\iota=1}^{n(\lambda)} w_\iota(\lambda)\cdot b_\iota(\lambda)+\sum_{\iota=n(\lambda)+1}^{n(\lambda)+\zeta(\lambda)} \upsilon_\iota(\lambda)\cdot b_\iota(\lambda),$ --.

Column 91, line 36, change "or ✓ v($\lambda$)$^{\rightarrow}$," to -- or ¬v($\lambda$)$^{\rightarrow}$,--.

Column 91, line 37, change " ✓ represents" to --¬ represents--.

Column 93, line 33, change " $\upsilon_1\cdot(\Sigma_{\mu=1}^{n} v_\mu\cdot b_\mu)+\upsilon_2\cdot b_{n+1}+...+\upsilon_{\xi+1}\cdot b_{n+\xi}$ " to -- $\upsilon_1\cdot(\sum_{\mu=1}^{n} v_\mu\cdot b_\mu)+\upsilon_2\cdot b_{n+1}+...+\upsilon_{\xi+1}\cdot b_{n+\xi}$ --.

Column 93, line 35, change " $\alpha\cdot(\Sigma_{\mu=1}^{n}v_\mu\cdot b_\mu^*)+\Sigma_{\iota=n+1}^{n+\xi}\upsilon_\iota'\cdot b_\iota^*,$ where" to -- $\alpha\cdot(\sum_{\mu=1}^{n} v_\mu\cdot b_\mu^*)+\sum_{\iota=n+1}^{n+\xi} \upsilon_\iota'\cdot b_\iota^*,$ where--.

Column 93, line 38, change "$\xi$is" to --$\xi$ is--.

Column 93, line 65, change "D$^*$(1),...,D($\Psi$)" to --D$^*$(1),...,D$^*$($\Psi$)--.

Column 94, line 1, change " $D^*(0)=-SE\cdot b_1^*(0)+\Sigma_{\iota=2}^{I}-coef_\iota(0)\cdot b_\iota^*(0),$ " to -- $D^*(0)=-SE\cdot b_1^*(0)+\sum_{\iota=2}^{I} coef_\iota(0)\cdot b_\iota^*(0),$ --.

Column 94, line 5, change " $+\Sigma_{\iota=2}^{n(\lambda)}-coef(\lambda)\cdot v_\iota(\lambda)\cdot b_\iota^*(\lambda),$ " to -- $+\sum_{\iota=2}^{n(\lambda)} coef(\lambda)\cdot v_\iota(\lambda)\cdot b_\iota^*(\lambda)$ --.

CERTIFICATE OF CORRECTION (continued)
U.S. Pat. No. 8,938,068 B2

IN THE SPECIFICATION

Column 94, line 7, change "$+\Sigma_{\iota=n(\lambda)+1}^{n(\lambda)+\zeta(\lambda)}-\text{coef}_{\iota}(\lambda)\cdot b_{\iota}^{*}(\lambda)$," to --$+\sum_{\iota=n(\lambda)+1}^{n(\lambda)+\zeta(\lambda)} \text{coef}_{\iota}(\lambda)\cdot b_{\iota}^{*}(\lambda)$--.

Column 94, line 10, change "$D^{*}(\lambda)=\text{share}(\lambda)\cdot\Sigma_{\iota=1}^{n(\lambda)}-v_{\iota}(\lambda)\cdot b_{\iota}^{*}(\lambda)$," to --$D^{*}(\lambda)=\text{share}(\lambda)\cdot\sum_{\iota=1}^{n(\lambda)} v_{\iota}(\lambda)\cdot b_{\iota}^{*}(\lambda)$--.

Column 94, line 12, change "$+\Sigma_{\iota=n(\lambda)+1}^{n(\lambda)+\zeta(\lambda)}-\text{coef}_{\iota}(\lambda)\cdot b_{\iota}^{*}(\lambda)$," TO --$+\sum_{\iota=n(\lambda)+1}^{n(\lambda)+\zeta(\lambda)} \text{coef}_{\iota}(\lambda)\cdot b_{\iota}^{*}(\lambda)$--.

Column 94, line 13, change " LAB($\lambda$)=v($\lambda$)$^{\rightarrow}$," to --LAB($\lambda$)=¬v($\lambda$)$^{\rightarrow}$,--.

Column 94, line 15, change "$C(0)=\upsilon\cdot b_{1}(0)+\Sigma_{\iota=2}^{I}-\upsilon_{\iota}(0)\cdot b_{\iota}(0),$" to --$C(0)=\upsilon\cdot b_{1}(0)+\sum_{\iota=2}^{I} \upsilon_{\iota}(0)\cdot b_{\iota}(0),$--.

Column 94, lines 17-18, change "$C(\lambda)=\upsilon\cdot\Sigma_{\iota=1}^{n(\lambda)}-w_{\iota}(\lambda)\cdot b_{\iota}(\lambda)+\Sigma_{\iota=n(\lambda)+1}^{n(\lambda)+\zeta(\lambda)}-\upsilon_{\iota}(\lambda)\cdot b_{\iota}(\lambda),$" to --$C(\lambda)=\upsilon\cdot\sum_{\iota=1}^{n(\lambda)} w_{\iota}(\lambda)\cdot b_{\iota}(\lambda)+\sum_{\iota=n(\lambda)+1}^{n(\lambda)+\zeta(\lambda)} \upsilon_{\iota}(\lambda)\cdot b_{\iota}(\lambda),$--.

Column 94, line 25, change "∨ v($\lambda$)$^{\rightarrow}$," to --¬v($\lambda$)$^{\rightarrow}$,--.

Column 94, line 26, change "∨ represents" to --¬ represents--.

CERTIFICATE OF CORRECTION (continued)
U.S. Pat. No. 8,938,068 B2

IN THE SPECIFICATION

Column 95, lines 25-30, change
"the first ciphertext includes $v_1 \cdot (\Sigma_{\mu=1}^{n} v_\mu \cdot b_\mu) + v_2 \cdot b_{n+1} + \ldots + v_{\xi+1} \cdot b_{n+\xi}$ and the second key information is $\alpha \cdot (\Sigma_{\mu=1}^{n} w_\mu \cdot b_\mu^*) + \Sigma_{\iota=n+1}^{n+\xi} -v_\iota' \cdot b_\iota^*$ or;
the second ciphertext includes $v_1 \cdot (\Sigma_{\mu=1}^{n} w_\mu \cdot b_\mu) + v_2 \cdot b_{n+1} + \ldots + v_{\xi+1} \cdot b_{n+\xi}$ and the first key information is $\alpha \cdot (\Sigma_{\mu=1}^{n} v_\mu \cdot b_\mu^*) + \Sigma_{\iota=n+1}^{n+\xi} -v_\iota' \cdot b_\iota^*$, where" to -- the first ciphertext includes $v_1 \cdot (\sum_{\mu=1}^{n} v_\mu \cdot b_\mu) + v_2 \cdot b_{n+1} + \ldots + v_{\xi+1} \cdot b_{n+\xi}$ and the second key information is $$\alpha \cdot (\sum_{\mu=1}^{n} w_\mu \cdot b_\mu^*) + \sum_{\iota=n+1}^{n+\xi} v_\iota' \cdot b_\iota^* \text{ or;}$$

the second ciphertext includes $v_1 \cdot (\sum_{\mu=1}^{n} w_\mu \cdot b_\mu) + v_2 \cdot b_{n+1} + \ldots + v_{\xi+1} \cdot b_{n+\xi}$ and the first key information is $$\alpha \cdot (\sum_{\mu=1}^{n} v_\mu \cdot b_\mu^*) + \sum_{\iota=n+1}^{n+\xi} v_\iota' \cdot b_\iota^*, \text{ where} \text{ --.}$$

Column 96, line 38, change "$D^*(1),\ldots,D(\Psi)$" to --$D^*(1),\ldots,D^*(\Psi)$--.

Column 96, line 41, change "$D^*(1),\ldots,D(\Psi)$" to --$D^*(1),\ldots,D^*(\Psi)$--.

Column 96, line 43, change "$D^*(0) = -SE \cdot b_1^*(0) + \Sigma_{\iota=2}^{I} -\text{coef}_\iota(0) \cdot b_\iota^*(0),$" to -- $D^*(0) = -SE \cdot b_1^*(0) + \sum_{\iota=2}^{I} \text{coef}_\iota(0) \cdot b_\iota^*(0),$ --.

Column 96, line 47, change "$+\Sigma_{\iota=2}^{n(\lambda)} -\text{coef}(\lambda) \cdot v_\iota(\lambda) \cdot b_\iota^*(\lambda)$" to -- $+\sum_{\iota=2}^{n(\lambda)} \text{coef}(\lambda) \cdot v_\iota(\lambda) \cdot b_\iota^*(\lambda)$ --.

Column 96, line 49, change "$+\Sigma_{\iota=n(\lambda)+1}^{n(\lambda)+\zeta(\lambda)} -\text{coef}_\iota(\lambda) \cdot b_\iota^*(\lambda)$" to -- $+\sum_{\iota=n(\lambda)+1}^{n(\lambda)+\zeta(\lambda)} \text{coef}_\iota(\lambda) \cdot b_\iota^*(\lambda)$ --.

Column 96, line 52, change "$D^*(\lambda) = \text{share}(\lambda) \cdot \Sigma_{\iota=1}^{n(\lambda)} -v_\iota(\lambda) \cdot b_\iota^*(\lambda)$" to -- $D^*(\lambda) = \text{share}(\lambda) \cdot \sum_{\iota=1}^{n(\lambda)} v_\iota(\lambda) \cdot b_\iota^*(\lambda)$ --.

IN THE SPECIFICATION

CERTIFICATE OF CORRECTION (continued)
U.S. Pat. No. 8,938,068 B2

Column 96, line 54, change "$+\Sigma_{\iota=n(\lambda)+1}^{n(\lambda)+\zeta(\lambda)}-\text{coef}_\iota(\lambda)\cdot b_\iota^*(\lambda)$," to -- $+\sum_{\iota=n(\lambda)+1}^{n(\lambda)+\zeta(\lambda)} \text{coef}_\iota(\lambda)\cdot b_\iota^*(\lambda)$ --.

Column 96, line 55, change "LAB($\lambda$)= $\vee$ v($\lambda$)$^\rightarrow$," to --LAB($\lambda$)=$\neg$ v($\lambda$)$^\rightarrow$,--.

Column 96, line 56, change "$C(0)=\upsilon\cdot b_1 1(0)+\Sigma_{\iota=2}^I -\upsilon_\iota(0)\cdot b_\iota(0)$," to -- $C(0)=\upsilon\cdot b_1(0)+\sum_{\iota=2}^I \upsilon_\iota(0)\cdot b_\iota(0)$, --.

Column 96, lines 58-59, change "$C(\lambda)=\upsilon\cdot\Sigma_{\iota=1}^{n(\lambda)}-w_\iota(\lambda)\cdot b_\iota(\lambda)+\Sigma_{\iota=n(\lambda)+1}^{n(\lambda)+\zeta(\lambda)}-\upsilon_\iota(\lambda)\cdot b_\iota(\lambda)$,"

to -- $C(\lambda)=\upsilon\cdot\sum_{\iota=1}^{n(\lambda)} w_\iota(\lambda)\cdot b_\iota(\lambda)+\sum_{\iota=n(\lambda)+1}^{n(\lambda)+\zeta(\lambda)} \upsilon_\iota(\lambda)\cdot b_\iota(\lambda)$, --.

Column 96, line 60, change "$\Psi$ represents" to --$\Psi$ represents--.

Column 96, line 67, change " $\vee$ represents" to --$\neg$ represents--.

Column 98, line 6, change "by determiner" to --by a determiner--.

Column 98, line 21, change "first unitselector," to --first selector,--.

Column 98, line 29, change "determiner a" to --determiner, a--.

Column 98, line 43, change "$\upsilon_1\cdot(\Sigma_{\mu=1}^n v_\mu\cdot b_\mu)+\upsilon_2\cdot$," to -- $\upsilon_1\cdot(\sum_{\mu=1}^n v_\mu\cdot b_\mu)+\upsilon_2\cdot$ --.

Column 98, line 45, change "$\alpha\cdot(\Sigma_{\mu=1}^n -v_\mu\cdot b_\mu^*)+\Sigma_{\iota=n+1}^{n+\xi}-\upsilon_\iota'\cdot b_\iota^*$, where " to -- $\alpha\cdot(\sum_{\mu=1}^n v_\mu\cdot b_\mu^*)+\sum_{\iota=n+1}^{n+\xi} \upsilon_\iota'\cdot b_\iota^*$, where --.

Column 99, line 9, change "$D^*(1),...,D(\Psi)$" to --$D^*(1),...,D^*(\Psi)$--.

Column 99, line 12, change "$D^*(0)=-SE\cdot b_1^*(0)+\Sigma_{\iota=2}^I -\text{coef}_\iota(0)\cdot b_\iota^*(0)$," to -- $D^*(0)=-SE\cdot b_1^*(0)+\sum_{\iota=2}^I \text{coef}_\iota(0)\cdot b_\iota^*(0)$, --.

IN THE SPECIFICATION

Column 99, line 16, change "$+\Sigma_{\iota=2}^{n(\lambda)}-\text{coef}(\lambda)\cdot v_{\iota(\lambda)}\cdot b_\iota^*(\lambda),$" to -- $+\sum_{\iota=2}^{n(\lambda)} \text{coef}(\lambda)\cdot v_\iota(\lambda)\cdot b_\iota^*(\lambda)$ --.

Column 99, line 19, change "$+\Sigma_{\iota=n(\lambda)+1}^{n(\lambda)+\zeta(\lambda)}-\text{coef}_\iota(\lambda)\cdot b_\iota^*(\lambda),$" to -- $+\sum_{\iota=n(\lambda)+1}^{n(\lambda)+\zeta(\lambda)} \text{coef}_\iota(\lambda)\cdot b_\iota^*(\lambda)$ --.

Column 99, line 21, change "$D^*(\lambda)=\text{share}(\lambda)\cdot\Sigma_{\iota=1}^{n(\lambda)}-v_\iota(\lambda)\cdot b_\iota^*(\lambda),$" to -- $D^*(\lambda)=\text{share}(\lambda)\cdot\sum_{\iota=1}^{n(\lambda)} v_\iota(\lambda)\cdot b_\iota^*(\lambda)$ --.

Column 99, line 23, change "$+\Sigma_{\iota=n(\lambda)+1}^{n(\lambda)+\zeta(\lambda)}-\text{coef}_\iota(\lambda)\cdot b_\iota^*(\lambda),$" to -- $+\sum_{\iota=n(\lambda)+1}^{n(\lambda)+\zeta(\lambda)} \text{coef}_\iota(\lambda)\cdot b_\iota^*(\lambda)$ --.

Column 99, line 25, change "LAB($\lambda$)= ∨ v($\lambda$)$^\rightarrow$," to --LAB($\lambda$)=¬ v($\lambda$)$^\rightarrow$,--.

Column 99, line 26, change "$C(0)=v\cdot b_1 1(0)+\Sigma_{\iota=2}^{I}-v_\iota(0)\cdot b_\iota(0),$" to -- $C(0)=v\cdot b_1(0)+\sum_{\iota=2}^{I} v_\iota(0)\cdot b_\iota(0),$ --.

Column 99, lines 28-29, change "$C(\lambda)=v\cdot\Sigma_{\iota=1}^{n(\lambda)}-w_\iota(\lambda)\cdot b_\iota(\lambda)+\Sigma_{\iota=n(\lambda)+1}^{n(\lambda)+\zeta(\lambda)}-v_\iota(\lambda)\cdot b_\iota(\lambda),$" to -- $C(\lambda)=v\cdot\sum_{\iota=1}^{n(\lambda)} w_\iota(\lambda)\cdot b_\iota(\lambda)+\sum_{\iota=n(\lambda)+1}^{n(\lambda)+\zeta(\lambda)} v_\iota(\lambda)\cdot b_\iota(\lambda),$ --.

Column 99, line 36, change " ∨ v($\lambda$)$^\rightarrow$," to --¬ v($\lambda$)$^\rightarrow$,--.

Column 99, line 37, change " ∨represents" to --¬ represents--.

Column 100, line 33, change "$w^{43}=(w_1,...,w_n),$" to -- $w^\rightarrow=(w_1,...,w_n),$--.

IN THE SPECIFICATION

Column 100, lines 34-39, change the first ciphertext includes $\upsilon_1 \cdot (\Sigma_{\mu=1}^{n} v_\mu \cdot b_\mu) + \upsilon_2 \cdot b_{n+1} + \ldots + \upsilon_{\xi+1} \cdot b_{n+\xi}$ *and the second key information is* $\alpha \cdot (\Sigma_{\mu=1}^{n} w_\mu \cdot b_\mu^*) + \Sigma_{\iota=n+1}^{n+\xi} - \upsilon_\iota' \cdot b_\iota^*$, or;

the second ciphertext includes $\upsilon_1 \cdot (\Sigma_{\mu=1}^{n} w_\mu \cdot b_\mu) + \upsilon_2 \cdot b_{n+1} + \ldots + \upsilon_{\xi+1} \cdot b_{n+\xi}$ *and the first key information is* $\alpha \cdot (\Sigma_{\mu=1}^{n} v_\mu \cdot b_\mu^*) + \Sigma_{\iota=n+1}^{n+\xi} - \upsilon_\iota' \cdot b_\iota^*$, where " to -- the first ciphertext includes $\upsilon_1 \cdot (\sum_{\mu=1}^{n} v_\mu \cdot b_\mu) + \upsilon_2 \cdot b_{n+1} + \ldots + \upsilon_{\xi+1} \cdot b_{n+\xi}$ and the second key information is $\alpha \cdot (\sum_{\mu=1}^{n} w_\mu \cdot b_\mu^*) + \sum_{\iota=n+1}^{n+\xi} \upsilon_\iota' \cdot b_\iota^*$ or;

the second ciphertext includes $\upsilon_1 \cdot (\sum_{\mu=1}^{n} w_\mu \cdot b_\mu) + \upsilon_2 \cdot b_{n+1} + \ldots + \upsilon_{\xi+1} \cdot b_{n+\xi}$ and the first key information is $\alpha \cdot (\sum_{\mu=1}^{n} v_\mu \cdot b_\mu^*) + \sum_{\iota=n+1}^{n+\xi} \upsilon_\iota' \cdot b_\iota^*$, where --.

Column 101, line 20, change "returns the" to --returns a--.

Column 101, line 45, change "$v(1)^\rightarrow,\ldots,v(\Psi)^{43}$" to --$v(1)^\rightarrow,\ldots,v(\Psi)^\rightarrow$--.

Column 101, line 46, change "$v(1)^{43},\ldots,v(\Psi)^\rightarrow$" to --$v(1)^\rightarrow,\ldots,v(\Psi)^\rightarrow$--.

Column 101, line 49, change "$D^*(1),\ldots,D(\Psi)$" to --$D^*(1),\ldots,D^*(\Psi)$--.

Column 101, line 52, change "$D^*(1),\ldots,D(\Psi)$" to --$D^*(1),\ldots,D^*(\Psi)$--.

Column 101, line 55, change " $D^*(0) = -SE \cdot b_1^*(0) + \Sigma_{\iota=2}^{I} -\text{coef}_\iota(0) \cdot b_\iota^*(0),$ " to -- $D^*(0) = -SE \cdot b_1^*(0) + \sum_{\iota=2}^{I} \text{coef}_\iota(0) \cdot b_\iota^*(0),$ --.

Column 101, line 59, change " $+\Sigma_{\iota=2}^{n(\lambda)} -\text{coef}(\lambda) \cdot v_\iota(\lambda) \cdot b_\iota^*(\lambda)$ " to -- $+\sum_{\iota=2}^{n(\lambda)} \text{coef}(\lambda) \cdot v_\iota(\lambda) \cdot b_\iota^*(\lambda)$ --.

IN THE SPECIFICATION

CERTIFICATE OF CORRECTION (continued)
U.S. Pat. No. 8,938,068 B2

Column 101, line 61, change "$+\Sigma_{\iota=n(\lambda)+1}^{n(\lambda)+\zeta(\lambda)}-\mathrm{coef}_\iota(\lambda)\cdot b_\iota^*(\lambda)$," to -- $+\sum_{\iota=n(\lambda)+1}^{n(\lambda)+\zeta(\lambda)} \mathrm{coef}_\iota(\lambda)\cdot b_\iota^*(\lambda)$ --.

Column 101, line 64, change "$D^*(\lambda)=\mathrm{share}(\lambda)\cdot\Sigma_{\iota=1}^{n(\lambda)}-v_\iota(\lambda)\cdot b_\iota^*(\lambda)$," to -- $D^*(\lambda)=\mathrm{share}(\lambda)\cdot \sum_{\iota=1}^{n(\lambda)} v_\iota(\lambda)\cdot b_\iota^*(\lambda)$ --.

Column 101, line 66, change "$+\Sigma_{\iota=n(\lambda)+1}^{n(\lambda)+\zeta(\lambda)}-\mathrm{coef}_\iota(\lambda)\cdot b_\iota^*(\lambda)$," to -- $+\sum_{\iota=n(\lambda)+1}^{n(\lambda)+\zeta(\lambda)} \mathrm{coef}_\iota(\lambda)\cdot b_\iota^*(\lambda)$ --.

Column 102, line 1, change "LAB($\lambda$)= ∨ v($\lambda$)$^\rightarrow$," to --LAB($\lambda$)=¬ v($\lambda$)$^\rightarrow$,--.

Column 102, line 2, change "$C(0)=\upsilon\cdot b_1(0)+\Sigma_{\iota=2}^I-\upsilon_\iota(0)\cdot b_\iota(0)$," to -- $C(0)=\upsilon\cdot b_1(0)+\sum_{\iota=2}^I \upsilon_\iota(0)\cdot b_\iota(0),$ --.

Column 102, lines 3-4, change "$C(\lambda)=\upsilon\cdot\Sigma_{\iota=1}^{n(\lambda)}-w_\iota(\lambda)\cdot b_\iota(\lambda)+\Sigma_{\iota=n(\lambda)+1}^{n(\lambda)+\zeta(\lambda)}-\upsilon_\iota(\lambda)\cdot b_\iota(\lambda),$" to -- $C(\lambda)=\upsilon\cdot\sum_{\iota=1}^{n(\lambda)} w_\iota(\lambda)\cdot b_\iota(\lambda)+\sum_{\iota=n(\lambda)+1}^{n(\lambda)+\zeta(\lambda)} \upsilon_\iota(\lambda)\cdot b_\iota(\lambda),$ --.

Column 102, line 12, change " ∨ v($\lambda$)$^\rightarrow$," to --¬ v($\lambda$)$^\rightarrow$,--.

Column 102, line 13, change " ∨ represents" to --¬ represents--.